US008554586B2

(12) United States Patent
Barth et al.

(10) Patent No.: US 8,554,586 B2
(45) **Date of Patent: *Oct. 8, 2013**

(54) MANAGING CONSISTENT INTERFACES FOR BUSINESS OBJECTS ACROSS HETEROGENEOUS SYSTEMS

(75) Inventors: Robert Barth, Ludwigshafen (DE); Dalibor Dvorak, Nussloch (CZ); Juergen Hollberg, Wiesloch (DE); Christian Pretzsch, Heidelberg (DE)

(73) Assignee: SAP AG, Walldorf (DE)

( * ) Notice: Subject to any disclaimer, the term of this patent is extended or adjusted under 35 U.S.C. 154(b) by 16 days.

This patent is subject to a terminal disclaimer.

(21) Appl. No.: 13/186,361

(22) Filed: Jul. 19, 2011

(65) Prior Publication Data

US 2011/0276360 A1 Nov. 10, 2011

Related U.S. Application Data

(63) Continuation of application No. 12/147,399, filed on Jun. 26, 2008, now abandoned.

(51) Int. Cl.
*G06Q 40/00* (2012.01)

(52) U.S. Cl.
USPC .......... 705/4; 705/14; 705/32; 705/35; 707/5; 709/223; 713/185; 235/114

(58) Field of Classification Search
USPC ..................... 705/14, 32, 35; 707/5; 709/223; 713/185; 235/114
See application file for complete search history.

(56) References Cited

U.S. PATENT DOCUMENTS

| | | | | |
|---|---|---|---|---|
| 3,223,321 | A * | 12/1965 | Baumgartner | 235/114 |
| 5,126,936 | A | 6/1992 | Champion et al. | |
| 5,210,686 | A | 5/1993 | Jernigan | |
| 5,247,575 | A | 9/1993 | Sprague et al. | |
| 5,255,181 | A | 10/1993 | Chapman et al. | |
| 5,463,555 | A | 10/1995 | Ward et al. | |
| 5,717,925 | A | 2/1998 | Harper et al. | |
| 5,787,237 | A | 7/1998 | Reilly | |
| 5,812,987 | A | 9/1998 | Luskin et al. | |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

SAP Structured Entity Relationship Model (SAP-SERM) for R/3 System Release 4.0 Introduction and Index; Dec. 1998; 26 pages.

(Continued)

*Primary Examiner* — James Trammell
*Assistant Examiner* — Sanjeev Malhotra
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a budget availability control register, a financial accounting view of work order, a funds commitment document, an insurance contract, and/or a project cost estimate business object.

3 Claims, 167 Drawing Sheets

(56) References Cited

U.S. PATENT DOCUMENTS

| | | | | |
|---|---|---|---|---|
| 5,970,465 | A | 10/1999 | Dietrich et al. | |
| 5,970,475 | A | 10/1999 | Barnes et al. | |
| 5,983,284 | A | 11/1999 | Argade | |
| 6,047,264 | A | 4/2000 | Fisher et al. | |
| 6,058,378 | A | 5/2000 | Clark et al. | |
| 6,073,137 | A | 6/2000 | Brown et al. | |
| 6,104,393 | A | 8/2000 | Santos-Gomez | |
| 6,115,690 | A | 9/2000 | Wong | |
| 6,125,391 | A * | 9/2000 | Meltzer et al. | 709/223 |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 | 10/2001 | Coutts et al. | |
| 6,327,700 | B1 | 12/2001 | Chen et al. | |
| 6,332,163 | B1 | 12/2001 | Bowman-Amuah | |
| 6,374,252 | B1 | 4/2002 | Althoff et al. | |
| 6,401,101 | B1 | 6/2002 | Britton et al. | |
| 6,424,979 | B1 | 7/2002 | Livingston et al. | |
| 6,438,594 | B1 | 8/2002 | Bowman-Amuah | |
| 6,442,620 | B1 | 8/2002 | Thatte et al. | |
| 6,513,019 | B2 | 1/2003 | Lewis | |
| 6,523,027 | B1 | 2/2003 | Underwood | |
| 6,542,912 | B2 | 4/2003 | Meltzer et al. | |
| 6,591,260 | B1 | 7/2003 | Schwartzhoff et al. | |
| 6,643,660 | B1 | 11/2003 | Miller et al. | |
| 6,725,122 | B2 | 4/2004 | Mori et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,055,132 | B2 | 5/2006 | Bogdan et al. | |
| 7,069,278 | B2 | 6/2006 | Telkowski | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,249,195 | B2 | 7/2007 | Panec et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,426,520 | B2 | 9/2008 | Gorelik et al. | |
| 7,451,177 | B1 | 11/2008 | Johnson et al. | |
| 7,454,362 | B1 | 11/2008 | Hayes et al. | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,523,466 | B2 | 4/2009 | DeAngelis | |
| 7,536,697 | B2 | 5/2009 | Wiseman et al. | |
| 7,574,383 | B1 | 8/2009 | Parasnis et al. | |
| 7,617,128 | B2 | 11/2009 | Greak | |
| 7,617,328 | B2 | 11/2009 | Lewis et al. | |
| 7,627,504 | B2 | 12/2009 | Brady et al. | |
| 7,634,482 | B2 | 12/2009 | Mukherjee et al. | |
| 7,657,466 | B2 | 2/2010 | Klingenberg et al. | |
| 7,689,711 | B2 | 3/2010 | Brouk et al. | |
| 7,788,319 | B2 | 8/2010 | Schmidt et al. | |
| 7,797,204 | B2 | 9/2010 | Balent | |
| 2001/0042032 | A1 * | 11/2001 | Crawshaw et al. | 705/32 |
| 2001/0047372 | A1 | 11/2001 | Gorelik et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0065680 | A1 | 5/2002 | Kojima et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 * | 8/2002 | Ginter et al. | 713/185 |
| 2002/0138318 | A1 | 9/2002 | Ellis et al. | |
| 2002/0147668 | A1 | 10/2002 | Smith et al. | |
| 2002/0152145 | A1 | 10/2002 | Wanta et al. | |
| 2002/0156930 | A1 | 10/2002 | Velasquez | |
| 2002/0157017 | A1 | 10/2002 | Mi et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0041178 | A1 | 2/2003 | Brouk et al. | |
| 2003/0069648 | A1 | 4/2003 | Douglas et al. | |
| 2003/0086594 | A1 | 5/2003 | Gross | |
| 2003/0097287 | A1 | 5/2003 | Franz et al. | |
| 2003/0120502 | A1 | 6/2003 | Robb et al. | |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0216978 | A1 | 11/2003 | Sweeney et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0006653 | A1 | 1/2004 | Kamen et al. | |
| 2004/0015366 | A1 | 1/2004 | Wiseman et al. | |
| 2004/0024662 | A1 | 2/2004 | Gray et al. | |
| 2004/0034577 | A1 | 2/2004 | Van Hoose et al. | |
| 2004/0073510 | A1 | 4/2004 | Logan | |
| 2004/0083201 | A1 | 4/2004 | Sholl et al. | |
| 2004/0083233 | A1 | 4/2004 | Willoughby | |
| 2004/0122730 | A1 | 6/2004 | Tucciarone et al. | |
| 2004/0133445 | A1 | 7/2004 | Rajan et al. | |
| 2004/0138942 | A1 | 7/2004 | Pearson et al. | |
| 2004/0148227 | A1 | 7/2004 | Tabuchi et al. | |
| 2004/0167894 | A1 | 8/2004 | Ziv | |
| 2004/0172360 | A1 | 9/2004 | Mabrey et al. | |
| 2004/0186891 | A1 | 9/2004 | Panec et al. | |
| 2004/0187140 | A1 | 9/2004 | Aigner et al. | |
| 2004/0220910 | A1 | 11/2004 | Zang et al. | |
| 2004/0254945 | A1 | 12/2004 | Schmidt et al. | |
| 2004/0267597 | A1 | 12/2004 | Kobrosly et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038718 | A1 | 2/2005 | Barnes et al. | |
| 2005/0038744 | A1 | 2/2005 | Viijoen | |
| 2005/0049903 | A1 | 3/2005 | Raja | |
| 2005/0055369 | A1 | 3/2005 | Gorelik et al. | |
| 2005/0065987 | A1 | 3/2005 | Telkowski et al. | |
| 2005/0071262 | A1 * | 3/2005 | Kobeh et al. | 705/35 |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197851 | A1 | 9/2005 | Veit | |
| 2005/0197886 | A1 | 9/2005 | Veit | |
| 2005/0197887 | A1 | 9/2005 | Zuerl et al. | |
| 2005/0197896 | A1 * | 9/2005 | Veit et al. | 705/14 |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |

(56) References Cited

U.S. PATENT DOCUMENTS

| | | | |
|---|---|---|---|
| 2005/0197900 | A1 | 9/2005 | Veit |
| 2005/0197901 | A1 | 9/2005 | Veit et al. |
| 2005/0197902 | A1 | 9/2005 | Veit |
| 2005/0197941 | A1 | 9/2005 | Veit |
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216421 | A1 | 9/2005 | Barry et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0228821 | A1 | 10/2005 | Gold |
| 2005/0234754 | A1 | 10/2005 | Veit |
| 2005/0246240 | A1 | 11/2005 | Padilla |
| 2005/0256753 | A1 | 11/2005 | Veit et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026552 | A1 | 2/2006 | Mazzitelli et al. |
| 2006/0026586 | A1 | 2/2006 | Remmel et al. |
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0069632 | A1 | 3/2006 | Kahn et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 | 4/2006 | Seubert et al. |
| 2006/0089885 | A1 | 4/2006 | Finke et al. |
| 2006/0095373 | A1 | 5/2006 | Venkatasubramanian et al. |
| 2006/0106824 | A1 | 5/2006 | Stuhec |
| 2006/0184435 | A1 | 8/2006 | Mostowfi |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |
| 2007/0055688 | A1 | 3/2007 | Blattner |
| 2007/0067411 | A1 | 3/2007 | Angelov |
| 2007/0112574 | A1 | 5/2007 | Greene |
| 2007/0124227 | A1 | 5/2007 | Dembo et al. |
| 2007/0129978 | A1 | 6/2007 | Shirasu et al. |
| 2007/0132585 | A1 | 6/2007 | Llorca et al. |
| 2007/0150387 | A1 | 6/2007 | Seubert et al. |
| 2007/0156428 | A1 | 7/2007 | Brecht-Tillinger et al. |
| 2007/0156545 | A1 | 7/2007 | Lin |
| 2007/0156552 | A1 | 7/2007 | Manganiello |
| 2007/0165622 | A1 | 7/2007 | O'Rourke et al. |
| 2007/0174811 | A1 | 7/2007 | Kaetker et al. |
| 2007/0214065 | A1 | 9/2007 | Kahlon et al. |
| 2007/0219864 | A1 | 9/2007 | Vollrath et al. |
| 2007/0225949 | A1 | 9/2007 | Sundararajan et al. |
| 2007/0226090 | A1 | 9/2007 | Stratton |
| 2007/0265860 | A1 | 11/2007 | Herrmann et al. |
| 2007/0265862 | A1 | 11/2007 | Freund et al. |
| 2007/0288250 | A1 | 12/2007 | Lemcke et al. |
| 2007/0294159 | A1 | 12/2007 | Cottle |
| 2007/0295803 | A1 | 12/2007 | Levine et al. |
| 2008/0016242 | A1 | 1/2008 | Panec et al. |
| 2008/0046104 | A1 | 2/2008 | Van Camp et al. |
| 2008/0046421 | A1* | 2/2008 | Bhatia et al. ...................... 707/5 |
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0120313 | A1 | 5/2008 | O'Brien et al. |
| 2008/0133303 | A1 | 6/2008 | Singh et al. |
| 2008/0144791 | A1 | 6/2008 | Harifi et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0215354 | A1 | 9/2008 | Halverson et al. |
| 2008/0243578 | A1 | 10/2008 | Veit |
| 2008/0288317 | A1 | 11/2008 | Kakar |
| 2008/0300962 | A1 | 12/2008 | Cawston et al. |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0094274 | A1 | 4/2009 | Gorelik et al. |
| 2009/0164497 | A1 | 6/2009 | Steinmaier et al. |
| 2009/0193432 | A1 | 7/2009 | McKegney et al. |
| 2009/0222360 | A1 | 9/2009 | Schmitt et al. |
| 2009/0248429 | A1 | 10/2009 | Doenig et al. |
| 2009/0248430 | A1 | 10/2009 | Hubert et al. |
| 2009/0248463 | A1 | 10/2009 | Piochon et al. |
| 2009/0248473 | A1 | 10/2009 | Doenig et al. |
| 2009/0248487 | A1 | 10/2009 | Santoso et al. |
| 2009/0248558 | A1 | 10/2009 | Hollberg et al. |
| 2009/0248586 | A1 | 10/2009 | Kaisermayr et al. |
| 2009/0248698 | A1 | 10/2009 | Rehmann |
| 2009/0249358 | A1 | 10/2009 | Schuette |
| 2009/0249362 | A1 | 10/2009 | Lindemann et al. |
| 2009/0254971 | A1 | 10/2009 | Herz et al. |
| 2009/0276338 | A1 | 11/2009 | Masermann et al. |
| 2009/0300578 | A1 | 12/2009 | Neil |
| 2009/0327009 | A1 | 12/2009 | Schmitt et al. |
| 2009/0327105 | A1 | 12/2009 | Moussa et al. |
| 2009/0327106 | A1 | 12/2009 | Bartelt et al. |
| 2010/0001834 | A1 | 1/2010 | Brunswig et al. |
| 2010/0014510 | A1 | 1/2010 | Boreli et al. |
| 2010/0070391 | A1 | 3/2010 | Storr et al. |
| 2010/0070395 | A1 | 3/2010 | Elkeles et al. |
| 2010/0106555 | A1 | 4/2010 | Mneimneh et al. |
| 2010/0131379 | A1 | 5/2010 | Dorais et al. |
| 2010/0131394 | A1 | 5/2010 | Rutsch et al. |
| 2010/0153297 | A1 | 6/2010 | Haaf et al. |
| 2010/0161425 | A1 | 6/2010 | Sideman |
| 2010/0198631 | A1 | 8/2010 | Edwards et al. |
| 2010/0217645 | A1 | 8/2010 | Jin et al. |
| 2010/0217820 | A1 | 8/2010 | Brouk et al. |
| 2010/0218245 | A1 | 8/2010 | Brouk et al. |
| 2010/0241729 | A1 | 9/2010 | Angelov |
| 2010/0306536 | A1 | 12/2010 | Brouk et al. |
| 2011/0046775 | A1 | 2/2011 | Bailey et al. |
| 2011/0077999 | A1 | 3/2011 | Becker et al. |
| 2011/0078048 | A1 | 3/2011 | Becker et al. |
| 2011/0088000 | A1 | 4/2011 | Mackay |
| 2011/0153767 | A1 | 6/2011 | Coldicott et al. |
| 2011/0276636 | A1 | 11/2011 | Cheng et al. |
| 2011/0307353 | A1 | 12/2011 | Ringl et al. |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | WO 2008/005102 | 1/2008 |

OTHER PUBLICATIONS

SAP Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages.

Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf; 36 pages.

"UML in the .com Enterprise: Modeling CORBA, Components, XML/XMI and Metadata Workshop"; http://www.omg.org/news/meetings/workshops/uml_presentations.htm.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

(56) References Cited

OTHER PUBLICATIONS

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; $27^{th}$ Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.;"Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: an Internet Commerce Architecture"; IEEE; May 1997; pp. 48-55.
Eyal, Anal et al.; "Integrating and Customizing Heterogeneous E-Commerce Applications"; The VLDB Journal; Aug. 2001; pp. 16-38.
Office Action issued in related U.S. Appl. No. 11/145,464, on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.

(56) References Cited

OTHER PUBLICATIONS

International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
FSML-Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
Newton's Telecom Dictionary; 18th Edition; 2002; pp. 347, 454.
Notice of Allowance issued in related U.S. Appl. No. 12/147,395 on Oct. 26, 2010; 10 pages.
Notice of Allowance issued in related U.S. Appl. No. 11/775,821 on Oct. 22, 2010; 4 pages.
Notice of Allowance issued in related U.S. Appl. No. 11/864,832 on Aug. 23, 2010; 4 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Altintas et al.; "Aurora Software Product Line"; Cybersoft Information Technologies Co.; 2005; pp. 1-8.
Annevelink et al.; "Heterogeneous Database Intergration in a Physician Workstation"; 1992; 5 pages.
Arsanjani, Ali; "Developing and Integrating Enterprise Components and Services"; Communications of the ACM; vol. 45, No. 10; Oct. 2002; pp. 31-34.
Aversano, Lerina et al.; "Introducing eServices in Business Process Models"; SEKE '02; Ischia Italy; Jul. 15-19, 2002; pp. 481-488.
Baker, Stacy; "Benefits of Assortment Planning"; Assortment Planning for Apparel Retailers—2005 Management Briefing; Just Style; Jun. 2005; 3 pages.
Boetterweck, Goetz; "A Model-Driven Approach to the Engineering of Multiple User Interfaces"; Lecture Notes in Computer Science; 2007; vol. 4364/2007; pp. 106-115.
Business Object DTF, Common Business Objects, Ver 1.5; OMG Document bom; Framingham Corporate Center, Framingham, MA; 20 pages; Dec. 4, 1997.
Chou et al. "Web Services for Service-Oriented Communication", International Conference on Collaborative Computing: Networking, Applications and Worksharing, CollaborateCom 2006, pp. 1-8, 2006.
Definition of "header" and "message header"; Newton's Telecom Dictionary; 18th Edition; 2002; pp. 347, 464.
Diehl et al.; "Service Architecture for an Object-Oriented Next Generation Profile Register"; date unknown; 8 pages.
"DOTS Inc. Selects Compass Software's smartmerchandising for Merchandise Planning and Assortment Planning"; PR Newswire; Dec. 11, 2002; 2 pages.
FSML-Financial Services Markup Language (Jul. 14, 1999) http://xml.coverpages.org/FSML-v1500a.pdf; pp. 1-159 (2 parts).
Gable, Julie; "Enterprise Application Integration"; Information Management Journal; Mar./Apr. 2002; pp. 48-52.

(56) References Cited

OTHER PUBLICATIONS

Gokhale, Aniruddha et al.; "Applying Model-Integrated Computing to Component Middleware and Enterprise Applications"; Communications of the ACM; vol. 45, No. 10; Oct. 2002; pp. 65-70.
Gosain, Sanjay et al.; "The Impact of Common E-Business Interfaces"; Communications of the ACM; vol. 46, No. 2; Dec. 2003; pp. 186-195.
He, Ning et al.; "B2B Contract Implementation Using Windows DNS"; 2001; pp. 71-79.
"Header", Newton's Telecom Dictionary; 12th Edition, 2004; pp. 389-390.
Himoff et al.; "MAGENTA Technology: Multi-Agent Systems for Industrial Logistics"; AAMAS'05; Jul. 25-29, 2005; 2005 ACM; pp. 60-66:1-7).
Intersystems, Evaluating Integration Software, Ensemble White Paper, 2007, http://www.intersystems.com/ensemble/whitepapers/pdf/evaluating-integration-software.pdf.
Ketabchi et al.; "Object-Oriented Database Management Support for Software Maintenance and Reverse Engineering"; Department of Electrical Engineering and Computer Science, Santa Clara University; 1989; 4 pages.
Lockemann et al.; "Flexibility through Multi-Agent Systems: Solutions or Illusions"; SOFSEM 2004; pp. 41-56.
Lynn, Chris; "Sony Enters Brand Asset Management Market"; the Seybold Report; Analyzing Publishing Technologies; Aug. 4, 2004; <www.Seybold365.com>; 3 pages.
Mascolo et al.; "An Analytical Method for Performance Evaluation of Kanban Controlled Production Systems"; Operations Research; vol. 44, No. 1; 1996; pp. 50-64.
Meltzer, Bart et al.; "XML and Electronic Commerce: Enabling the Network Economy"; SIGMOD Record; ACM Press; vol. 27, No. 4; Dec. 1998; pp. 21-24.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, an Oracle White Paper; 29 pages.; Aug. 2009.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
SAP; "BC-Central Maintenance and Transport Objects"; Release 4.6C; Apr. 200; 15 pages.
Shi, Min-Hua et al.; "MQMLl-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
Communication Pursuant to Article 94(3) issued in European Application No. 05757432.9 on Apr. 12, 2011; 5 pages.
Communication Pursuant to Article 94(3) issued in European Application No. 05766672.9 on Jul. 14, 2011; 4 pages.
Communication Pursuant to Rules 70(2) and 70a(2) EPC issued in related European Application No. 07835755.5 on Feb. 28, 2011; 6 pages.
International Search Report and Written Opinion issued in International Application No. PCT/CN2011/001238 on May 3, 2012; 9 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Notice of Allowance issued in U.S. Appl. No. 11/864,811 on Mar. 19, 2013; 9 pages.
Notice of Allowance issued in U.S. Appl. No. 12/060,144 on Mar. 20, 2013; 12 pages.
Notice of Allowance issued in related U.S. Appl. No. 12/060,178 on Dec. 6, 2010; 4 pages.
Notice of Allowance issued in related U.S. Appl. No. 12/060,178 on Sep. 2, 2011; 9 pages.
Notice of Allowance issued in related U.S. Appl. No. 12/060,178 on Feb. 14, 2013; 7 pages.
Notice of Allowance issued in related U.S. Appl. No. 11/145,464 on Feb. 23, 2011; 7 pages.
Notice of Allowance issued in related U.S. Appl. No. 11/145,464 on Feb. 6, 2012; 7 pages.
Notice of Allowance issued in related U.S. Appl. No. 11/166,065 on Oct. 9, 2012; 10 pages.
Notice of Allowance issued in related U.S. Appl. No. 11/364,538 on Dec. 13, 2010; 5 pages.
Notice of Allowance issued in related U.S. Appl. No. 11/364,538 on Jul. 23, 2012; 7 pages.
Notice of Allowance issued in related U.S. Appl. No. 11/364,538 on Jul. 26, 2011; 6 pages.
Notice of Allowance issued in related U.S. Appl. No. 11/731,857 on Apr. 11, 2011; 8 pages.
Notice of Allowance issued in related U.S. Appl. No. 11/731,857 on Dec. 14, 2011; 7 pages.
Notice of Allowance issued in related U.S. Appl. No. 11/731,857 on Nov. 29, 2010; 4 pages.
Notice of Allowance issued in related U.S. Appl. No. 11/731,857 on Oct. 9, 2012; 7 pages.
Notice of Allowance issued in related U.S. Appl. No. 11/775,821 on Feb. 4, 2011; 4 pages.
Notice of Allowance issued in related U.S. Appl. No. 11/775,821 on Nov. 2, 2012; 5 pages.
Notice of Allowance issued in related U.S. Appl. No. 11/803,178 on Jul. 17, 2012; 15 pages.
Notice of Allowance issued in related U.S. Appl. No. 11/803,178 on May 17, 2011; 13 pages.
Notice of Allowance issued in related U.S. Appl. No. 11/864,832 on Dec. 3, 2010; 9 pages.
Notice of Allowance issued in related U.S. Appl. No. 11/864,832 on Jan. 9, 2012;12 pages.
Notice of Allowance issued in related U.S. Appl. No. 11/864,832 on Jul. 30, 2012;12 pages.
Notice of Allowance issued in related U.S. Appl. No. 11/864,832 on Jul. 7, 2011;11 pages.
Notice of Allowance issued in related U.S. Appl. No. 12/147,395 on Dec. 24, 2012; 11 pages.
Notice of Allowance issued in related U.S. Appl. No. 12/147,449 on Apr. 28, 2011; 9 pages.
Notice of Allowance issued in U.S. Appl. No. 11/155,368 on Jul. 23, 2012; 7 pages.
Notice of Allowance issued in U.S. Appl. No. 11/155,368 on Mar. 14, 2011; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Notice of Allowance issued in U.S. Appl. No. 11/166,065 on Mar. 8, 2011; 5 pages.
Notice of Allowance issued in U.S. Appl. No. 11/640,422 on May 22, 2012; 7 pages.
Notice of Allowance issued in U.S. Appl. No. 11/640,422 on Sep. 29, 2011; 7 pages.
Notice of Allowance issued in U.S. Appl. No. 11/775,821 on Dec. 30, 2011; 5 pages.
Notice of Allowance issued in U.S. Appl. No. 11/775,821 on Sep. 21, 2011; 5 pages.
Notice of Allowance issued in U.S. Appl. No. 11/864,786 on Nov. 7, 2012; 7 pages.
Notice of Allowance issued in U.S. Appl. No. 11/864,811 on Mar. 2, 2012; 8 pages.

(56) References Cited

OTHER PUBLICATIONS

Notice of Allowance issued in U.S. Appl. No. 11/864,811 on Nov. 14, 2011; 8 pages.
Notice of Allowance issued in U.S. Appl. No. 11/864,811 on Sep. 10, 2012; 10 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,062 on Nov. 9, 2012; 7 pages.
Notice of Allowance issued in U.S. Appl. No. 12/060,155 on Jan. 11, 2013; 5 pages.
Notice of Allowance issued in U.S. Appl. No. 12/060,155 on Apr. 24, 2012; 15 pages.
Notice of Allowance issued in U.S. Appl. No. 12/060,171 on Oct. 3, 2012; 10 pages.
Notice of Allowance issued in U.S. Appl. No. 12/060,192 on Mar. 2, 2012; 18 pages.
Notice of Allowance issued in U.S. Appl. No. 12/060,192 on Oct. 29, 2012; 12 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/147,395 on May 4, 2011; 10 pages.
Notice of Allowance issued in U.S. Appl. No. 12/323,116 on Jun. 11, 2012; 10 pages.
Notice of Allowance issued in U.S. Appl. No. 12/323,139 on Feb. 8, 2013; 9 pages.
Notice of Allowance issued in U.S. Appl. No. 12/323,139 on Mar. 14, 2012; 10 pages.
Notice of Allowance issued in U.S. Appl. No. 12/323,139 on Mar. 4, 2011; 13 pages.
Notice of Allowance issued in U.S. Appl. No. 12/571,140 on Mar. 20, 2012; 16 pages.
Notice of Allowance issued in U.S. Appl. No. 12/571,140 on Nov. 9, 2012; 8 pages.
Notice of Allowance issued in U.S. Appl. No. 12/815,618 on May 10, 2012; 7 pages.
Notice of Allowance issued in U.S. Appl. No. 12/815,639 on Sep. 24, 2012; 9 pages.
Notice of Allowance issued in U.S. Appl. No. 12/815,802 on Nov. 27, 2012; 9 pages.
Notice of Allowance issued in U.S. Appl. No. 12/816,293 on Sep. 19, 2012; 7 pages.
Notice of Allowance issued in related U.S. Appl. No. 11/864,866 on Jul. 22, 2011; 6 pages.
Notice of Allowance issued in related U.S. Appl. No. 11/864,866 on Mar. 13, 2012; 7 pages.
Office Action issued in related U.S. Appl. No. 11/864,863 on Dec. 22, 2011; 20 pages.
Office Action issued in related U.S. Appl. No. 11/864,863 on Jul. 21, 2011; 29 pages.
Office Action issued in related U.S. Appl. No. 11/864,866 on Feb. 3, 2011; 20 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/059,971 on May 18, 2011; 13 pages.
Office Action issued in related U.S. Appl. No. 12/060,054 on Dec. 7, 2011; 15 pages.
Office Action issued in related U.S. Appl. No. 12/060,054 on Jun. 29, 2011; 15 pages.
Office Action issued in related U.S. Appl. No. 12/060,062 on Jul. 13, 2011; 16 pages.
Office Action issued in related U.S. Appl. No. 12/060,149 on Feb. 4, 2011; 19 pages.
Office Action issued in related U.S. Appl. No. 12/060,155 on May 10, 2011; 8 pages.
Office Action issued in related U.S. Appl. No. 12/060,155 on Oct. 31, 2011; 15 pages.
Office Action issued in related U.S. Appl. No. 12/060,171 on Jan. 26, 2011; 17 pages.
Office Action issued in related U.S. Appl. No. 12/060,171 on Mar. 1, 2012; 19 pages.
Office Action issued in related U.S. Appl. No. 12/060,192 on Apr. 14, 2011; 18 pages.
Office Action issued in related U.S. Appl. No. 12/060,192 on Sep. 6, 2011; 18 pages.
Office Action issued in U.S. Appl. No. 11/864,786 on Mar. 30, 2012; 12 pages.
Office Action issued in U.S. Appl. No. 11/864,811 on Jul. 26, 2011; 7 pages.
Office Action issued in U.S. Appl. No. 11/864,811 on Mar. 18, 2011; 10 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.
Office Action issued in U.S. Application No. 12/060,144 on Jun. 23, 2011; 16 pages.
Office Action issued in U.S. Application No. 12/147,378 on Jun. 17, 2011; 10 pages.
Office Action issued in U.S. Appl. No. 12/147,414 on Apr. 14, 2011; 30 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/334,175 on May 27, 2011; 12 pages.
Office Action issued in U.S. Appl. No. 12/571,140 on Sep. 26, 2011; 14 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,576 on Feb. 15, 2013; 13 pages.
Office Action issued in U.S. Appl. No. 12/815,576 on Oct. 12, 2012; 11 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,750 on Feb. 21, 2013; 67 pages.
Office Action issued in U.S. Appl. No. 12/815,750 on Sep. 28, 2012; 66 pages.
Office Action issued in U.S. Appl. No. 12/815,802 on Jul. 20, 2012; 16 pages.
Office Action issued in U.S. Appl. No. 12/815,869 on Feb. 15, 2013; 27 pages.
Office Action issued in U.S. Appl. No. 12/815,911 on Feb. 25, 2013; 15 pages.
Office Action issued in U.S. Appl. No. 12/815,911 on Sep. 26, 2012; 14 pages.
Office Action issued in U.S. Appl. No. 12/816,083 on May 9, 2012; 20 pages.

(56) References Cited

OTHER PUBLICATIONS

Office Action issued in U.S. Appl. No. 12/816,083 on Sep. 21, 2012; 22 pages.
Office Action issued in U.S. Appl. No. 12/816,170 on Jul. 24, 2012; 9 pages.
Office Action issued in U.S. Appl. No. 12/816,268 on Oct. 11, 2012; 11 pages.
Office Action issued in U.S. Appl. No. 12/816,293 on Apr. 25, 2012; 10 pages.
Office Action issued in U.S. Appl. No. 12/823,996 on Mar. 22, 2013, 7 pages.
Office Action issued in U.S. Appl. No. 13/192,543 on Aug. 28, 2012; 14 pages.
Office Action issued in U.S. Appl. No. 13/192,543 on Dec. 13, 2012; 26 pages.
Office Action issued in U.S. Appl. No. 13/192,553 on Feb. 11, 2013, 23 pages.
Office Action issued in U.S. Appl. No. 13/192,555 on Jul. 20, 2012; 7 pages.
Office Action issued in U.S. Appl. No. 13/192,555 on Mar. 1, 2013; 11 pages.
Office Action issued in U.S. Appl. No. 13/192,574 on Oct. 24, 2012; 6 pages.
Office Action issued in U.S. Appl. No. 13/192,599 on Mar. 21, 2013; 29 pages.
Office Action issued in U.S. Appl. No. 13/192,612 on Oct. 4, 2012; 12 pages.
Office Action issued in U.S. Appl. No. 13/218,876 on Apr. 5, 2013; 10 pages.
Office Action issued in U.S. Appl. No. 13/349,477 on Jun. 29, 2012; 13 pages.
Office Action issued in U.S. Appl. No. 13/349,477 on Nov. 15, 2012; 15 pages.
Office Action issued in U.S. Appl. No. 13/535,433 on Mar. 4, 2013; 11 pages.
Office Action issued in U.S. Appl. No. 13/535,667 on Dec. 26, 2012; 9 pages.
Office Action issued in U.S. Appl. No. 13/535,881 on Dec. 21, 2012; 7 pages.

* cited by examiner

FIG. 35-1

| Package | level1 | level2 | level3 | level4 | Data Type Name |
|---|---|---|---|---|---|
| BudgetAvailabilityControl-RegisterERPMessage_sync 35000 | BudgetAvail-abilityControl-RegisterERP-Message_sync 35002 | | | | BudgetRegisterERPMessage_sync 35004 |
| BudgetAvailabilityControl-Register 35006 | | BudgetAvailabili-tyControlRegister 35008 | | | |
| | | | FundsManagemen-tAreaID 35010 | | NOSC_FundsManagementAreaID 35012 |
| | | | BudgetAvailabilityCon-trolRegisterCode 35014 | | NOSC_BudgetAvailabilityControlRegist erCode 35016 |
| | | | BudgetAvailablilityCon-trolRegisterName 35018 | | MEDIUM_Name 35020 |

FIG. 35-2

| Package | level1 | level2 | level3 | level4 | Data Type Name |
|---|---|---|---|---|---|
| Item 35022 | | | Item 35024 | | |
| | | | | FiscalYearID 35026 | FiscalYearID 35028 |
| | | | | CashEffectivenessFiscalYearID 35030 | FiscalYearID 35032 |
| | | | | ConsumedAmount 35034 | Amount 35036 |
| | | | | ConsumableAmount 35038 | Amount 35040 |
| | | | | CoverEligibilityActiveIndicator 35042 | Indicator 35044 |

FIG. 35-3

| Package | level1 | level2 | level3 | level4 | Data Type Name |
|---|---|---|---|---|---|
| ControlAccountingCod-ingBlockAssignment 35046 | | | ControlAccountingCod-ingBlockAssignment 35048 | | |
| | | | | ProjectReference 35050 | NOSC_ProjectReference 35052 |
| | | | | InternalOrderID 35054 | NOSC_InternalOrderID 35056 |
| | | | | MaintenanceOrderReference 35058 | NOSC_BusinessTransactionDocumentReference 35060 |
| | | | | FundsManagementCentreID 35062 | NOSC_FundsManagementCentreID 35064 |
| | | | | FundsManagementFundID 35066 | NOSC_FundsManagementFundID 35068 |

FIG. 35-4

| Package | level1 | level2 | level3 | level4 | Data Type Name |
|---|---|---|---|---|---|
| | | | | FundsManagementAccountID 35070 | NOSC_FundsManagementAccountID 35072 |
| | | | | FundsManagementFunctionalAreaID 35074 | NOSC_FundsManagementFunctionalAreaID 35076 |
| | | | | FundsManagementProgramID 35078 | NOSC_FundsManagementProgramID 35080 |
| | | | | GrantID 35082 | NOSC_GrantID 35084 |
| ConsumingAccountingCodingBlockAssignment 35086 | | | ConsumingAccountingCodingBlockAssignment 35088 | | |
| | | | | ProfitCentreID 35090 | NOSC_ProfitCentreID 35092 |

FIG. 35-5

| Package | level1 | level2 | level3 | level4 | Data Type Name |
|---|---|---|---|---|---|
| | | | | CostCentreID 35094 | NOSC_CostCentreID 35096 |
| | | | | ProjectReference 35098 | NOSC_ProjectReference 35100 |
| | | | | InternalOrderID 35102 | NOSC_InternalOrderID 35104 |
| | | | | MaintenanceOrderReference 35106 | NOSC_BusinessTransactionDocumen-tReference 35108 |
| | | | | FundsManagementCentreID 35110 | NOSC_FundsManagementCentreID 35112 |
| | | | | FundsManagementFundID 35114 | NOSC_FundsManagementFundID 35116 |

FIG. 35-6

| Package | level1 | level2 | level3 | level4 | Data Type Name |
|---|---|---|---|---|---|
| | | | | FundsManagementAccountID 35118 | NOSC_FundsManagementAccountID 35120 |
| | | | | FundsManagementFunctionalAreaID 35122 | NOSC_FundsManagementFunctionalAreaID 35124 |
| | | | | FundsManagementProgramID 35126 | NOSC_FundsManagementProgramID 35128 |
| | | | | GrantID 35130 | NOSC_GrantID 35132 |
| | | | | AccountingBusinessAreaCode 35134 | NOSC_AccountingBusinessAreaCode 35136 |
| Log 35138 | | Log 35140 | | | NOSC_Log 35142 |

FIG. 36-1

| Package | level1 | level2 | level3 | level4 | Cardinality |
|---|---|---|---|---|---|
| BudgetAvailabilityControlRegisterERPItemByElementsQueryMessage_sync 36000 | BudgetAvailabilityControlRegisterERPItemByElementsQueryMessage_sync 36002 | | | | |
| Selection 36004 | | BudgetAvailabiltyControlRegisterItemSelectionByElements 36006 | | | 1 36008 |
| | | | FundsManagementAreaID 36010 | | 0..1 36012 |
| | | | FiscalYearID 36014 | | 1 36016 |
| | | | CashEffectivenessFiscalYearID 36018 | | 0..1 36020 |
| | | | ConsumingProjectReference 36022 | | 0..1 36024 |

FIG. 36-2

| Package | level1 | level2 | level3 | level4 | Cardinality |
|---|---|---|---|---|---|
| | | | ConsumingInternalOrderID 36026 | | 0..1 36028 |
| | | | ConsumingMaintenanceOrderReference 36030 | | 0..1 36032 |
| | | | ConsumingFundsManagementCentreID 36034 | | 0..1 36036 |
| | | | ConsumingFundsManagementFundID 36038 | | 0..1 36040 |
| | | | ConsumingFundsManagementAccountID 36042 | | 0..1 36044 |
| | | | ConsumingFundsManagementFunctionalAreaID 36046 | | 0..1 36048 |
| | | | ConsumingFundsManagementProgramID 36050 | | 0..1 36052 |

FIG. 36-3

| Package | level1 | level2 | level3 | level4 | Cardinality |
|---|---|---|---|---|---|
| | | | ConsumingGrantID 36054 | | 0..1 36056 |
| | | | SelectionByBudgetAvailabilityControlRegisterCode 36058 | | 1..n 36060 |
| | | | | InclusionExclusionCode 36062 | 1 36064 |
| | | | | IntervalBoundaryTypeCode 36066 | 1 36068 |
| | | | | LowerBoundaryBudgetAvail-abilityControlRegisterCode 36070 | 1 36072 |
| | | | | UpperBoundaryBudgetAvail-abilityControlRegisterCode 36074 | 0..1 36076 |

FIG. 37-1

| Package | level1 | level2 | level3 | level4 | level5 | Cardinality |
|---|---|---|---|---|---|---|
| BudgetAvailabiltyControlRegisterERPItem-ByElementsResponseMessage_sync 37000 | BudgetAvailabilityControlRegisterERPItem-ByElementsResponseMessage_sync 37002 | | | | | |
| BudgetAvailability-ControlRegister 37004 | | BudgetAvailabilityControlRegister 37006 | | | | 0..n 37008 |
| | | | FundsManagementAreaID 37010 | | | 0..1 37012 |
| | | | BudgetAvailablility-ControlRegisterCode 37014 | | | 1 37016 |
| | | | BudgetAvailablility-ControlRegisterName 37018 | | | 1 37020 |

FIG. 37-2

| Package | level1 | level2 | level3 | level4 | level5 | Cardinality |
|---|---|---|---|---|---|---|
| Item 37022 | | | Item 37024 | | | 0..1 37026 |
| | | | | FiscalYearID 37028 | | 1 37030 |
| | | | | CashEffectivenessFiscalYearID 37032 | | 0..1 37034 |
| | | | | ConsumedAmount 37036 | | 1 37038 |
| | | | | ConsumableAmount 37040 | | 1 37042 |
| | | | | CoverEligibilityActiveIndicator 37044 | | 1 37046 |

FIG. 37-3

| Package | level1 | level2 | level3 | level4 | level5 | Cardinality |
|---|---|---|---|---|---|---|
| ControlAccountingCodingBlockAssignment 37048 | | | | ControlAccountingCodingBlockAssignment 37050 | | 0..1 37052 |
| | | | | | ProjectReference 37054 | 0..1 37056 |
| | | | | | InternalOrderID 37058 | 0..1 37060 |
| | | | | | MaintenanceOrderReference 37062 | 0..1 37064 |
| | | | | | FundsManagementCentreID 37066 | 0..1 37068 |
| | | | | | FundsManagementFundID 37070 | 0..1 37072 |

FIG. 37-4

| Package | level1 | level2 | level3 | level4 | level5 | Cardinality |
|---|---|---|---|---|---|---|
| | | | | | FundsManagementAccountID 37074 | 0..1 37076 |
| | | | | | FundsManagementFunctionalAreaID 37078 | 0..1 37080 |
| | | | | | FundsManagementProgramID 37082 | 0..1 37084 |
| | | | | | GrantID 37086 | 0..1 37088 |
| ConsumingAccountingCodingBlockAssignment 37090 | | | | ConsumingAccountingCodingBlockAssignment 37092 | | 1 37094 |
| | | | | | ProfitCentreID 37096 | 0..1 37098 |

FIG. 37-5

| Package | level1 | level2 | level3 | level4 | level5 | Cardinality |
|---|---|---|---|---|---|---|
| | | | | | CostCentreID 37100 | 0..1 37102 |
| | | | | | ProjectReference 37104 | 0..1 37106 |
| | | | | | InternalOrderID 37108 | 0..1 37110 |
| | | | | | MaintenanceOrderReference 37112 | 0..1 37114 |
| | | | | | FundsManagementCentreID 37116 | 0..1 37118 |
| | | | | | FundsManagementFundID 37120 | 0..1 37122 |
| | | | | | FundsManagementAccountID 37124 | 0..1 37126 |

FIG. 37-6

| Package | level1 | level2 | level3 | level4 | level5 | Cardinality |
|---|---|---|---|---|---|---|
| | | | | | FundsManagementFunctionalAreaID 37128 | 0..1 37130 |
| | | | | | FundsManagementProgramID 37132 | 0..1 37134 |
| | | | | | GrantID 37136 | 0..1 37138 |
| | | | | | AccountingBusinessAreaCode 37140 | 0..1 37142 |
| Log 37144 | | Log 37146 | | | | 1 37148 |

FIG. 40-1

| Package | level1 | level2 | level3 | level4 | Cardinality | Data Type Name |
|---|---|---|---|---|---|---|
| ManufacturingWorkOrderAccountingNotificationMessage 40000 | ManufacturingWorkOrderAccountingNotificationMessage 40002 | | | | | ManufacturingWorkOrderAccountingNotificationMessage 40004 |
| MessageHeader 40006 | | MessageHeader 40008 | | | 0..1 40010 | BusinessDocumentMessageHeader 40012 |
| ManufacturingWorkOrder 40014 | | ManufacturingWorkOrder 40016 | | | 1 40018 | |
| | | | ID 40020 | | 1 40022 | BusinessTransactionDocumentID 40024 |
| Item 40026 | | | Item 40028 | | 1..n 40030 | |
| | | | | ID 40032 | 1 40034 | BusinessTransactionDocumentItemID 40036 |

FIG. 40-2

| Package | level1 | level2 | level3 | level4 | Cardinality | Data Type Name |
|---|---|---|---|---|---|---|
| BusinessTransaction DocumentReference 40038 | | | | PurchaseOr-derReference 40040 | 1 40042 | BusinessTransactionDocumentReference 40044 |

FIG. 52-1

| Package | level1 | level2 | level3 | level4 | level5 | Data Type Name |
|---|---|---|---|---|---|---|
| FundsCommitment-DocumentERPMes-sage_sync 52000 | FundsCom-mitmentDocu-mentERPMes-sage_sync_V1 52002 | | | | | <MessageDataType> 52004 |
| MessageHeader 52006 | | MessageHeader 52008 | | | | NOSC_BasicBusiness DocumentMessage-Header 52010 |
| FundsCommitment-Document 52012 | | FundsCommit-mentDocument 52014 | | | | |
| | | | itemListCom-pleteTransmissionIndi-cator 52016 | | | Indicator 52018 |
| | | | ID 52020 | | | NOSC_FundsCommit mentDocumentID 52022 |

FIG. 52-2

| Package | level1 | level2 | level3 | level4 | level5 | Data Type Name |
|---|---|---|---|---|---|---|
| | | | CompanyID 52024 | | | NOSC_CompanyID 52026 |
| | | | FundsManagementAreaID 52028 | | | NOSC_FundsManagementAreaID 52030 |
| | | | ChangeStateID 52032 | | | ChangeStateID 52034 |
| | | | CategoryCode 52036 | | | FundsCommitmentDocumentCategoryCode 52038 |
| | | | PostingStatusCode 52040 | | | PostingStatusCode 52042 |
| | | | TypeCode 52044 | | | NOSC_FundsCommitmentDocumentTypeCode 52046 |

FIG. 52-3

| Package | level1 | level2 | level3 | level4 | level5 | Data Type Name |
|---|---|---|---|---|---|---|
| | | | ApprovedIndicator 52048 | | | Indicator 52050 |
| | | | CompletedIndicator 52052 | | | Indicator 52054 |
| | | | ConsumptionAllowed-Indicator 52056 | | | Indicator 52058 |
| | | | ManualChangeAllow-edIndicator 52060 | | | Indicator 52062 |
| | | | ExchangeRate 52064 | | | ExchangeRate 52066 |
| | | | CategoryName 52068 | | | FundsCommitment-DocumentCategory-Name 52070 |
| | | | PostingStatusName 52072 | | | PostingStatusName 52074 |

FIG. 52-4

| Package | level1 | level2 | level3 | level4 | level5 | Data Type Name |
|---|---|---|---|---|---|---|
| | | | TypeName 52076 | | | FundsCommitment-DocumentTypeName 52078 |
| | | | Date 52080 | | | Date 52082 |
| | | | PostingDate 52084 | | | Date 52086 |
| | | | BusinessTransaction-DocumentReference 52088 | | | NOSC_BusinessTransactionDocumen-tReference 52090 |
| | | | Note 52092 | | | Note 52094 |
| Item 52096 | | | Item 52098 | | | |
| | | | | actionCode 52100 | | actionCode 52102 |

FIG. 52-5

| Package | level1 | level2 | level3 | level4 | level5 | Data Type Name |
|---|---|---|---|---|---|---|
| | | | | ID 52104 | | FundsCommitment-DocumentItemID 52106 |
| | | | | ChangeStateID 52108 | | ChangeStateID 52110 |
| | | | | PredecessorFundsCommitment-DocumentReference 52112 | | NOSC_BusinessTransactionDocumen-tReference 52114 |
| | | | | AccountingCodingBlockAssign-mentChangeAllowedIndicator 52116 | | Indicator 52118 |
| | | | | ApprovedIndicator 52120 | | Indicator 52122 |
| | | | | CompletedIndicator 52124 | | Indicator 52126 |

FIG. 52-6

| Package | level1 | level2 | level3 | level4 | level5 | Data Type Name |
|---|---|---|---|---|---|---|
| | | | | ConsumptionAllowedIndicator 52128 | | Indicator 52130 |
| | | | | DeletedIndicator 52132 | | Indicator 52134 |
| | | | | ExceedWithoutLimitAllowedIndi-cator 52136 | | Indicator 52138 |
| | | | | GlobalToleranceOverrideAllowed-Indicator 52140 | | Indicator 52142 |
| | | | | ManualChangeAllowedIndicator 52144 | | Indicator 52146 |
| | | | | PredecessorFundsCommitment-DocumentItemCompletedIndicator 52148 | | Indicator 52150 |
| | | | | UpdateRelevanceIndicator 52152 | | Indicator 52154 |

FIG. 52-7

| Package | level1 | level2 | level3 | level4 | level5 | Data Type Name |
|---|---|---|---|---|---|---|
| | | | | DueDate 52156 | | Date 52158 |
| | | | | SystemAdministrativeData 52160 | | DATE_SystemAdministrativeData 52162 |
| | | | | ReservedTransactionCurrencyAmount 52164 | | Amount 52166 |
| | | | | ReservedLocalCurrencyAmount 52168 | | Amount 52170 |
| | | | | OpenTransactionCurrenyAmount 52172 | | Amount 52174 |
| | | | | OpenLocalCurrencyAmount 52176 | | Amount 52178 |
| | | | | AmountOverdrawingTolerancePercent 52180 | | Percent 52182 |

FIG. 52-8

| Package | level1 | level2 | level3 | level4 | level5 | Data Type Name |
|---|---|---|---|---|---|---|
| | | | | Note 52184 | | Note 52186 |
| Accounting-Cod-ingBlockAs-signment 52188 | | | | AccountingCodingBlockAssign-ment 52190 | | |
| | | | | | CostCentreID 52192 | NOSC_CostCentreID 52194 |
| | | | | | FundsManagement-CentreID 52196 | NOSC_FundsManagementCentreID 52198 |
| | | | | | ProjectReference 52200 | NOSC_ProjectReference 52202 |
| | | | | | InternalOrderID 52204 | NOSC_InternalOrderID 52206 |

FIG. 52-9

| Package | level1 | level2 | level3 | level4 | level5 | Data Type Name |
|---|---|---|---|---|---|---|
| | | | | | IndividualMaterialID 52208 | NOSC_ProductID 52210 |
| | | | | | FundsManagement-FundID 52212 | NOSC_FundsManagementFundID 52214 |
| | | | | | FundsManagement-FunctionalAreaID 52216 | NOSC_FundsManagementFunctionalAreaID 52218 |
| | | | | | FundsManagemen-tAccountID 52220 | NOSC_FundsManagementAccountID 52222 |
| | | | | | FundsManagement-ProgramID 52224 | NOSC_FundsManagementProgramID 52226 |
| | | | | | GrantID 52228 | NOSC_GrantID 52230 |

FIG. 52-10

| Package | level1 | level2 | level3 | level4 | level5 | Data Type Name |
|---|---|---|---|---|---|---|
| | | | | | AccountDetermina-tionExpenseGroup-Code 52232 | AccountDetermina-tionExpenseGroup-Code 52234 |
| | | | | | AccountingBusines-sAreaCode 52236 | NOSC_AccountingBusinessAreaCode 52238 |
| ProcessingConditions 52240 | | QueryProcess-ingConditions 52242 | | | | WITHOUT_LASTRETURNED_QueryProcessingConditions 52244 |
| | | ResponseProc-essingConditions 52246 | | | | WITHOUT_LASTRETURNED_ResponseProcessingConditions 52248 |
| Log 52250 | | Log 52252 | | | | NOSC_Log 52254 |

FIG. 53-1

| Package | level1 | level2 | level3 | level4 | level5 | Cardinality |
|---|---|---|---|---|---|---|
| FundsCommitment-DocumentERPCre-ateRequestMes-sage_sync 53000 | FundsCommitment-DocumentERPCre-ateRequestMes-sage_sync 53002 | | | | | |
| MessageHeader 53004 | | MessageHeader 53006 | | | | 0..1 53008 |
| FundsCommitment-Document 53010 | | FundsCommit-mentDocument 53012 | | | | 1 53014 |
| | | | ID 53016 | | | 0..1 53018 |
| | | | CompanyID 53020 | | | 1 53022 |
| | | | CategoryCode 53024 | | | 1 53026 |
| | | | TypeCode 53028 | | | 1 53030 |

FIG. 53-2

| Package | level1 | level2 | level3 | level4 | level5 | Cardinality |
|---|---|---|---|---|---|---|
| | | | ManualChangeAllow-edIndicator 53032 | | | 1 53034 |
| | | | ExchangeRate 53036 | | | 0..1 53038 |
| | | | Date 53040 | | | 1 53042 |
| | | | PostingDate 53044 | | | 1 53046 |
| | | | BusinessTransaction-DocumentReference 53048 | | | 0..1 53050 |
| | | | Note 53052 | | | 0..1 53054 |
| Item 53056 | | | Item 53058 | | | 1..n 53060 |

FIG. 53-3

| Package | level1 | level2 | level3 | level4 | level5 | Cardinality |
|---|---|---|---|---|---|---|
| | | | | PredecessorFundsCommitmentDocumentReference 53062 | | 0..1 53064 |
| | | | | AccountingCodingBlockAssignmentChangeAllowedIndicator 53066 | | 1 53068 |
| | | | | ConsumptionAllowedIndicator 53070 | | 1 53072 |
| | | | | ExceedWithoutLimitAllowedIndicator 53074 | | 1 53076 |
| | | | | GlobalToleranceOverrideAllowedIndicator 53078 | | 1 53080 |
| | | | | ManualChangeAllowedIndicator 53082 | | 1 53084 |

FIG. 53-4

| Package | level1 | level2 | level3 | level4 | level5 | Cardinality |
|---|---|---|---|---|---|---|
| | | | | PredecessorFundsCommitmentDocumentItemCompletedIndicator 53086 | | 1 53088 |
| | | | | UpdateRelevanceIndicator 53090 | | 1 53092 |
| | | | | DueDate 53094 | | 0..1 53096 |
| | | | | ReservedTransactionCurrencyAmount 53098 | | 1 53100 |
| | | | | AmountOverdrawingTolerancePercent 53102 | | 0..1 53104 |
| | | | | Note 53106 | | 0..1 53108 |

FIG. 53-5

| Package | level1 | level2 | level3 | level4 | level5 | Cardinality |
|---|---|---|---|---|---|---|
| Accounting-CodingBlock-Assignment 53110 | | | | AccountingCodingBlockAs-signment 53112 | | 1 53114 |
| | | | | | CostCentreID 53116 | 0..1 53118 |
| | | | | | FundsManagementCentreID 53120 | 0..1 53122 |
| | | | | | ProjectReference 53124 | 0..1 53126 |
| | | | | | InternalOrderID 53128 | 0..1 53130 |
| | | | | | IndividualMaterialID 53132 | 0..1 53134 |
| | | | | | FundsManagementFundID 53136 | 0..1 53138 |

FIG. 53-6

| Package | level1 | level2 | level3 | level4 | level5 | Cardinality |
|---|---|---|---|---|---|---|
| | | | | | FundsManagementFunctionalAreaID 53140 | 0..1 53142 |
| | | | | | FundsManagementAccountID 53144 | 0..1 53146 |
| | | | | | FundsManagementProgramID 53148 | 0..1 53150 |
| | | | | | GrantID 53152 | 0..1 53154 |
| | | | | | AccountDeterminationExpenseGroupCode 53156 | 0..1 53158 |
| | | | | | AccountingBusinessAreaCode 53160 | 0..1 53162 |

FIG. 54

| Package | level1 | level2 | level3 | Cardinality |
|---|---|---|---|---|
| FundsCommitmentDocumentERPCreateConfirmationMessage_sync 54000 | FundsCommitmentDocumentERPCreateConfirmationMessage_sync 54002 | | | |
| MessageHeader 54004 | | MessageHeader 54006 | | 0..1 54008 |
| FundsCommitmentDocument 54010 | | FundsCommitmentDocument 54012 | | 0..1 54014 |
| | | | ID 54016 | 1 54018 |
| Log 54020 | | Log 54022 | | 1 54024 |

FIG. 55-1

| Package | level1 | level2 | level3 | level4 | level5 | Cardinality |
|---|---|---|---|---|---|---|
| FundsCommitmen-DocumentERPUp-dateRequestMes-sage_sync 55000 | FundsCom-mitmentDocu-mentERPUp-dateRequest-Message_sync 55002 | | | | | |
| MessageHeader 55004 | | MessageHeader 55006 | | | | 0..1 55008 |
| FundsCommit-mentDocument 55010 | | FundsCommit-mentDocument 55012 | | | | 1 55014 |
| | | | ItemListCompleteTrans-missionIndicator 55016 | | | 1 55018 |
| | | | ID 55020 | | | 1 55022 |
| | | | ChangeStateID 55024 | | | 1 55026 |

FIG. 55-2

| Package | level1 | level2 | level3 | level4 | level5 | Cardinality |
|---|---|---|---|---|---|---|
| | | | ApprovedIndicator 55028 | | | 0..1 55030 |
| | | | CompletedIndicator 55032 | | | 0..1 55034 |
| | | | ManualChangeAllowed-Indicator 55036 | | | 0..1 55038 |
| | | | Date 55040 | | | 0..1 55042 |
| | | | ExchangeRate 55044 | | | 0..1 55046 |
| | | | BusinessTransaction-DocumentReference 55048 | | | 0..1 55050 |
| | | | Note 55052 | | | 0..1 55054 |

FIG. 55-3

| Package | level1 | level2 | level3 | level4 | level5 | Cardinality |
|---|---|---|---|---|---|---|
| Item 55056 | | | Item 55058 | | | 0..n 55060 |
| | | | | ActionCode 55062 | | 1 55064 |
| | | | | ID 55066 | | 1 55068 |
| | | | | ChangeStateID 55070 | | 1 55072 |
| | | | | PredecessorFundsCommitmentDocumentReference 55074 | | 0..1 55076 |
| | | | | AccountingCodingBlockAssignmentChangeAllowedIndicator 55078 | | 1 55080 |
| | | | | ApprovedIndicator 55082 | | 1 55084 |

FIG. 55-4

| Package | level1 | level2 | level3 | level4 | level5 | Cardinality |
|---|---|---|---|---|---|---|
| | | | | CompletedIndicator 55086 | | 1 55088 |
| | | | | ConsumptionAllowedIndicator 55090 | | 1 55092 |
| | | | | ExceedWithoutLimitAllowedIndicator 55094 | | 1 55096 |
| | | | | GlobalToleranceOverrideAllowedIndicator 55098 | | 1 55100 |
| | | | | ManualChangeAllowedIndicator 55102 | | 1 55104 |
| | | | | PredecessorFundsCommitmentDocumentItemCompletedIndicator 55106 | | 1 55108 |
| | | | | UpdateRelevanceIndicator 55110 | | 1 55112 |

FIG. 55-5

| Package | level1 | level2 | level3 | level4 | level5 | Cardinality |
|---|---|---|---|---|---|---|
| | | | | DueDate 55114 | | 0..1 55116 |
| | | | | ReservedTransactionCurrencyAmount 55118 | | 1 55120 |
| | | | | AmountOverdrawingTolerancePercent 55122 | | 0..1 55124 |
| | | | | Note 55126 | | 0..1 55128 |
| Accounting-CodingBlock-Assignment 55130 | | | | AccountingCodingBlockAssignment 55132 | | 0..1 55134 |
| | | | | | CostCentreID 55136 | 0..1 55138 |
| | | | | | FundsManagement-CentreID 55140 | 0..1 55142 |

FIG. 55-6

| Package | level1 | level2 | level3 | level4 | level5 | Cardinality |
|---|---|---|---|---|---|---|
| | | | | | ProjectReference 55144 | 0..1 55146 |
| | | | | | InternalOrderID 55148 | 0..1 55150 |
| | | | | | IndividualMaterialID 55152 | 0..1 55154 |
| | | | | | FundsManagement-FundID 55156 | 0..1 55158 |
| | | | | | FundsManagement-FunctionalAreaID 55160 | 0..1 55162 |
| | | | | | FundsManagemen-tAccountID 55164 | 0..1 55166 |
| | | | | | FundsManagement-ProgramID 55168 | 0..1 55170 |

FIG. 55-7

| Package | level1 | level2 | level3 | level4 | level5 | Cardinality |
|---|---|---|---|---|---|---|
| | | | | | GrantID 55172 | 0..1 55174 |
| | | | | | AccountDetermina-tionExpenseGroup-Code 55176 | 0..1 55178 |
| | | | | | AccountingBusines-sAreaCode 55180 | 0..1 55182 |

FIG. 56

| Package | level1 | level2 | level3 | Cardinality |
|---|---|---|---|---|
| FundsCommitmentDocumentERPUpdateConfirmationMessage_sync 56000 | FundsCommitmentDocumentERPUpdateConfirmationMessage_sync 56002 | | | |
| MessageHeader 56004 | | MessageHeader 56006 | | 0..1 56008 |
| FundsCommitmentDocument 56010 | | FundsCommitmentDocument 56012 | | 0..1 56014 |
| | | | ID 56016 | 1 56018 |
| Log 56020 | | Log 56022 | | 1 56024 |

FIG. 57

| Package | level1 | level2 | level3 | Cardinality |
|---|---|---|---|---|
| FundsCommitmentDocumentERPBy-IDQueryMessage_sync 57000 | FundsCommitmentDocumentERPBy-IDQueryMessage_sync 57002 | | | |
| Selection 57004 | | FundsCommitmentDocument-SelectionByID 57006 | | 1 57008 |
| | | | ID 57010 | 1 57012 |

FIG. 58-1

| Package | level1 | level2 | level3 | level4 | level5 | Cardinality |
|---|---|---|---|---|---|---|
| FundsCommitmentDocumentERPByIDResponseMessage_sync 58000 | FundsCommitmentDocumentERPByIDResponseMessage_sync 58002 | | | | | |
| FundsCommitmentDocument 58004 | | FundsCommitmentDocument 58006 | | | | 0..1 58008 |
| | | | ID 58010 | | | 1 58012 |
| | | | CompanyID 58014 | | | 1 58016 |
| | | | FundsManagementAreaID 58018 | | | 0..1 58020 |
| | | | ChangeStateID 58022 | | | 1 58024 |

FIG. 58-2

| Package | level1 | level2 | level3 | level4 | level5 | Cardinality |
|---|---|---|---|---|---|---|
| | | | CategoryCode 58026 | | | 1 58028 |
| | | | PostingStatusCode 58030 | | | 1 58032 |
| | | | TypeCode 58034 | | | 1 58036 |
| | | | ApprovedIndicator 58038 | | | 1 58040 |
| | | | CompletedIndicator 58042 | | | 1 58044 |
| | | | ConsumptionAllowedIndicator 58046 | | | 1 58048 |
| | | | ManualIChangeAllowedIndicator 58050 | | | 1 58052 |

FIG. 58-3

| Package | level1 | level2 | level3 | level4 | level5 | Cardinality |
|---|---|---|---|---|---|---|
| | | | ExchangeRate 58054 | | | 1 58056 |
| | | | CategoryName 58058 | | | 1 58060 |
| | | | PostingStatusName 58062 | | | 1 58064 |
| | | | TypeName 58066 | | | 1 58068 |
| | | | Date 58070 | | | 1 58072 |
| | | | PostingDate 58074 | | | 1 58076 |
| | | | BusinessTransac-tionDocumentRefer-ence 58078 | | | 0..1 58080 |

FIG. 58-4

| Package | level1 | level2 | level3 | level4 | level5 | Cardinality |
|---|---|---|---|---|---|---|
| | | | Note 58082 | | | 0..1 58084 |
| Item 58086 | | | Item 58088 | | | 1 58090 |
| | | | | ID 58092 | | 1 58094 |
| | | | | ChangeStateID 58096 | | 1 58098 |
| | | | | PredecessorFundsCommitmentDocumentReference 58100 | | 0..1 58102 |
| | | | | AccountingCodingBlockAssignmentChangeAllowedIndicator 58104 | | 1 58106 |
| | | | | ApprovedIndicator 58108 | | 1 58110 |

FIG. 58-5

| Package | level1 | level2 | level3 | level4 | level5 | Cardinality |
|---|---|---|---|---|---|---|
| | | | | CompletedIndicator 58112 | | 1 58114 |
| | | | | ConsumptionAllowedIndicator 58116 | | 1 58118 |
| | | | | DeletedIndicator 58120 | | 1 58122 |
| | | | | ExceedLimitAllowedIndicator 58124 | | 1 58126 |
| | | | | GlobalToleranceOverrideAllowedIndicator 58128 | | 1 58130 |
| | | | | ManualChangeAllowedIndicator 58132 | | 1 58134 |
| | | | | OverPercentUnlimitedIndicator 58136 | | 1 58138 |

FIG. 58-6

| Package | level1 | level2 | level3 | level4 | level5 | Cardinality |
|---|---|---|---|---|---|---|
| | | | | PredecessorFundsCommitmentDocumentItemCompletedIndicator 58140 | | 1 58142 |
| | | | | UpdateRelevanceIndicator 58144 | | 1 58146 |
| | | | | DueDate 58148 | | 0..1 58150 |
| | | | | ReservedTransactionCurrencyAmount 58152 | | 1 58154 |
| | | | | ReservedLocalCurrencyAmount 58156 | | 1 58158 |
| | | | | OpenTransactionCurrenyAmount 58160 | | 1 58162 |
| | | | | OpenLocalCurrencyAmount 58164 | | 1 58166 |

FIG. 58-7

| Package | level1 | level2 | level3 | level4 | level5 | Cardinality |
|---|---|---|---|---|---|---|
| | | | | AmountOverdrawingTolerancePercent 58168 | | 0..1 58170 |
| | | | | Note 58172 | | 0..1 58174 |
| Accounting-Cod-ingBlockAs-signment 58176 | | | | AccountingCodingBlockAssignment 58178 | | 0..1 58180 |
| | | | | | CostCentreID 58182 | 0..1 58184 |
| | | | | | FundsManagementCentreID 58186 | 0..1 58188 |
| | | | | | ProjectReference 58190 | 0..1 58192 |
| | | | | | InternalOrderID 58194 | 0..1 58196 |

FIG. 58-8

| Package | level1 | level2 | level3 | level4 | level5 | Cardinality |
|---|---|---|---|---|---|---|
| | | | | | IndividualMaterialID 58198 | 0..1 58200 |
| | | | | | FundsManagementFundID 58202 | 0..1 58204 |
| | | | | | FundsManagementFunctionalAreaID 58206 | 0..1 58208 |
| | | | | | FundsManagementAccountID 58210 | 0..1 58212 |
| | | | | | FundsManagementProgramID 58214 | 0..1 58216 |
| | | | | | GrantID 58218 | 0..1 58220 |
| | | | | | AccountDeterminationExpenseGroupCode 58222 | 0..1 58224 |

FIG. 58-9

| Package | level1 | level2 | level3 | level4 | level5 | Cardinality |
|---|---|---|---|---|---|---|
| | | | | | AccountingBusinessAreaCode 58226 | 0..1 58228 |
| Log 58230 | | Log 58232 | | | | 1 58234 |

FIG. 59-1

| Package | level1 | level2 | level3 | level4 | Cardinality |
|---|---|---|---|---|---|
| FundsCommitmentDocumentERPBasicDataByBasicDataQueryMessage_sync 59000 | FundsCommitmentDocumentERPBasicDataByBasicDataQueryMessage_sync 59002 | | | | |
| Selection 59004 | | FundsCommitmentDocumentSelectionByBasicData 59006 | | | 1 59008 |
| | | | ID 59010 | | 0..1 59012 |
| | | | CompanyID 59014 | | 0..1 59016 |
| | | | BusinessTransactionDocumentReference 59018 | | 0..1 59020 |
| | | | Note 59022 | | 0..1 59024 |

FIG. 59-2

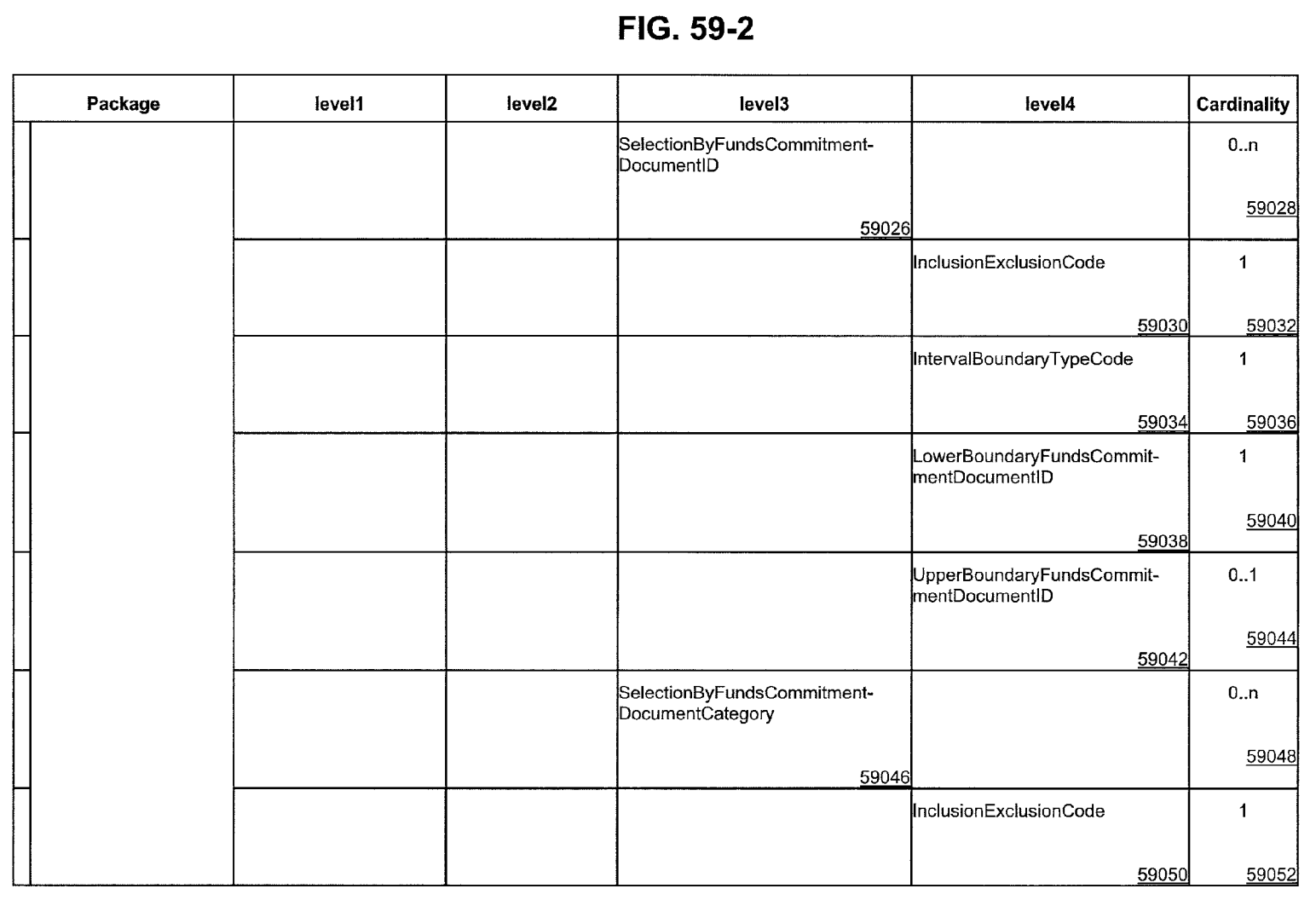

| Package | level1 | level2 | level3 | level4 | Cardinality |
|---|---|---|---|---|---|
| | | | SelectionByFundsCommitment-DocumentID 59026 | | 0..n 59028 |
| | | | | InclusionExclusionCode 59030 | 1 59032 |
| | | | | IntervalBoundaryTypeCode 59034 | 1 59036 |
| | | | | LowerBoundaryFundsCommit-mentDocumentID 59038 | 1 59040 |
| | | | | UpperBoundaryFundsCommit-mentDocumentID 59042 | 0..1 59044 |
| | | | SelectionByFundsCommitment-DocumentCategory 59046 | | 0..n 59048 |
| | | | | InclusionExclusionCode 59050 | 1 59052 |

FIG. 59-3

| Package | level1 | level2 | level3 | level4 | Cardinality |
|---|---|---|---|---|---|
| | | | | IntervalBoundaryTypeCode 59054 | 1 59056 |
| | | | | LowerBoundaryFundsCommit-mentDocumentCategory 59058 | 1 59060 |
| | | | | UpperBoundaryFundsCommit-mentDocumentCategory 59062 | 0..1 59064 |
| | | | SelectionByFundsCommitment-DocumentType 59066 | | 0..n 59068 |
| | | | | InclusionExclusionCode 59070 | 1 59072 |
| | | | | IntervalBoundaryTypeCode 59074 | 1 59076 |
| | | | | LowerBoundaryFundsCommit-mentDocumentType 59078 | 1 59080 |

FIG. 59-4

| Package | level1 | level2 | level3 | level4 | Cardinality |
|---|---|---|---|---|---|
| | | | | UpperBoundaryFundsCommit-mentDocumentType 59082 | 0..1 59084 |
| | | | SelectionByPostingDate 59086 | | 0..n 59088 |
| | | | | InclusionExclusionCode 59090 | 1 59092 |
| | | | | IntervalBoundaryTypeCode 59094 | 1 59096 |
| | | | | LowerBoundaryPostingDate 59098 | 1 59100 |
| | | | | UpperBoundaryPostingDate 59102 | 0..1 59104 |
| | | | SelectionByFundsCommitment-DocumentDate 59106 | | 0..n 59108 |

FIG. 59-5

| Package | level1 | level2 | level3 | level4 | Cardinality |
|---|---|---|---|---|---|
| | | | | InclusionExclusionCode 59110 | 1 59112 |
| | | | | IntervalBoundaryTypeCode 59114 | 1 59116 |
| | | | | LowerBoundaryDocumentDate 59118 | 1 59120 |
| | | | | UpperBoundaryDocumentDate 59122 | 0..1 59124 |
| | | | SelectionByCreationUserAccountID 59126 | | 0..n 59128 |
| | | | | InclusionExclusionCode 59130 | 1 59132 |
| | | | | IntervalBoundaryTypeCode 59134 | 1 59136 |

FIG. 59-6

| Package | level1 | level2 | level3 | level4 | Cardinality |
|---|---|---|---|---|---|
| | | | | LowerBoundaryCreatorID 59138 | 1 59140 |
| | | | | UpperBoundaryCreatorID 59142 | 0..1 59144 |
| | | | SelectionByLastChangeUserAccountID 59146 | | 0..n 59148 |
| | | | | InclusionExclusionCode 59150 | 1 59152 |
| | | | | IntervalBoundaryTypeCode 59154 | 1 59156 |
| | | | | LowerBoundaryLastChangeUserAccountID 59158 | 1 59160 |
| | | | | UpperBoundaryLastChangeUserAccountID 59162 | 0..1 59164 |

FIG. 59-7

| Package | level1 | level2 | level3 | level4 | Cardinality |
|---|---|---|---|---|---|
| | | | SelectionByCreationDate 59166 | | 0..n 59168 |
| | | | | InclusionExclusionCode 59170 | 1 59172 |
| | | | | IntervalBoundaryTypeCode 59174 | 1 59176 |
| | | | | LowerBoundaryCreationDate 59178 | 1 59180 |
| | | | | UpperBoundaryCreatonDate 59182 | 0..1 59184 |
| | | | SelectionByLastChangeDate 59186 | | 0..n 59188 |
| | | | | InclusionExclusionCode 59190 | 1 59192 |

FIG. 59-8

| Package | level1 | level2 | level3 | level4 | Cardinality |
|---|---|---|---|---|---|
| | | | | IntervalBoundaryTypeCode 59194 | 1 59196 |
| | | | | LowerBoundaryLastChangeDate 59198 | 1 59200 |
| | | | | UpperBoundaryLastChangeDate 59202 | 0..1 59204 |
| ProcessingConditions 59206 | | QueryProcessing-Conditions 59208 | | | 0..1 59210 |
| | | | QueryHitsMaximumNumberValue 59212 | | 0..1 59214 |
| | | | UnlimitedQueryHitsIndicator 59216 | | 1 59218 |

FIG. 60-1

| Package | level1 | level2 | level3 | Cardinality |
|---|---|---|---|---|
| FundsCommitmentDocumentERPBasicDataByBasicDataResponseMessage_sync 60000 | FundsCommitmentdocumentERPBasicDataByBasicDataResponseMessage_sync 60002 | | | |
| FundsCommitmentDocument 60004 | | FundsCommitmentDocument 60006 | | 0..n 60008 |
| | | | ID 60010 | 1 60012 |
| | | | CompanyID 60014 | 0..1 60016 |
| | | | CategoryCode 60018 | 0..1 60020 |
| | | | TypeCode 60022 | 0..1 60024 |
| | | | CategoryName 60026 | 0..1 60028 |

FIG. 60-2

| Package | level1 | level2 | level3 | Cardinality |
|---|---|---|---|---|
| | | | TypeName 60030 | 0..1 60032 |
| | | | Date 60034 | 0..1 60036 |
| | | | PostingDate 60038 | 0..1 60040 |
| | | | BusinessTransactionDocumentReference 60042 | 0..1 60044 |
| | | | Note 60046 | 0..1 60048 |
| ProcessingConditions 60050 | | ResponseProcessingConditions 60052 | | 1 60054 |
| | | | ReturnedQueryHitsNumberValue 60056 | 1 60058 |

FIG. 60-3

| Package | level1 | level2 | level3 | Cardinality |
|---|---|---|---|---|
| | | | MoreElementsAvailableIndicator 60060 | 1 60062 |
| Log 60064 | | Log 60066 | | 1 60068 |

FIG. 61

| Package | level1 | level2 | level3 | Cardinality |
|---|---|---|---|---|
| FundsCommitmentDocumentERPCompleteRequestMessage_sync 61000 | FundsCommitmentDocumentERPCompleteRequestMessage_sync 61002 | | | |
| MessageHeader 61004 | | MessageHeader 61006 | | 0..1 61008 |
| FundsCommitmentDocument 61010 | | FundsCommitmentDocument 61012 | | 1 61014 |
| | | | ID 61016 | 1 61018 |

FIG. 62

| Package | level1 | level2 | Cardinality |
|---|---|---|---|
| FundsCommitmentDocumentERPCompleteConfirmationMessage 62000 | FundsCommitmentDocumentERPCompleteConfirmation-Message_sync 62002 | | |
| MessageHeader 62004 | | MessageHeader 62006 | 0..1 62008 |
| Log 62010 | | Log 62012 | 1 62014 |

FIG. 77-1

| Package | level1 | level2 | level3 | level4 | Cardinality | Data Type Name |
|---|---|---|---|---|---|---|
| ContractAccountsReceivablesPayablesPostingDocumentQuotationNotificationMessage 77000 | ContractAccountsReceivablesPayablesPostingDocumentQuotationNotificationMessage 77002 | | | | | ContractAccountsReceivablesPayablesPostingDocumentQuotationNotificationMessage 77004 |
| MessageHeader 77006 | | MessageHeader 77008 | | | 0..1 77010 | BusinessDocumentMessageHeader 77012 |
| | | | ID 77014 | | 1 77016 | BusinessDocumentMessageID 77018 |
| | | | CreationDateTime 77020 | | 1 77022 | DateTime 77024 |
| | | | Uname 77026 | | 0..1 77028 | ... |
| | | | ID 77030 | | 1 77032 | BusinessDocumentMessageID 77034 |

FIG. 77-2

| Package | level1 | level2 | level3 | level4 | Cardinality | Data Type Name |
|---|---|---|---|---|---|---|
| ContractAccountsReceivablesPayablesPosting-DocumentQuotationNotification 77036 | | ContractAccountsReceivablesPayablesPosting-DocumentQuotationNotification 77038 | | | 1 77040 | ContractAccountsReceivablesPayablesPostingDocumentQuotationNotification 77042 |
| | | | ID 77044 | | 1 77046 | BusinessTransactionDocumentID 77048 |
| | | | ProcedureCode 77050 | | 1 77052 | DunningProcedure 77054 |
| | | | LevelCategoryCode 77056 | | 1 77058 | DunningLevelCategoryCode 77060 |
| | | | DueDate 77062 | | 1 77064 | Date 77066 |
| | | | Amount 77068 | | 1 77070 | Amount 77072 |

FIG. 77-3

| Package | level1 | level2 | level3 | level4 | Cardinality | Data Type Name |
|---|---|---|---|---|---|---|
| | | | PaymentAmount 77074 | | 1 77076 | Amount 77078 |
| | | | DateTime 77080 | | 1 77082 | GLOBAL_DateTime 77084 |
| Party 77086 | | | PayerParty 77088 | | 1 77090 | BusinessTransactionDocumentParty 77092 |
| | | | | InternalID 77094 | 1 77096 | PartyInternalID 77098 |
| BusinessTransaction-DocumentReference 77100 | | | AccountReference 77102 | | 1 77104 | AccountReference 77106 |
| | | | | ID 77108 | 1 77110 | BusinessTransactionDocumentID 77112 |
| | | | ContractReference 77114 | | 0..1 77116 | ContractReference 77118 |

FIG. 77-4

| Package | level1 | level2 | level3 | level4 | Cardinality | Data Type Name |
|---|---|---|---|---|---|---|
| | | | | ID 77120 | 1 77122 | BusinessTransactionDocumentID 77124 |

FIG. 87-1

| Package | level1 | level2 | level3 | level4 | level5 | level6 | Data Type Name |
|---|---|---|---|---|---|---|---|
| ProjectCostEstimateMessage 87000 | ProjectCostEstimateMessage 87002 | | | | | | |
| MessageHeader 87004 | | MessageHeader 87006 | | | | | NOSC_BasicBusinessDocumentMessageHeader 87008 |
| ProjectCostEstimate 87010 | | ProjectCostEstimate 87012 | | | | | |
| | | | ProjectID 87014 | | | | NOSC_ProjectID 87016 |
| | | | AccountingPlanningVersionCode 87018 | | | | NOSC_AccountingPlanningVersionCode 87020 |
| | | | ChangeStateID 87022 | | | | ChangeStateID 87024 |

FIG. 87-2

| Package | level1 | level2 | level3 | level4 | level5 | level6 | Data Type Name |
|---|---|---|---|---|---|---|---|
| | | | ElementCost-Estimate 87026 | | | | |
| | | | | ProjectWork-BreakdownStruc-tureElementID 87028 | | | NOSC_ProjectWorkBreakdown StructureElementID 87030 |
| | | | | ProjectActivityID 87032 | | | ProjectActivityID 87034 |
| | | | | ProjectNetworkID 87036 | | | ProjectNetworkID 87038 |
| | | | | CostModel 87040 | | | |
| | | | | | ID 87042 | | NOSC_CostModelID 87044 |
| | | | | | PropertyValuation 87046 | | |

FIG. 87-3

| Package | level1 | level2 | level3 | level4 | level5 | level6 | Data Type Name |
|---|---|---|---|---|---|---|---|
| | | | | | | PropertyID 87048 | NOSC_PropertyID 87050 |
| | | | | | | Property-ValueName 87052 | SHORT_Name 87054 |
| | | | | Item 87056 | | | |
| | | | | | @actionCode 87058 | | ActionCode 87060 |
| | | | | | Number 87062 | | NumberValue 87064 |
| | | | | | TypeCode 87066 | | CostEstimateItemTypeCode 87068 |
| | | | | | ControllingAreaID 87070 | | NOSC_ControllingAreaID 87072 |

FIG. 87-4

| Package | level1 | level2 | level3 | level4 | level5 | level6 | Data Type Name |
|---|---|---|---|---|---|---|---|
| | | | | | CostCentreID 87074 | | NOSC_CostCentreID 87076 |
| | | | | | CostingActivityResource-ClassID 87078 | | NOSC_ResourceClassID 87080 |
| | | | | | ProductInternalID 87082 | | NOSC_ProductInternalID 87084 |
| | | | | | PlantID 87086 | | NOSC_PlantID 87088 |
| | | | | | WorkCentreID 87090 | | NOSC_WorkCentreID 87092 |
| | | | | | WorkCentrePlantID 87094 | | NOSC_PlantID 87096 |
| | | | | | CostingActivityID 87098 | | NOSC_CostingActivityID 87100 |

FIG. 87-5

| Package | level1 | level2 | level3 | level4 | level5 | level6 | Data Type Name |
|---|---|---|---|---|---|---|---|
| | | | | | InventoryValuationType-Code 87102 | | NOSC_InventoryValuation-TypeCode 87104 |
| | | | | | ValuationDate 87106 | | Date 87108 |
| | | | | | LatestScheduledEndDate 87110 | | Date 87112 |
| | | | | | CostElementID 87114 | | CostElementID 87116 |
| | | | | | NetPrice 87118 | | Price 87120 |
| | | | | | Description 87122 | | SHORT_Description 87124 |
| Log 87126 | | Log 87128 | | | | | |

FIG. 88

| Package | level1 | level2 | level3 | Cardinality |
|---|---|---|---|---|
| ProjCostEstERPByProjIDAn-dAcctgPlngVersCodeQryMsg_s 88000 | ProjCostEstERPByProjIDAn-dAcctgPlngVersCodeQryMsg_s 88002 | | | |
| Selection 88004 | | ProjectCostEstimateSelection-ByProjIDAndAcctgPlngVersCode 88006 | | 1 88008 |
| | | | ProjectID 88010 | 1 88012 |
| | | | AccountingPlanningVersionCode 88014 | 1 88016 |

FIG. 89-1

| Package | level1 | level2 | level3 | level4 | level5 | Cardinality |
|---|---|---|---|---|---|---|
| ProjCostEstERPByProjIDAndAcctgPlngVersCodeRspMsg_s 89000 | ProjCostEstERPByProjIDAndAcctgPlngVersCodeRspMsg_s 89002 | | | | | |
| ProjectCostEstimate 89004 | | ProjectCostEstimate 89006 | | | | 0..1 89008 |
| | | | ProjectID 89010 | | | 1 89012 |
| | | | AccountingPlanningVersionCode 89014 | | | 1 89016 |
| | | | ChangeStateID 89018 | | | 1 89020 |
| | | | ElementCostEstimate 89022 | | | 0..n 89024 |

FIG. 89-2

| Package | level1 | level2 | level3 | level4 | level5 | Cardinality |
|---|---|---|---|---|---|---|
| | | | | ProjectWorkBreakdown-StructureElementID 89026 | | 0..1 89028 |
| | | | | ProjectActivityID 89030 | | 0..1 89032 |
| | | | | ProjectNetworkID 89034 | | 0..1 89036 |
| | | | | Item 89038 | | 0..n 89040 |
| | | | | | Number 89042 | 1 89044 |
| | | | | | TypeCode 89046 | 1 89048 |
| | | | | | ControllingAreaID 89050 | 1 89052 |

FIG. 89-3

| Package | level1 | level2 | level3 | level4 | level5 | Cardinality |
|---|---|---|---|---|---|---|
| | | | | | CostCentreID 89054 | 0..1 89056 |
| | | | | | CostingActivityResourceClassID 89058 | 0..1 89060 |
| | | | | | ProductInternalID 89062 | 0..1 89064 |
| | | | | | PlantID 89066 | 0..1 89068 |
| | | | | | WorkCentreID 89070 | 0..1 89072 |
| | | | | | WorkCentrePlantID 89074 | 0..1 89076 |
| | | | | | CostingActivityID 89078 | 0..1 89080 |

FIG. 89-4

| Package | level1 | level2 | level3 | level4 | level5 | Cardinality |
|---|---|---|---|---|---|---|
| | | | | | InventoryValuationTypeCode 89082 | 0..1 89084 |
| | | | | | ValuationDate 89086 | 0..1 89088 |
| | | | | | LatestScheduledEndDate 89090 | 0..1 89092 |
| | | | | | CostElementID 89094 | 0..1 89096 |
| | | | | | NetPrice 89098 | 0..1 89100 |
| | | | | | Description 89102 | 0..1 89104 |
| Log 89106 | | Log 89108 | | | | 1 89110 |

FIG. 90-1

| Package | level1 | level2 | level3 | level4 | level5 | level6 | Cardinality |
|---|---|---|---|---|---|---|---|
| ProjCost-EstERPCrteReqMsg_s 90000 | ProjCost-EstERPCrteReqMsg_s 90002 | | | | | | |
| MessageHeader 90004 | | MessageHeader 90006 | | | | | 0..1 90008 |
| ProjectCostEstimate 90010 | | ProjectCostEstimate 90012 | | | | | 1 90014 |
| | | | ProjectID 90016 | | | | 1 90018 |
| | | | AccountingPlanning-VersionCode 90020 | | | | 1 90022 |
| | | | ElementCostEstimate 90024 | | | | 1..n 90026 |
| | | | | ProjectWork-BreakdownStruc-tureElementID 90028 | | | 0..1 90030 |

FIG. 90-2

| Package | level1 | level2 | level3 | level4 | level5 | level6 | Cardinality |
|---|---|---|---|---|---|---|---|
| | | | | ProjectActivityID 90032 | | | 0..1 90034 |
| | | | | ProjectNetworkID 90036 | | | 0..1 90038 |
| | | | | CostModel 90040 | | | 0..1 90042 |
| | | | | | ID 90044 | | 1 90046 |
| | | | | | PropertyValuation 90048 | | 0..n 90050 |
| | | | | | | PropertyID 90052 | 1 90054 |
| | | | | | | Property-ValueName 90056 | 1 90058 |

FIG. 90-3

| Package | level1 | level2 | level3 | level4 | level5 | level6 | Cardinality |
|---|---|---|---|---|---|---|---|
| | | | | Item 90060 | | | 0..n 90062 |
| | | | | | TypeCode 90064 | | 1 90066 |
| | | | | | ControllingAreaID 90068 | | 1 90070 |
| | | | | | CostCentreID 90072 | | 0..1 90074 |
| | | | | | CostingActivityResourceClassID 90076 | | 0..1 90078 |
| | | | | | ProductInternalID 90080 | | 0..1 90082 |
| | | | | | PlantID 90084 | | 0..1 90086 |

FIG. 90-4

| Package | level1 | level2 | level3 | level4 | level5 | level6 | Cardinality |
|---|---|---|---|---|---|---|---|
| | | | | | WorkCentreID 90088 | | 0..1 90090 |
| | | | | | WorkCentrePlantID 90092 | | 0..1 90094 |
| | | | | | CostingActivityID 90096 | | 0..1 90098 |
| | | | | | InventoryValuation-TypeCode 90100 | | 0..1 90102 |
| | | | | | CostElementID 90104 | | 0..1 90106 |
| | | | | | NetPrice 90108 | | 0..1 90110 |
| | | | | | Description 90112 | | 0..1 90114 |

FIG. 91

| Package | level1 | level2 | Cardinality |
|---|---|---|---|
| ProjCostEstERPCrteConfMsg_s 91000 | ProjCostEstERPCrteConfMsg_s 91002 | | |
| MessageHeader 91004 | | MessageHeader 91006 | 0..1 91008 |
| Log 91010 | | Log 91012 | 1 91014 |

FIG. 92-1

| Package | level1 | level2 | level3 | level4 | level5 | Cardinality |
|---|---|---|---|---|---|---|
| ProjCostEstER-PUpdtReqMsg_s 92000 | ProjCostEstER-PUpdtReqMsg_s 92002 | | | | | |
| MessageHeader 92004 | | MessageHeader 92006 | | | | |
| ProjectCostEstimate 92008 | | ProjectCostEstimate 92010 | | | | 1 92012 |
| | | | ProjectID 92014 | | | 1 92016 |
| | | | AccountingPlanning-VersionCode 92018 | | | 1 92020 |
| | | | ChangeStateID 92022 | | | 1 92024 |
| | | | ElementCostEstimate 92026 | | | 1..n 92028 |

FIG. 92-2

| Package | level1 | level2 | level3 | level4 | level5 | Cardinality |
|---|---|---|---|---|---|---|
| | | | | ProjectWorkBreakdown-StructureElementID 92030 | | 0..1 92032 |
| | | | | ProjectActivityID 92034 | | 0..1 92036 |
| | | | | ProjectNetworkID 92038 | | 0..1 92040 |
| | | | | Item 92042 | | 1..n 92044 |
| | | | | | @actionCode 92046 | 1 92048 |
| | | | | | Number 92050 | 1 92052 |
| | | | | | ControllingAreaID 92054 | 1 92056 |

FIG. 92-3

| Package | level1 | level2 | level3 | level4 | level5 | Cardinality |
|---|---|---|---|---|---|---|
| | | | | | TypeCode 92058 | 0..1 92060 |
| | | | | | CostCentreID 92062 | 0..1 92064 |
| | | | | | CostingActivityResourceClassID 92066 | 0..1 92068 |
| | | | | | ProductInternalID 92070 | 0..1 92072 |
| | | | | | PlantID 92074 | 0..1 92076 |
| | | | | | WorkCentreID 92078 | 0..1 92080 |
| | | | | | WorkCentrePlantID 92082 | 0..1 92084 |

FIG. 92-4

| Package | level1 | level2 | level3 | level4 | level5 | Cardinality |
|---|---|---|---|---|---|---|
| | | | | | CostingActivityID 92086 | 0..1 92088 |
| | | | | | InventoryValuationTypeCode 92090 | 0..1 92092 |
| | | | | | CostElementID 92094 | 0..1 92096 |
| | | | | | NetPrice 92098 | 0..1 92100 |
| | | | | | Description 92102 | 0..1 104 |

FIG. 93

| Package | level1 | level2 | Cardinality |
|---|---|---|---|
| ProjCostEstERPUpdtConfMsg_s 93000 | ProjCostEstERPUpdtConfMsg_s 93002 | | |
| MessageHeader 93004 | | MessageHeader 93006 | 0..1 93008 |
| Log 93010 | | Log 93012 | 1 93014 |

FIG. 94-1

| Package | level1 | level2 | level3 | level4 | Cardinality |
|---|---|---|---|---|---|
| ProjCostEstERPCancReqMsg_s 94000 | ProjCostEstERPCancReqMsg_s 94002 | | | | |
| MessageHeader 94004 | | MessageHeader 94006 | | | 0..1 94008 |
| ProjectCostEstimate 94010 | | ProjectCostEstimate 94012 | | | 1 94014 |
| | | | ProjectID 94016 | | 1 94018 |
| | | | AccountingPlanning-VersionCode 94020 | | 1 94022 |
| | | | ElementCostEstimate 94024 | | 1..n 94026 |
| | | | | ProjectWorkBreakdown-StructureElementID 94028 | 0..1 94030 |

FIG. 94-2

| Package | level1 | level2 | level3 | level4 | Cardinality |
|---|---|---|---|---|---|
| | | | | ProjectActivityID 94032 | 0..1 94034 |
| | | | | ProjectNetworkID 94036 | 0..1 94038 |

FIG. 95

| Package | level1 | level2 | Cardinality |
|---|---|---|---|
| ProjCostEstERPCancConfMsg_s 95000 | ProjCostEstERPCancConfMsg_s 95002 | | |
| MessageHeader 95004 | | MessageHeader 95006 | 0..1 95008 |
| Log 95010 | | Log 95012 | 1 95014 |

MANAGING CONSISTENT INTERFACES FOR BUSINESS OBJECTS ACROSS HETEROGENEOUS SYSTEMS

CROSS-REFERENCE TO RELATED APPLICATION

This application is a continuation of and claims priority to U.S. application Ser. No. 12/147,399, filed on Jun. 26, 2008, the entire disclosure of which is incorporated herein by reference.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a computer readable medium includes program code for providing a message-based interface for performing a budget availability control register service. The interface exposes at least one service as defined in a service registry. Upon execution, the program code executes in an environment of computer systems providing message-based services. The service comprises program code for receiving, from a service consumer, a first message for processing information from which a user can determine available budget and already consumed budget on a given account assignment, including internal order of funds management account assignment. The service comprises program code for invoking a budget availability control register business object. The business object is a logically centralized, semantically disjointed object for representing information from which a user determines available budget and already consumed budget on a given account assignment, including internal order of funds management account assignment. The business object comprises data logically organized as a budget availability control register root node and a budget availability control register item subordinate node. The budget availability control register item node contains an accounting coding block assignment subordinate node. Program code initiates transmission of a message to a heterogeneous second application, executing in the environment of computer systems providing message-based services, based on the data in the budget availability control register business object. The message comprises a budget availability control register enterprise resource planning item by elements query message entity, a selection package, and a processing conditions package.

In a second aspect, a computer readable medium includes program code for providing a message-based interface for performing a budget availability control register service. The service comprises computer readable instructions embodied on tangible media. Upon execution, the software executes in a landscape of computer systems providing message-based services. Program code initiates transmission of a message to a heterogeneous second application, executing in the environment of computer systems providing message-based services. The service is based on data in a budget availability control register business object invoked by the second application. The business object is a logically centralized, semantically disjointed object for representing information from which a user can determine available budget and already consumed budget on a given account assignment, including internal order of funds management account assignment. The business object comprises data logically organized as a budget availability control register root node, and a budget availability control register item subordinate node. The budget availability control register item node contains an accounting coding block assignment subordinate node. The message comprises a budget availability control register enterprise resource planning item by elements query message entity, a selection package, and a processing conditions package. Program code receives a second message from the second application, the second message associated with the invoked budget availability control register business object and in response to the first message.

In a third aspect, a distributed system operates in a landscape of computer systems providing message-based services. The system processes business objects involving a budget availability control register and comprises memory and a graphical user interface remote from the memory. The memory stores a business object repository storing a plurality of business objects. Each business object is a logically centralized, semantically disjointed object and at least one of the business objects represents information from which a user can determine available budget and already consumed budget on a given account assignment, including internal order of funds management account assignment. The business object comprises data logically organized as a budget availability control register root node and a budget availability control register item subordinate node. The budget availability control register item node contains an accounting coding block assignment subordinate node. A graphical user interface remote from the memory presents data associated with an invoked instance of the budget availability control register business object, the interface comprising computer readable instructions embodied on tangible media.

In a fourth aspect, a computer readable medium includes program code for providing a message-based interface for performing a financial accounting view of work order service. The interface exposes at least one service as defined in a service registry. Upon execution, the program code executes in an environment of computer systems providing message-based services. The service comprises program code for receiving, from a service consumer, a first message for processing information used to manage manufacturing work orders. Program code invokes a financial accounting view of work order business object. The business object is a logically centralized, semantically disjointed object for representing information used to manage manufacturing work orders and comprises data logically organized as a manufacturing work order root node and an item subordinate node. The item node contains a purchase order reference subordinate node. Program code initiates transmission of a message to a heterogeneous second application, executing in the environment of computer systems providing message-based services, based on the data in the financial accounting view of work order business object. The message comprises a manufacturing work order accounting notification message entity, a message header package, and a manufacturing work order package.

In a fifth aspect, a computer readable medium includes program code for providing a message-based interface for performing a financial accounting view of work order service. The software comprises computer readable instructions embodied on tangible media. Upon execution, the software executes in a landscape of computer systems providing message-based services. Program code initiates the transmission of a message to a heterogeneous second application, executing in the environment of computer systems providing message-based services. The service is based on data in a financial accounting view of work order business object invoked by the second application, wherein the business object is a logically centralized, semantically disjointed object for managing manufacturing work orders. The business object comprises data logically organized as a manufacturing work order root node and an item subordinate node. The item node contains a purchase order reference subordinate node. The message is comprised of a manufacturing work order accounting notification message entity, a message header package, and a manufacturing work order package. Program code receives a second message from the second application, the second message associated with the invoked financial accounting view of work order business object and in response to the first message.

In a sixth aspect, a distributed system operates in a landscape of computer systems providing message-based services. The system processes business objects involving a financial accounting view of work order service and comprises memory and a graphical user interface remote from the memory. The memory stores a business object repository storing a plurality of business objects. Each business object is a logically centralized, semantically disjointed object and at least one of the business objects is for managing manufacturing work orders. The business object comprises data logically organized as a manufacturing work order root node and an item subordinate node. The item node contains a purchase order reference subordinate node. A graphical user interface remote from the memory presents data associated with an invoked instance of the manufacturing work order business object, the interface comprising computer readable instructions embodied on tangible media.

In a seventh aspect, a computer readable medium includes program code for providing a message-based interface for performing a funds commitment document service. The interface exposes at least one service as defined in a service registry. Upon execution, the program code executes in an environment of computer systems providing message-based services. The service comprises program code for receiving, from a service consumer, a first message for processing information used to manage funds commitment documents. Program code invokes a funds commitment document business object. The business object is a logically centralized, semantically disjointed object for representing a funds commitment document service. The business object comprises data logically organized as a funds commitment document root node and a funds commitment document item subordinate node. The funds commitment document item node contains an accounting coding block assignment subordinate node. Program code initiates the transmission of a message to a heterogeneous second application, executing in the environment of computer systems providing message-based services, based on the data in the funds commitment document business object. The message comprises a funds commitment document create request message entity, a message header package, and a funds commitment document package.

In an eighth aspect, a computer readable medium includes program code for providing a message-based interface for performing a funds commitment document service. The software comprises computer readable instructions embodied on tangible media. Upon execution, the software executes in a landscape of computer systems providing message-based services. The service comprises program code for initiating transmission of a message to a heterogeneous second application, executing in the environment of computer systems providing message-based services, based on data in a funds commitment document business object invoked by the second application. The business object is a logically centralized, semantically disjointed object for managing funds commitment documents and comprises data logically organized as a funds commitment document root node and a funds commitment document item subordinate node. The funds commitment document item node contains an accounting coding block assignment subordinate node. The message comprises a funds commitment document create request message entity, a message header package, and a funds commitment document package. Program code receives a second message from the second application, the second message associated with the invoked funds commitment document business object and in response to the first message.

In a ninth aspect, a distributed system operates in a landscape of computer systems providing message-based services. The system processing business objects involve a funds commitment document service. The service comprises memory and a graphical user interface remote from the memory. The memory stores a business object repository storing a plurality of business objects. Each business object is a logically centralized, semantically disjointed object and at least one of the business objects is for managing funds commitment documents. The business object comprises data logically organized as a funds commitment document root node and a funds commitment document item subordinate node. The funds commitment document item node contains an accounting coding block assignment subordinate node. A graphical user interface remote from the memory presents data associated with an invoked instance of the funds commitment document business object, the interface comprising computer readable instructions embodied on tangible media.

In a tenth aspect, a computer readable medium includes program code for providing a message-based interface for performing an insurance contract service. The interface exposes at least one service as defined in a service registry. Upon execution the program code executes in an environment of computer systems providing message-based services. The service comprises program code for receiving, from a service consumer, a first message for processing, in the insurance industry, an exchange of information from insurance-specific collection processes between a collection and disbursement component and upstream or downstream components, such as in-force business management or a claims system. Program code invokes an insurance contract business object. The business object is a logically centralized, semantically disjointed object for processing, in the insurance industry, an exchange of information from insurance-specific collection processes between a collection and disbursement component and upstream or downstream components, such as in-force business management or a claims system. The business object comprises data logically organized as an insurance contract root node and a dunning level subordinate node. The dunning level node contains a payer party subordinate node, an account reference subordinate node, a contract reference subordinate node, and a payment results subordinate node. The payment results node contains a payer party subordinate node, an account reference subordinate node, a contract reference subordinate node, a posting document reference subordinate node, and a deposit shortage subordinate node. The deposit shortage node contains a deposit holder party subordinate node, an account reference subordinate node, a contract reference subordinate node, and a customer initiated payment subordinate node. The customer initiated payment node contains a payer party subordinate node, an account reference subordinate node, a contract reference subordinate node, and an item subordinate node. The item node contains a posting document reference subordinate node, and an insurance contract benefit free period subordinate node. The insurance contract benefit free period node contains an insurance contract reference subordinate node, and a contract account receivables payable posting document quotation subordinate node. The contract account receivables payable posting document quotation node contains a payer party subordinate node, an account reference subordinate node, a contract reference subordinate node, and a running dunning procedure subordinate node. The running dunning procedure node contains a payer party subordinate node, an account reference subordinate node, and a contract reference subordinate node. Program code initiates transmission of a message to a heterogeneous second application, executing in the environment of computer systems providing message-based services, based on the data in the insurance contract business object. The message comprises a customer initiated payment received message entity, a message header package, and a customer initiated payment package.

In an eleventh aspect, a computer readable medium includes program code for providing a message-based interface for performing an insurance contract service. The software comprises computer readable instructions embodied on tangible media. Upon execution, the software executes in a landscape of computer systems providing message-based services. The service comprises program code for initiating transmission of a message to a heterogeneous second application, executing in the environment of computer systems providing message-based services, based on data in an insurance contract business object invoked by the second application. The business object is a logically centralized, semantically disjointed object for processing, in the insurance industry, an exchange of information from insurance-specific collection processes between a collection and disbursement component and upstream or downstream components, such as in-force business management or a claims system. The business object comprises data logically organized as an insurance contract root node, and a dunning level subordinate node. The dunning level node contains a payer party subordinate node, an account reference subordinate node, a contract reference subordinate node, and a payment results subordinate node. The payment results node contains a payer party subordinate node, an account reference subordinate node, a contract reference subordinate node, a posting document reference subordinate node, and a deposit shortage subordinate node. The deposit shortage node contains a deposit holder party subordinate node, an account reference subordinate node, a contract reference subordinate node, and a customer initiated payment subordinate node. The customer initiated payment node contains a payer party subordinate node, an account reference subordinate node, a contract reference subordinate node, and an item subordinate node. The item node contains a posting document reference subordinate node, and an insurance contract benefit free period subordinate node. The insurance contract benefit free period node contains an insurance contract reference subordinate node, and a contract account receivables payable posting document quotation subordinate node. The contract account receivables payable posting document quotation node contains a payer party subordinate node, an account reference subordinate node, a contract reference subordinate node, and a running dunning procedure subordinate node. The running dunning procedure node contains a payer party subordinate node, an account reference subordinate node, and a contract reference subordinate node. The message comprises a customer initiated payment received message entity, a message header package, and a customer initiated payment package. Program code receives a second message from the second application, the second message associated with the invoked insurance contract business object and in response to the first message.

In a twelfth aspect, a distributed system operates in a landscape of computer systems providing message-based services. The system processing business objects involves an insurance contract service. The service comprises memory and a graphical user interface remote from the memory. The memory stores a business object repository storing a plurality of business objects. Each business object is a logically centralized, semantically disjointed object and at least one of the business objects is for processing, in the insurance industry, an exchange of information from insurance-specific collection processes between a collection and disbursement component and upstream or downstream components, such as in-force business management or a claims system. The business object comprises data logically organized as an insurance contract root node, and a dunning level subordinate node. The dunning level node contains a payer party subordinate node, an account reference subordinate node, a contract reference subordinate node, and a payment results subordinate node. The payment results node contains a payer party subordinate node, an account reference subordinate node, a contract reference subordinate node, a posting document reference subordinate node, and a deposit shortage subordinate node. The deposit shortage node contains a deposit holder party subordinate node, an account reference subordinate node, a contract reference subordinate node, and a customer initiated payment subordinate node. The customer initiated payment node contains a payer party subordinate node, an account reference subordinate node, a contract reference subordinate node, and an item subordinate node. The item node contains a posting document reference subordinate node, and an insurance contract benefit free period subordinate node. The insurance contract benefit free period node contains an insurance contract reference subordinate node, and a contract account receivables payable posting document quotation subordinate node. The contract account receivables payable posting document quotation node contains a payer party subordinate node, an account reference subordinate node, a contract reference subordinate node, and a running dunning procedure subordinate node. The running dunning procedure node contains a payer party subordinate node, an account reference subordinate node, and a contract reference subordinate node. A graphical user interface remote from the memory presents data associated with an invoked instance of the insurance contract business object, the interface comprising computer readable instructions embodied on tangible media.

In a thirteenth aspect, a computer readable medium includes program code for providing a message-based interface for performing a project cost estimate service. The interface exposes at least one service as defined in a service registry. Upon execution, the program code executes in an environment of computer systems providing message-based services. The service comprises program code for receiving, from a service consumer, a first message for processing information used to manage the estimated costs for a project. Program code invokes a project cost estimate business object. The business object is a logically centralized, semantically disjointed object for representing information used to manage the estimated costs for a project. The business object comprises data logically organized as a project cost estimate root node, and an element cost estimate subordinate node. The element cost estimate node contains an item subordinate node, and a cost model subordinate node. The cost model node contains a property subordinate node. Program code initiates transmission of a message to a heterogeneous second application, executing in the environment of computer systems providing message-based services, based on the data in the project cost estimate business object. The message comprises a project cost estimate create request message entity, a message header package, and a project cost estimate package.

In a fourteenth aspect, a computer readable medium includes program code for providing a message-based interface for performing a project cost estimate service. The software comprises computer readable instructions embodied on tangible media. Upon execution, the software executes in a landscape of computer systems providing message-based services. The service comprises program code for initiating transmission of a message to a heterogeneous second application, executing in the environment of computer systems providing message-based services, based on data in a project cost estimate business object invoked by the second application. The business object is a logically centralized, semantically disjointed object for representing information used to manage the estimated costs for a project. The business object comprises data logically organized as a project cost estimate root node, and an element cost estimate subordinate node. The element cost estimate node contains an item subordinate node, and a cost model subordinate node. The cost model node contains a property subordinate node. The message comprises a project cost estimate create request message entity, a message header package, and a project cost estimate package. Program code receives a second message from the second application, the second message associated with the invoked project cost estimate business object and in response to the first message.

In a fifteenth aspect, a distributed system operates in a landscape of computer systems providing message-based services. The system processes business objects involving a project cost estimate service. The system comprises memory and a graphical user interface remote from the memory. The memory stores a business object repository storing a plurality of business objects. Each business object is a logically centralized, semantically disjointed object and at least one of the business objects is for representing information used to manage the estimated costs for a project. The business object comprises data logically organized as a project cost estimate root node, and an element cost estimate subordinate node. The element cost estimate node contains an item subordinate node, and a cost model subordinate node. The cost model node contains a property subordinate node. A graphical user interface remote from the memory presents data associated with an invoked instance of the project cost estimate business object, the interface comprising computer readable instructions embodied on tangible media.

In some implementations, processing business objects includes creating, updating and/or retrieving information associated with the business objects.

BRIEF DESCRIPTION OF THE DRAWINGS

FIGS. 35-1 through 35-6 show an exemplary BudgetAvailabilityControlRegisterERPMessage_sync Element Structure.

FIGS. 36-1 through 36-3 show an exemplary BudgetAvailabilityControlRegisterERPItemByElementsQueryMessage_sync Element Structure.

FIGS. 37-1 through 37-6 show an exemplary BudgetAvailabilityControlRegisterERPItemByElementsResponseMessage_sync Element Structure.

FIGS. 40-1 through 40-2 show an exemplary ManufacturingWorkOrderAccountingNotificationMessage Element Structure.

FIGS. 52-1 through 52-10 show an exemplary FundsCommitmentDocumentERPMessage_sync Element Structure.

FIGS. 53-1 through 53-6 show an exemplary FundsCommitmentDocumentERPCreateRequestMessage_sync Message Data Type.

FIG. 54 shows an exemplary FundsCommitmentDocumentERPCreateConfirmationMessage_sync Element Structure.

FIGS. 55-1 through 55-7 show an exemplary FundsCommitmentDocumentERPUpdateRequestMessage_sync Element Structure.

FIG. 56 shows an exemplary FundsCommitmentDocumentERPUpdateConfirmationMessage_sync Element Structure.

FIG. 57 shows an exemplary FundsCommitmentDocumentERPByIDQueryMessage_sync Element Structure.

FIGS. 58-1 through 58-9 show an exemplary FundsCommitmentDocumentERPComplete-ConfirmationMessage_sync Element Structure.

FIGS. 59-1 through 59-8 show an exemplary FundsCommitmentDocumentERPCompleteRequestMessage_sync Element Structure.

FIGS. 60-1 through 60-3 show an exemplary FundsCommitmentDocumentERPBasic-DataByBasicDataQueryMessage_sync Element Structure.

FIG. 61 shows an exemplary FundsCommitmentDocumentERPBasicDataByBasicDataResponseMessage_sync Element Structure.

FIG. 62 shows an exemplary FundsCommitmentDocumentERPByIDResponseMessage_sync Element Structure.

FIGS. 77-1 through 77-4 show an exemplary ContractAccountsReceivablesPayablesPostingDocumentQuotationNotification Element Structure.

FIGS. 87-1 through 87-5 show an exemplary ProjectCost-EstimateMessage Element Structure.

FIG. 88 shows an exemplary ProjCostEstERP-ByProjIDAndAcctgPlngVersCodeQryMsg_s Element Structure.

FIGS. 89-1 through 89-4 show an exemplary ProjCostEst-ERPByProjIDAndAcctgPlngVersCodeRspMsg_s Element Structure.

FIGS. 90-1 through 90-4 show an exemplary ProjCostEst-ERPCrteReqMsg_s Element Structure.

FIG. 91 shows an exemplary ProjCostEstERPCrteConfMsg_s Element Structure.

FIGS. 92-1 through 92-4 show an exemplary ProjCostEst-ERPUpdtReqMsg_s Element Structure.

FIG. 93 shows an exemplary ProjCostEstERPUpdtConfMsg_s Element Structure.

FIGS. 94-1 through 94-2 show an exemplary ProjCostEst-ERPCancReqMsg_s Element Structure.

FIG. 95 shows an exemplary ProjCostEstERPCancConfMsg_s Element Structure.

DETAILED DESCRIPTION

A. Overview

Figure 1:
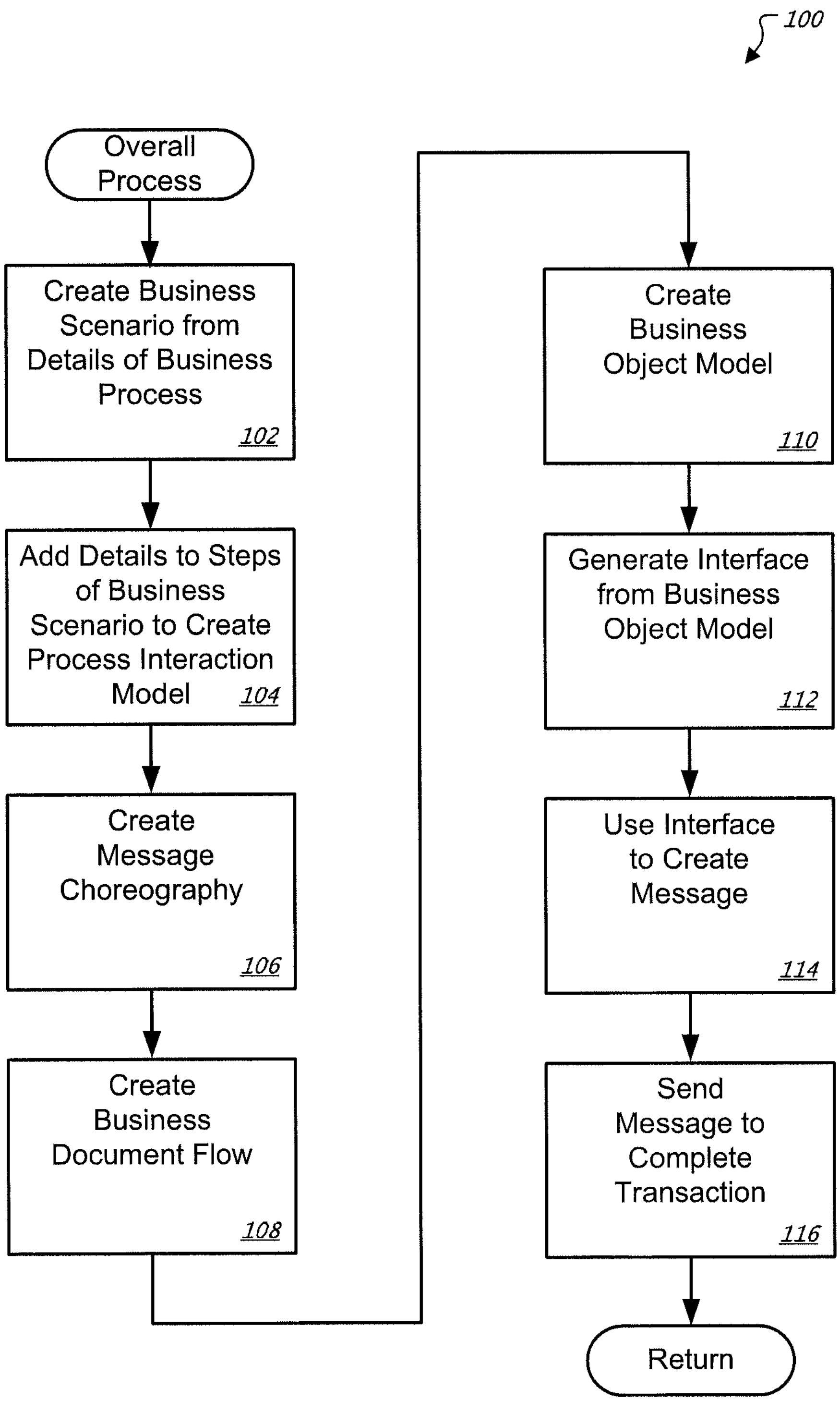
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
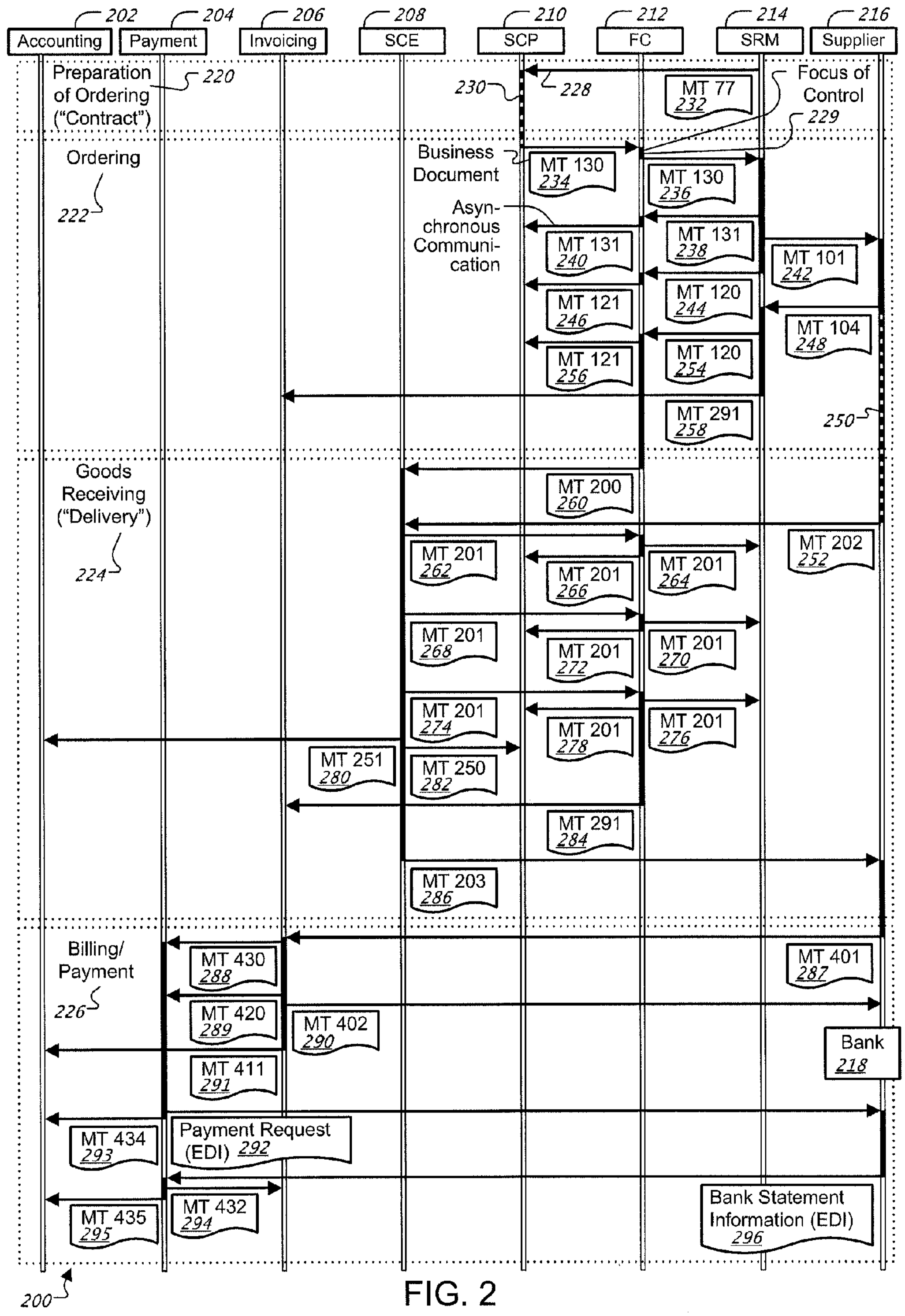
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
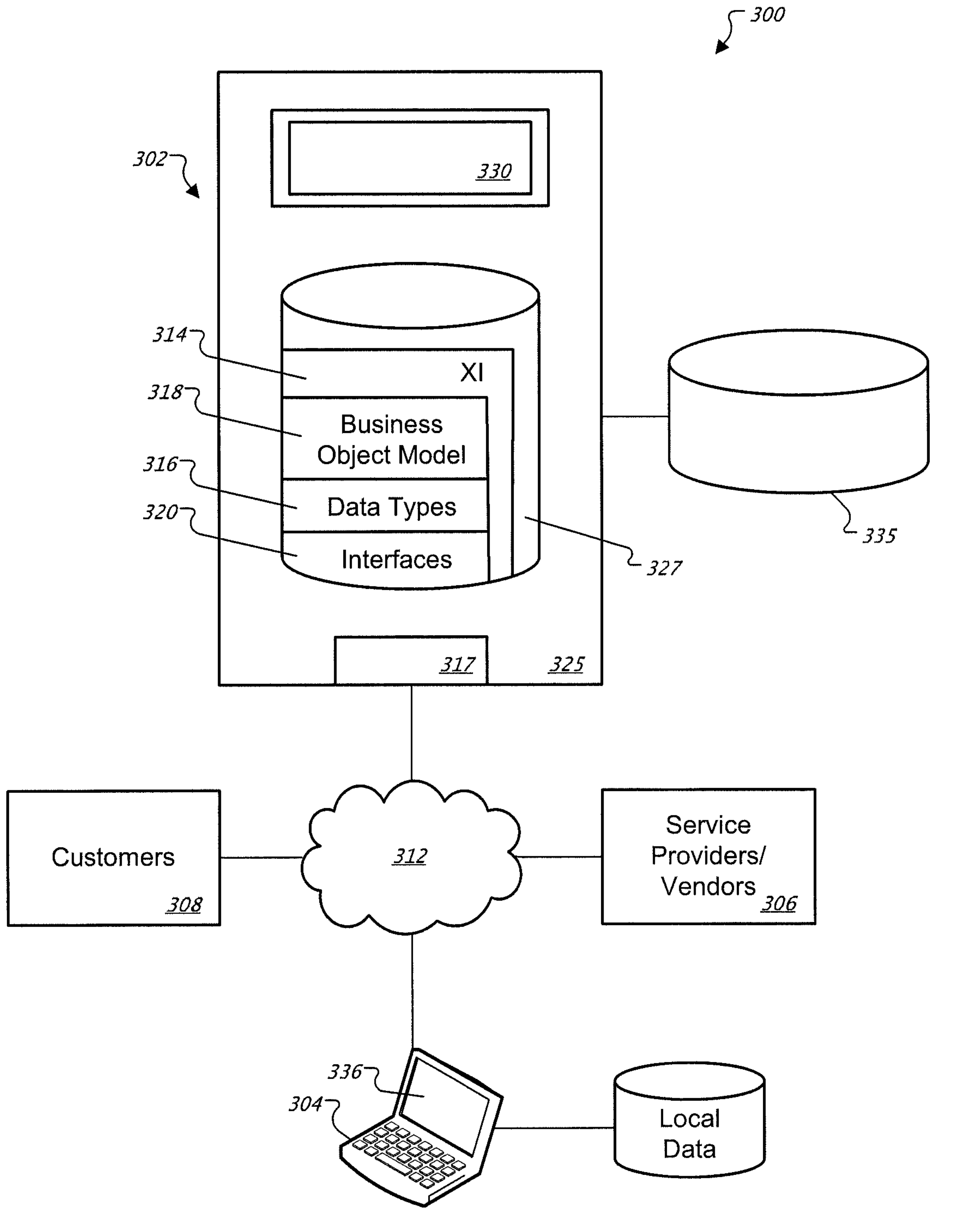
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
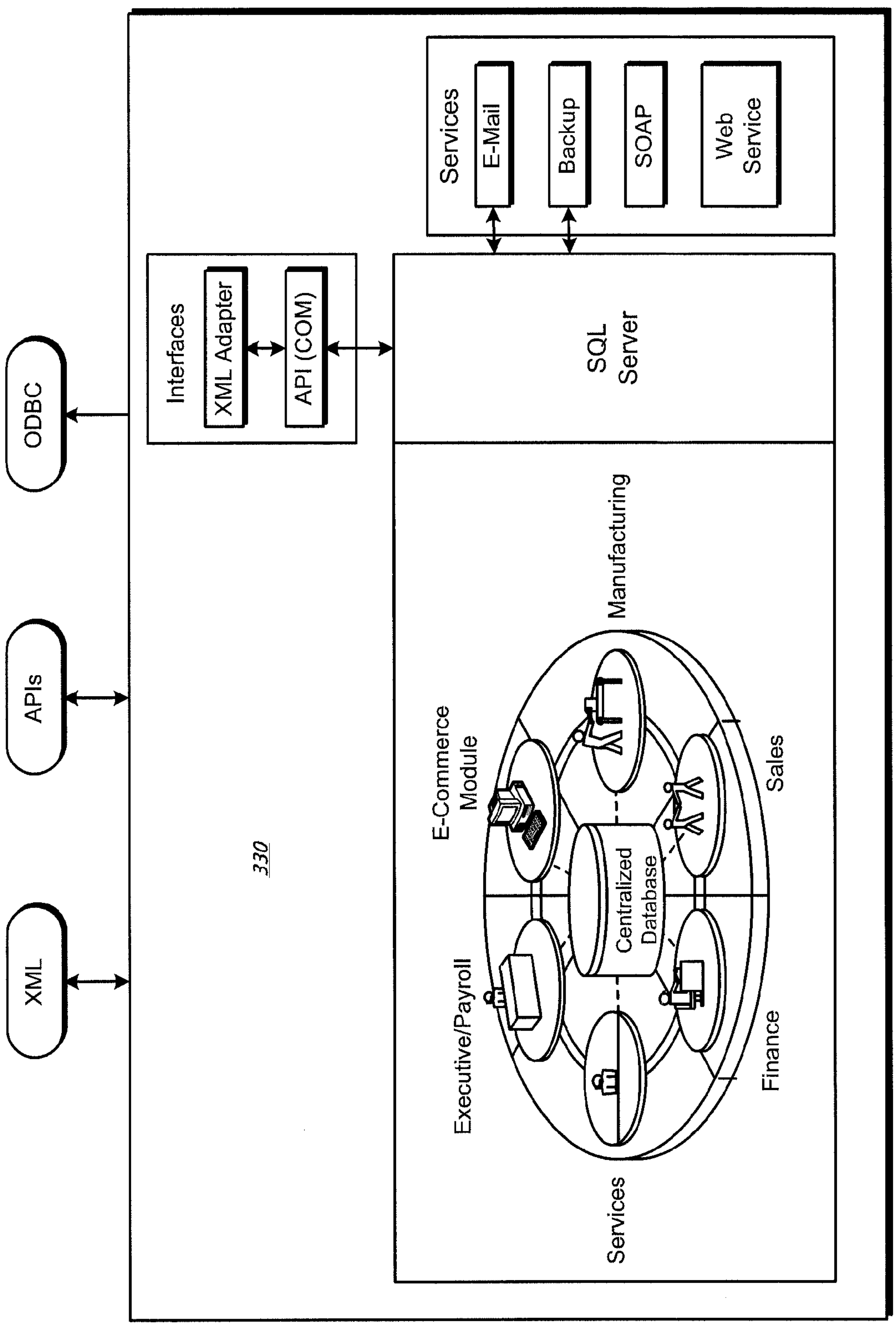
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
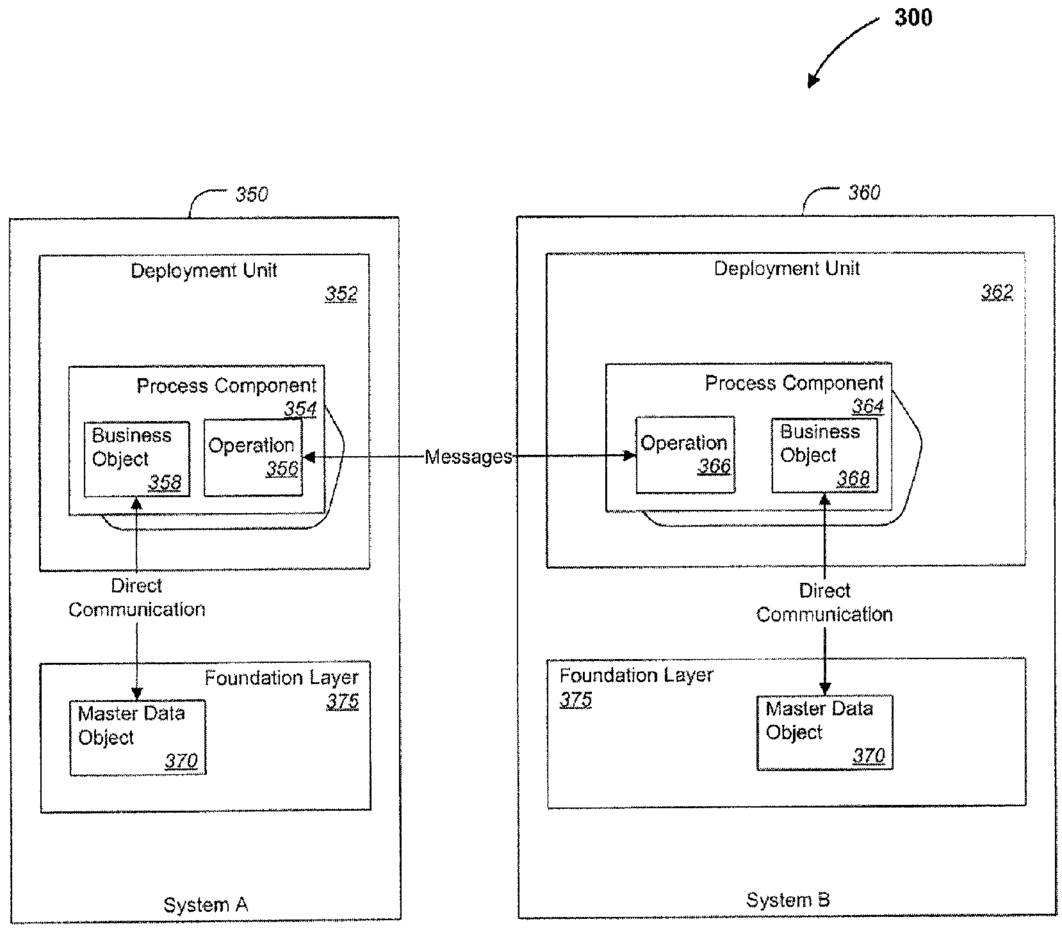

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
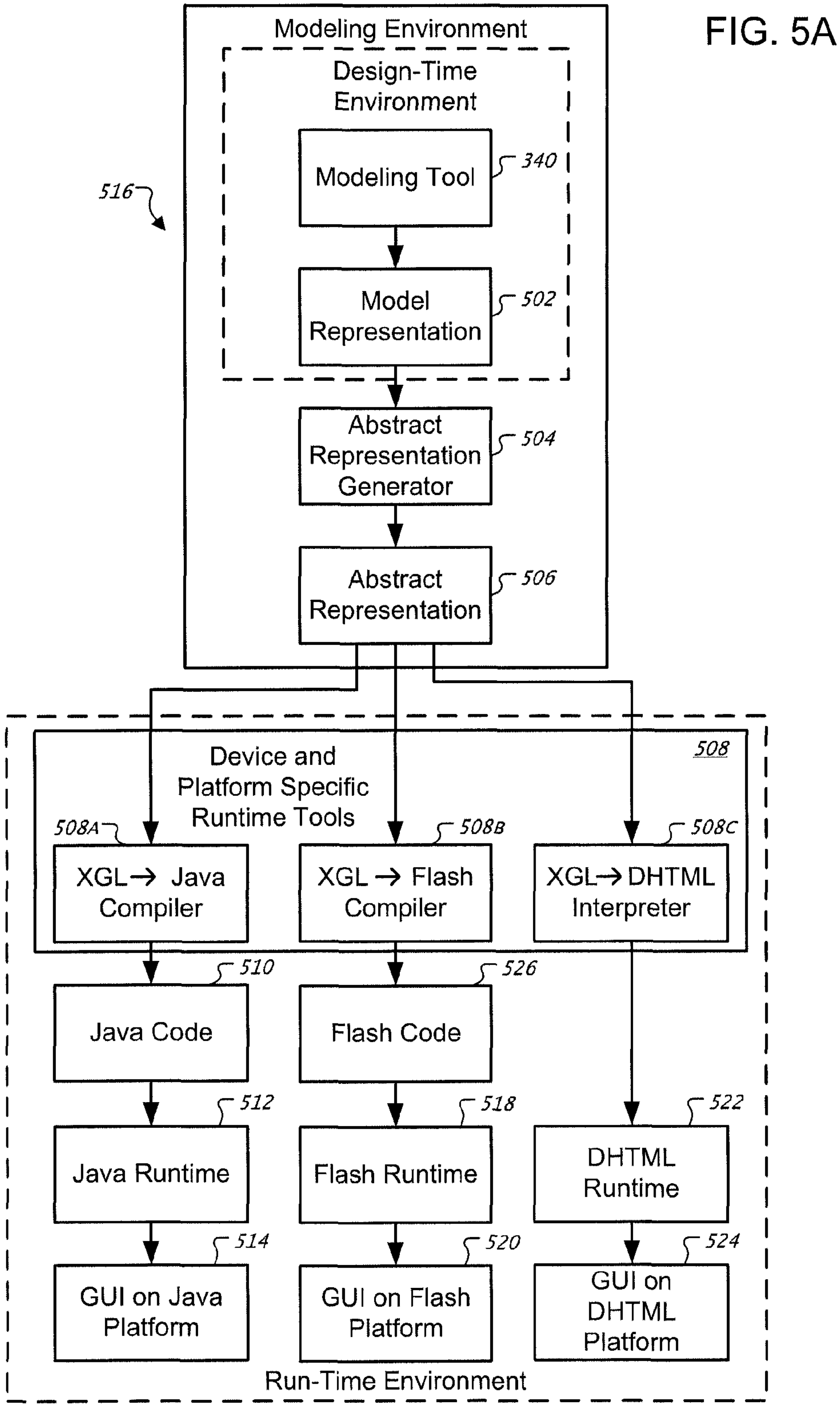
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 may be a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
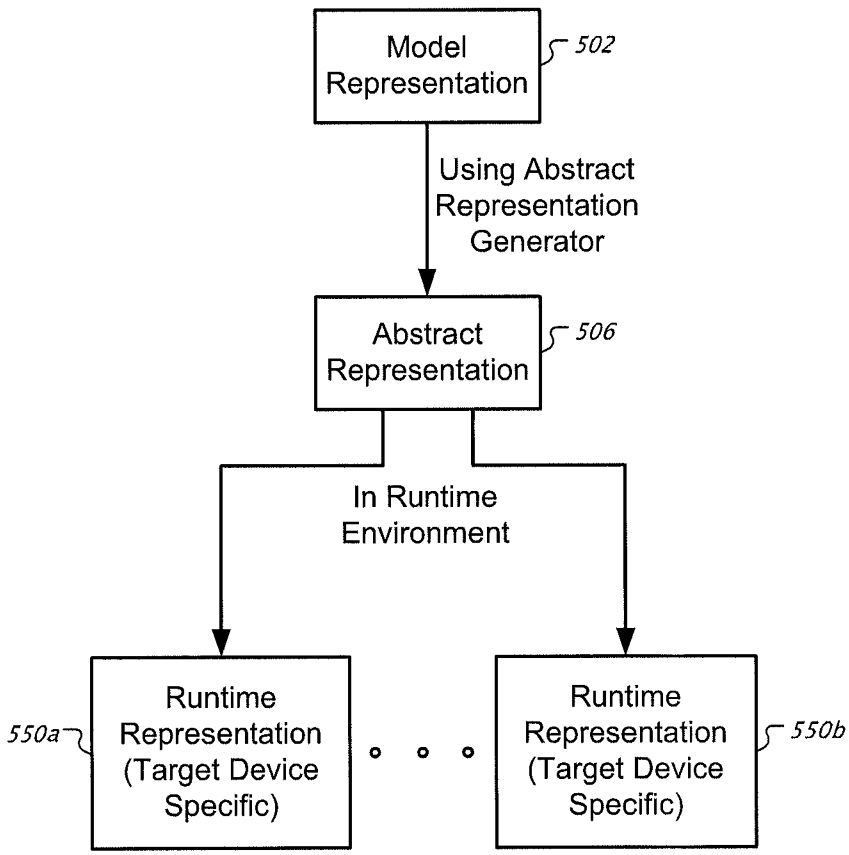
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550$a$, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
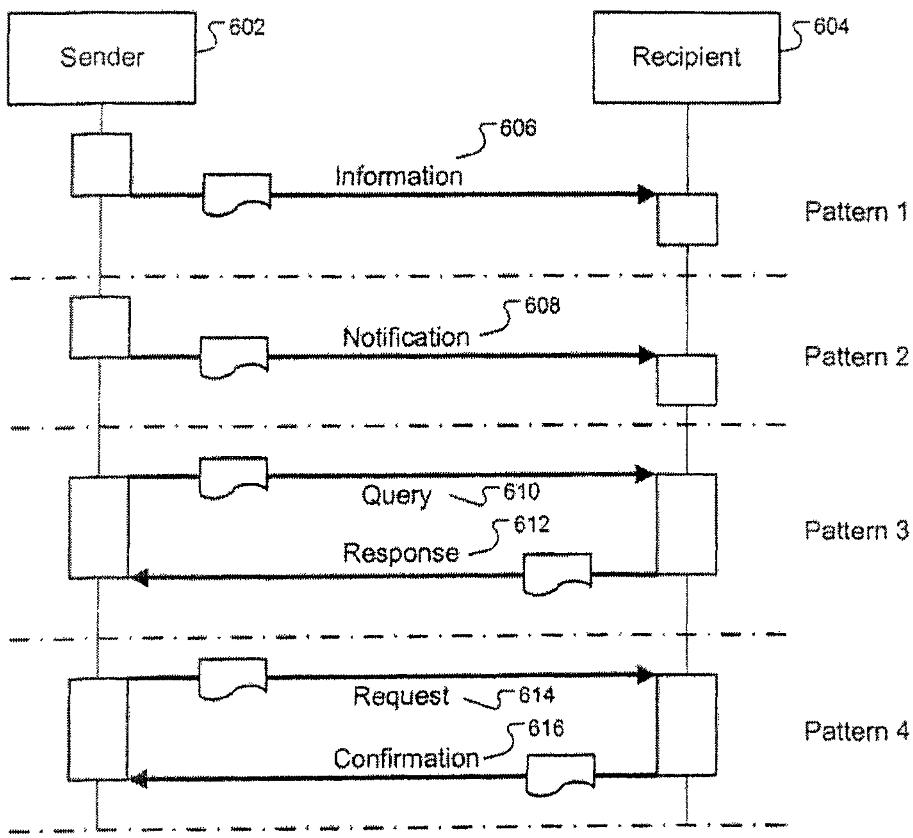
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
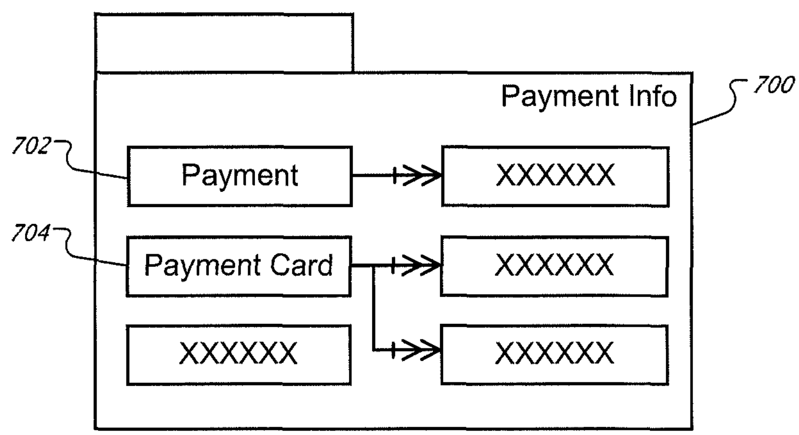
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
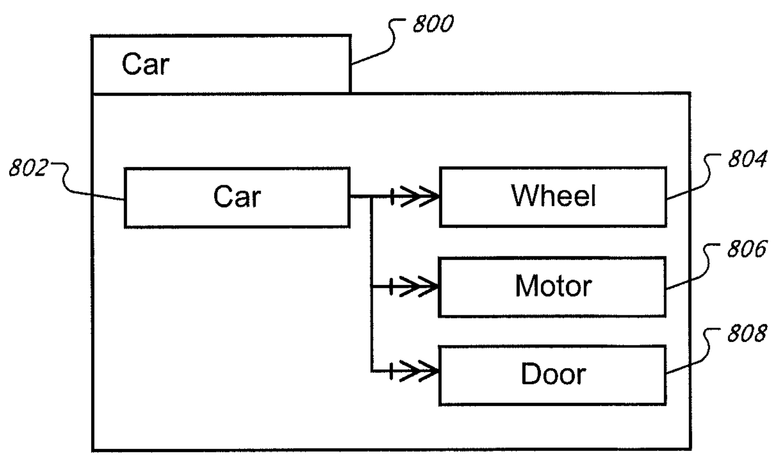
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
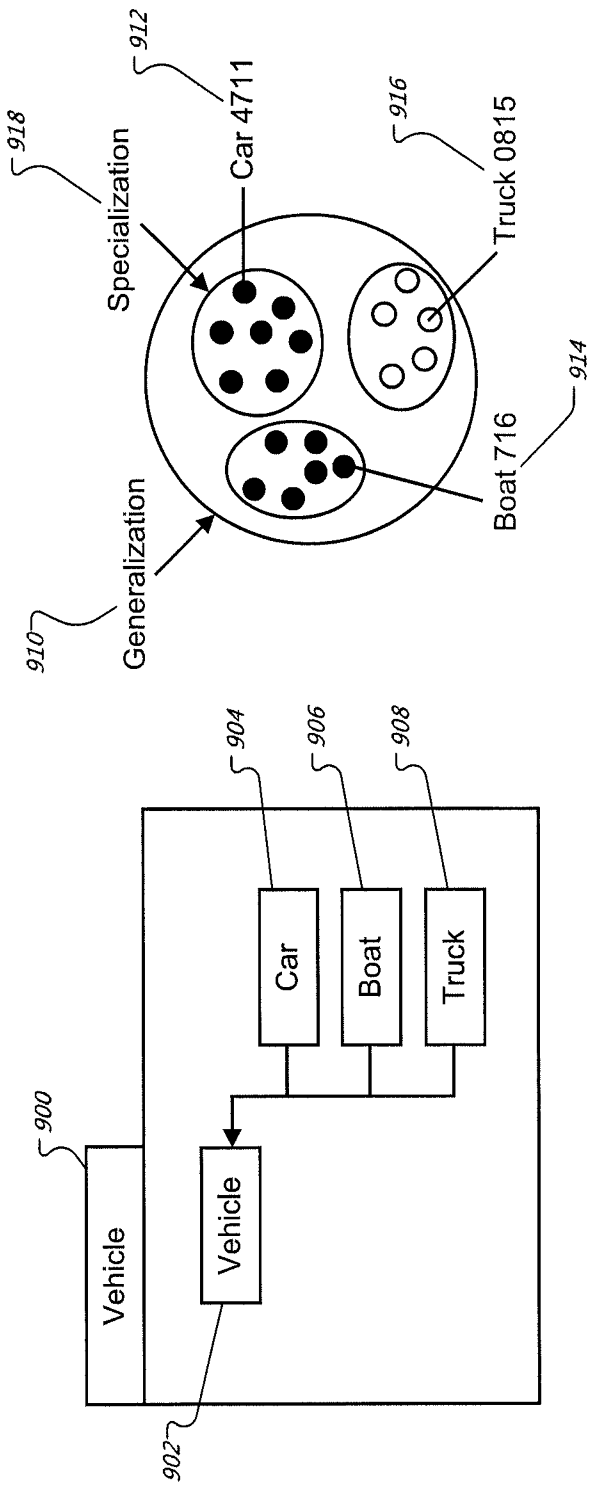
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
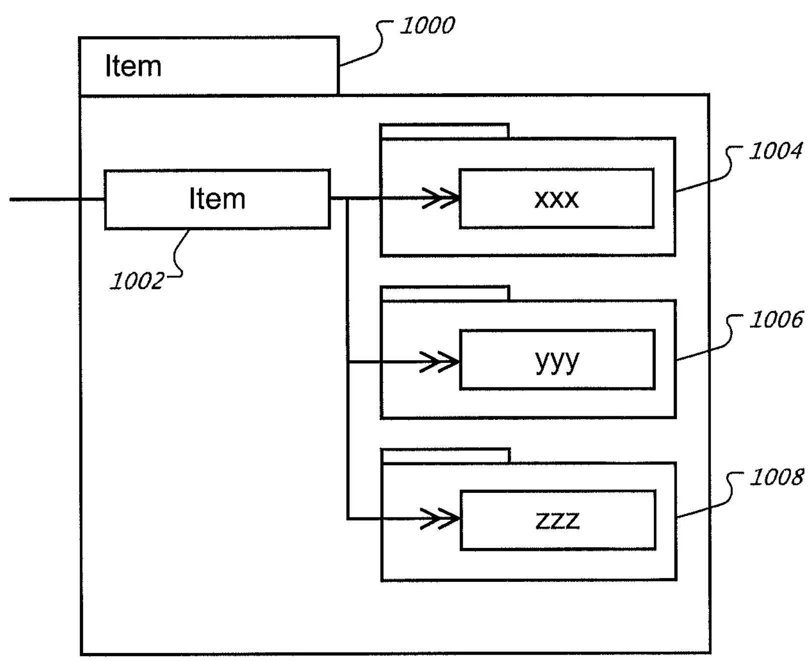
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
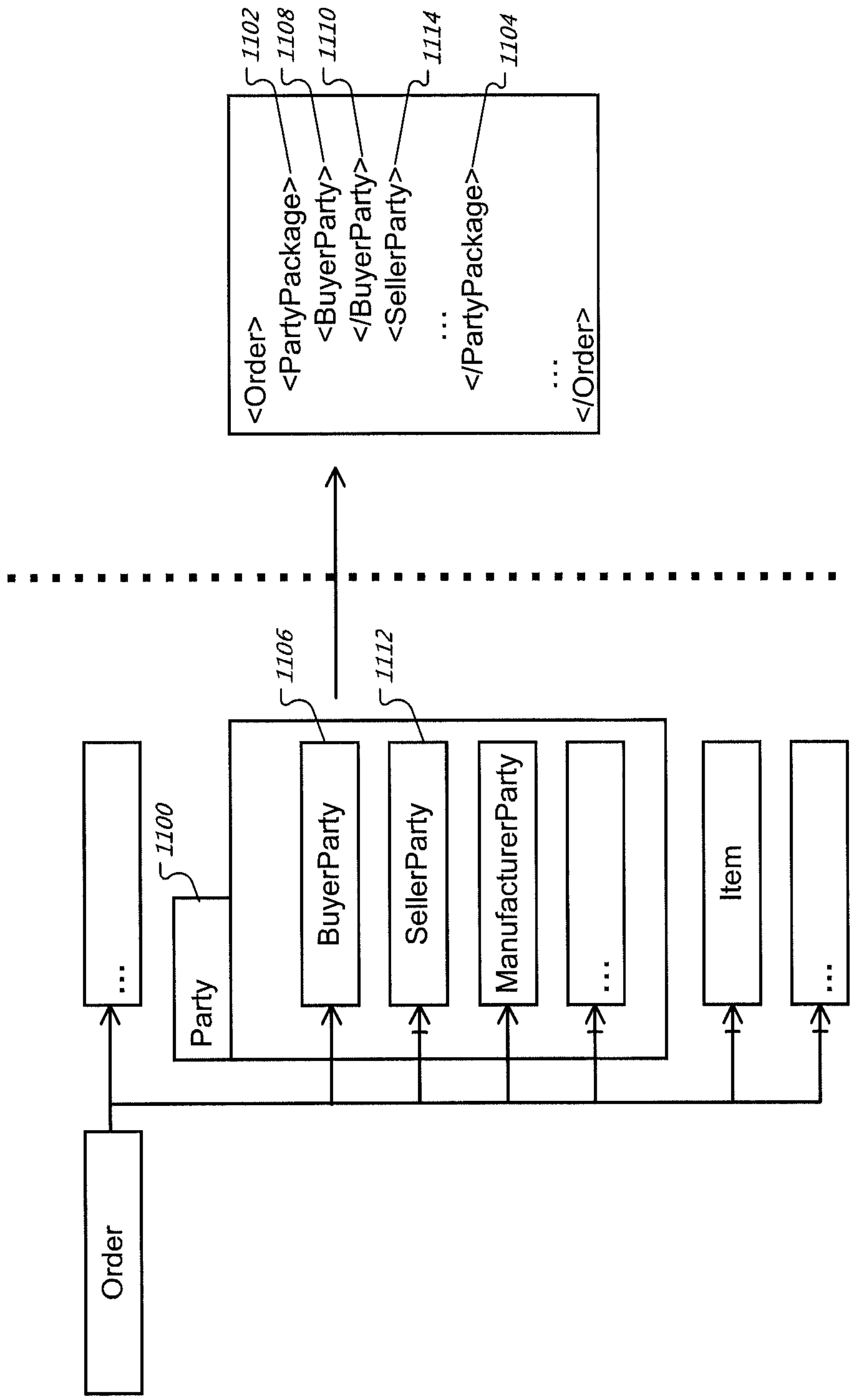
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
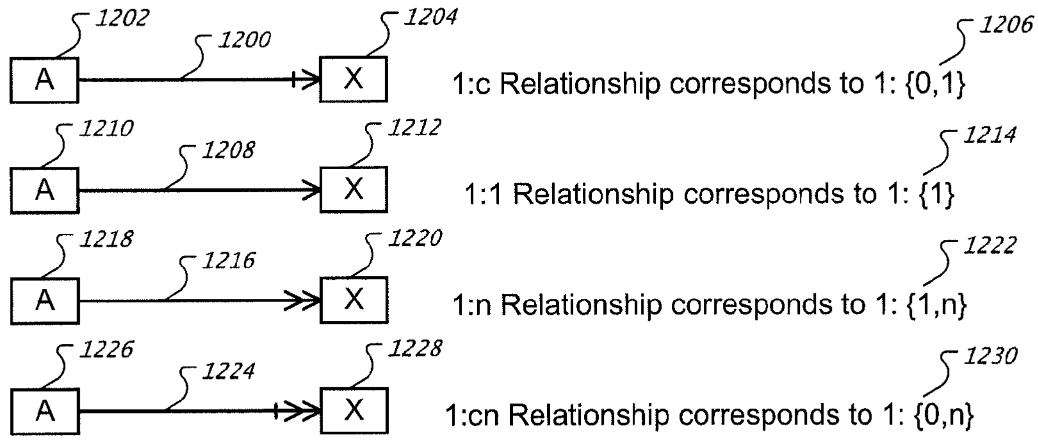
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
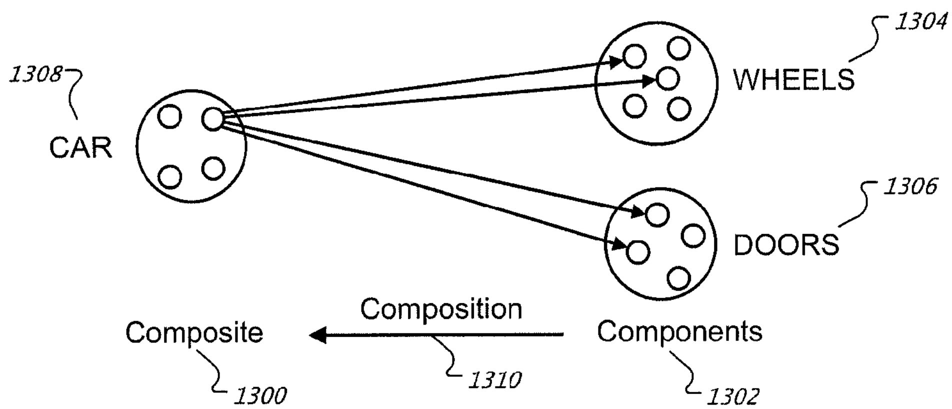
FIG. 13 depicts an example of a composition in accordance with methods and systems consistent with the subject matter described herein.
Figure 14:
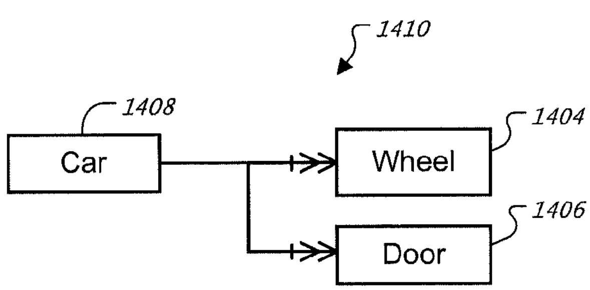
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
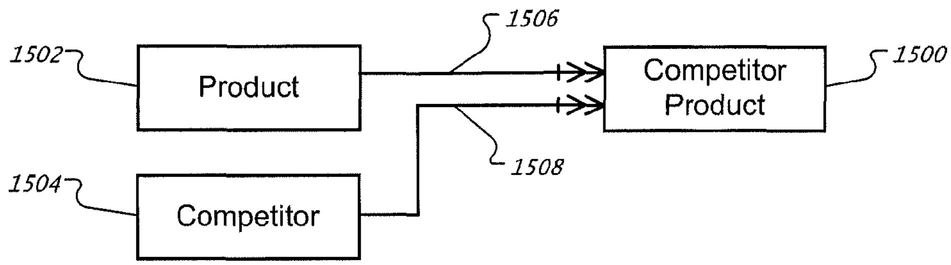
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
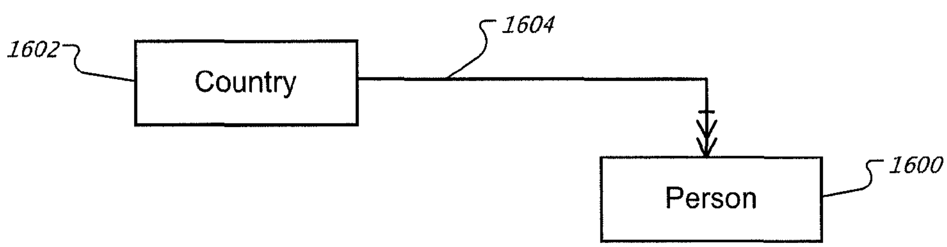
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
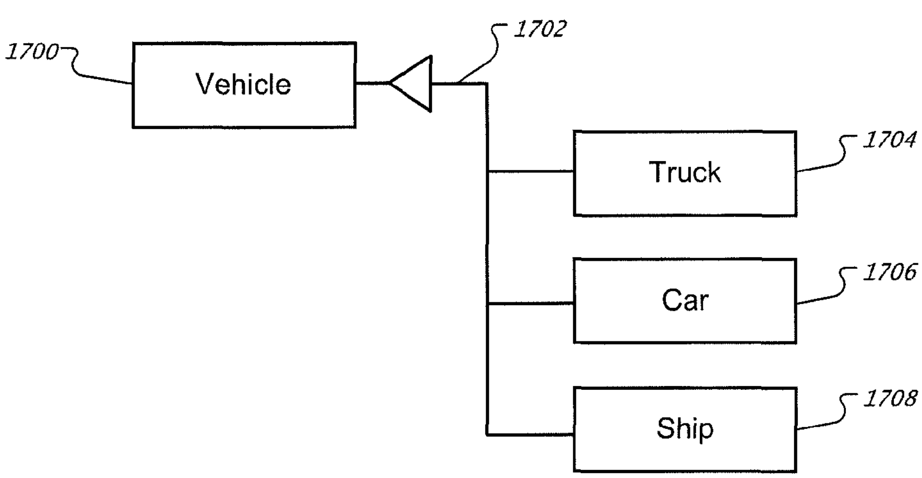
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
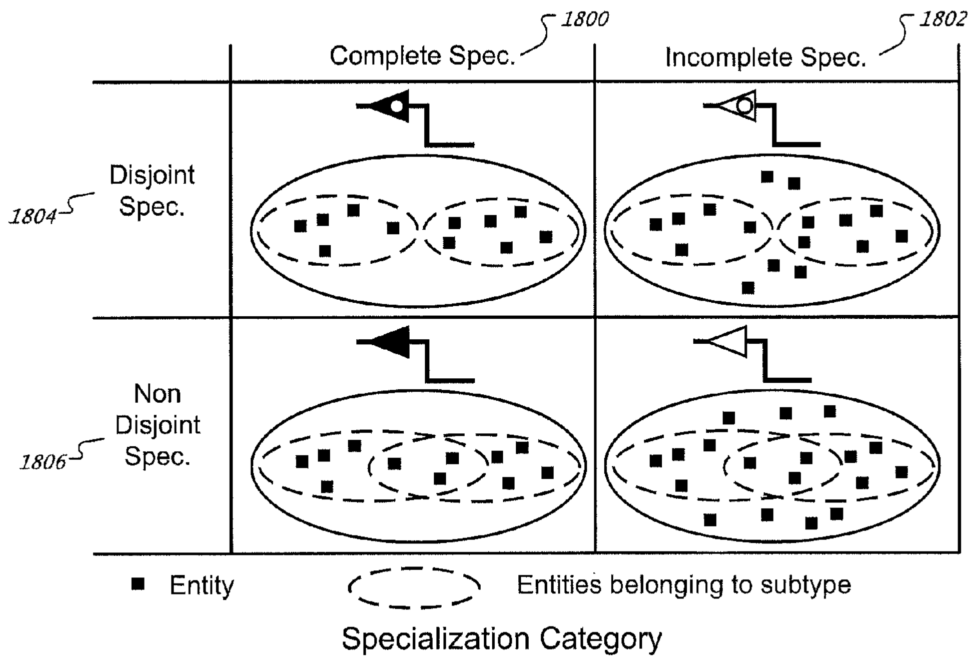
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
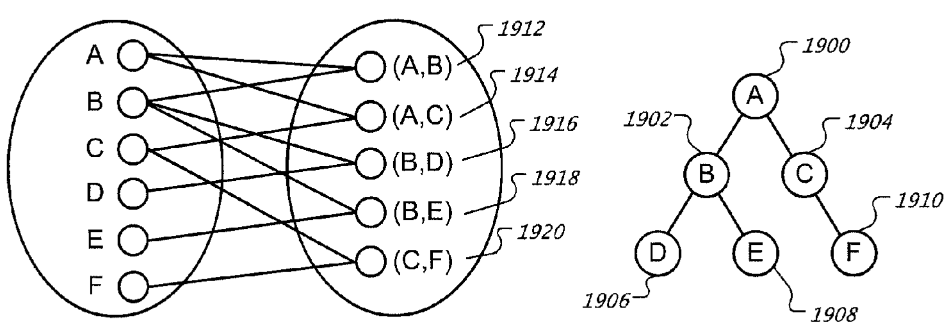
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
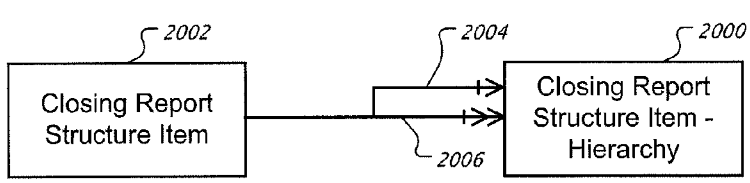
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
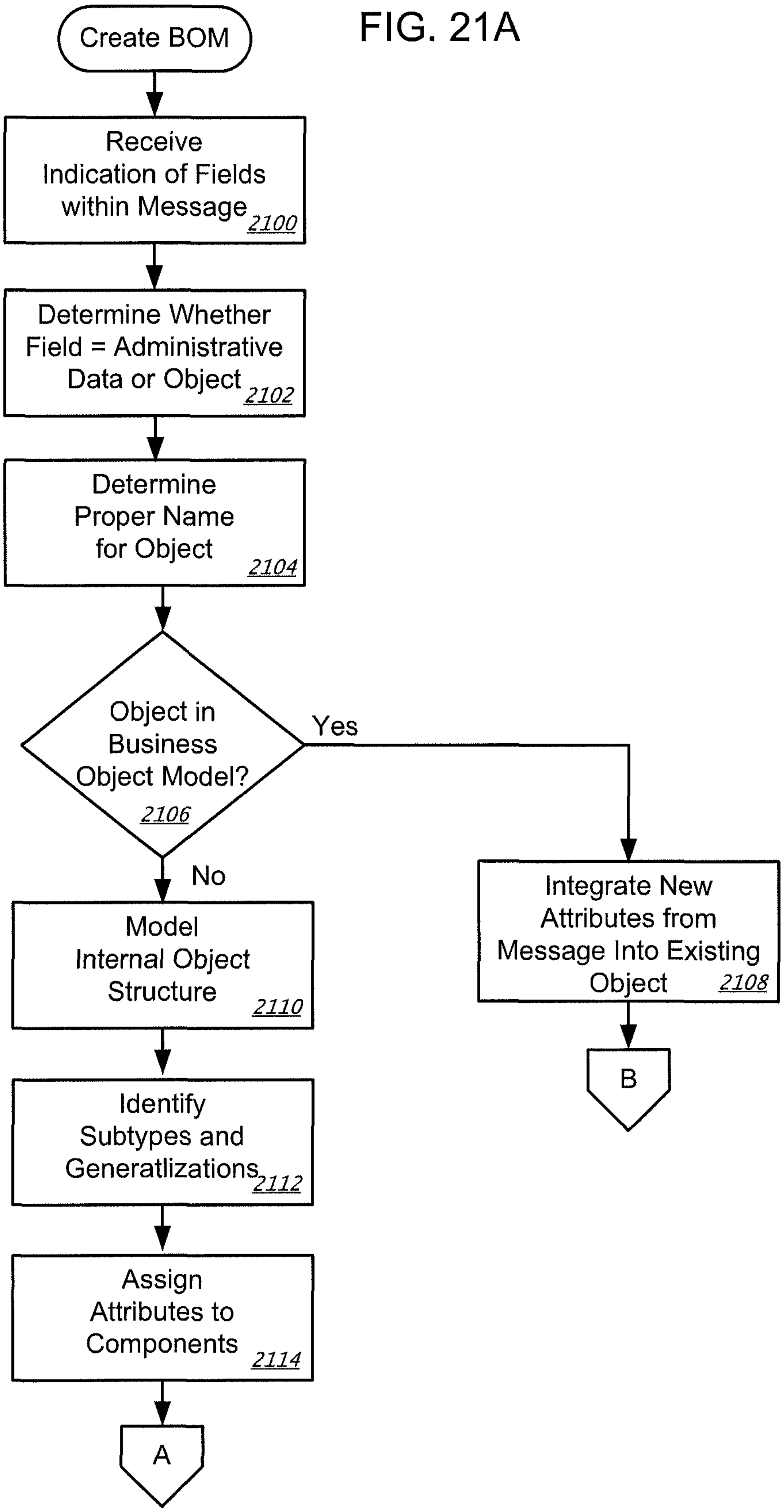
FIGS. 21A-B depict a flow diagram of the steps performed to create a business object model in accordance with methods and systems consistent with the subject matter described herein.
Figure 21B:
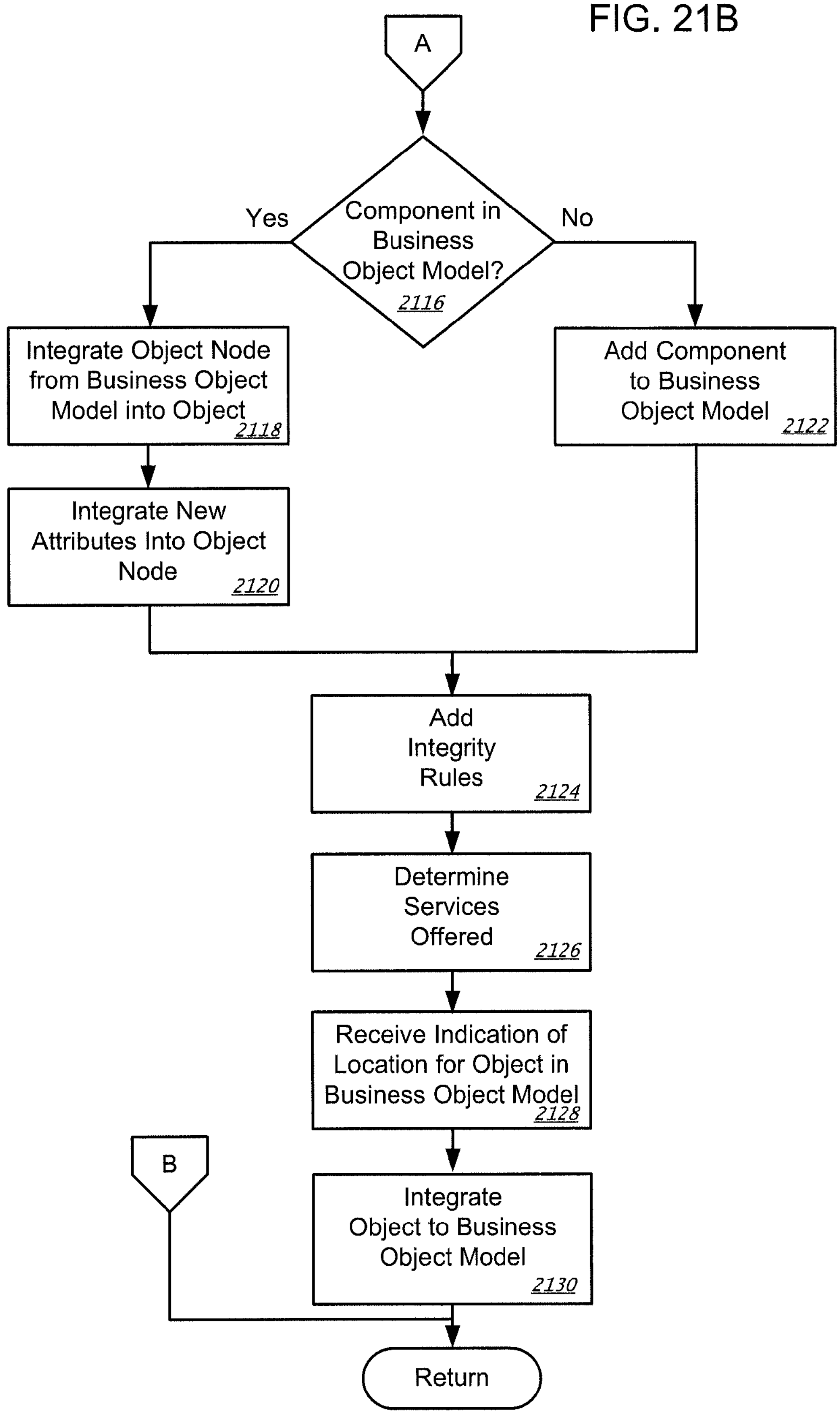

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |

-continued

-continued

| |
|---|
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase | |
| AdditionalID | Order | |
| PostingDate | | |
| LastChangeDate | | |
| AcceptanceStatus | | |
| Note | | |
| CompleteTransmission | | |
| Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | Delivery- | |
| DeliveryPriority | Terms | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof | | |
| Message | | |
| FollowUpActivity | | |
| ItemID | Purchase | |
| ParentItemID | Order Item | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation | | |
| Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |

-continued

| | |
|---|---|
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |

-continued

| | |
|---|---|
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
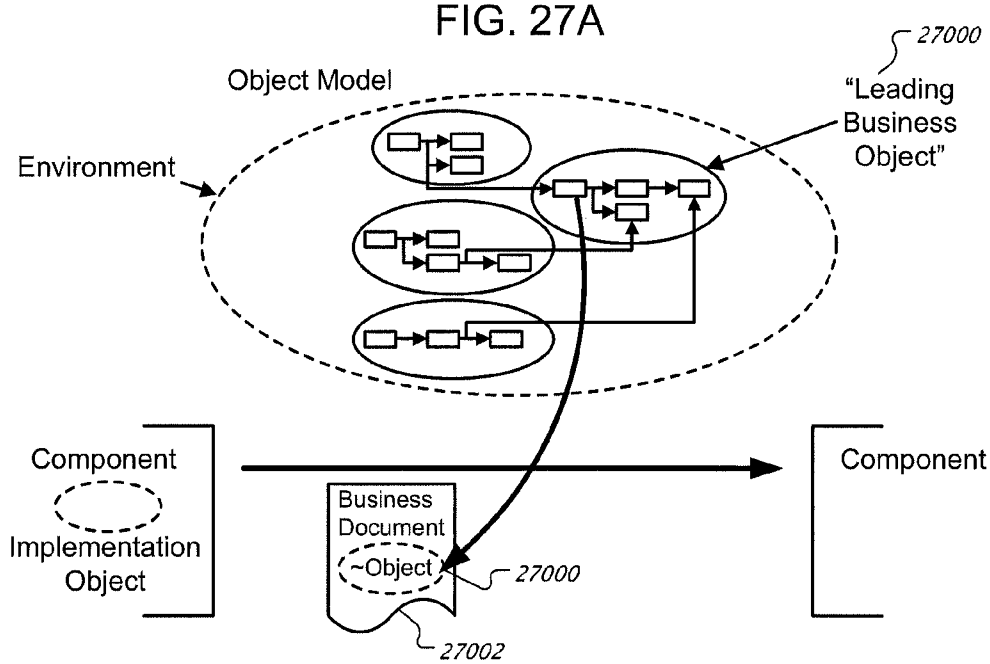
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
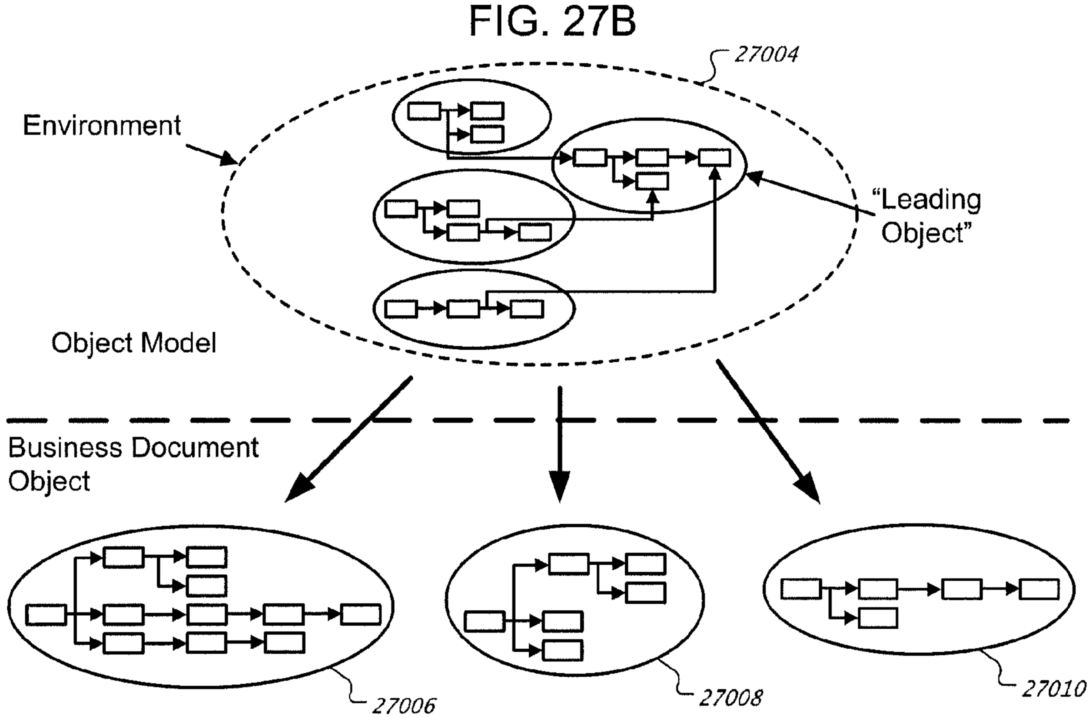

As illustrated in FIG. 27B, several business document objects 27006, 27008, and 27010 as overlapping views may be derived for a given leading object 27004. Each business document object results from the object model by hierarchization.

Figure 27C:
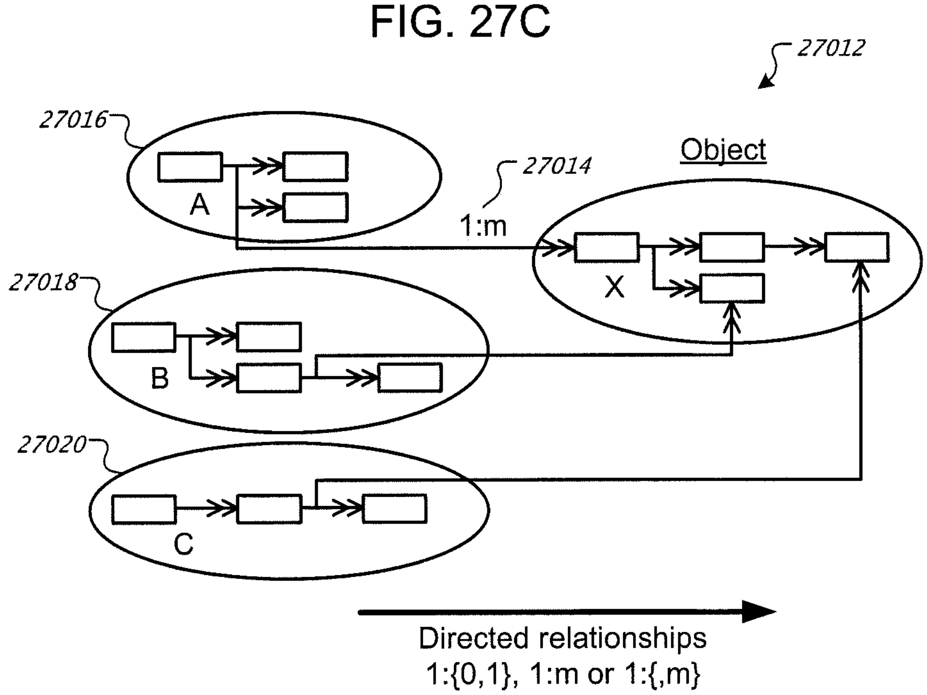

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
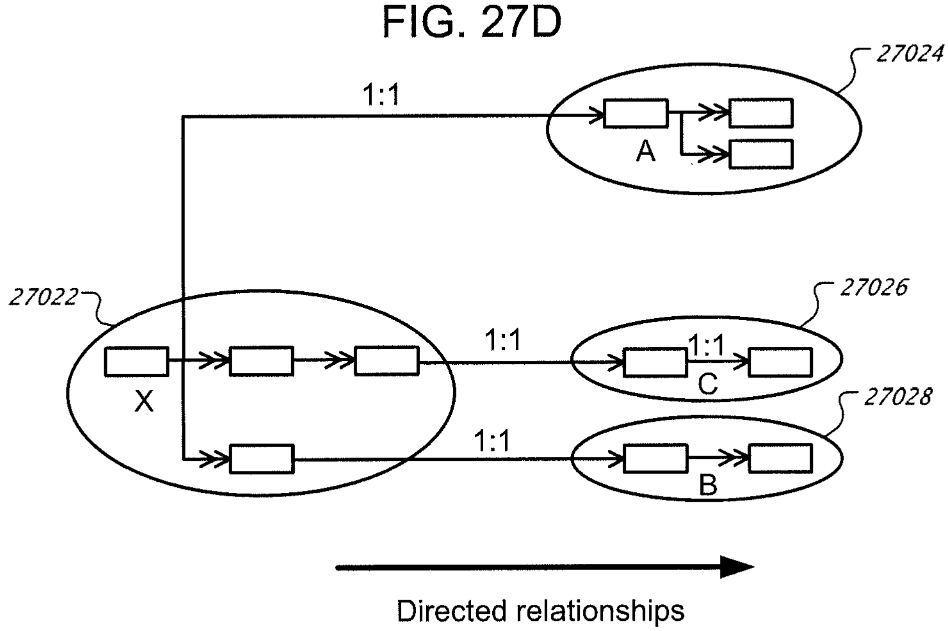

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
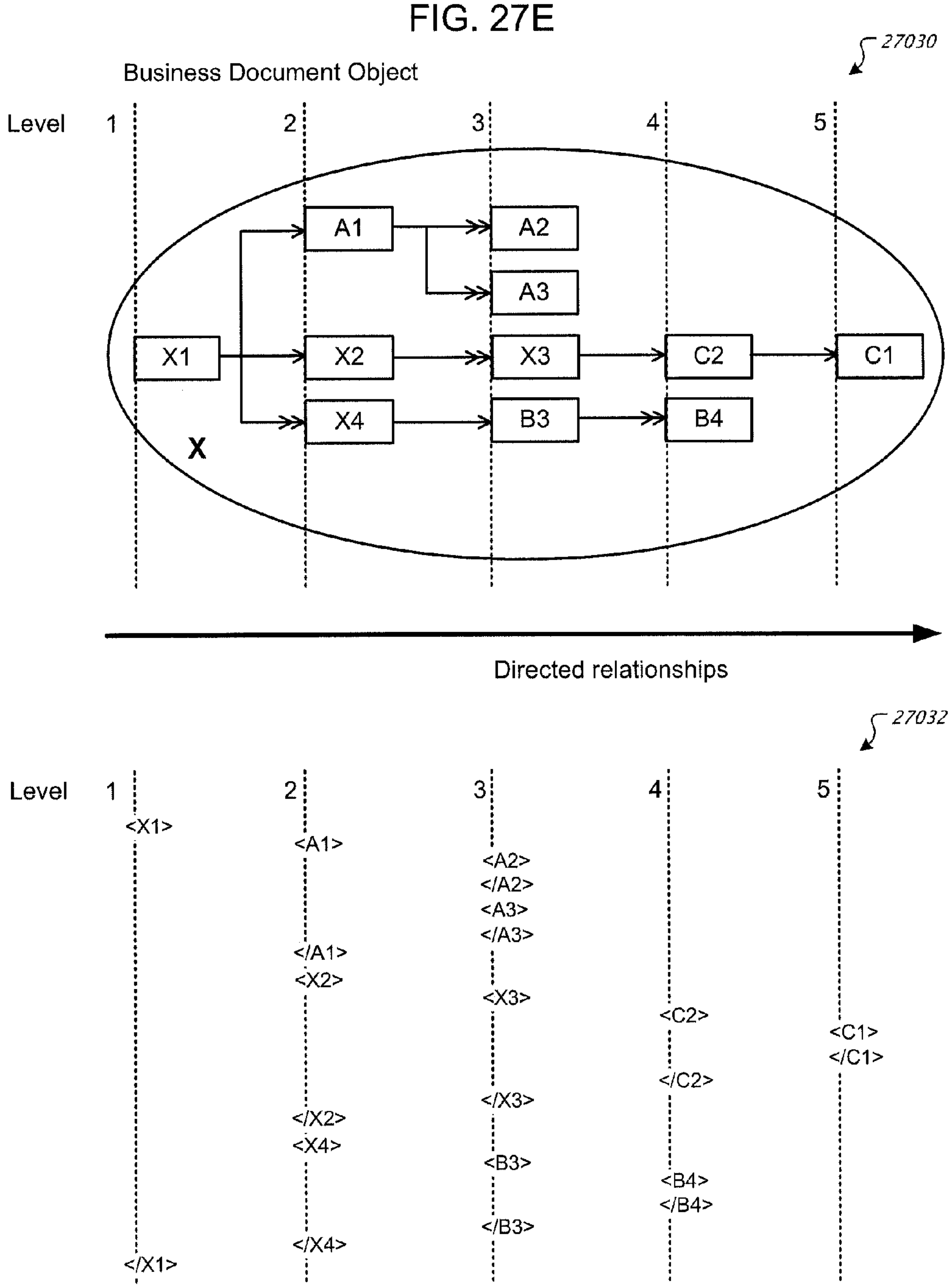

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
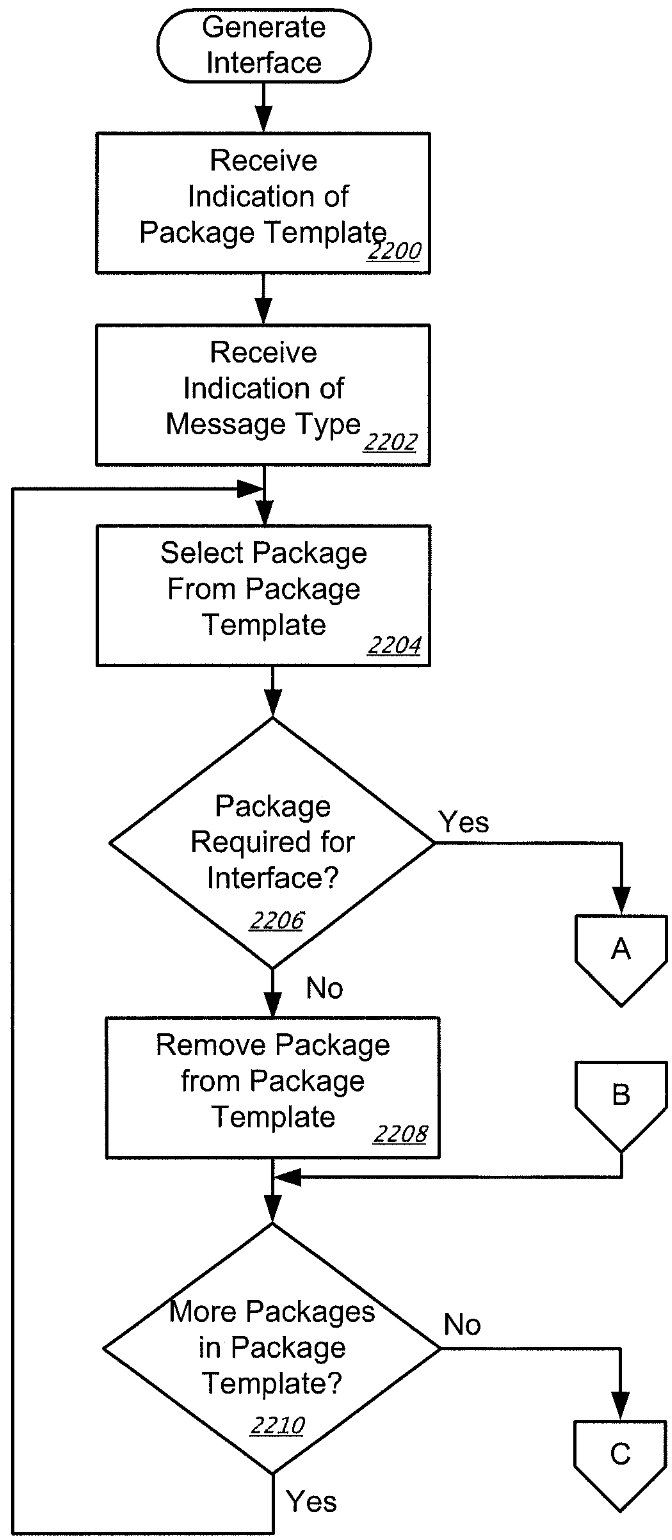
FIGS. 22A-F depict a flow diagram of the steps performed to generate an interface from the business object model in accordance with methods and systems consistent with the subject matter described herein.
Figure 22B:
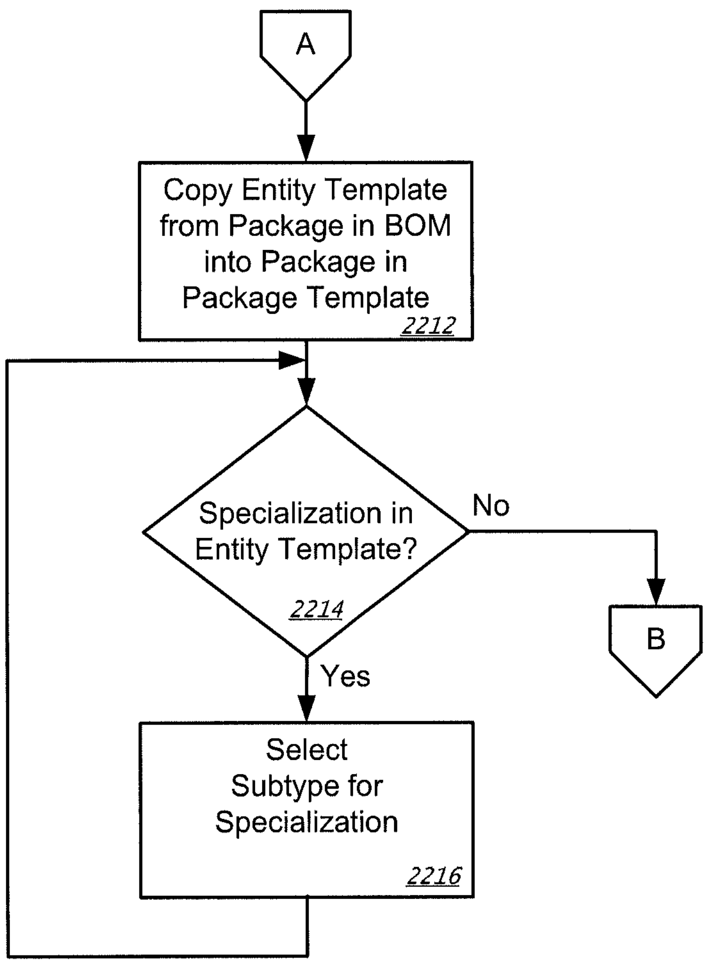
Figure 22C:
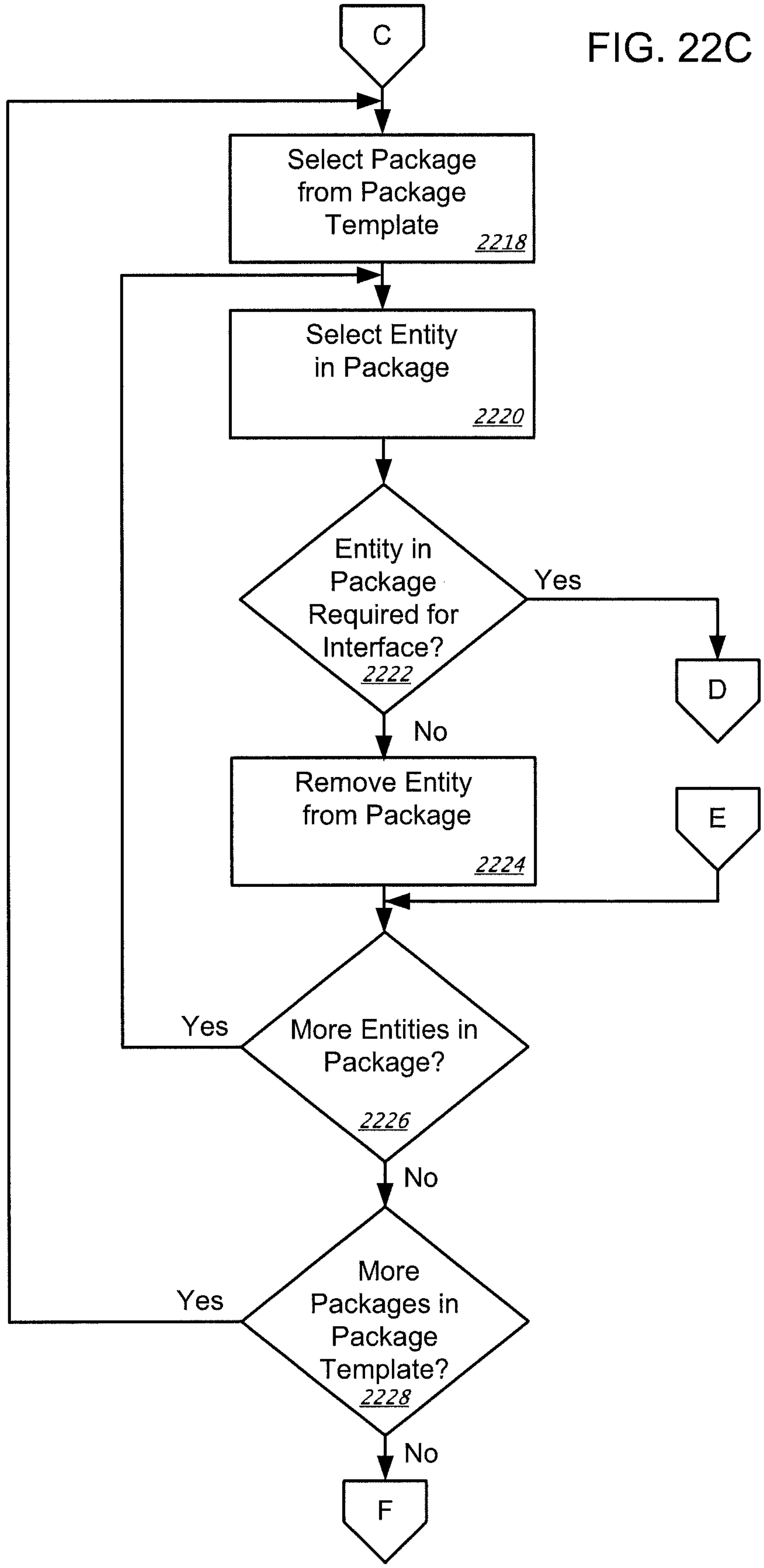

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
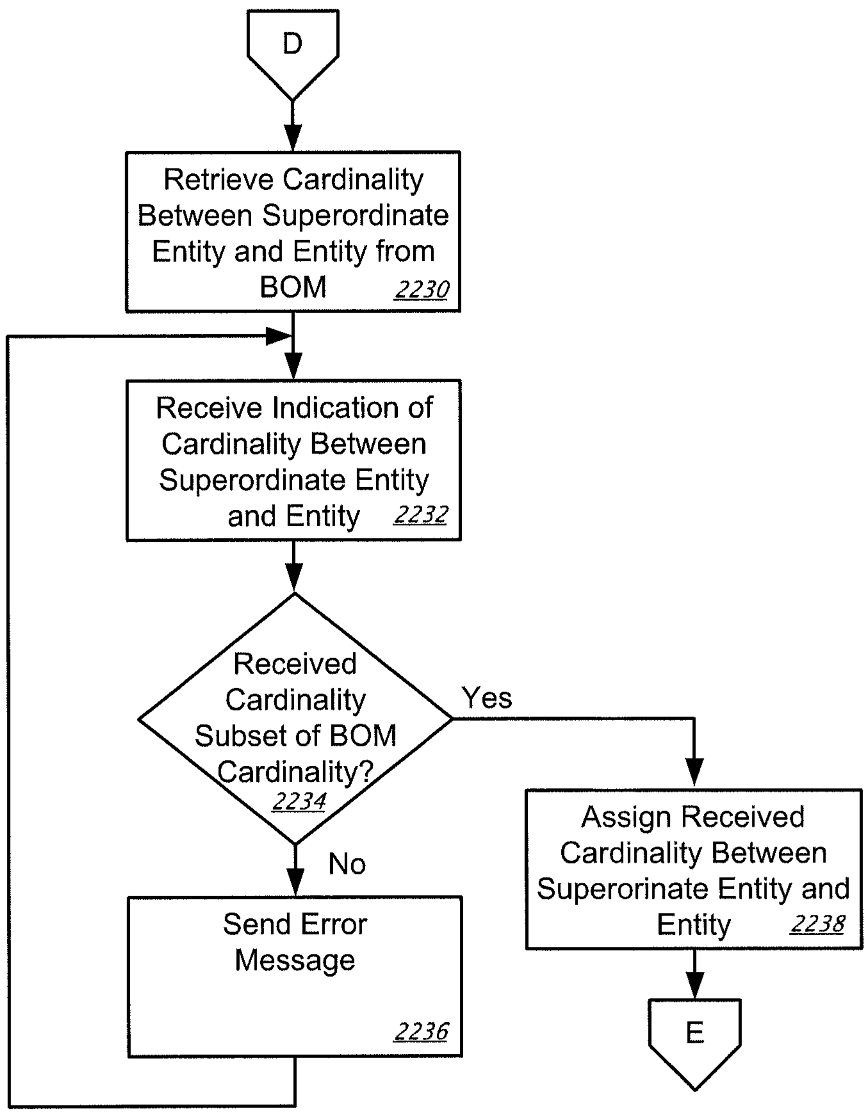

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
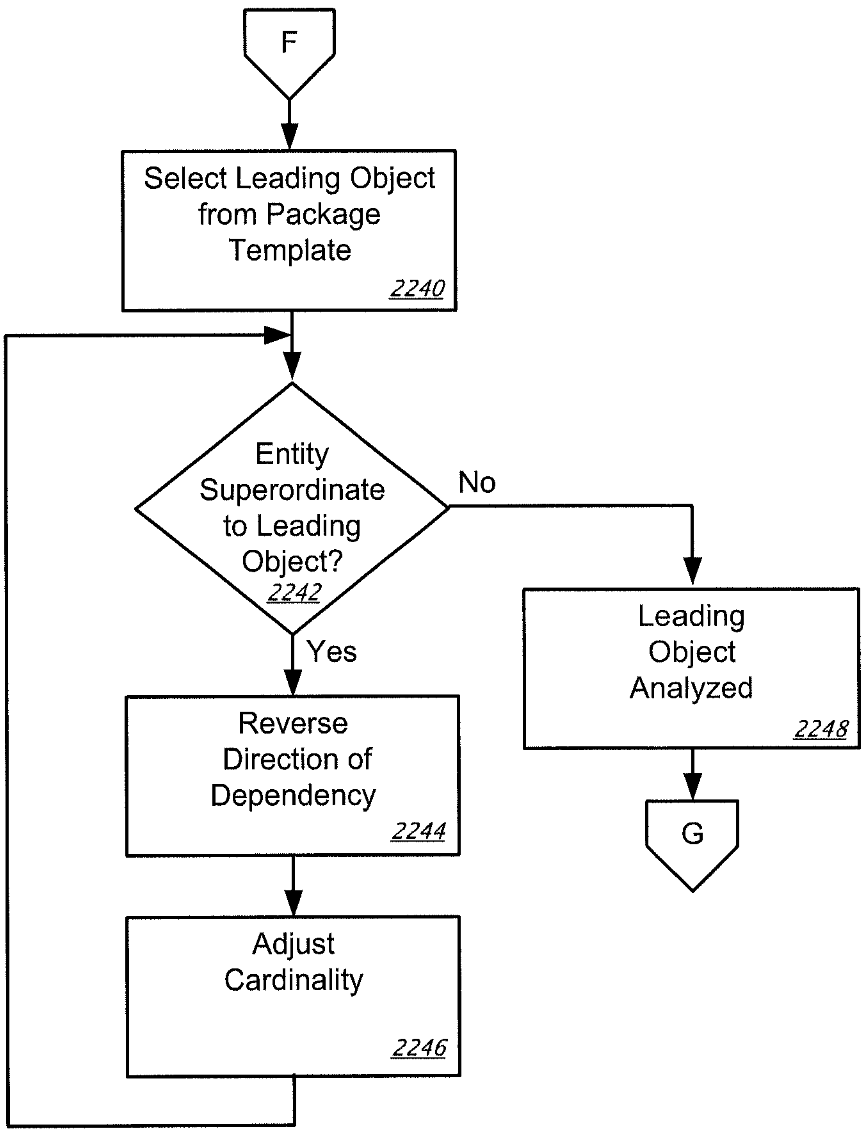

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
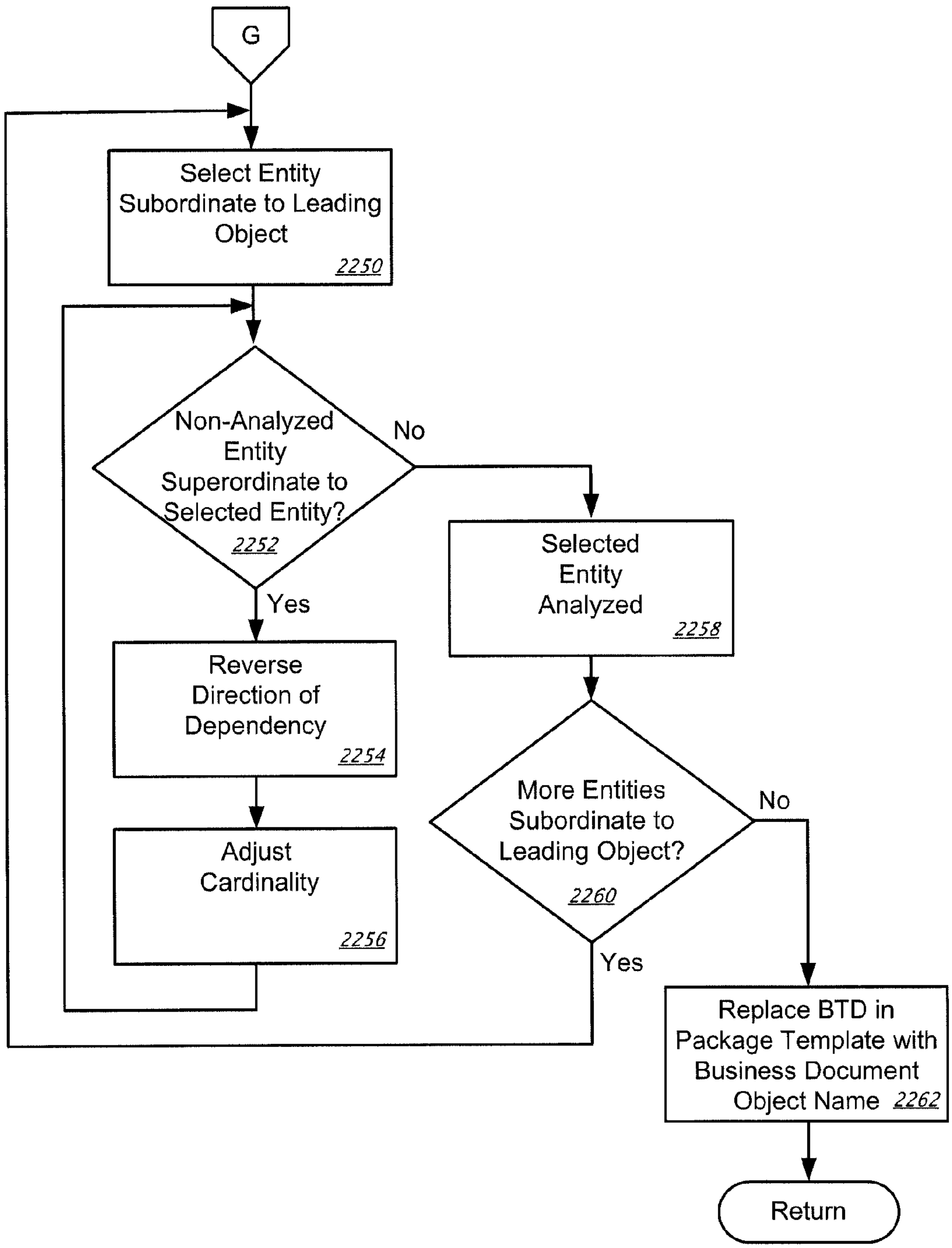

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
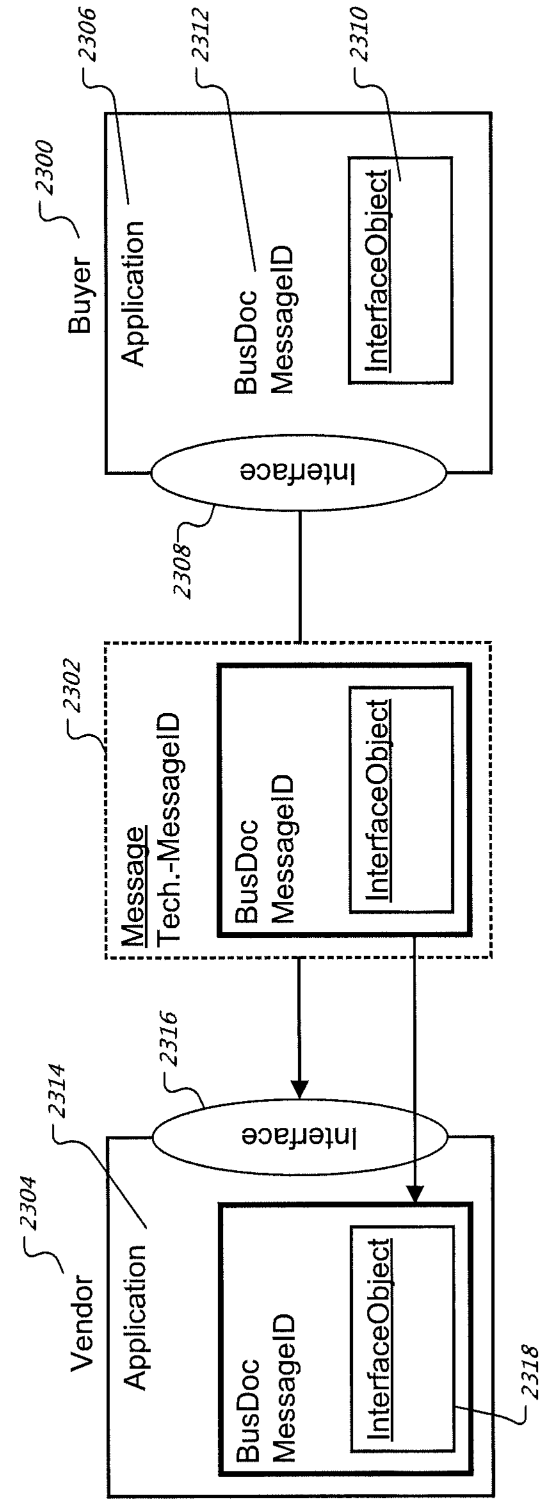
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
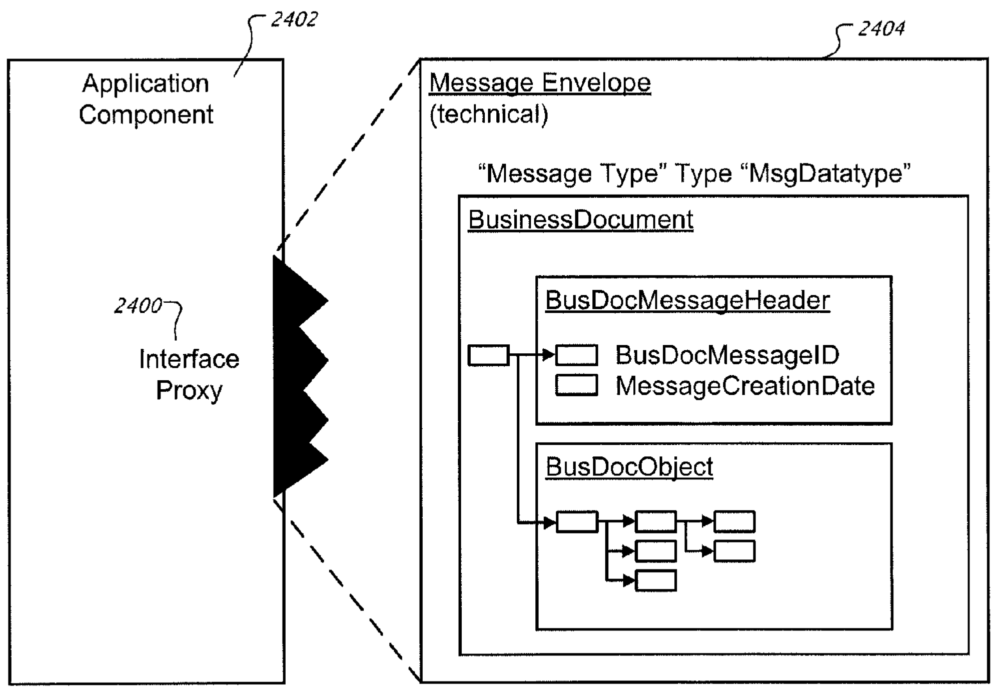
FIG. 24 depicts an interface proxy in accordance with methods and systems consistent with the subject matter described herein.
Figure 25:
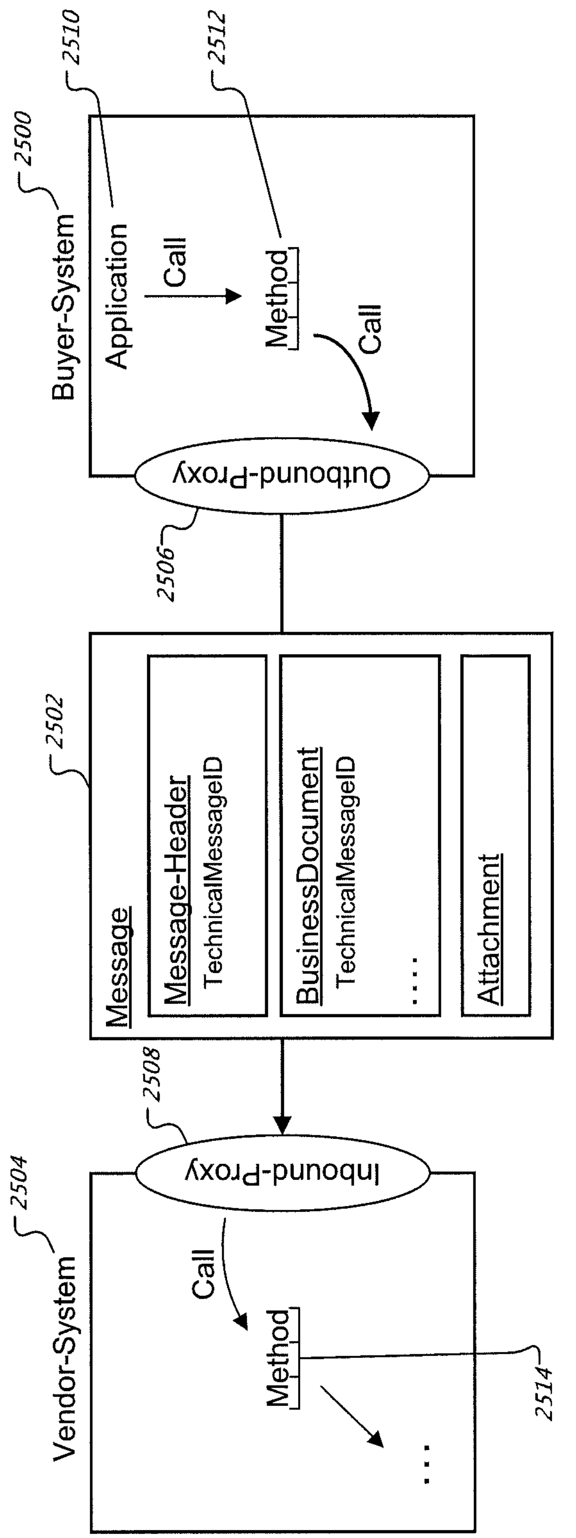
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
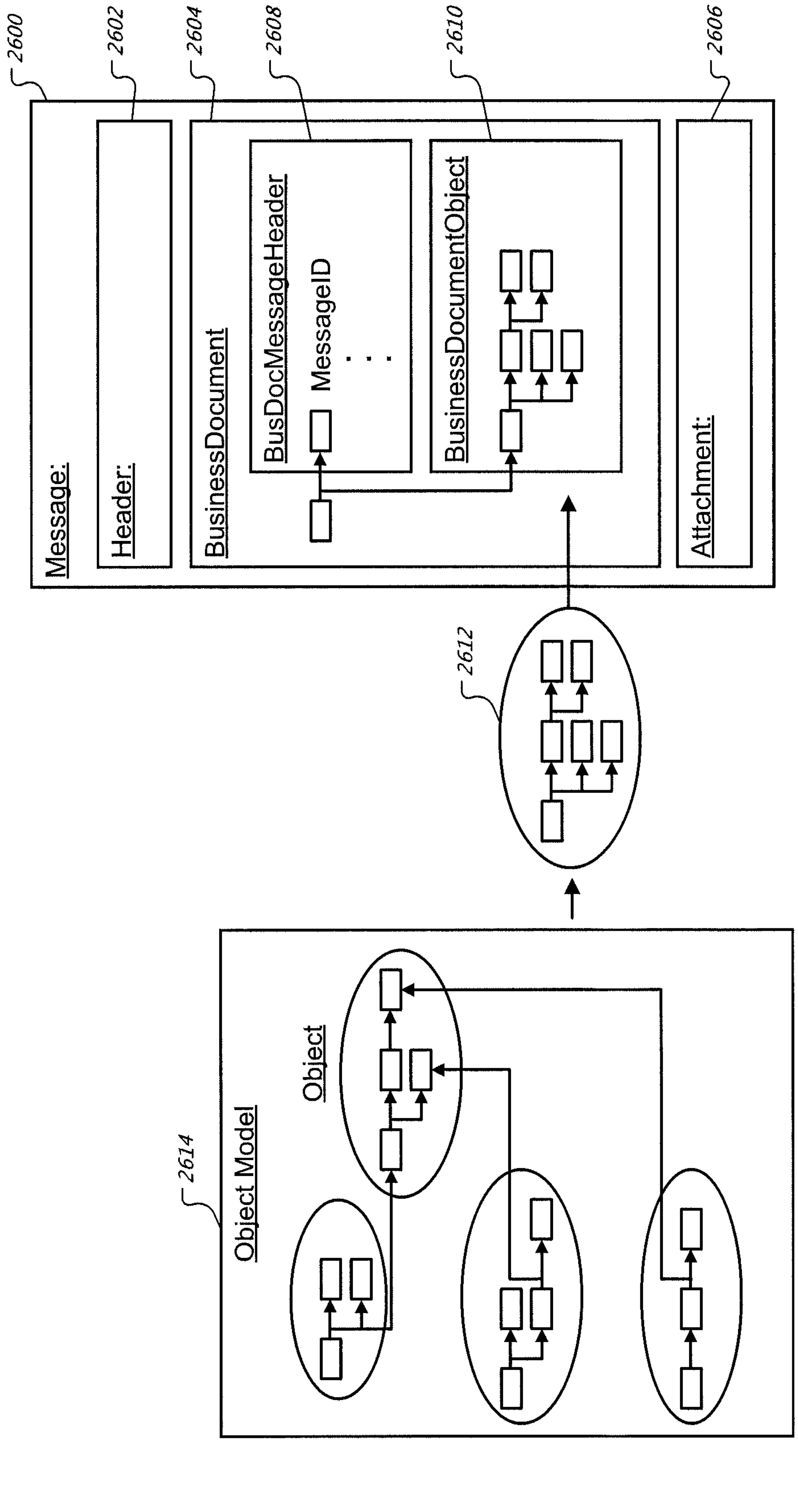
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
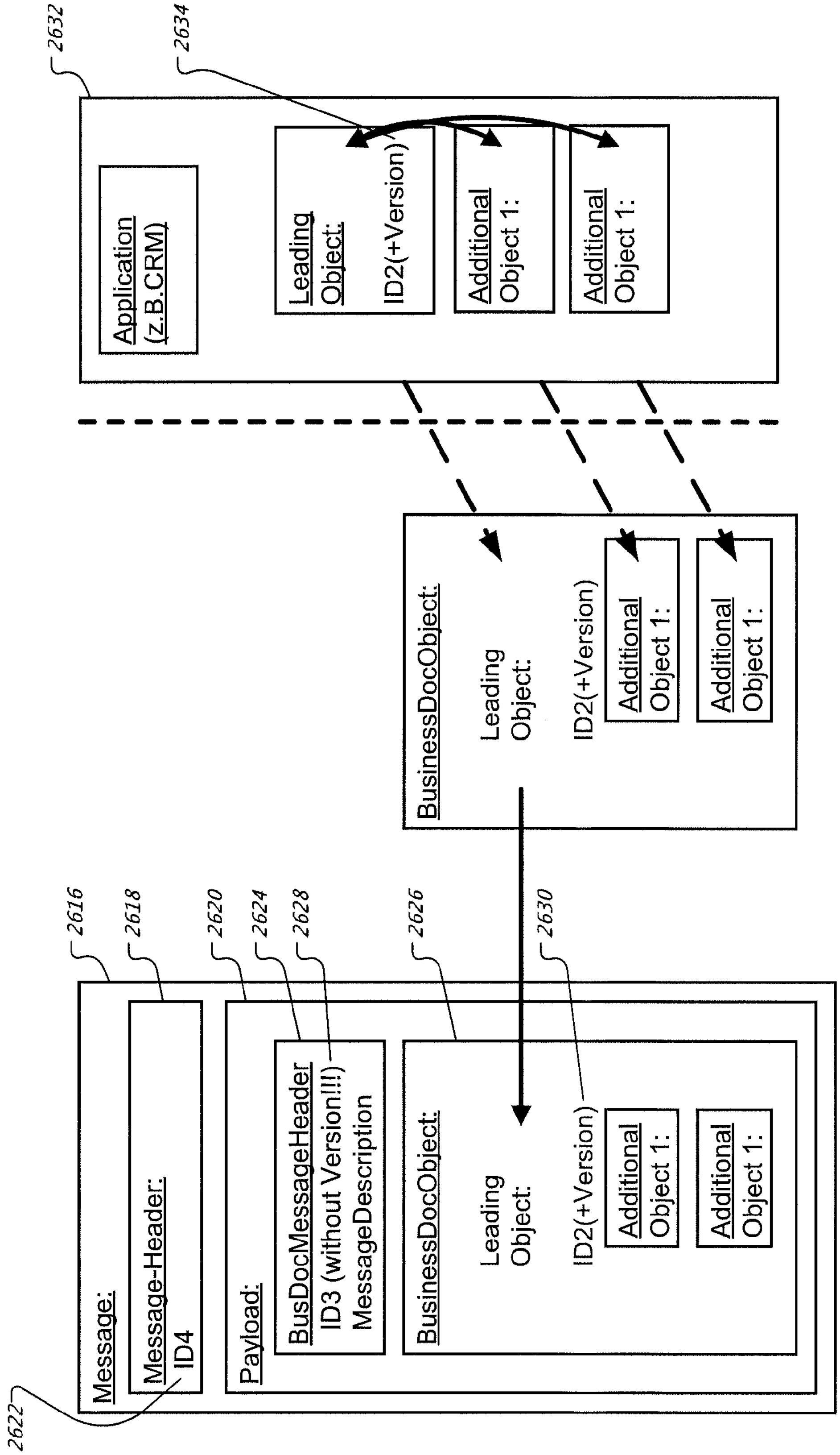
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
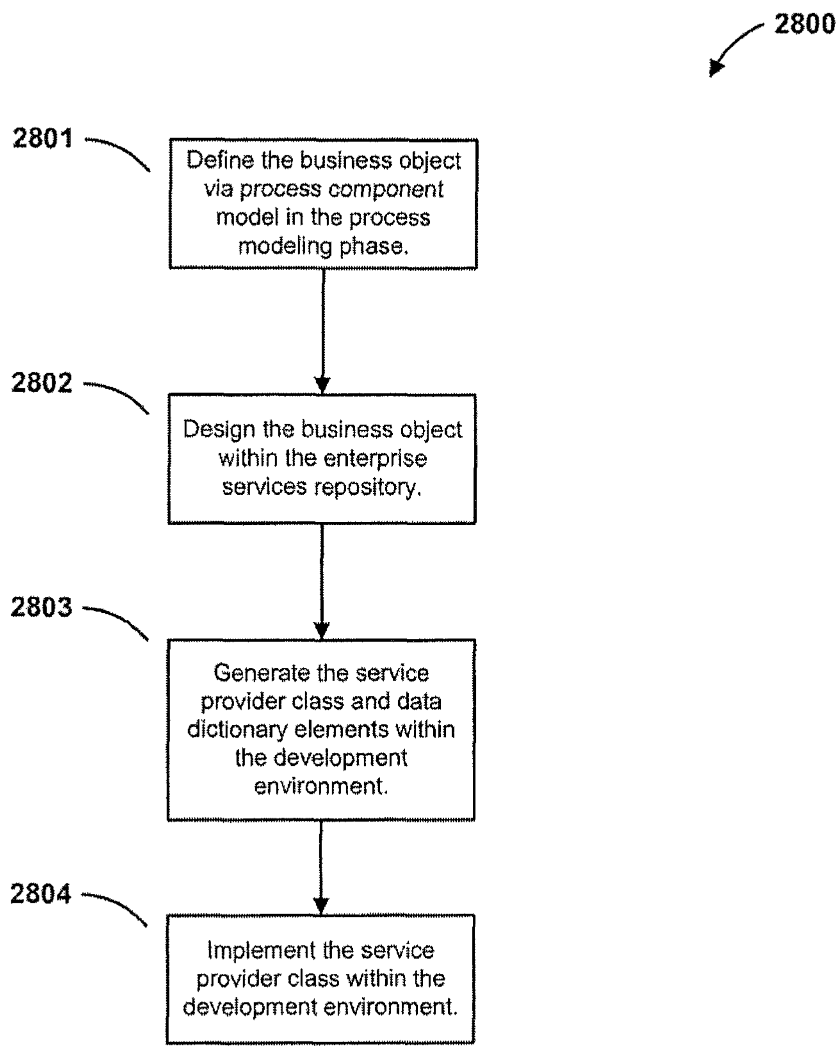
FIG. 28 illustrates an example method for service enabling in accordance with one embodiment of the present disclosure.
Figure 29:
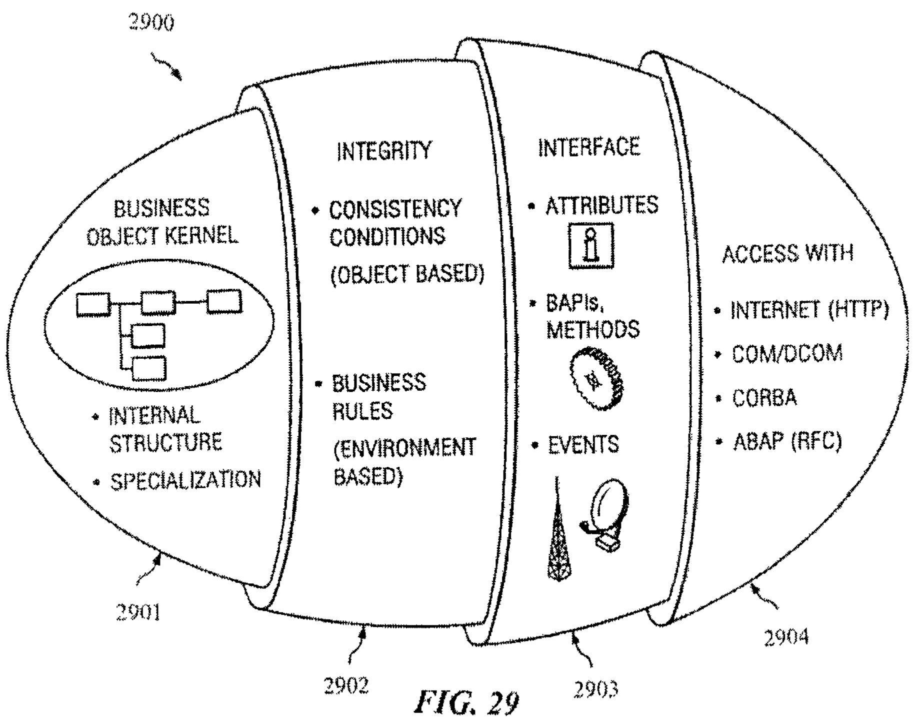
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
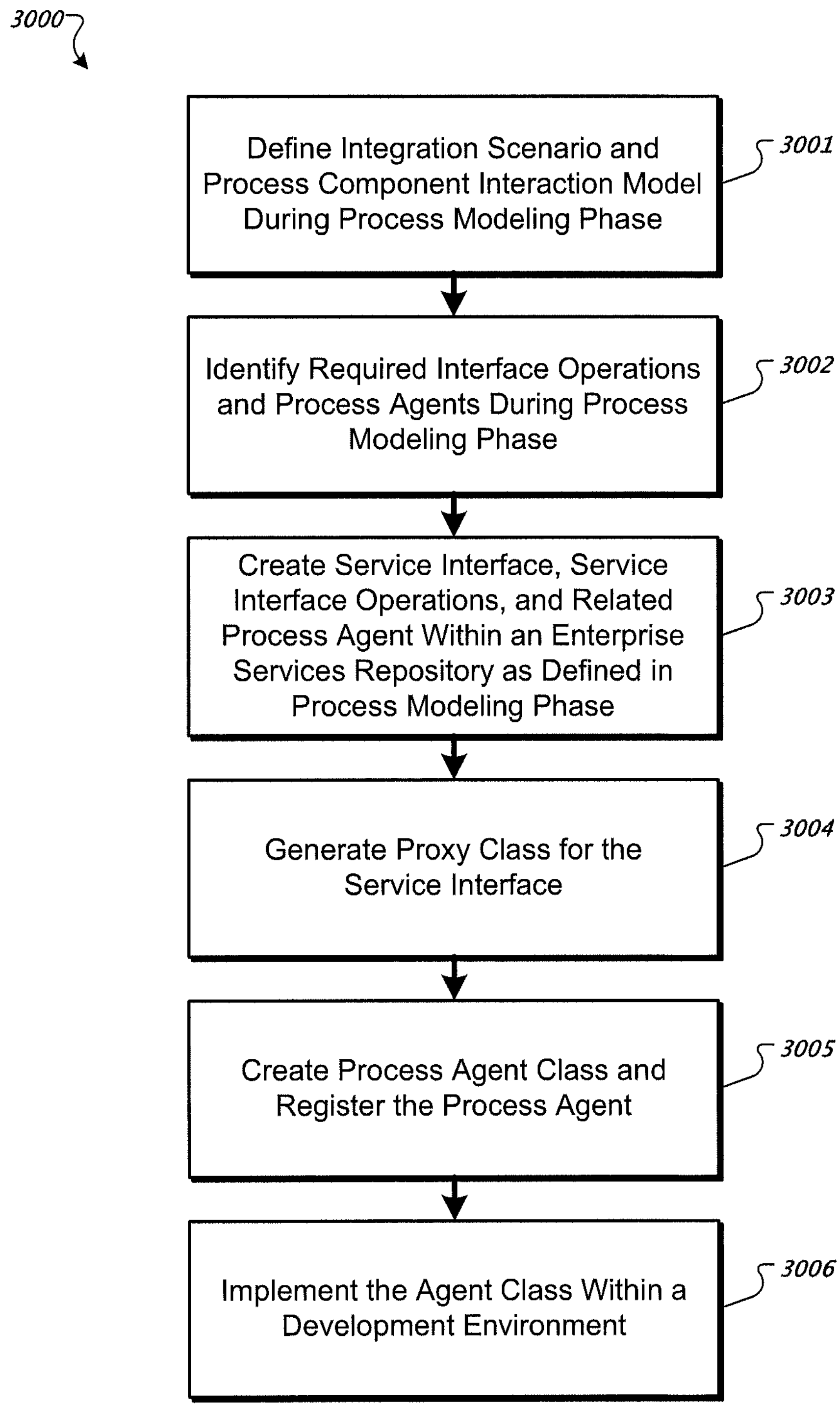
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
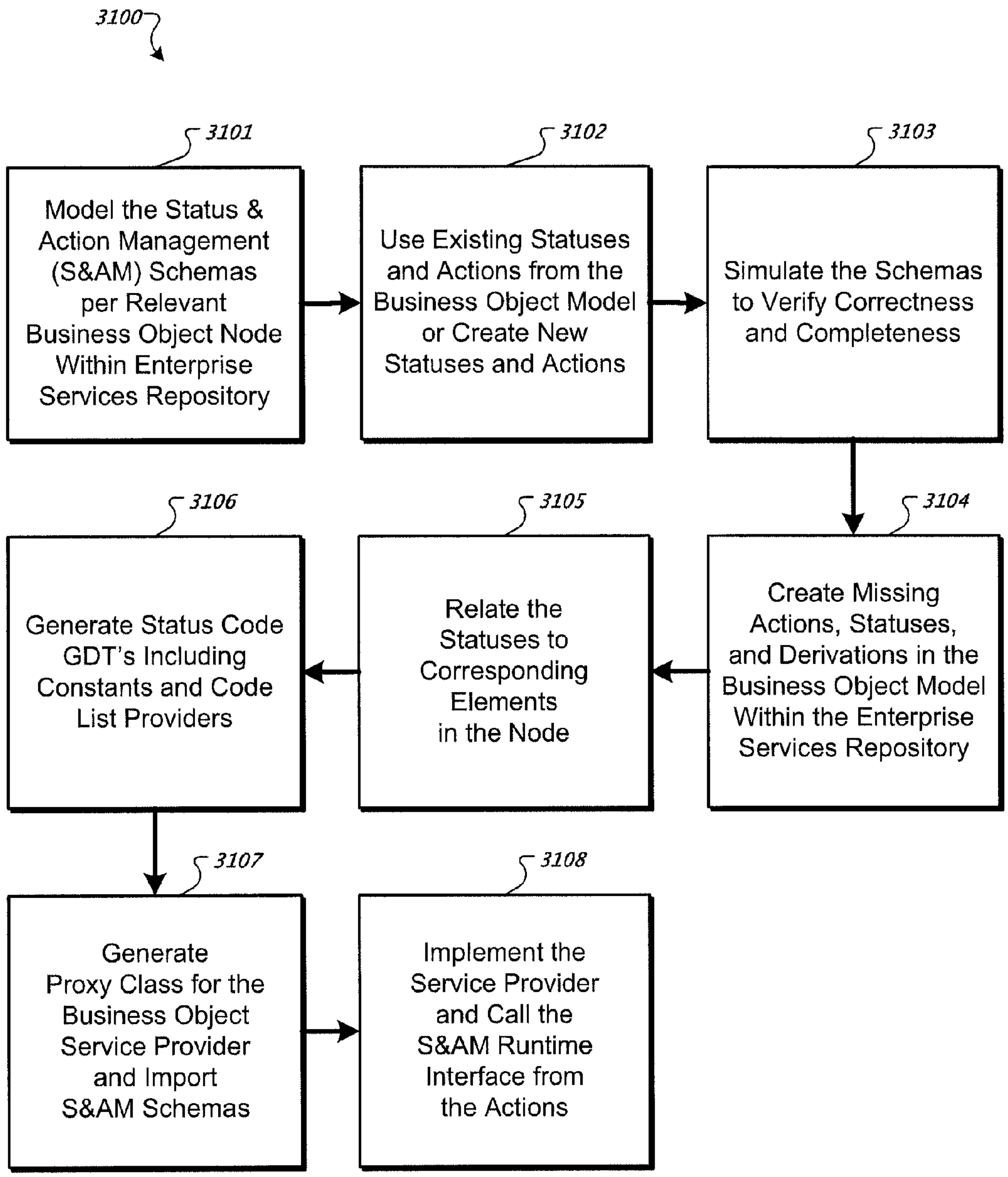
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

BudgetAvailabilityControlRegister Interfaces

The motivating business scenario using a BudgetAvailabilityControlRegister can provide the possibility for a user to determine available and already consumed budget on a given account assignment, e.g., internal order of funds management account assignment. The BudgetAvailabilityControlRegister interface can perform a BudgetAvailabilityControlRegisterERPItemByElementsQueryResponse_In operation. The BudgetAvailabilityControlRegisterERPItemByElementsQueryResponse_In operation can handle queries to and responses from BudgetProcessing for BudgetAvailabilityControlRegister items. The operation can read total available and already consumed budget value for an account assignment with possible restriction on time period and other budget relevant attributes.

The BudgetAvailabilityControlRegisterERPItemByElementsQueryResponse_In operation includes various message types, namely a BudgetAvailabilityControlRegisterERPItemByElementsQuerysync and a BudgetAvailabilityControlRegisterERPItemByElementsResponsesync. The structure of the BudgetAvailabilityControlRegisterERPItemByElementsQuerysync message type can be specified by a BudgetAvailabilityControlRegisterERPItemByElementsQueryMessage_sync message data type. The structure of the BudgetAvailabilityControlRegisterERPItemByElementsResponsesync message type can be specified by a BudgetAvailabilityControlRegisterERPItemByElementsResponseMessage_sync message data type.

Figure 32:
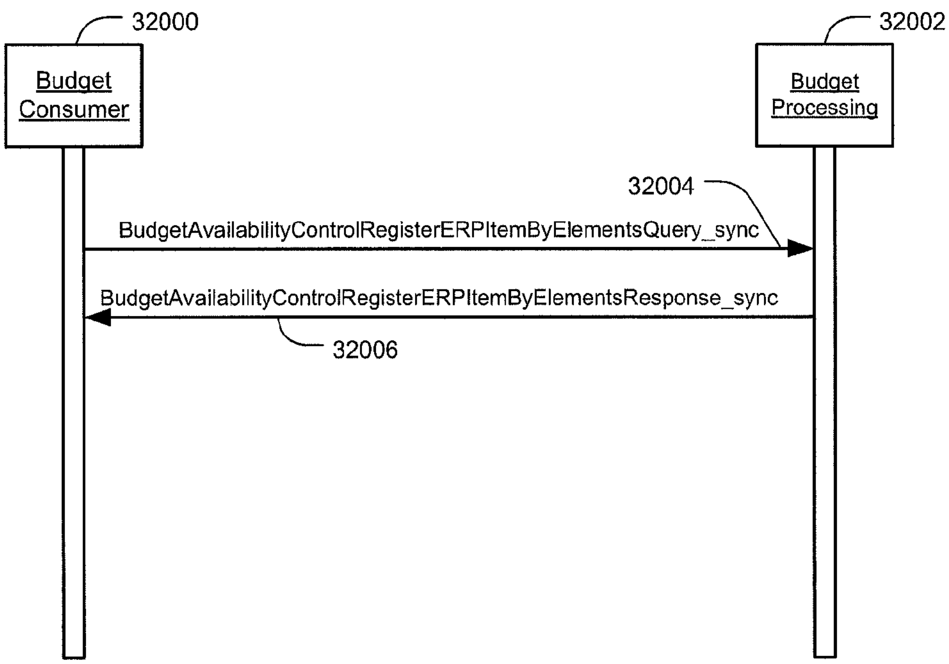
FIG. 32 shows an exemplary BudgetAvailabilityControlRegister Message Choreography.

The message choreography of FIG. 32 describes a possible logical sequence of messages that can be used to realize a Budget Availability business scenario.

A "Budget Consumer" system 32000 can query a "BudgetProcessing" system 32002, for budget availability control register items using a BudgetAvailabilityControlRegisterERPItemByElementsQuerysync message 32004 as shown, for example in FIG. 32. The "Budget Processing" system 32002 can respond to the query, using a BudgetAvailabilityControlRegisterERPItemByElementsResponsesync message 32006 as shown, for example, in FIG. 32.

Figure 33:
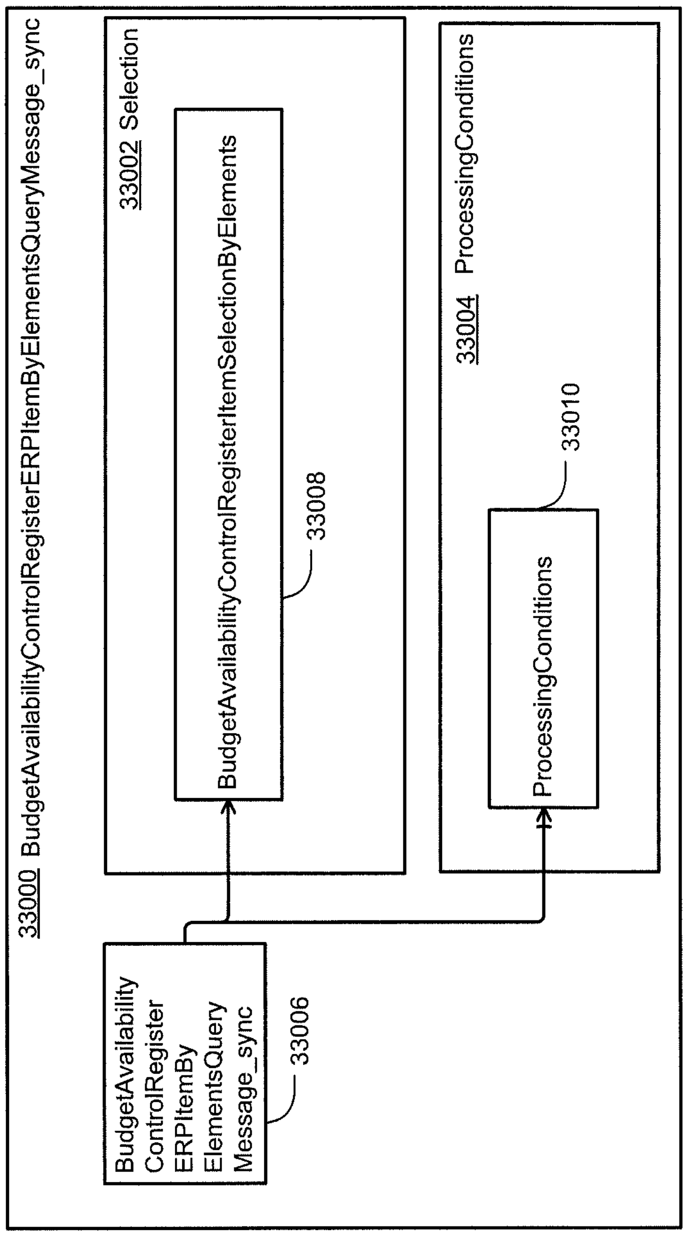
FIG. 33 shows an exemplary BudgetAvailabilityControlRegisterERPItemByElementsQueryMessage_sync Message Data Type.

FIG. 33 illustrates one example logical configuration of BudgetAvailabilityControlRegisterERPItemByElementsQueryMessage_sync message 33000. Specifically, this figure depicts the arrangement and hierarchy of various components such as one or more levels of packages, entities, and datatypes, shown here as 33002 through 33010. As described above, packages may be used to represent hierarchy levels. Entities are discrete business elements that are used during a business transaction. Data types are used to type object entities and interfaces with a structure. For example, BudgetAvailabilityControlRegisterERPItemByElementsQueryMessage_sync message 33000 includes, among other things, BudgetAvailabilityControlRegisterItemSelectionByElements 33008. Accordingly, heterogeneous applications may communicate using this consistent message configured as such.

Figure 34:
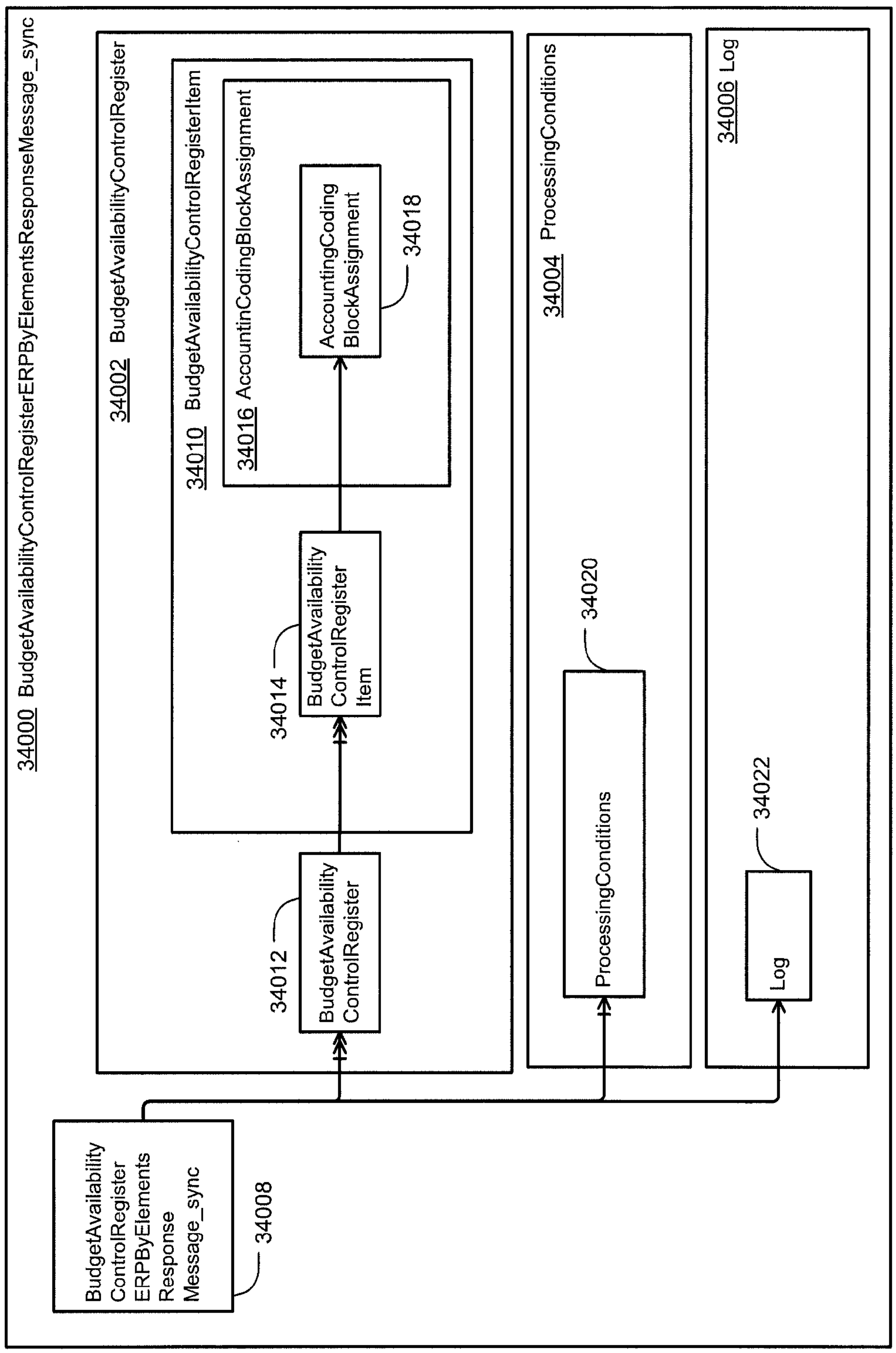
FIG. 34 shows an exemplary BudgetAvailabilityControlRegisterERPByElementsResponseMessage_sync Message Data Type.

Additionally, FIG. 34 illustrates one example logical configuration of BudgetAvailabilityControlRegisterERPByElementsResponseMessage_sync message 34000. Specifically, this figure depicts the arrangement and hierarchy of various components such as one or more levels of packages, entities, and datatypes, shown here as 34002 through 34022. As described above, packages may be used to represent hierarchy levels. Entities are discrete business elements that are used during a business transaction. Data types are used to type object entities and interfaces with a structure. For example, BudgetAvailabilityControlRegisterERPByElementsResponseMessage_sync message 34000 includes, among other things, BudgetAvailabilityControlRegister 34012. Accordingly, heterogeneous applications may communicate using this consistent message configured as such.

FIGS. 35-1 through 35-6 show an example configuration of an Element Structure that includes a BudgetAvailabilityControlRegisterERPMessage_sync 35000 package. The BudgetAvailabilityControlRegisterERPMessage_sync 35000 package is a BudgetRegisterERPMessage_sync 35004 data type. The BudgetAvailabilityControlRegisterERPMessage_sync 35000 package includes a BudgetAvailabilityControlRegisterERPMessage_sync 35002 entity. The BudgetAvailabilityControlRegisterERPMessage_sync 35000 package includes various packages, namely a BudgetAvailabilityControlRegister 35006 and a Log 35138.

The BudgetAvailabilityControlRegister 35006 package includes a BudgetAvailabilityControlRegister 35008 entity. The BudgetAvailabilityControlRegister 35006 package includes various packages, namely an Item 35022, a ControlAccountingCodingBlockAssignment 35046 and a ConsumingAccountingCodingBlockAssignment 35086. The BudgetAvailabilityControlRegister 35008 entity includes various attributes, namely a FundsManagementAreaID 35010, a BudgetAvailabilityControlRegisterCode 35014 and a BudgetAvailablilityControlRegisterName 35018. The FundsManagementAreaID 35010 attribute can be a NOSC_FundsManagementAreaID 35012 data type. A FundsManagementAreaID can be a unique identifier for a Funds Management Area. The BudgetAvailabilityControlRegisterCode 35014 attribute can be a NOSC_BudgetAvailabilityControlRegisterCode 35016 data type. A BudgetAvailabilityControlRegisterCode can be a coded representation of budget register. The BudgetAvailablilityControlRegisterName 35018 attribute can be a MEDIUM Name 35020 data type. A BudgetAvailabilityControlRegisterName can be a natural-language name of a BudgetAvailabilityControlRegisterCode.

The Item 35022 package includes an Item 35024 entity. The Item 35024 entity includes various attributes, namely a FiscalYearID 35026, a CashEffectivenessFiscalYearID 35030, a ConsumedAmount 35034, a ConsumableAmount 35038 and a CoverEligibilityActiveIndicator 35042. The FiscalYearID 35026 attribute can be a FiscalYearID 35028 data type. The CashEffectivenessFiscalYearID 35030 attribute can be a FiscalYearID 35032 data type.

The ConsumedAmount 35034 attribute can be an Amount 35036 data type. A ConsumedAmount can be an amount that is consumed with the corresponding currency unit. The ConsumableAmount 35038 attribute can be an Amount 35040 data type. A Consumable Amount can be an amount that can be consumed with the corresponding currency unit. The CoverEligibilityActiveIndicator 35042 attribute can be an Indicator 35044 data type. A CoverPoolAssignedIndicator can indicate whether or not an budget object is assigned to a cover pool.

The ControlAccountingCodingBlockAssignment 35046 package includes a ControlAccountingCodingBlockAssignment 35048 entity. The ControlAccountingCodingBlockAssignment 35048 entity includes various attributes, namely a ProjectReference 35050, an InternalOrderID 35054, a MaintenanceOrderReference 35058, a FundsManagementCentreID 35062, a FundsManagementFundID 35066, a FundsManagementAccountID 35070, a FundsManagementFunctionalAreaID 35074, a FundsManagementProgramID 35078 and a GrantID 35082.

The ProjectReference 35050 attribute can be a NOSC_ProjectReference 35052 data type. A ProjectReference can be a unique reference to a project or to an element within a project. The InternalOrderID 35054 attribute can be a NOSC_InternalOrderID 35056 data type. An InternalOrderID can be an identifier for an internal order. The MaintenanceOrderReference 35058 attribute can be a NOSC_BusinessTransactionDocumentReference 35060 data type. A BusinessTransactionDocumentReference can be a unique reference to other business documents or business document items that are of significance within each respective business process. A reference to an item within the same business document is possible.

The FundsManagementCentreID 35062 attribute can be a NOSC_FundsManagementCentreID 35064 data type. A FundsManagementCentreID can be a unique identifier for a Funds Management Centre. The FundsManagementFundID 35066 attribute can be a NOSC_FundsManagementFundID 35068 data type. A FundsManagementFundID can be a unique identifier for a Fund. The FundsManagementAccountID 35070 attribute can be a NOSC_FundsManagementAccountID 35072 data type. A FundsManagementAccountID can be a unique identifier for a Funds Management Account. In some implementations, a Funds Management Account denotes a grouping of revenues and expenditures by its nature.

The FundsManagementFunctionalAreaID 35074 attribute can be a NOSC_FundsManagementFunctionalAreaID 35076 data type. A FundsManagementFunctionalAreaID can be a unique identifier for a functional area within funds management. The FundsManagementProgramID 35078 attribute can be a NOSC_FundsManagementProgramID 35080 data type. A FundsManagementProgramID can be a unique identifier for a Funds Management Program. The GrantID 35082 attribute can be a NOSC_GrantID 35084 data type. A GrantID can be a unique identifier for a Grant.

The ConsumingAccountingCodingBlockAssignment 35086 package includes a ConsumingAccountingCodingBlockAssignment 35088 entity. The ConsumingAccountingCodingBlockAssignment 35088 entity includes various attributes, namely a ProfitCentreID 35090, a CostCentreID 35094, a ProjectReference 35098, an InternalOrderID 35102, a MaintenanceOrderReference 35106, a FundsManagementCentreID 35110, a FundsManagementFundID 35114, a FundsManagementAccountID 35118, a FundsManagementFunctionalAreaID 35122, a FundsManagementProgramID 35126, a GrantID 35130 and an AccountingBusinessAreaCode 35134.

The ProfitCentreID 35090 attribute can be a NOSC_ProfitCentreID 35092 data type. A ProfitCentreID can be an identifier for a profit center. The CostCentreID 35094 attribute can be a NOSC_CostCentreID 35096 data type. A CostCentreID can be an identifier for a cost center. The ProjectReference 35098 attribute can be a NOSC_ProjectReference 35100 data type. A ProjectReference can be a unique reference to a project or to an element within a project. The InternalOrderID 35102 attribute can be a NOSC_InternalOrderID 35104 data type. An InternalOrderID can be an identifier for an internal order.

The MaintenanceOrderReference 35106 attribute can be a NOSC_BusinessTransactionDocumentReference 35108 data type. A BusinessTransactionDocumentReference can be a unique reference to other business documents or business document items that are of significance within each respective business process. A reference to an item within the same business document is possible.

The FundsManagementCentreID 35110 attribute can be a NOSC_FundsManagementCentreID 35112 data type. A FundsManagementCentreID can be a unique identifier for a Funds Management Centre. The FundsManagementFundID 35114 attribute can be a NOSC_FundsManagementFundID 35116 data type. A FundsManagementFundID can be a unique identifier for a Fund. The FundsManagementAccountID 35118 attribute can be a NOSC_FundsManagementAccountID 35120 data type.

A FundsManagementAccountID can be a unique identifier for a Funds Management Account. In some implementations, a Funds Management Account denotes a grouping of revenues and expenditures by its nature. The FundsManagementFunctionalAreaID 35122 attribute can be a NOSC_FundsManagementFunctionalAreaID 35124 data type. A FundsManagementFunctionalAreaID can be a unique identifier for a functional area within funds management. The FundsManagementProgramID 35126 attribute can be a NOSC_FundsManagementProgramID 35128 data type.

A FundsManagementProgramID can be a unique identifier for a Funds Management Program. The GrantID 35130 attribute can be a NOSC_GrantID 35132 data type. A GrantID can be a unique identifier for a Grant.

The AccountingBusinessAreaCode 35134 attribute can be a NOSC_AccountingBusinessAreaCode 35136 data type. An AccountingBusinessAreaCode can be a coded representation of a business area within a company from the accounting point of view. The Log 35138 package can be a NOSC_Log 35142 data type. The Log 35138 package includes a Log 35140 entity.

Additionally, FIGS. 36-1 through 36-3 show an example configuration of an Element Structure that includes a BudgetAvailabilityControlRegisterERPItemByElementsQueryMessage_sync 36000 package. The BudgetAvailabilityControlRegisterERPItemByElementsQueryMessage_sync 36000 package includes a BudgetAvailabilityControlRegisterERPItemByElementsQueryMessage_sync 36002 entity. The BudgetAvailabilityControlRegisterERPItemByElementsQueryMessage_sync 36000 package includes a Selection 36004 package.

The Selection 36004 package includes a BudgetAvailabilityControlRegisterItemSelectionByElements 36006 entity. The BudgetAvailabilityControlRegisterItemSelectionByElements 36006 entity has a cardinality of 1 36008 meaning that for each instance of the Selection 36004 package there is one BudgetAvailabilityControlRegisterItemSelectionByElements 36006 entity. The BudgetAvailabilityControlRegisterItemSelectionByElements 36006 entity includes various attributes, namely a FundsManagementAreaID 36010, a FiscalYearID 36014, a CashEffectivenessFiscalYearID 36018, a ConsumingProjectReference 36022, a ConsumingInternalOrderID 36026, a ConsumingMaintenanceOrderReference 36030, a ConsumingFundsManagementCentreID 36034, a ConsumingFundsManagementFundID 36038, a ConsumingFundsManagementAccountID 36042, a ConsumingFundsManagementFunctionalAreaID 36046, a ConsumingFundsManagementProgramID 36050 and a ConsumingGrantID 36054.

The BudgetAvailabilityControlRegisterItemSelectionByElements 36006 entity includes a SelectionByBudgetAvailabilityControlRegisterCode 36058 subordinate entity. The FundsManagementAreaID 36010 attribute has a cardinality of 0 . . . 1 36012 meaning that for each instance of the BudgetAvailabilityControlRegisterItemSelectionByElements 36006 entity there may be one FundsManagementAreaID 36010 attribute. The FiscalYearID 36014 attribute has a cardinality of 1 36016 meaning that for each instance of the BudgetAvailabilityControlRegisterItemSelectionByElements 36006 entity there is one FiscalYearID 36014 attribute. The CashEffectivenessFiscalYearID 36018 attribute has a cardinality of 0 . . . 1 36020 meaning that for each instance of the BudgetAvailabilityControlRegisterItemSelectionByElements 36006 entity there may be one CashEffectivenessFiscalYearID 36018 attribute. The ConsumingProjectReference 36022 attribute has a cardinality of 0 . . . 1 36024 meaning that for each instance of the BudgetAvailabilityControlRegisterItemSelectionByElements 36006 entity there may be one ConsumingProjectReference 36022 attribute.

The ConsumingInternalOrderID 36026 attribute has a cardinality of 0 . . . 1 36028 meaning that for each instance of the BudgetAvailabilityControlRegisterItemSelectionByElements 36006 entity there may be one ConsumingInternalOrderID 36026 attribute. The ConsumingMaintenanceOrderReference 36030 attribute has a cardinality of 0 . . . 1 36032 meaning that for each instance of the BudgetAvailabilityControlRegisterItemSelectionByElements 36006 entity there may be one ConsumingMaintenanceOrderReference 36030 attribute. The ConsumingFundsManagementCentreID 36034 attribute has a cardinality of 0 . . . 1 36036 meaning that for each instance of the BudgetAvailabilityControlRegisterItemSelectionByElements 36006 entity there may be one ConsumingFundsManagementCentreID 36034 attribute. The ConsumingFundsManagementFundID 36038 attribute has a cardinality of 0 . . . 1 36040 meaning that for each instance of the BudgetAvailabilityControlRegisterItemSelectionByElements 36006 entity there may be one ConsumingFundsManagementFundID 36038 attribute.

The ConsumingFundsManagementAccountID 36042 attribute has a cardinality of 0 . . . 1 36044 meaning that for each instance of the BudgetAvailabilityControlRegisterItemSelectionByElements 36006 entity there may be one ConsumingFundsManagementAccountID 36042 attribute. The ConsumingFundsManagementFunctionalAreaID 36046 attribute has a cardinality of 0 . . . 1 36048 meaning that for each instance of the BudgetAvailabilityControlRegisterItemSelectionByElements 36006 entity there may be one ConsumingFundsManagementFunctionalAreaID 36046 attribute. The ConsumingFundsManagementProgramID 36050 attribute has a cardinality of 0 . . . 1 36052 meaning that for each instance of the BudgetAvailabilityControlRegisterItemSelectionByElements 36006 entity there may be one ConsumingFundsManagementProgramID 36050 attribute.

The ConsumingGrantID 36054 attribute has a cardinality of 0 . . . 1 36056 meaning that for each instance of the BudgetAvailabilityControlRegisterItemSelectionByElements 36006 entity there may be one ConsumingGrantID 36054 attribute. The SelectionByBudgetAvailabilityControlRegisterCode 36058 entity has a cardinality of 1 . . . n 36060 meaning that for each instance of the BudgetAvailabilityControlRegisterItemSelectionByElements 36006 entity there are one or more SelectionByBudgetAvailabilityControlRegisterCode 36058 entities. The SelectionByBudgetAvailabilityControlRegisterCode 36058 entity includes various attributes, namely an InclusionExclusionCode 36062, an IntervalBoundaryTypeCode 36066, a LowerBoundaryBudgetAvailabilityControlRegisterCode 36070 and an UpperBoundaryBudgetAvailabilityControlRegisterCode 36074.

The InclusionExclusionCode 36062 attribute has a cardinality of 1 36064 meaning that for each instance of the SelectionByBudgetAvailabilityControlRegisterCode 36058 entity there is one InclusionExclusionCode 36062 attribute. The IntervalBoundaryTypeCode 36066 attribute has a cardinality of 1 36068 meaning that for each instance of the SelectionByBudgetAvailabilityControlRegisterCode 36058 entity there is one IntervalBoundaryTypeCode 36066 attribute. The LowerBoundaryBudgetAvailabilityControlRegisterCode 36070 attribute has a cardinality of 1 36072 meaning that for each instance of the SelectionByBudgetAvailabilityControlRegisterCode 36058 entity there is one LowerBoundaryBudgetAvailabilityControlRegisterCode 36070 attribute.

The UpperBoundaryBudgetAvailabilityControlRegisterCode 36074 attribute has a cardinality of 0 . . . 1 36076 meaning that for each instance of the SelectionByBudgetAvailabilityControlRegisterCode 36058 entity there may be one UpperBoundaryBudgetAvailabilityControlRegisterCode 36074 attribute. The data types of the various packages, entities, and attributes are described with respect to FIG. 35.

Additionally, FIGS. 37-1 through 37-6 show an example configuration of an Element Structure that includes a BudgetAvailabilityControlRegisterERPItemByElementsResponseMessage_sync 37000 package. The BudgetAvailabilityControlRegisterERPItemByElementsResponseMessage_sync 37000 package includes a BudgetAvailabilityControlRegisterERPItemByElementsResponseMessage_sync 37002 entity. The BudgetAvailabilityControlRegisterERPItemByElementsResponseMessage_sync 37000 package includes various packages, namely a BudgetAvailabilityControlRegister 37004 and a Log 37144.

The BudgetAvailabilityControlRegister 37004 package includes a BudgetAvailabilityControlRegister 37006 entity. The BudgetAvailabilityControlRegister 37004 package includes an Item 37022 package. The BudgetAvailability- ControlRegister 37006 entity has a cardinality of 0 . . . n 37008 meaning that for each instance of the BudgetAvailabilityControlRegister 37004 package there may be one or more BudgetAvailabilityControlRegister 37006 entities.

The BudgetAvailabilityControlRegister 37006 entity includes various attributes, namely a FundsManagementAreaID 37010, a BudgetAvailablilityControlRegisterCode 37014 and a BudgetAvailablilityControlRegisterName 37018. The FundsManagementAreaID 37010 attribute has a cardinality of 0 . . . 1 37012 meaning that for each instance of the BudgetAvailabilityControlRegister 37006 entity there may be one FundsManagementAreaID 37010 attribute. The BudgetAvailablilityControlRegisterCode 37014 attribute has a cardinality of 1 37016 meaning that for each instance of the BudgetAvailabilityControlRegister 37006 entity there is one BudgetAvailablilityControlRegisterCode 37014 attribute. The BudgetAvailablilityControlRegisterName 37018 attribute has a cardinality of 1 37020 meaning that for each instance of the BudgetAvailabilityControlRegister 37006 entity there is one BudgetAvailablilityControlRegisterName 37018 attribute.

The Item 37022 package includes an Item 37024 entity. The Item 37022 package includes various packages, namely a ControlAccountingCodingBlockAssignment 37048 and a ConsumingAccountingCodingBlockAssignment 37090. The Item 37024 entity has a cardinality of 0 . . . 1 37026 meaning that for each instance of the Item 37022 package there may be one Item 37024 entity. The Item 37024 entity includes various attributes, namely a FiscalYearID 37028, a CashEffectivenessFiscalYearID 37032, a ConsumedAmount 37036, a ConsumableAmount 37040 and a CoverEligibilityActiveIndicator 37044. The FiscalYearID 37028 attribute has a cardinality of 1 37030 meaning that for each instance of the Item 37024 entity there is one FiscalYearID 37028 attribute.

The CashEffectivenessFiscalYearID 37032 attribute has a cardinality of 0 . . . 1 37034 meaning that for each instance of the Item 37024 entity there may be one CashEffectivenessFiscalYearID 37032 attribute. The ConsumedAmount 37036 attribute has a cardinality of 1 37038 meaning that for each instance of the Item 37024 entity there is one ConsumedAmount 37036 attribute. The ConsumableAmount 37040 attribute has a cardinality of 1 37042 meaning that for each instance of the Item 37024 entity there is one ConsumableAmount 37040 attribute. The CoverEligibilityActiveIndicator 37044 attribute has a cardinality of 1 37046 meaning that for each instance of the Item 37024 entity there is one CoverEligibilityActiveIndicator 37044 attribute.

The ControlAccountingCodingBlockAssignment 37048 package includes a ControlAccountingCodingBlockAssignment 37050 entity. The ControlAccountingCodingBlockAssignment 37050 entity has a cardinality of 0 . . . 1 37052 meaning that for each instance of the ControlAccountingCodingBlockAssignment 37048 package there may be one ControlAccountingCodingBlockAssignment 37050 entity. The ControlAccountingCodingBlockAssignment 37050 entity includes various attributes, namely a ProjectReference 37054, an InternalOrderID 37058, a MaintenanceOrderReference 37062, a FundsManagementCentreID 37066, a FundsManagementFundID 37070, a FundsManagementAccountID 37074, a FundsManagementFunctionalAreaID 37078, a FundsManagementProgramID 37082 and a GrantID 37086.

The ProjectReference 37054 attribute has a cardinality of 0 . . . 1 37056 meaning that for each instance of the ControlAccountingCodingBlockAssignment 37050 entity there may be one ProjectReference 37054 attribute. The InternalOrderID 37058 attribute has a cardinality of 0 . . . 1 37060 meaning that for each instance of the ControlAccountingCodingBlockAssignment 37050 entity there may be one InternalOrderID 37058 attribute. The MaintenanceOrderReference 37062 attribute has a cardinality of 0 . . . 1 37064 meaning that for each instance of the ControlAccountingCodingBlockAssignment 37050 entity there may be one MaintenanceOrderReference 37062 attribute.

The FundsManagementCentreID 37066 attribute has a cardinality of 0 . . . 1 37068 meaning that for each instance of the ControlAccountingCodingBlockAssignment 37050 entity there may be one FundsManagementCentreID 37066 attribute. The FundsManagementFundID 37070 attribute has a cardinality of 0 . . . 1 37072 meaning that for each instance of the ControlAccountingCodingBlockAssignment 37050 entity there may be one FundsManagementFundID 37070 attribute. The FundsManagementAccountID 37074 attribute has a cardinality of 0 . . . 1 37076 meaning that for each instance of the ControlAccountingCodingBlockAssignment 37050 entity there may be one FundsManagementAccountID 37074 attribute.

The FundsManagementFunctionalAreaID 37078 attribute has a cardinality of 0 . . . 1 37080 meaning that for each instance of the ControlAccountingCodingBlockAssignment 37050 entity there may be one FundsManagementFunctionalAreaID 37078 attribute. The FundsManagementProgramID 37082 attribute has a cardinality of 0 . . . 1 37084 meaning that for each instance of the ControlAccountingCodingBlockAssignment 37050 entity there may be one FundsManagementProgramID 37082 attribute. The GrantID 37086 attribute has a cardinality of 0 . . . 1 37088 meaning that for each instance of the ControlAccountingCodingBlockAssignment 37050 entity there may be one GrantID 37086 attribute.

The ConsumingAccountingCodingBlockAssignment 37090 package includes a ConsumingAccountingCodingBlockAssignment 37092 entity. The ConsumingAccountingCodingBlockAssignment 37092 entity has a cardinality of 1 37094 meaning that for each instance of the ConsumingAccountingCodingBlockAssignment 37090 package there is one ConsumingAccountingCodingBlockAssignment 37092 entity. The ConsumingAccountingCodingBlockAssignment 37092 entity includes various attributes, namely a ProfitCentreID 37096, a CostCentreID 37100, a ProjectReference 37104, an InternalOrderID 37108, a MaintenanceOrderReference 37112, a FundsManagementCentreID 37116, a FundsManagementFundID 37120, a FundsManagementAccountID 37124, a FundsManagementFunctionalAreaID 37128, a FundsManagementProgramID 37132, a GrantID 37136 and an AccountingBusinessAreaCode 37140.

The ProfitCentreID 37096 attribute has a cardinality of 0 . . . 1 37098 meaning that for each instance of the ConsumingAccountingCodingBlockAssignment 37092 entity there may be one ProfitCentreID 37096 attribute. The CostCentreID 37100 attribute has a cardinality of 0 . . . 1 37102 meaning that for each instance of the ConsumingAccountingCodingBlockAssignment 37092 entity there may be one CostCentreID 37100 attribute. The ProjectReference 37104 attribute has a cardinality of 0 . . . 1 37106 meaning that for each instance of the ConsumingAccountingCodingBlockAssignment 37092 entity there may be one ProjectReference 37104 attribute.

The InternalOrderID 37108 attribute has a cardinality of 0 . . . 1 37110 meaning that for each instance of the ConsumingAccountingCodingBlockAssignment 37092 entity there may be one InternalOrderID 37108 attribute. The MaintenanceOrderReference 37112 attribute has a cardinality of 0 . . . 1 37114 meaning that for each instance of the ConsumingAccountingCodingBlockAssignment 37092 entity there may be one MaintenanceOrderReference 37112 attribute. The FundsManagementCentreID 37116 attribute has a cardinality of 0 . . . 1 37118 meaning that for each instance of the ConsumingAccountingCodingBlockAssignment 37092 entity there may be one FundsManagementCentreID 37116 attribute.

The FundsManagementFundID 37120 attribute has a cardinality of 0 . . . 1 37122 meaning that for each instance of the ConsumingAccountingCodingBlockAssignment 37092 entity there may be one FundsManagementFundID 37120 attribute. The FundsManagementAccountID 37124 attribute has a cardinality of 0 . . . 1 37126 meaning that for each instance of the ConsumingAccountingCodingBlockAssignment 37092 entity there may be one FundsManagementAccountID 37124 attribute. The FundsManagementFunctionalAreaID 37128 attribute has a cardinality of 0 . . . 1 37130 meaning that for each instance of the ConsumingAccountingCodingBlockAssignment 37092 entity there may be one FundsManagementFunctionalAreaID 37128 attribute.

The FundsManagementProgramID 37132 attribute has a cardinality of 0 . . . 1 37134 meaning that for each instance of the ConsumingAccountingCodingBlockAssignment 37092 entity there may be one FundsManagementProgramID 37132 attribute. The GrantID 37136 attribute has a cardinality of 0 . . . 1 37138 meaning that for each instance of the ConsumingAccountingCodingBlockAssignment 37092 entity there may be one GrantID 37136 attribute. The AccountingBusinessAreaCode 37140 attribute has a cardinality of 0 . . . 1 37142 meaning that for each instance of the ConsumingAccountingCodingBlockAssignment 37092 entity there may be one AccountingBusinessAreaCode 37140 attribute.

The Log 37144 package includes a Log 37146 entity. The Log 37146 entity has a cardinality of 1 37148 meaning that for each instance of the Log 37144 package there is one Log 37146 entity. The data types of the various packages, entities, and attributes are described with respect to FIG. 35.

FinancialAccountingViewOfManufacturingWorkOrder Interfaces

In the context of the integration scenario Outsourced Manufacturing, the FinancialAccountingViewOfManufacturingWorkOrder can provide an accounting view of a work order. The interface CreateFinancialAccountingViewOfManufacturingWorkOrderBasedOnManufacturingWorkOrderNotification_In can provide a possibility to create a FinancialAccountingViewOfManufacturingWorkOrder based on a ManufacturingWorkOrderAccountingNotification. A ManufacturingWorkOrderAccountingNotification can be a notification from the Inventory Collaboration Hub to Accounting that a ManufacturingWorkOrder has been created. The ManufacturingWorkOrderAccountingNotification can be implemented by the ManufacturingWorkOrderAccountingNotification_In message interface.

Figure 38:
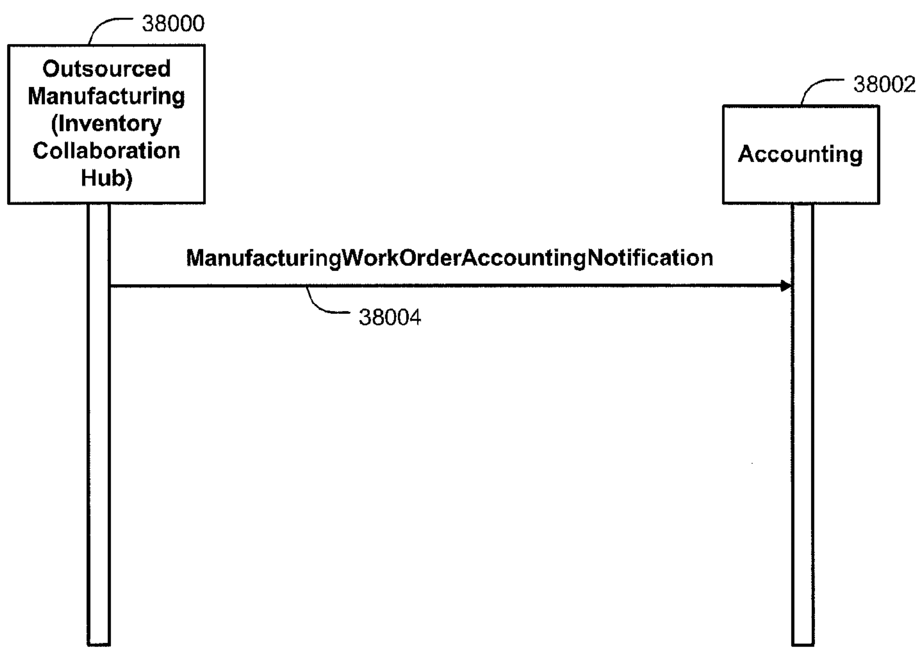
FIG. 38 shows an exemplary ManufacturingWorkOrderAccountingNotification Message Choreography.

The message choreography of FIG. 38 describes a possible logical sequence of messages that can be used to realize an Outsourced Manufacturing business scenario. An "Outsourced Manufacturing (Inventory Collaboration Hub)" system 38000 can notify an "Accounting" system 38002 of a manufacturing work order, using a ManufacturingWorkOrderAccountingNotification message 38004 as shown, for example in FIG. 38.

Figure 39:
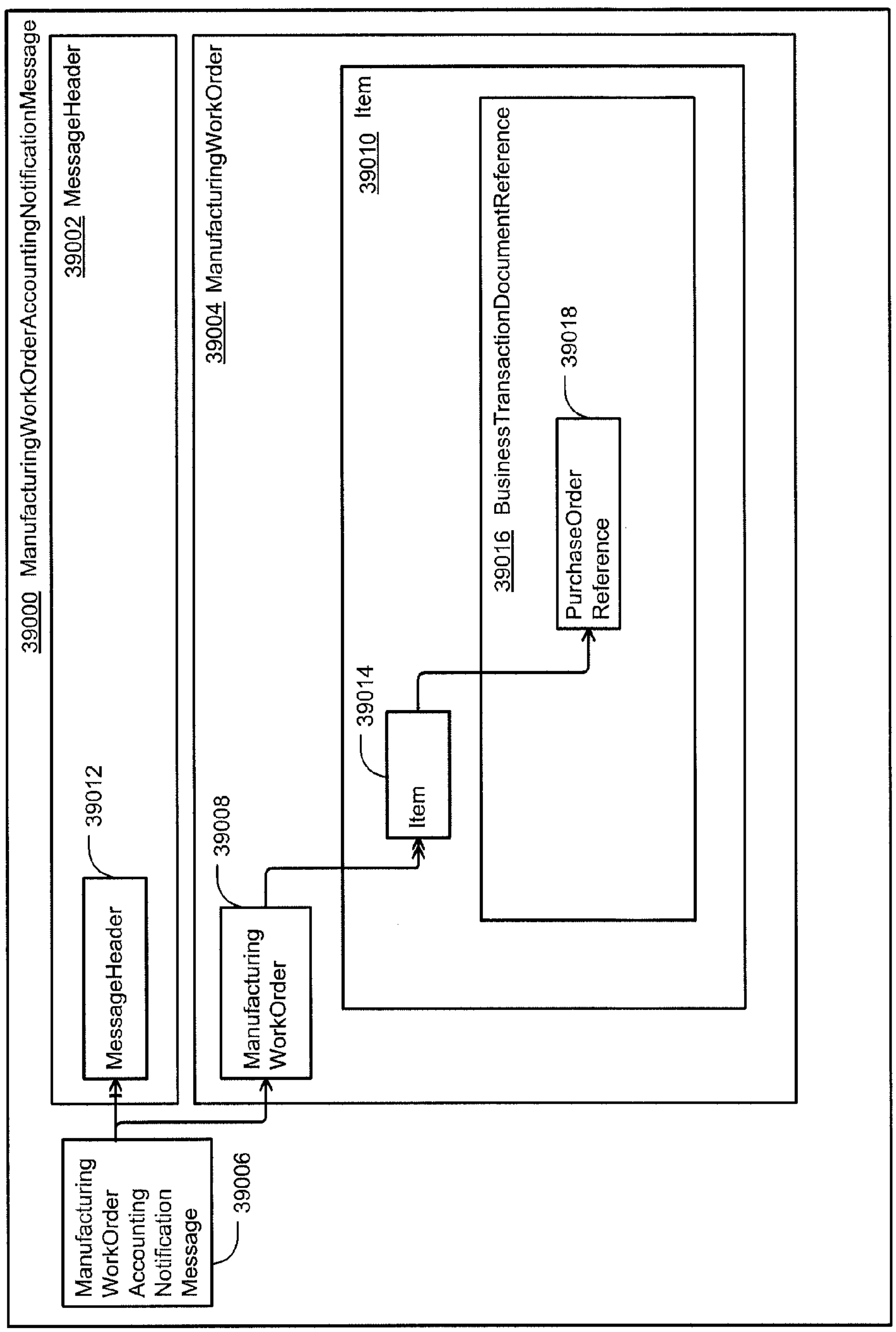
FIG. 39 shows an exemplary ManufacturingWorkOrderAccountingNotificationMessage Message Data Type.

FIG. 39 illustrates one example logical configuration of ManufacturingWorkOrderAccountingNotificationMessage message 39000. Specifically, this figure depicts the arrangement and hierarchy of various components such as one or more levels of packages, entities, and datatypes, shown here as 39002 through 39018. As described above, packages may be used to represent hierarchy levels. Entities are discrete business elements that are used during a business transaction. Data types are used to type object entities and interfaces with a structure. For example, ManufacturingWorkOrderAccountingNotificationMessage message 39000 includes, among other things, ManufacturingWorkOrder 39008. Accordingly, heterogeneous applications may communicate using this consistent message configured as such.

FIGS. 40-1 through 40-2 illustrate one example logical configuration of a ManufacturingWorkOrderAccountingNotificationMessage 40000 element structure. Specifically, these figures depict the arrangement and hierarchy of various components such as one or more levels of packages, entities, and datatypes, shown here as 40000 through 40044. As described above, packages may be used to represent hierarchy levels. Entities are discrete business elements that are used during a business transaction. Data types are used to type object entities and interfaces with a structure. For example, the ManufacturingWorkOrderAccountingNotificationMessage 40000 includes, among other things, a ManufacturingWorkOrderAccountingNotificationMessage entity 40002. Accordingly, heterogeneous applications may communicate using this consistent message configured as such.

Message Data Type ManufacturingWorkOrderNotificationMessage

The message data type ManufacturingWorkOrderNotificationMessage includes a work order accounting notification included in a business document and business information that is relevant for sending a business document in a message. It includes the MessageHeader and ManufacturingWorkOrderAccountingNotification packages.

The following Table 1 shows which packages and entities of the abstract message data type ManufacturingWorkOrderAccountingNotificationMessage may be used in the above mentioned concrete message data types:

TABLE 1

Packages/Entities used in messages

| Package/Entity | Message Data Type Manufacturing-Work-OrderAccounting-Notification-Message |
|---|---|
| MessageHeader | c |
| ManufacturingWorkOrder | 1 |
| Item | n |
| PurchaseOrderReference | 1 |

The message data type ManufacturingWorkOrderAccountingNotificationMessage can provide a structure for the message type ManufacturingWorkOrderAccountingNotification and for interfaces that are based on it.

A MessageHeader package can group together business information from a perspective of a sending application to identify a business document in a message, to provide information about the sender, and to provide information about the recipient. The MessageHeader can be divided up into the SenderParty and RecipientParty entities. The MessageHeader can be of type GDT: BusinessDocumentMessageHeader. The MessageHeader can include the following elements: ID, ReferenceID, and CreationDateTime. The MessageID can be set by the sending application. With the ReferencedMessageID, reference can be made in the current BusinessDocument to a previous BusinessDocument.

The ManufacturingWorkOrder package can group a work order with its packages. The ManufacturingWorkOrder package includes the ManufacturingWorkOrder entity and the Item package. A ManufacturingWorkOrder can be an order from a customer to a supplier which specifies how to manufacture the product(s) included within. ManufacturingWorkOrder can include the ID element. ID can be an identifier for a ManufacturingWorkOrder. ID can be based on GDT: BusinessTransactionDocumentID.

The Item package can group an item with its packages. The Item package includes the Item entity and the BusinessTransactionDocumentReference package. Item is a manufacturing work order which specifies how to manufacture the product(s) included within. Item can include ID. ID can be a unique identifier of a ManufacturingWorkOrderItem. ID can be based on GDT: Business TransactionDocumentItemID.

A BusinessTransactionDocumentReference package can group information needed to identify a purchase order item based on which work order was created. The BusinessTransactionDocumentReference package includes the PurchaseOrderReference entity. A PurchaseOrderReference can specify a purchase order and corresponding purchase order item based on which ManufacturingWorkOrder was created. PurchaseOrderReference can be of type GDT BusinessTransactionDocumentReference. Of the elements of the GDT: BusinessDocumentReference, the elements ID and ItemID can be provided.

FundsCommitmentDocument Interfaces

The ES Bundle includes Enterprise Services to reflect commitment chains and block budget for certain activities. In doing so, you can, on the one hand, take expected revenues into account and the incoming budget funds linked to them. On the other hand, you can earmark the appropriate funds for expected expenditures, for which the exact application of funds does not have to be known.

The FundsCommitmentDocument interface can perform various operations, namely a FundsCommitmentDocumentERPCreateRequestConfirmation, a FundsCommitmentDocumentERPBasicDataByBasicDataQueryResponse, a FundsCommitmentDocumentERPByIDQueryResponse, a FundsCommitmentDocumentERPUpdateRequestConfirmation, and a FundsCommitmentDocumentERPCompleteRequestConfirmation. The FundsCommitmentDocumentERPCreateRequestConfirmation operation can handle a Request and Confirmation to create a Funds Commitment Document to Funds Commitment Processing. An Employee can request a creation of a Funds Commitment Document to Funds Commitment Processing.

The FundsCommitmentDocumentERPCreateRequestConfirmation operation includes various message types, namely a FundsCommitmentDocumentERPCreateRequest_sync and a FundsCommitmentDocumentERPCreateConfirmation_sync. The structure of the FundsCommitmentDocumentERPCreateRequest_sync message type can be specified by a FundsCommitmentDocumentERPCreateRequestMessage_sync message data type. The structure of the FundsCommitmentDocumentERPCreateConfirmation_sync message type can be specified by a FundsCommitmentDocumentERPCreateConfirmationMessage_sync message data type. The FundsCommitmentDocumentERPBasicDataByBasicDataQueryResponse operation can handle a query to and response from Funds Commitment processing to supply Funds Commitment Documents identifying elements that satisfy the selection criteria specified in the query.

An Employee can request a list of Funds Commitment Documents identifying information that satisfy a specified selection criteria. The FundsCommitmentDocumentERPBasicDataByBasicDataQueryResponse operation includes various message types, namely a FundsCommitmentDocumentERPBasicDataByBasicDataQuery_sync and a FundsCommitmentDocumentERPBasicDataByBasicDataResponse_sync. The structure of the FundsCommitmentDocumentERPBasicDataByBasicDataQuery_sync message type can be specified by a FundsCommitmentDocumentERPBasicDataByBasicDataQueryMessage_sync message data type.

The structure of the FundsCommitmentDocumentERPBasicDataByBasicDataResponse_sync message type can be specified by a FundsCommitmentDocumentERPBasicDataByBasicDataResponseMessage_sync message data type. The FundsCommitmentDocumentERPByIDQueryResponse operation can handle a query to and response from Funds Commitment Processing to supply detailed Funds Commitment Document information. An Employee can request detailed information about a Funds Commitment Document. The FundsCommitmentDocumentERPByIDQueryResponse operation includes various message types, namely a FundsCommitmentDocumentERPByIDQuery_sync and a FundsCommitmentDocumentERPByIDResponse_sync.

The structure of the FundsCommitmentDocumentERPByIDQuery_sync message type can be specified by a FundsCommitmentDocumentERPByIDQueryMessage_sync message data type. The structure of the FundsCommitmentDocumentERPByIDResponse_sync message type can be specified by a FundsCommitmentDocumentERPByIDResponseMessage_sync message data type. The FundsCommitmentDocumentERPUpdateRequestConfirmation operation can handle a Request and Confirmation to update a Funds Commitment Document to Funds Commitment Processing. An Employee can request an update of a Funds Commitment Document to Funds Commitment Processing.

The FundsCommitmentDocumentERPUpdateRequestConfirmation operation includes various message types, namely a FundsCommitmentDocumentERPUpdateRequest_sync and a FundsCommitmentDocumentERPUpdateConfirmation_sync. The structure of the FundsCommitmentDocumentERPUpdateRequest_sync message type can be specified by a FundsCommitmentDocumentERPUpdateMessage_sync message data type. The structure of the FundsCommitmentDocumentERPUpdateConfirmation_sync message type can be specified by a FundsCommitmentDocumentERPUpdateConfirmationMessage_sync message data type. The FundsCommitmentDocumentERPCompleteRequestConfirmation operation can handle a Request and Confirmation to complete a Funds Commitment Document to Funds Commitment Processing. An Employee can request the completion of a Funds Commitment Document to Funds Commitment Processing.

The FundsCommitmentDocumentERPCompleteRequestConfirmation operation includes various message types, namely a FundsCommitmentDocumentERPCompleteRequest_sync and a FundsCommitmentDocumentERPCompleteConfirmation_sync. The structure of the FundsCommitmentDocumentERPCompleteRequest_sync message type can be specified by a FundsCommitmentDocumentERPCompleteMessage_sync message data type. The structure of the FundsCommitmentDocumentERP-CompleteConfirmation_sync message type can be specified by a FundsCommitmentDocumentERP-CompleteConfirmationMessage_sync message data type.

Figure 41:
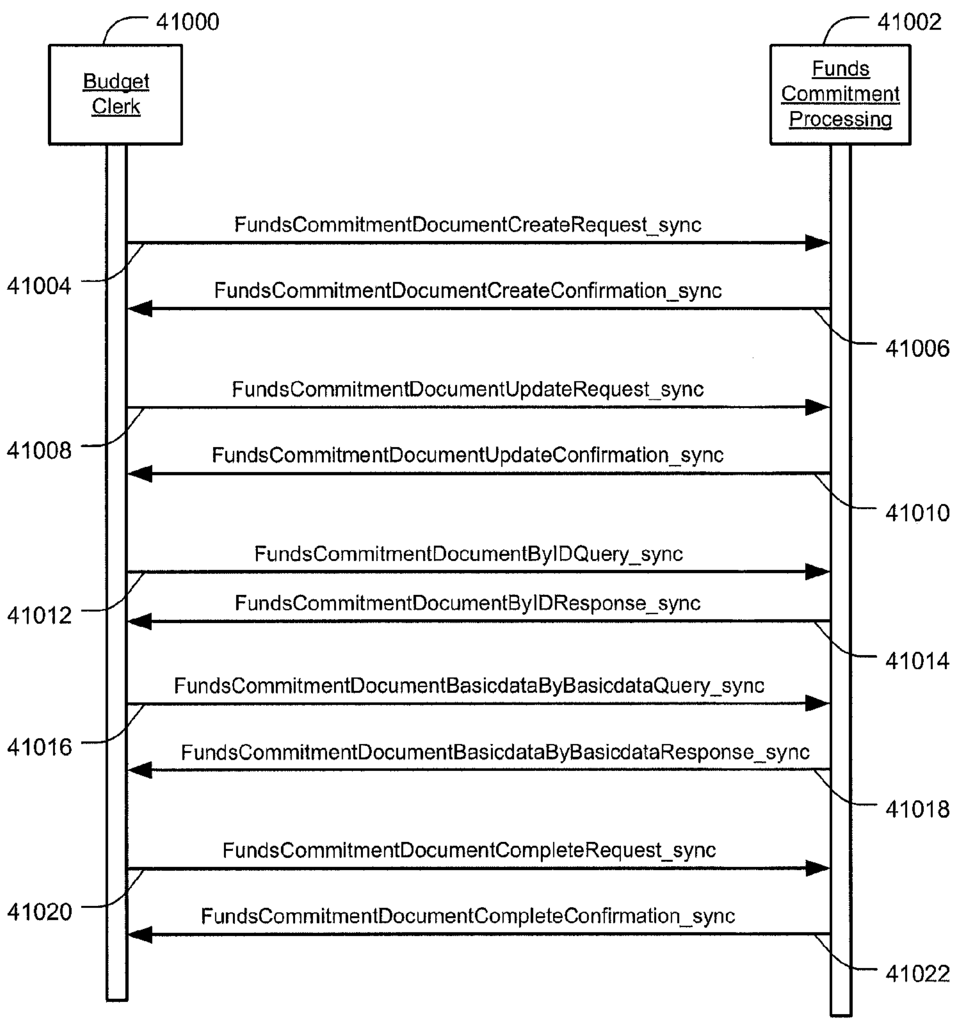
FIG. 41 shows an exemplary FundsCommitmentDocument Message Choreography.

The message choreography of FIG. 41 describes a possible logical sequence of messages that can be used to realize a Funds Commitment business scenario. A "Budget Clerk" system 41000 can request the creation of a funds commitment document, using a FundsCommitmentDocumentCreateRequest_sync message 41004 as shown, for example in FIG. 41. A "Funds Commitment Processing" system 41002 can confirm the creation, using a FundsCommitmentDocument-CreateConfirmation_sync message 41006 as shown, for example, in FIG. 41.

The "Budget Clerk" system 41000 can request an update of a funds commitment document, using a FundsCommitment-DocumentUpdateRequest_sync message 41008 as shown, for example, in FIG. 41. The "Funds Commitment Processing" system 41002 can confirm the update, using the FundsCommitmentDocumentUpdateConfirmation_sync message 41010 as shown, for example, in FIG. 41.

The "Budget Clerk" system 41000 can query the "Funds Commitment Processing" system 41002, for a funds commitment document by ID, using a FundsCommitmentDocument-ByIDQuery_sync message 41012 as shown, for example, in FIG. 41. The "Funds Commitment Processing" system 41002 can respond to the query, using the FundsCommitmentDocumentByIDResponse_sync message 41014 as shown, for example, in FIG. 41.

The "Budget Clerk" system 41000 can query the "Funds Commitment Processing" system 41002, for a funds commitment document basic data by basic data, using a FundsCommitmentDocumentBasicdataByBasicdataQuery_sync message 41016 as shown, for example, in FIG. 41. The "Funds Commitment Processing" system 41002 can respond to the query, using the FundsCommitmentDocumentBasic-DataByBasicdataResponse_sync message 41018 as shown, for example, in FIG. 41.

The "Budget Clerk" system 41000 can request the completion of a funds commitment document, using a FundsCommitmentDocumentCompleteRequest_sync message 41020 as shown, for example, in FIG. 41. The "Funds Commitment Processing" system 41002 can confirm the request, using the FundsCommitmentDocumentCompleteConfirmation_sync message 41022 as shown, for example, in FIG. 41.

Figure 42:
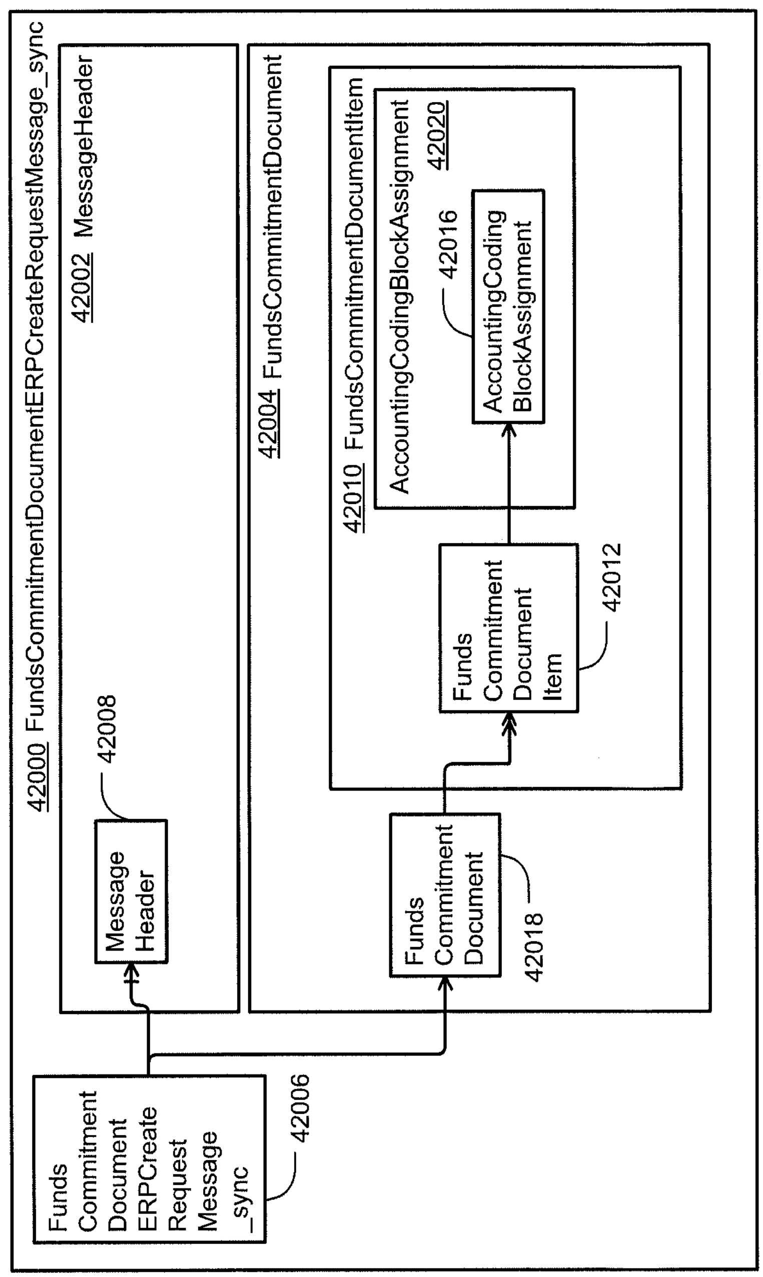
FIG. 42 shows an exemplary FundsCommitmentDocumentERPCreateRequestMessage_sync Message Data Type.

FIG. 42 illustrates one example logical configuration of FundsCommitmentDocumentERPCreateRequestMessage_sync message 42000. Specifically, this figure depicts the arrangement and hierarchy of various components such as one or more levels of packages, entities, and datatypes, shown here as 42002 through 42020. As described above, packages may be used to represent hierarchy levels. Entities are discrete business elements that are used during a business transaction. Data types are used to type object entities and interfaces with a structure. For example, FundsCommitmentDocumentERPCreateRequestMessage_sync message 42000 includes, among other things, FundsCommitmentDocument 42018. Accordingly, heterogeneous applications may communicate using this consistent message configured as such.

Figure 43:
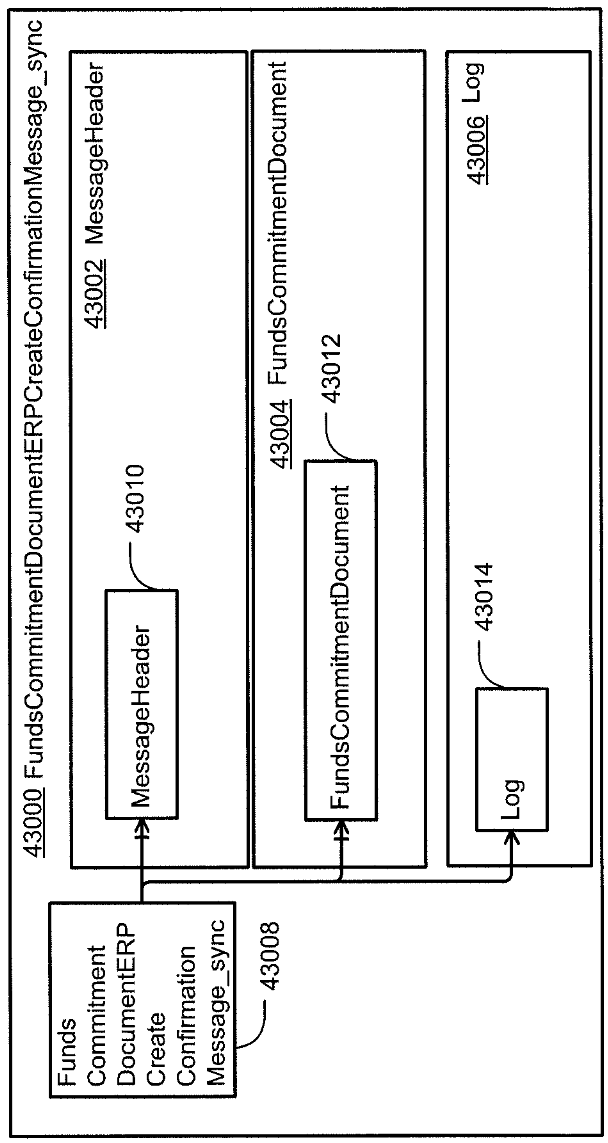
FIG. 43 shows an exemplary FundsCommitmentDocumentERPCreateConfirmationMessage_sync Message Data Type.

Additionally, FIG. 43 illustrates one example logical configuration of FundsCommitmentDocumentERPCreateConfirmationMessage_sync message 43000. Specifically, this figure depicts the arrangement and hierarchy of various components such as one or more levels of packages, entities, and datatypes, shown here as 43002 through 43014. As described above, packages may be used to represent hierarchy levels. Entities are discrete business elements that are used during a business transaction. Data types are used to type object entities and interfaces with a structure. For example, FundsCommitmentDocumentERPCreateConfirmationMessage_sync message 43000 includes, among other things, FundsCommitmentDocument 43012. Accordingly, heterogeneous applications may communicate using this consistent message configured as such.

Figure 44:
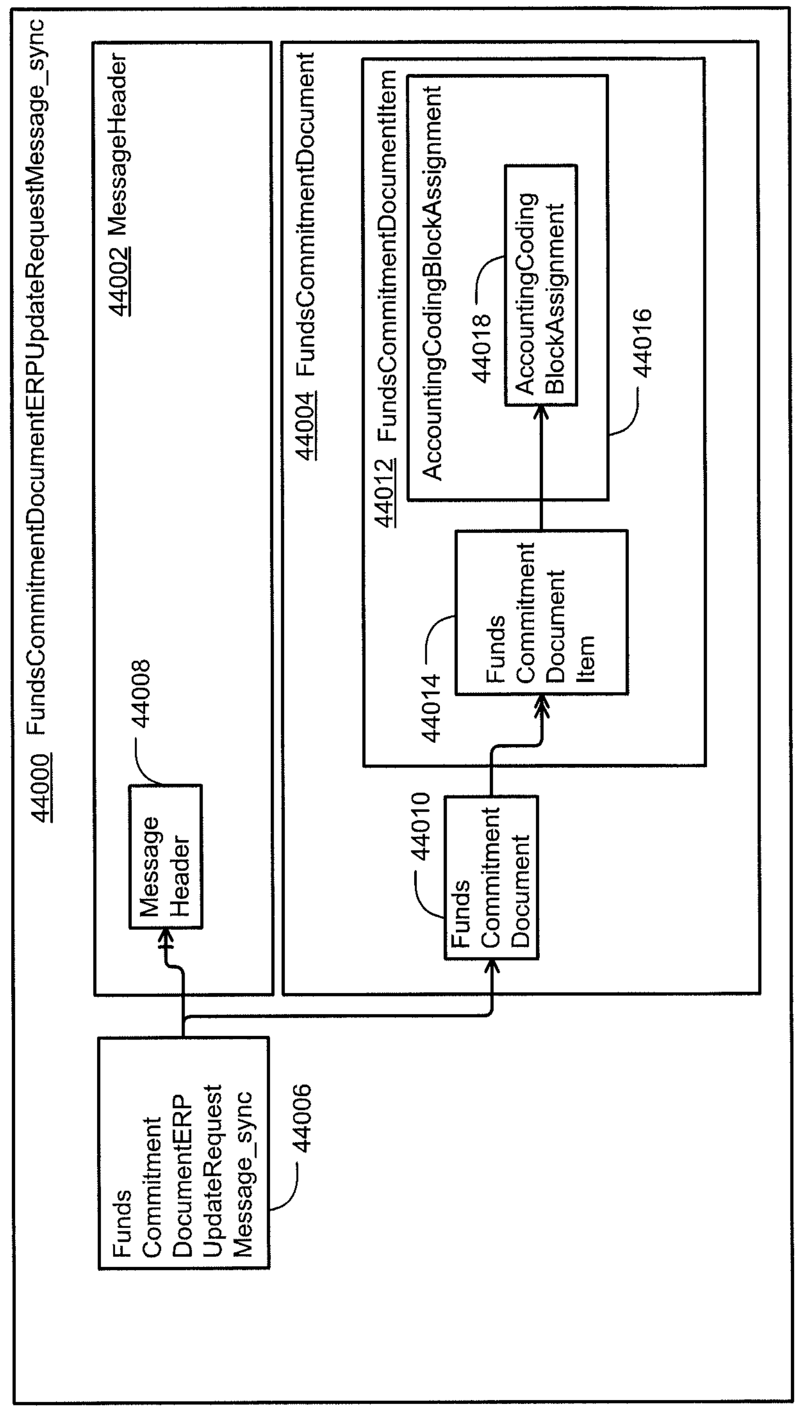
FIG. 44 shows an exemplary FundsCommitmentDocumentERPUpdateRequestMessage_sync Message Data Type.

Additionally, FIG. 44 illustrates one example logical configuration of FundsCommitmentDocumentERPUpdateRequestMessage_sync message 44000. Specifically, this figure depicts the arrangement and hierarchy of various components such as one or more levels of packages, entities, and datatypes, shown here as 44002 through 44018. As described above, packages may be used to represent hierarchy levels. Entities are discrete business elements that are used during a business transaction. Data types are used to type object entities and interfaces with a structure. For example, FundsCommitmentDocumentERPUpdateRequestMessage_sync message 44000 includes, among other things, FundsCommitmentDocumentItem 44014. Accordingly, heterogeneous applications may communicate using this consistent message configured as such.

Figure 45:
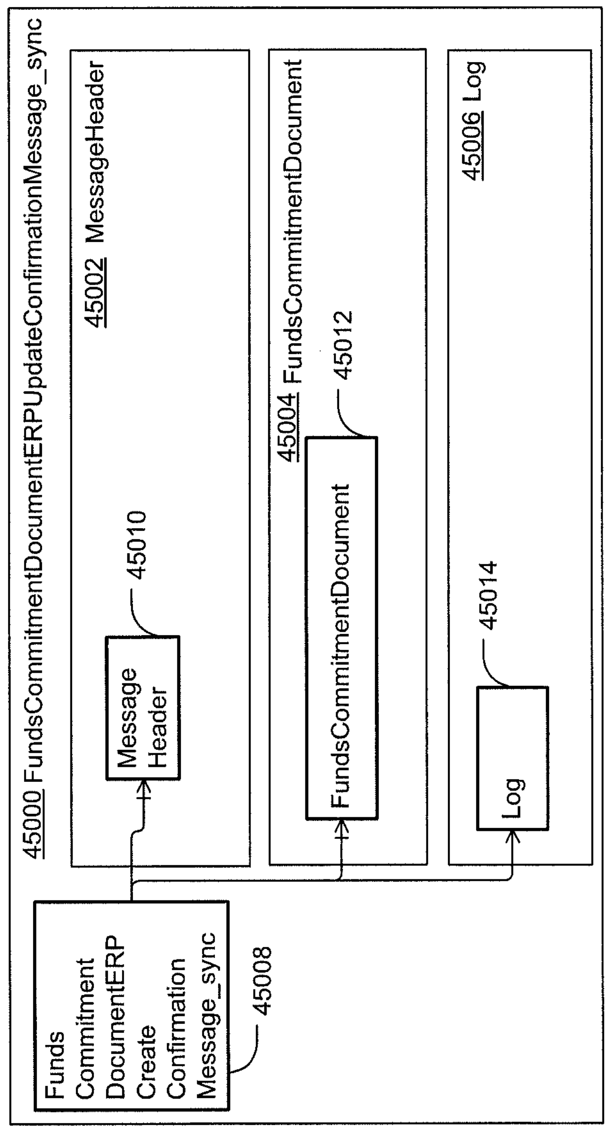
FIG. 45 shows an exemplary FundsCommitmentDocumentERPUpdateConfirmationMessage_sync Message Data Type.

Additionally, FIG. 45 illustrates one example logical configuration of FundsCommitmentDocumentERPUpdateConfirmationMessage_sync message 45000. Specifically, this figure depicts the arrangement and hierarchy of various components such as one or more levels of packages, entities, and datatypes, shown here as 45002 through 45014. As described above, packages may be used to represent hierarchy levels. Entities are discrete business elements that are used during a business transaction. Data types are used to type object entities and interfaces with a structure. For example, FundsCommitmentDocumentERPUpdateConfirmationMessage_sync message 45000 includes, among other things, FundsCommitmentDocument 45012. Accordingly, heterogeneous applications may communicate using this consistent message configured as such.

Figure 46:
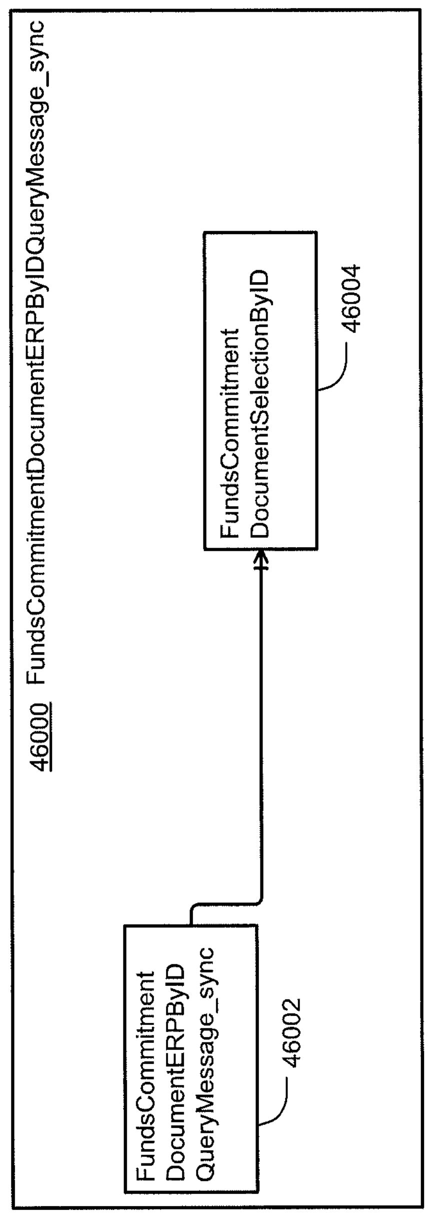
FIG. 46 shows an exemplary FundsCommitmentDocumentERPByIDQueryMessage_sync Message Data Type.

Additionally, FIG. 46 illustrates one example logical configuration of FundsCommitmentDocumentERPByIDQueryMessage_sync message 46000. Specifically, this figure depicts the arrangement and hierarchy of various components such as one or more levels of packages, entities, and datatypes, shown here as 46002 through 46004. As described above, packages may be used to represent hierarchy levels. Entities are discrete business elements that are used during a business transaction. Data types are used to type object entities and interfaces with a structure. For example, FundsCommitmentDocumentERPByIDQueryMessage_sync message 46000 includes, among other things, FundsCommitment-DocumentSelectionByID 46004. Accordingly, heterogeneous applications may communicate using this consistent message configured as such.

Figure 47:
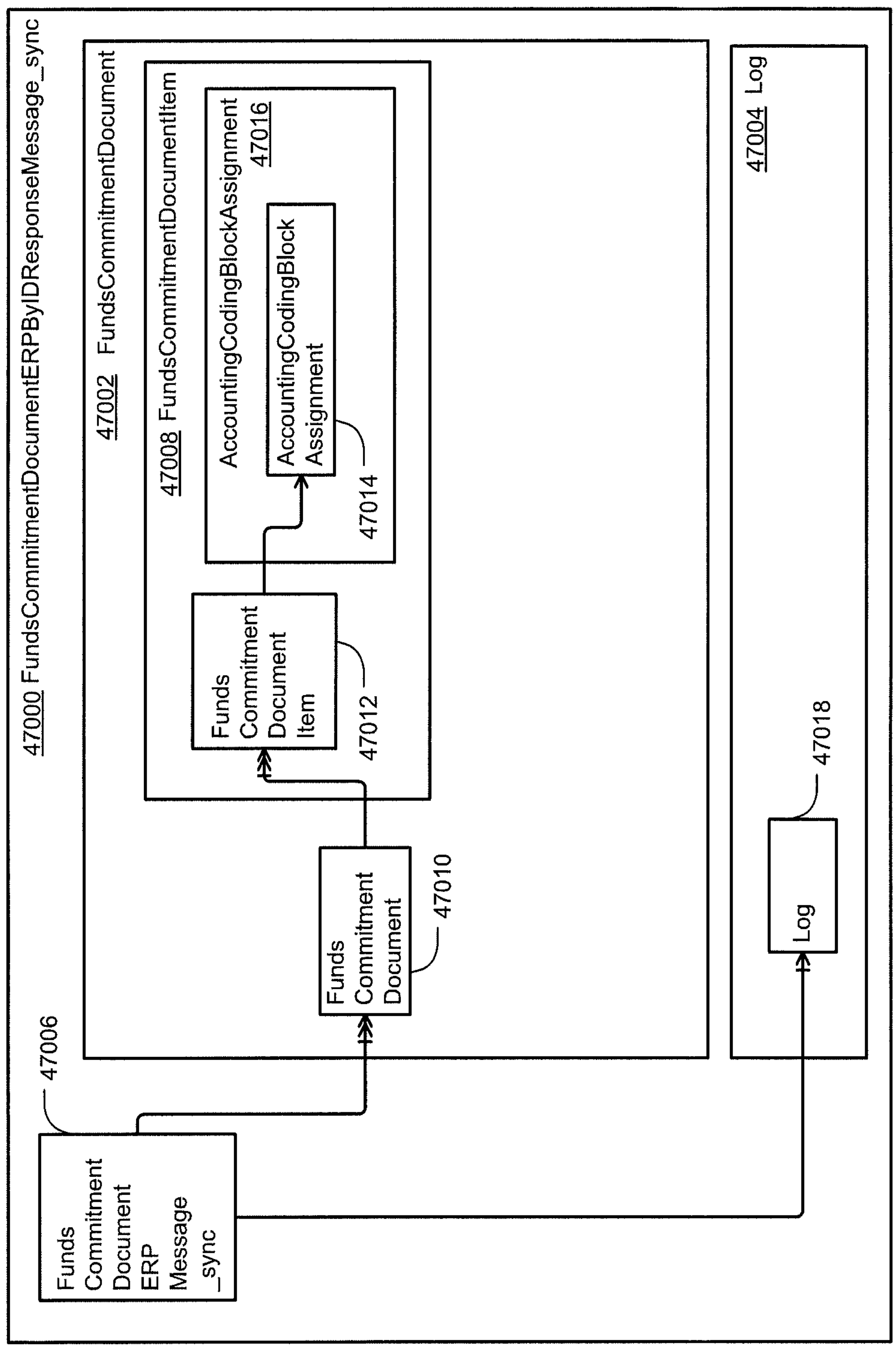
FIG. 47 shows an exemplary FundsCommitmentDocumentERPByIDResponseMessage_sync Message Data Type.

Additionally, FIG. 47 illustrates one example logical configuration of FundsCommitmentDocumentERPByIDResponseMessage_sync message 47000. Specifically, this figure depicts the arrangement and hierarchy of various components such as one or more levels of packages, entities, and datatypes, shown here as 47002 through 47018. As described above, packages may be used to represent hierarchy levels. Entities are discrete business elements that are used during a business transaction. Data types are used to type object entities and interfaces with a structure. For example, FundsCommitmentDocumentERPByIDResponseMessage_sync message 47000 includes, among other things, AccountingCodingBlockAssignment 47016. Accordingly, heterogeneous applications may communicate using this consistent message configured as such.

Figure 48:
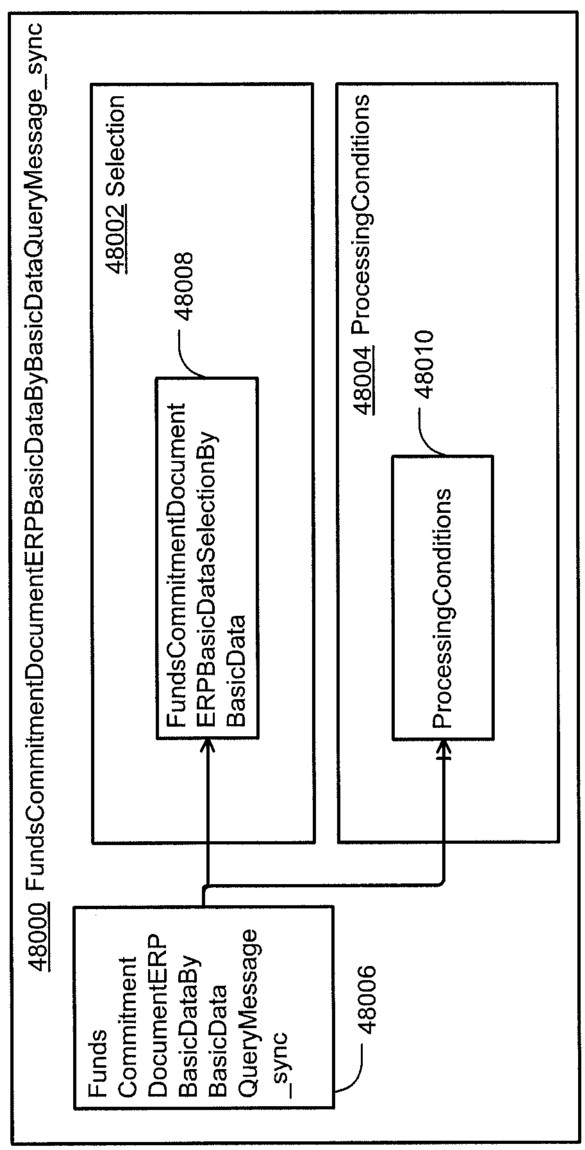
FIG. 48 shows an exemplary FundsCommitmentDocumentERPBasicDataByBasicDataQueryMessage_sync Message Data Type.

Additionally, FIG. 48 illustrates one example logical configuration of FundsCommitmentDocumentERPBasicDataByBasicDataQueryMessage_sync message 48000. Specifically, this figure depicts the arrangement and hierarchy of various components such as one or more levels of packages, entities, and datatypes, shown here as 48002 through 48010. As described above, packages may be used to represent hierarchy levels. Entities are discrete business elements that are used during a business transaction. Data types are used to type object entities and interfaces with a structure. For example, FundsCommitmentDocumentERPBasicDataByBasicDataQueryMessage_sync message 48000 includes, among other things, FundsCommitmentDocumentERPBasicDataSelectionByBasicData 48008. Accordingly, heterogeneous applications may communicate using this consistent message configured as such.

Figure 49:
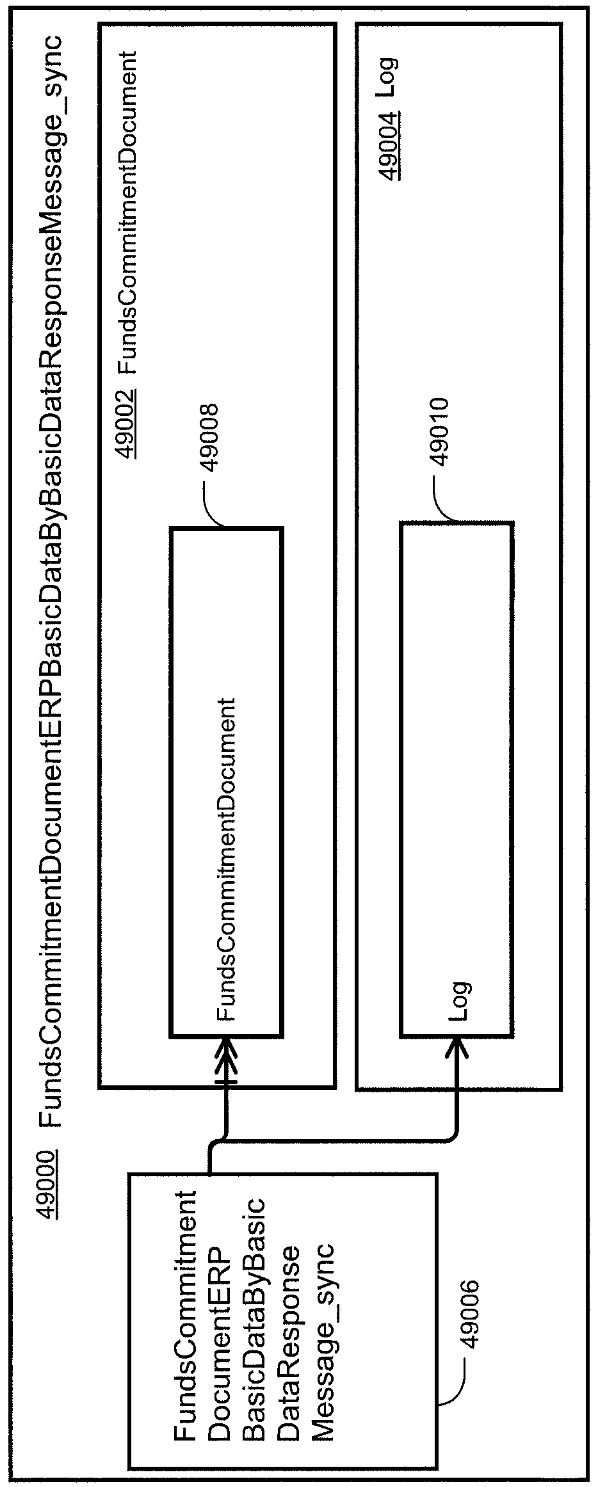
FIG. 49 shows an exemplary FundsCommitmentDocumentERPBasicDataByBasicDataResponseMessage_sync Message Data Type.

Additionally, FIG. 49 illustrates one example logical configuration of FundsCommitmentDocumentERPBasicDataByBasicDataResponseMessage_sync message 49000. Specifically, this figure depicts the arrangement and hierarchy of various components such as one or more levels of packages, entities, and datatypes, shown here as 49002 through 49010. As described above, packages may be used to represent hierarchy levels. Entities are discrete business elements that are used during a business transaction. Data types are used to type object entities and interfaces with a structure. For example, FundsCommitmentDocumentERPBasicDataByBasicDataResponseMessage_sync message 49000 includes, among other things, FundsCommitmentDocument 49008. Accordingly, heterogeneous applications may communicate using this consistent message configured as such.

Figure 50:
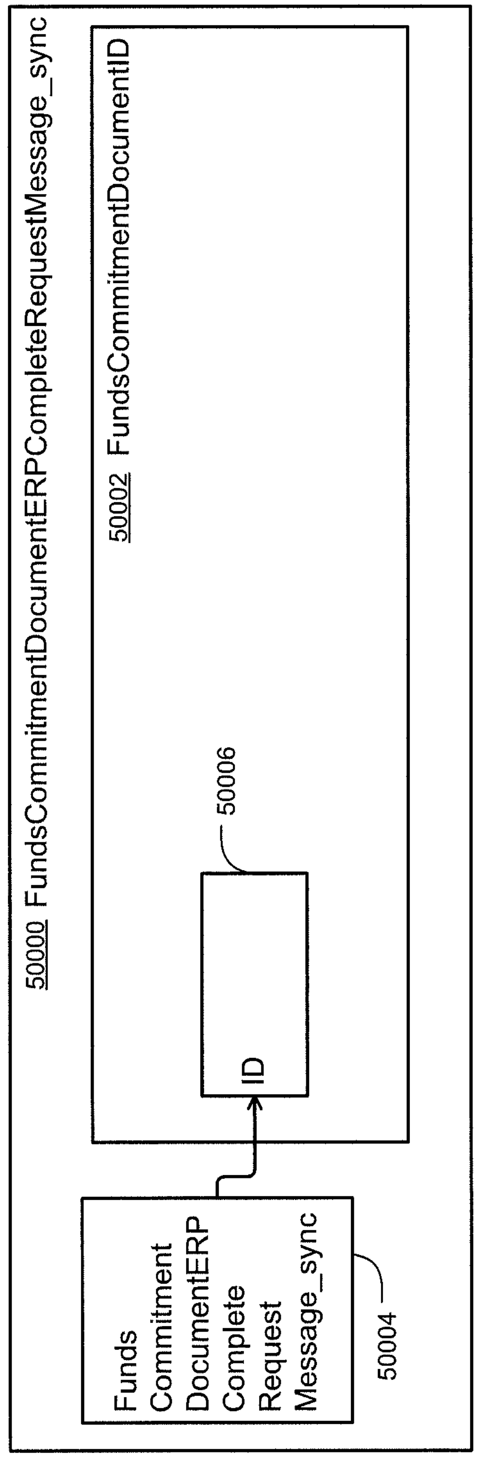
FIG. 50 shows an exemplary FundsCommitmentDocumentERPCompleteRequestMessage_sync Message Data Type.

Additionally, FIG. 50 illustrates one example logical configuration of FundsCommitmentDocumentERPCompleteRequestMessage_sync message 50000. Specifically, this figure depicts the arrangement and hierarchy of various components such as one or more levels of packages, entities, and datatypes, shown here as 50002 through 50006. As described above, packages may be used to represent hierarchy levels. Entities are discrete business elements that are used during a business transaction. Data types are used to type object entities and interfaces with a structure. For example, FundsCommitmentDocumentERPCompleteRequestMessage_sync message 50000 includes, among other things, FundsCommitmentDocumentERPCompleteRequestMessage_sync 50004. Accordingly, heterogeneous applications may communicate using this consistent message configured as such.

Figure 51:
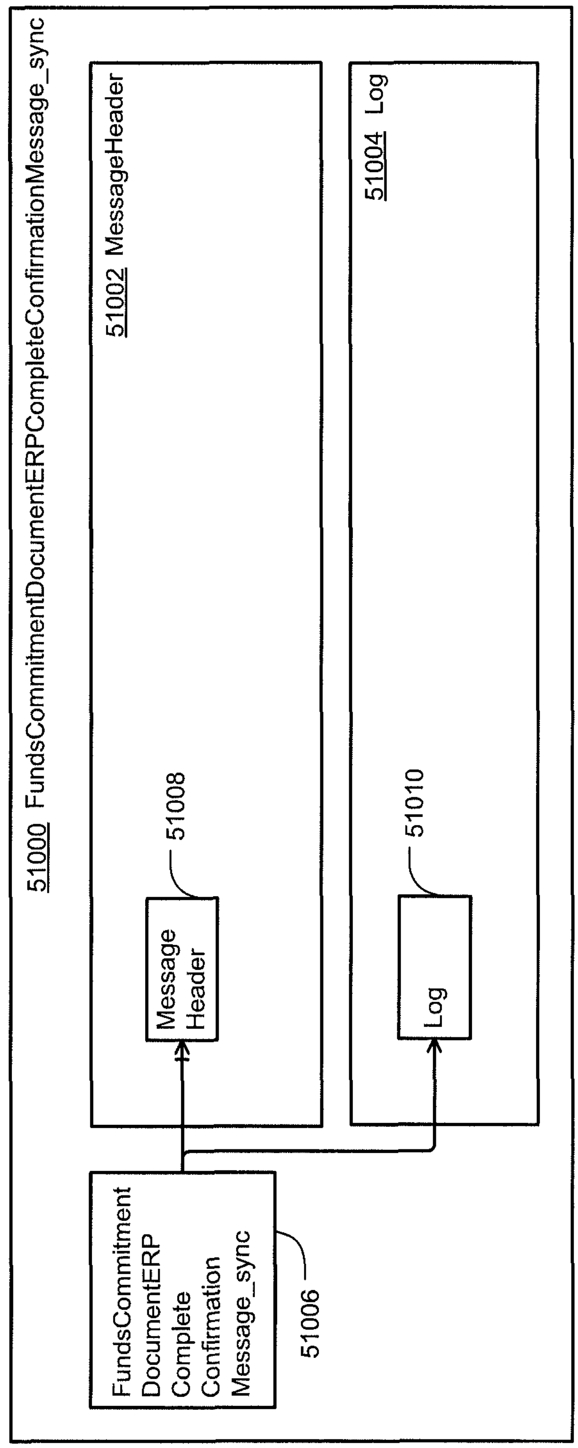
FIG. 51 shows an exemplary FundsCommitmentDocumentERPCompleteConfirmationMessage_sync Message Data Type.

Additionally, FIG. 51 illustrates one example logical configuration of FundsCommitmentDocumentERPCompleteConfirmationMessage_sync message 51000. Specifically, this figure depicts the arrangement and hierarchy of various components such as one or more levels of packages, entities, and datatypes, shown here as 51002 through 51010. As described above, packages may be used to represent hierarchy levels. Entities are discrete business elements that are used during a business transaction. Data types are used to type object entities and interfaces with a structure. For example, FundsCommitmentDocumentERPCompleteConfirmationMessage_sync message 51000 includes, among other things, Log 51010. Accordingly, heterogeneous applications may communicate using this consistent message configured as such.

FIGS. 52-1 through 52-10 show an example configuration of an Element Structure that includes a FundsCommitmentDocumentERPMessage_sync 52000 package. The FundsCommitmentDocumentERPMessage_sync 52000 package is a <MessageDataType> 52004 data type. The FundsCommitmentDocumentERPMessage_sync 52000 package includes a FundsCommitmentDocumentERPMessage_sync_V1 52002 entity. The FundsCommitmentDocumentERPMessage_sync 52000 package includes various packages, namely a MessageHeader 52006, a FundsCommitmentDocument 52012, a ProcessingConditions 52240 and a Log 52250.

The MessageHeader 52006 package can be a NOSC_BasicBusinessDocumentMessageHeader 52010 data type. The MessageHeader 52006 package includes a MessageHeader 52008 entity.

The BasicBusinessDocumentMessageHeader can be a collection of identification data of an instance of a business document message, or reference data to another instance of a business document message, or both. The subject of the identification data can be a message instance that conveys them, whereas the reference data can be related to a different message instance previously exchanged between the same interaction parties.

The FundsCommitmentDocument 52012 package includes a FundsCommitmentDocument 52014 entity. The FundsCommitmentDocument 52012 package includes an Item 52096 package. The FundsCommitmentDocument 52014 entity includes various attributes, namely an ItemListCompleteTransmissionIndicator 52016, an ID 52020, a CompanyID 52024, a FundsManagementAreaID 52028, a ChangeStateID 52032, a CategoryCode 52036, a PostingStatusCode 52040, a TypeCode 52044, an ApprovedIndicator 52048, a CompletedIndicator 52052, a ConsumptionAllowedIndicator 52056, a ManualChangeAllowedIndicator 52060, an ExchangeRate 52064, a CategoryName 52068, a PostingStatusName 52072, a TypeName 52076, a Date 52080, a PostingDate 52084, a BusinessTransactionDocumentReference 52088 and a Note 52092.

The ItemListCompleteTransmissionIndicator 52016 attribute can be an Indicator 52018 data type. The ID 52020 attribute can be a NOSCFundsCommitmentDocumentID 52022 data type. The CompanyID 52024 attribute can be a NOSC_CompanyID 52026 data type. The CompanyID can be an identifier for a company. The FundsManagementAreaID 52028 attribute can be a NOSCFundsManagementAreaID 52030 data type. The ChangeStateID 52032 attribute can be a ChangeStateID 52034 data type. The ChangeStateID can be a unique Identifier for a change state. The CategoryCode 52036 attribute can be a FundsCommitmentDocumentCategoryCode 52038 data type. The FundsCommitmentDocumentCategoryCode can be a coded representation of a Funds Commitment document category. The PostingStatusCode 52040 attribute can be a PostingStatusCode 52042 data type. The allowed PostingStatusCode values include Posted, Not Posted, and Cancelled. The TypeCode 52044 attribute can be a NOSC_FundsCommitmentDocumentTypeCode 52046 data type. The BusinessTransactionDocumentTypeCode can be a coded representation of the document type that occurs in business transactions. The document Type can describe the business nature of similar documents and can define the basic features of this type of documents. The ApprovedIndicator 52048 attribute can be an Indicator 52050 data type. The CompletedIndicator 52052 attribute can be an Indicator 52054 data type. The CompletedIndicator can be information on whether an object is completed in a business sense or not. The ConsumptionAllowedIndicator 52056 attribute can be an Indicator 52058 data type. The ConsumptionAllowedIndicator can specify whether something is blocked from consumption perspective or not. The ManualChangeAllowedIndicator 52060 attribute can be an Indicator 52062 data type.

The ManualChangeAllowedIndicator can be used to decide whether a line item could be changed manually or not. The ExchangeRate 52064 attribute can be an ExchangeRate 52066 data type. This can designate the exchange rate between local currency and currency of ItemAmounts (transaction currency). The CategoryName 52068 attribute can be a FundsCommitmentDocumentCategoryName 52070 data type. The FundsCommitmentDocumentCategoryName can be a natural-language comment on a FundsCommitmentDocumentCategoryCode. The PostingStatusName 52072 attribute can be a PostingStatusName 52074 data type. The PostingStatusName can be a natural-language comment on a PostingStatusCode. The TypeName 52076 attribute can be a FundsCommitmentDocumentTypeName 52078 data type.

The FundsCommitmentDocumentTypeName can be a natural-language comment on a FundsCommitmentDocumentTypeCode. The Date 52080 attribute can be a Date 52082 data type. The Date can be used when entering the document in Financial Accounting or Controlling. The PostingDate 52084 attribute can be a Date 52086 data type. The Date can be used when entering the document in Financial Accounting or Controlling. The BusinessTransactionDocumentReference 52088 attribute can be a NOSC_BusinessTransactionDocumentReference 52090 data type. The reference document number can be used as a search criterion when displaying or changing documents. In correspondence, the reference document number can be printed in place of the document number. The Note 52092 attribute can be a Note 52094 data type. The Note can be a natural-language comment on a situation or subject.

The Item 52096 package includes an Item 52098 entity. The Item 52096 package includes an AccountingCodingBlockAssignment 52188 package. The Item 52098 entity includes various attributes, namely an ActionCode 52100, an ID 52104, a ChangeStateID 52108, a PredecessorFundsCommitmentDocumentReference 52112, an AccountingCodingBlockAssignmentChangeAllowedIndicator 52116, an ApprovedIndicator 52120, a CompletedIndicator 52124, a ConsumptionAllowedIndicator 52128, a DeletedIndicator 52132, an ExceedWithoutLimitAllowedIndicator 52136, a GlobalToleranceOverrideAllowedIndicator 52140, a ManualChangeAllowedIndicator 52144, a PredecessorFundsCommitmentDocumentItemCompletedIndicator 52148, an UpdateRelevanceIndicator 52152, a DueDate 52156, a SystemAdministrativeData 52160, a ReservedTransactionCurrencyAmount 52164, a ReservedLocalCurrencyAmount 52168, an OpenTransactionCurrencyAmount 52172, an OpenLocalCurrencyAmount 52176, an AmountOverdrawingTolerancePercent 52180 and a Note 52184.

The ActionCode 52100 attribute is an actionCode 52102 data type. The ID 52104 attribute can be a FundsCommitmentDocumentItemID 52106 data type. The FundsCommitmentDocumentItemID can be a unique identifier of an item of a funds commitment document. The ChangeStateID 52108 attribute can be a ChangeStateID 52110 data type. The ChangeStateID can be a unique identifier for a change state. The PredecessorFundsCommitmentDocumentReference 52112 attribute can be a NOSC_BusinessTransactionDocumentReference 52114 data type. The reference can be to a FundsCommitment Document (in some implementations, only ID and item ID are supported). The AccountingCodingBlockAssignmentChangeAllowedIndicator 52116 attribute can be an Indicator 52118 data type. If this indicator is set, consuming documents can have a different account assignment from that in the document on which they draw. The ApprovedIndicator 52120 attribute can be an Indicator 52122 data type. The ApprovedIndicator can be used to display whether the item has been approved or not. The CompletedIndicator 52124 attribute can be an Indicator 52126 data type.

The Indicator can flag a document item as complete. If this indicator is set, the funds reservation commitment is reduced in full, regardless of whether the full amount of the reservation has actually been used. The completed item is still displayed and cannot be changed. The completion indicator can be reset. The ConsumptionAllowedIndicator 52128 attribute can be an Indicator 52130 data type. The ConsumptionAllowedIndicator can specify whether something is blocked from a consumption perspective or not. The DeletedIndicator 52132 attribute can be an Indicator 52134 data type. The DeletedIndicator can be used to display whether the item has been logically deleted.

The ExceedWithoutLimitAllowedIndicator 52136 attribute can be an Indicator 52138 data type. The Indicator can indicate that the reserved amount can be exceeded by the consumption document as much as you want. The GlobalToleranceOverrideAllowedIndicator 52140 attribute can be an Indicator 52142 data type. The Indicator can stipulate that an overrun tolerance defined in the document overrides the settings in Customizing for percentage-based tolerance limits. The ManualChangeAllowedIndicator 52144 attribute can be an Indicator 52146 data type. The ManualChangeAllowedIndicator can be used to decide whether a line item could be change manually or not.

The PredecessorFundsCommitmentDocumentItemCompletedIndicator 52148 attribute can be an Indicator 52150 data type. If the current document references earmarked funds, the effect of this indicator is to reduce the earmarked funds in full from this document. If the earmarked funds are not cleared in full by the document, the amount still bound is released again. The UpdateRelevanceIndicator 52152 attribute can be an Indicator 52154 data type. The Indicator can define if the earmarked funds are only updated statistically. No budget is preposted. Other documents, such as invoices, can refer to earmarked funds that are flagged as statistical. The earmarked funds is reduced and the budget is debited accordingly. The DueDate 52156 attribute can be a Date 52158 data type. By entering a due date, you can stipulate the time (period and fiscal year) as of which the budget is committed. This date can be a controlling character.

The SystemAdministrativeData 52160 attribute can be a DATE_SystemAdministrativeData 52162 data type. The SystemAdministrativeData can be administrative data that is stored in a system. This data includes system users and change dates/times. The ReservedTransactionCurrencyAmount 52164 attribute can be an Amount 52166 data type. The Amount can be a Reserved Amount in the transaction currency. The ReservedLocalCurrencyAmount 52168 attribute can be an Amount 52170 data type. The Amount can be a Reserved Amount in the local currency of a company.

The OpenTransactionCurrencyAmount 52172 attribute can be an Amount 52174 data type. The Amount can be an Open Amount in the transaction currency. The OpenLocalCurrencyAmount 52176 attribute can be an Amount 52178 data type. The Amount can be an Open Amount in the local currency. The AmountOverdrawingTolerancePercent 52180 attribute can be a Percent 52182 data type. This can define the percentage value up to which reduction using other documents may exceed the amount in an earmarked funds item. The Note 52184 attribute can be a Note 52186 data type. The Note can be a natural-language comment on a situation or subject.

The AccountingCodingBlockAssignment 52188 package includes an AccountingCodingBlockAssignment 52190 entity. The AccountingCodingBlockAssignment 52190 entity includes various attributes, namely a CostCentreID 52192, a FundsManagementCentreID 52196, a ProjectReference 52200, an InternalOrderID 52204, an IndividualMaterialID 52208, a FundsManagementFundID 52212, a FundsManagementFunctionalAreaID 52216, a FundsManagementAccountID 52220, a FundsManagementProgramID 52224, a GrantID 52228, an AccountDeterminationExpenseGroupCode 52232 and an AccountingBusinessAreaCode 52236.

The CostCentreID 52192 attribute can be a NOSC_CostCentreID 52194 data type. The CostCentreID can be an identifier for a cost center. A CostCentre can be an organizational unit that represents a clearly defined location at which costs arise and for which costs are recorded separately. The definition can be based on functional requirements, allocation criteria, physical location, and cost responsibility. The FundsManagementCentreID 52196 attribute can be a NOSC_FundsManagementCentreID 52198 data type. The FundsManagementCentreID can be a unique identifier for a Funds Management Centre. A Funds Management Centre can be an organizational unit in Funds Management.

The ProjectReference 52200 attribute can be a NOSC_ProjectReference 52202 data type. The ProjectReference can be a unique reference to a project or to an element within a project. A ProjectPurchaseRequestType can represent a particular processing step for a project purchase request, as documented in the business transaction document. A ProjectPurchaseRequestType can be used to group together ProjectPurchaseRequests according to the processing step. The InternalOrderID 52204 attribute can be a NOSC_InternalOrderID 52206 data type. An InternalOrderID can be an identifier for an internal order. An internal order can be used to monitor the costs, and in certain circumstances the revenues of an organization. It can be created to monitor the costs of a time-restricted job, to monitor the costs and if necessary, the revenues for performing an activity, or for the continual monitoring of costs.

The IndividualMaterialID 52208 attribute can be a NOSC_ProductID 52210 data type. A ProductID can be a unique identifier for a product. The FundsManagementFundID 52212 attribute can be a NOSC_FundsManagementFundID 52214 data type. A FundsManagementFundID can be a unique identifier for a Fund. A fund can be a separately identifiable source of monies that is budgeted and controlled for all expenditures and revenues in order to stay in budget. A fund can be an internal identification of the source of monies and can be categorized according to source and use such as governmental, enterprise, fiduciary.

A fund can additionally be used for the representation of grants or parts of grants for internal reporting purposes. In some implementations, Fund does not represent an organizational unit. The FundsManagementFunctionalAreaID 52216 attribute can be a NOSC_FundsManagementFunctionalAreaID 52218 data type. A FundsManagementFunctionalAreaID can be a unique identifier for a functional area within funds management. A functional area can represent a goal of an organization in Funds Management that is budgeted and controlled for all expenditures and revenues in order to stay in budget. A functional area can correspond to a task involved in achieving the organization goal, such as administration, public safety, education or research. In some implementations, Functional area does not represent an organizational unit. The purpose of Funds Management can be to budget all revenues and expenditures for individual areas of responsibility, to control future funds transactions in accordance with the distributed budget and to stop the budget being exceeded by any process which leads to a revenue or an expenditure.

The FundsManagementAccountID 52220 attribute can be a NOSC_FundsManagementAccountID 52222 data type. A FundsManagementAccountID can be a unique identifier for a Funds Management Account. A Funds Management Account can denote a grouping of revenues and expenditures by its nature.

The FundsManagementProgramID 52224 attribute can be a NOSC_FundsManagementProgramID 52226 data type. A FundsManagementProgramID can be a unique identifier for a Funds Management Program. A program in Funds Management can describe the operation breakdown of organization's goals into activities that are budgeted and controlled for all expenditures and revenues in order to stay in budget. The GrantID 52228 attribute can be a NOSC_GrantID 52230 data type. A GrantID can be a unique identifier for a Grant. A grant can be driven and monitored by the sponsor who provides the resource and for this purpose it can be represented according to the reporting requirements of the sponsor. A grant can be assigned to one or more funds for internal reporting purposes.

In some implementations, a grant does not represent an organizational unit. The AccountDeterminationExpenseGroupCode 52232 attribute can be an AccountDeterminationExpenseGroupCode 52234 data type. The AccountingBusinessAreaCode 52236 attribute can be a NOSC_AccountingBusinessAreaCode 52238 data type. The ProcessingConditions 52240 package can be a WITHOUT_LASTRETURNED_QueryProcessingConditions 52244 data type. The ProcessingConditions 52240 package includes various entities, namely a QueryProcessingConditions 52242 and a ResponseProcessingConditions 52246. The Log 52250 package can be a NOSC_Log 52254 data type. The Log 52250 package includes a Log 52252 entity.

Additionally, FIGS. 53-1 through 53-6 show an example configuration of an Element Structure that includes a FundsCommitmentDocumentERPCreateRequestMessage_sync 53000 package. The FundsCommitmentDocumentERPCreateRequestMessage_sync 53000 package includes a FundsCommitmentDocumentERPCreateRequestMessage_sync 53002 entity. The FundsCommitmentDocumentERPCreateRequestMessage_sync 53000 package includes various packages, namely a MessageHeader 53004, a FundsCommitmentDocument 53010 and a Figure.

The MessageHeader 53004 package includes a MessageHeader 53006 entity. The MessageHeader 53006 entity has a cardinality of 0 . . . 1 53008 meaning that for each instance of the MessageHeader 53004 package there may be one MessageHeader 53006 entity. The FundsCommitmentDocument 53010 package includes a FundsCommitmentDocument 53012 entity. The FundsCommitmentDocument 53010 package includes an Item 53056 package. The FundsCommitmentDocument 53012 entity has a cardinality of 1 53014 meaning that for each instance of the FundsCommitmentDocument 53010 package there is one FundsCommitmentDocument 53012 entity. The FundsCommitmentDocument 53012 entity includes various attributes, namely an ID 53016, a CompanyID 53020, a CategoryCode 53024, a TypeCode 53028, a ManualChangeAllowedIndicator 53032, an ExchangeRate 53036, a Date 53040, a PostingDate 53044, a BusinessTransactionDocumentReference 53048 and a Note 53052.

The ID 53016 attribute has a cardinality of 0 . . . 1 53018 meaning that for each instance of the FundsCommitment- Document 53012 entity there may be one ID 53016 attribute. The CompanyID 53020 attribute has a cardinality of 1 53022 meaning that for each instance of the FundsCommitmentDocument 53012 entity there is one CompanyID 53020 attribute. The CategoryCode 53024 attribute has a cardinality of 1 53026 meaning that for each instance of the FundsCommitmentDocument 53012 entity there is one CategoryCode 53024 attribute. The TypeCode 53028 attribute has a cardinality of 1 53030 meaning that for each instance of the FundsCommitmentDocument 53012 entity there is one TypeCode 53028 attribute. The ManualChangeAllowedIndicator 53032 attribute has a cardinality of 1 53034 meaning that for each instance of the FundsCommitmentDocument 53012 entity there is one ManualChangeAllowedIndicator 53032 attribute.

The ExchangeRate 53036 attribute has a cardinality of 0 . . . 1 53038 meaning that for each instance of the FundsCommitmentDocument 53012 entity there may be one ExchangeRate 53036 attribute. The Date 53040 attribute has a cardinality of 1 53042 meaning that for each instance of the FundsCommitmentDocument 53012 entity there is one Date 53040 attribute. The PostingDate 53044 attribute has a cardinality of 1 53046 meaning that for each instance of the FundsCommitmentDocument 53012 entity there is one PostingDate 53044 attribute. The BusinessTransactionDocumentReference 53048 attribute has a cardinality of 0 . . . 1 53050 meaning that for each instance of the FundsCommitmentDocument 53012 entity there may be one BusinessTransactionDocumentReference 53048 attribute. The Note 53052 attribute has a cardinality of 0 . . . 1 53054 meaning that for each instance of the FundsCommitmentDocument 53012 entity there may be one Note 53052 attribute.

The Item 53056 package includes an Item 53058 entity. The Item 53056 package includes an AccountingCodingBlockAssignment 53110 package. The Item 53058 entity has a cardinality of 1 . . . n 53060 meaning that for each instance of the Item 53056 package there are one or more Item 53058 entities. The Item 53058 entity includes various attributes, namely a PredecessorFundsCommitmentDocumentReference 53062, an AccountingCodingBlockAssignmentChangeAllowedIndicator 53066, a ConsumptionAllowedIndicator 53070, an ExceedWithoutLimitAllowedIndicator 53074, a GlobalToleranceOverrideAllowedIndicator 53078, a ManualChangeAllowedIndicator 53082, a PredecessorFundsCommitmentDocumentItemCompletedIndicator 53086, an UpdateRelevanceIndicator 53090, a DueDate 53094, a ReservedTransactionCurrencyAmount 53098, an AmountOverdrawingTolerancePercent 53102 and a Note 53106.

The PredecessorFundsCommitmentDocumentReference 53062 attribute has a cardinality of 0 . . . 1 53064 meaning that for each instance of the Item 53058 entity there may be one PredecessorFundsCommitmentDocumentReference 53062 attribute. The AccountingCodingBlockAssignmentChangeAllowedIndicator 53066 attribute has a cardinality of 1 53068 meaning that for each instance of the Item 53058 entity there is one AccountingCodingBlockAssignmentChangeAllowedIndicator 53066 attribute. The ConsumptionAllowedIndicator 53070 attribute has a cardinality of 1 53072 meaning that for each instance of the Item 53058 entity there is one ConsumptionAllowedIndicator 53070 attribute. The ExceedWithoutLimitAllowedIndicator 53074 attribute has a cardinality of 1 53076 meaning that for each instance of the Item 53058 entity there is one ExceedWithoutLimitAllowedIndicator 53074 attribute.

The GlobalToleranceOverrideAllowedIndicator 53078 attribute has a cardinality of 1 53080 meaning that for each instance of the Item 53058 entity there is one GlobalToleranceOverrideAllowedIndicator 53078 attribute. The ManualChangeAllowedIndicator 53082 attribute has a cardinality of 1 53084 meaning that for each instance of the Item 53058 entity there is one ManualChangeAllowedIndicator 53082 attribute. The PredecessorFundsCommitmentDocumentItemCompletedIndicator 53086 attribute has a cardinality of 1 53088 meaning that for each instance of the Item 53058 entity there is one PredecessorFundsCommitmentDocumentItemCompletedIndicator 53086 attribute. The UpdateRelevanceIndicator 53090 attribute has a cardinality of 1 53092 meaning that for each instance of the Item 53058 entity there is one UpdateRelevanceIndicator 53090 attribute.

The DueDate 53094 attribute has a cardinality of 0 . . . 1 53096 meaning that for each instance of the Item 53058 entity there may be one DueDate 53094 attribute. The ReservedTransactionCurrencyAmount 53098 attribute has a cardinality of 1 53100 meaning that for each instance of the Item 53058 entity there is one ReservedTransactionCurrencyAmount 53098 attribute. The AmountOverdrawingTolerancePercent 53102 attribute has a cardinality of 0 . . . 1 53104 meaning that for each instance of the Item 53058 entity there may be one AmountOverdrawingTolerancePercent 53102 attribute. The Note 53106 attribute has a cardinality of 0 . . . 1 53108 meaning that for each instance of the Item 53058 entity there may be one Note 53106 attribute.

The AccountingCodingBlockAssignment 53110 package includes an AccountingCodingBlockAssignment 53112 entity. The AccountingCodingBlockAssignment 53112 entity has a cardinality of 1 53114 meaning that for each instance of the AccountingCodingBlockAssignment 53110 package there is one AccountingCodingBlockAssignment 53112 entity. The AccountingCodingBlockAssignment 53112 entity includes various attributes, namely a CostCentreID 53116, a FundsManagementCentreID 53120, a ProjectReference 53124, an InternalOrderID 53128, an IndividualMaterialID 53132, a FundsManagementFundID 53136, a Funds ManagementFunctionalAreaID 53140, a FundsManagementAccountID 53144, a FundsManagementProgramID 53148, a GrantID 53152, an AccountDeterminationExpenseGroupCode 53156 and an AccountingBusinessAreaCode 53160.

The CostCentreID 53116 attribute has a cardinality of 0 . . . 1 53118 meaning that for each instance of the AccountingCodingBlockAssignment 53112 entity there may be one CostCentreID 53116 attribute. The FundsManagementCentreID 53120 attribute has a cardinality of 0 . . . 1 53122 meaning that for each instance of the AccountingCodingBlockAssignment 53112 entity there may be one FundsManagementCentreID 53120 attribute. The ProjectReference 53124 attribute has a cardinality of 0 . . . 1 53126 meaning that for each instance of the AccountingCodingBlockAssignment 53112 entity there may be one ProjectReference 53124 attribute.

The InternalOrderID 53128 attribute has a cardinality of 0 . . . 1 53130 meaning that for each instance of the AccountingCodingBlockAssignment 53112 entity there may be one InternalOrderID 53128 attribute. The IndividualMaterialID 53132 attribute has a cardinality of 0 . . . 1 53134 meaning that for each instance of the AccountingCodingBlockAssignment 53112 entity there may be one IndividualMaterialID 53132 attribute. The FundsManagementFundID 53136 attribute has a cardinality of 0 . . . 1 53138 meaning that for each instance of the AccountingCodingBlockAssignment 53112 entity there may be one FundsManagementFundID 53136 attribute.

The FundsManagementFunctionalAreaID 53140 attribute has a cardinality of 0 . . . 1 53142 meaning that for each instance of the AccountingCodingBlockAssignment 53112 entity there may be one FundsManagementFunctionalAreaID 53140 attribute. The FundsManagementAccountID 53144 attribute has a cardinality of 0 . . . 1 53146 meaning that for each instance of the AccountingCodingBlockAssignment 53112 entity there may be one FundsManagementAccountID 53144 attribute. The FundsManagementProgramID 53148 attribute has a cardinality of 0 . . . 1 53150 meaning that for each instance of the AccountingCodingBlockAssignment 53112 entity there may be one FundsManagementProgramID 53148 attribute.

The GrantID 53152 attribute has a cardinality of 0 . . . 1 53154 meaning that for each instance of the AccountingCodingBlockAssignment 53112 entity there may be one GrantID 53152 attribute. The AccountDeterminationExpenseGroupCode 53156 attribute has a cardinality of 0 . . . 1 53158 meaning that for each instance of the AccountingCodingBlockAssignment 53112 entity there may be one AccountDeterminationExpenseGroupCode 53156 attribute. The AccountingBusinessAreaCode 53160 attribute has a cardinality of 0 . . . 1 53162 meaning that for each instance of the AccountingCodingBlockAssignment 53112 entity there may be one AccountingBusinessAreaCode 53160 attribute. The data types of the various packages, entities, and attributes are described with respect to FIG. 52.

Additionally, FIG. 54 shows an example configuration of an Element Structure that includes a FundsCommitmentDocumentERPCreateConfirmationMessage_sync 54000 package. The FundsCommitmentDocumentERPCreateConfirmationMessage_sync 54000 package includes a FundsCommitmentDocumentERPCreateConfirmationMessage_sync 54002 entity. The FundsCommitmentDocumentERPCreateConfirmationMessage_sync 54000 package includes various packages, namely a MessageHeader 54004, a FundsCommitmentDocument 54010, and a Log 54020.

The MessageHeader 54004 package includes a MessageHeader 54006 entity. The MessageHeader 54006 entity has a cardinality of 0 . . . 1 54008 meaning that for each instance of the MessageHeader 54004 package there may be one MessageHeader 54006 entity.

The FundsCommitmentDocument 54010 package includes a FundsCommitmentDocument 54012 entity. The FundsCommitmentDocument 54012 entity has a cardinality of 0 . . . 1 54014 meaning that for each instance of the FundsCommitmentDocument 54010 package there may be one FundsCommitmentDocument 54012 entity. The FundsCommitmentDocument 54012 entity includes an ID 54016 attribute. The ID 54016 attribute has a cardinality of 1 54018 meaning that for each instance of the FundsCommitmentDocument 54012 entity there is one ID 54016 attribute.

The Log 54020 package includes a Log 54022 entity. The Log 54022 entity has a cardinality of 1 54024 meaning that for each instance of the Log 54020 package there is one Log 54022 entity. The data types of the various packages, entities, and attributes are described with respect to FIG. 52.

Additionally, FIGS. 55-1 through 55-7 show an example configuration of an Element Structure that includes a FundsCommitmentDocumentERPUpdateRequestMessage_sync 55000 package. The FundsCommitmentDocumentERPUpdateRequestMessage_sync 55000 package includes a FundsCommitmentDocumentERPUpdateRequestMessage_sync 55002 entity. The FundsCommitmentDocumentERPUpdateRequestMessage_sync 55000 package includes various packages, namely a MessageHeader 55004, and a FundsCommitmentDocument 55010.

The MessageHeader 55004 package includes a MessageHeader 55006 entity. The MessageHeader 55006 entity has a cardinality of 0 . . . 1 55008 meaning that for each instance of the MessageHeader 55004 package there may be one MessageHeader 55006 entity. The FundsCommitmentDocument 55010 package includes a FundsCommitmentDocument 55012 entity. The FundsCommitmentDocument 55010 package includes an Item 55056 package.

The FundsCommitmentDocument 55012 entity has a cardinality of 1 55014 meaning that for each instance of the FundsCommitmentDocument 55010 package there is one FundsCommitmentDocument 55012 entity. The FundsCommitmentDocument 55012 entity includes various attributes, namely an ItemListCompleteTransmissionIndicator 55016, an ID 55020, a ChangeStateID 55024, an ApprovedIndicator 55028, a CompletedIndicator 55032, a ManualChangeAllowedIndicator 55036, a Date 55040, an ExchangeRate 55044, a BusinessTransactionDocumentReference 55048 and a Note 55052. The ItemListCompleteTransmissionIndicator 55016 attribute has a cardinality of 1 55018 meaning that for each instance of the FundsCommitmentDocument 55012 entity there is one ItemListCompleteTransmissionIndicator 55016 attribute.

The ID 55020 attribute has a cardinality of 1 55022 meaning that for each instance of the FundsCommitmentDocument 55012 entity there is one ID 55020 attribute. The ChangeStateID 55024 attribute has a cardinality of 1 55026 meaning that for each instance of the FundsCommitmentDocument 55012 entity there is one ChangeStateID 55024 attribute. The ApprovedIndicator 55028 attribute has a cardinality of 0 . . . 1 55030 meaning that for each instance of the FundsCommitmentDocument 55012 entity there may be one ApprovedIndicator 55028 attribute. The CompletedIndicator 55032 attribute has a cardinality of 0 . . . 1 55034 meaning that for each instance of the FundsCommitmentDocument 55012 entity there may be one CompletedIndicator 55032 attribute. The ManualChangeAllowedIndicator 55036 attribute has a cardinality of 0 . . . 1 55038 meaning that for each instance of the FundsCommitmentDocument 55012 entity there may be one ManualChangeAllowedIndicator 55036 attribute.

The Date 55040 attribute has a cardinality of 0 . . . 1 55042 meaning that for each instance of the FundsCommitmentDocument 55012 entity there may be one Date 55040 attribute. The ExchangeRate 55044 attribute has a cardinality of 0 . . . 1 55046 meaning that for each instance of the FundsCommitmentDocument 55012 entity there may be one ExchangeRate 55044 attribute. The BusinessTransactionDocumentReference 55048 attribute has a cardinality of 0 . . . 1 55050 meaning that for each instance of the FundsCommitmentDocument 55012 entity there may be one BusinessTransactionDocumentReference 55048 attribute. The Note 55052 attribute has a cardinality of 0 . . . 1 55054 meaning that for each instance of the FundsCommitmentDocument 55012 entity there may be one Note 55052 attribute.

The Item 55056 package includes an Item 55058 entity. The Item 55056 package includes an AccountingCodingBlockAssignment 55130 package. The Item 55058 entity has a cardinality of 0 . . . n 55060 meaning that for each instance of the Item 55056 package there may be one or more Item 55058 entities. The Item 55058 entity includes various attributes, namely an ActionCode 55062, an ID 55066, a ChangeStateID 55070, a PredecessorFundsCommitmentDocumentReference 55074, an AccountingCodingBlockAssignmentChangeAllowedIndicator 55078, an ApprovedIndicator 55082, a CompletedIndicator 55086, a ConsumptionAllowedIndicator 55090, an ExceedWithout- LimitAllowedIndicator 55094, a GlobalToleranceOverrideAllowedIndicator 55098, a ManualChangeAllowedIndicator 55102, a PredecessorFundsCommitmentDocumentItemCompletedIndicator 55106, an UpdateRelevanceIndicator 55110, a DueDate 55114, a ReservedTransactionCurrencyAmount 55118, an AmountOverdrawingTolerancePercent 55122 and a Note 55126.

The ActionCode 55062 attribute has a cardinality of 1 55064 meaning that for each instance of the Item 55058 entity there is one ActionCode 55062 attribute. The ID 55066 attribute has a cardinality of 1 55068 meaning that for each instance of the Item 55058 entity there is one ID 55066 attribute. The ChangeStateID 55070 attribute has a cardinality of 1 55072 meaning that for each instance of the Item 55058 entity there is one ChangeStateID 55070 attribute. The PredecessorFundsCommitmentDocumentReference 55074 attribute has a cardinality of 0 . . . 1 55076 meaning that for each instance of the Item 55058 entity there may be one PredecessorFundsCommitmentDocumentReference 55074 attribute. The AccountingCodingBlockAssignmentChangeAllowedIndicator 55078 attribute has a cardinality of 1 55080 meaning that for each instance of the Item 55058 entity there is one AccountingCodingBlockAssignmentChangeAllowedIndicator 55078 attribute.

The ApprovedIndicator 55082 attribute has a cardinality of 1 55084 meaning that for each instance of the Item 55058 entity there is one ApprovedIndicator 55082 attribute. The CompletedIndicator 55086 attribute has a cardinality of 1 55088 meaning that for each instance of the Item 55058 entity there is one CompletedIndicator 55086 attribute. The ConsumptionAllowedIndicator 55090 attribute has a cardinality of 1 55092 meaning that for each instance of the Item 55058 entity there is one ConsumptionAllowedIndicator 55090 attribute. The ExceedWithoutLimitAllowedIndicator 55094 attribute has a cardinality of 1 55096 meaning that for each instance of the Item 55058 entity there is one ExceedWithoutLimitAllowedIndicator 55094 attribute.

The GlobalToleranceOverrideAllowedIndicator 55098 attribute has a cardinality of 1 55100 meaning that for each instance of the Item 55058 entity there is one GlobalToleranceOverrideAllowedIndicator 55098 attribute. The ManualChangeAllowedIndicator 55102 attribute has a cardinality of 1 55104 meaning that for each instance of the Item 55058 entity there is one ManualChangeAllowedIndicator 55102 attribute. The PredecessorFundsCommitmentDocumentItemCompletedIndicator 55106 attribute has a cardinality of 1 55108 meaning that for each instance of the Item 55058 entity there is one PredecessorFundsCommitmentDocumentItemCompletedIndicator 55106 attribute. The UpdateRelevanceIndicator 55110 attribute has a cardinality of 1 55112 meaning that for each instance of the Item 55058 entity there is one UpdateRelevanceIndicator 55110 attribute.

The DueDate 55114 attribute has a cardinality of 0 . . . 1 55116 meaning that for each instance of the Item 55058 entity there may be one DueDate 55114 attribute. The ReservedTransactionCurrencyAmount 55118 attribute has a cardinality of 1 55120 meaning that for each instance of the Item 55058 entity there is one ReservedTransactionCurrencyAmount 55118 attribute. The AmountOverdrawingTolerancePercent 55122 attribute has a cardinality of 0 . . . 1 55124 meaning that for each instance of the Item 55058 entity there may be one AmountOverdrawingTolerancePercent 55122 attribute. The Note 55126 attribute has a cardinality of 0 . . . 1 55128 meaning that for each instance of the Item 55058 entity there may be one Note 55126 attribute.

The AccountingCodingBlockAssignment 55130 package includes an AccountingCodingBlockAssignment 55132 entity. The AccountingCodingBlockAssignment 55132 entity has a cardinality of 0 . . . 1 55134 meaning that for each instance of the AccountingCodingBlockAssignment 55130 package there may be one AccountingCodingBlockAssignment 55132 entity. The AccountingCodingBlockAssignment 55132 entity includes various attributes, namely a CostCentreID 55136, a FundsManagementCentreID 55140, a ProjectReference 55144, an InternalOrderID 55148, an IndividualMaterialID 55152, a FundsManagementFundID 55156, a Funds ManagementFunctionalAreaID 55160, a FundsManagementAccountID 55164, a FundsManagementProgramID 55168, a GrantID 55172, an AccountDeterminationExpenseGroupCode 55176 and an AccountingBusinessAreaCode 55180.

The CostCentreID 55136 attribute has a cardinality of 0 . . . 1 55138 meaning that for each instance of the AccountingCodingBlockAssignment 55132 entity there may be one CostCentreID 55136 attribute. The FundsManagementCentreID 55140 attribute has a cardinality of 0 . . . 1 55142 meaning that for each instance of the AccountingCodingBlockAssignment 55132 entity there may be one FundsManagementCentreID 55140 attribute. The ProjectReference 55144 attribute has a cardinality of 0 . . . 1 55146 meaning that for each instance of the AccountingCodingBlockAssignment 55132 entity there may be one ProjectReference 55144 attribute.

The InternalOrderID 55148 attribute has a cardinality of 0 . . . 1 55150 meaning that for each instance of the AccountingCodingBlockAssignment 55132 entity there may be one InternalOrderID 55148 attribute. The IndividualMaterialID 55152 attribute has a cardinality of 0 . . . 1 55154 meaning that for each instance of the AccountingCodingBlockAssignment 55132 entity there may be one IndividualMaterialID 55152 attribute. The FundsManagementFundID 55156 attribute has a cardinality of 0 . . . 1 55158 meaning that for each instance of the AccountingCodingBlockAssignment 55132 entity there may be one FundsManagementFundID 55156 attribute. The FundsManagementFunctionalAreaID 55160 attribute has a cardinality of 0 . . . 1 55162 meaning that for each instance of the AccountingCodingBlockAssignment 55132 entity there may be one FundsManagementFunctionalAreaID 55160 attribute.

The FundsManagementAccountID 55164 attribute has a cardinality of 0 . . . 1 55166 meaning that for each instance of the AccountingCodingBlockAssignment 55132 entity there may be one FundsManagementAccountID 55164 attribute. The FundsManagementProgramID 55168 attribute has a cardinality of 0 . . . 1 55170 meaning that for each instance of the AccountingCodingBlockAssignment 55132 entity there may be one FundsManagementProgramID 55168 attribute. The GrantID 55172 attribute has a cardinality of 0 . . . 1 55174 meaning that for each instance of the AccountingCodingBlockAssignment 55132 entity there may be one GrantID 55172 attribute.

The AccountDeterminationExpenseGroupCode 55176 attribute has a cardinality of 0 . . . 1 55178 meaning that for each instance of the AccountingCodingBlockAssignment 55132 entity there may be one AccountDeterminationExpenseGroupCode 55176 attribute. The AccountingBusinessAreaCode 55180 attribute has a cardinality of 0 . . . 1 55182 meaning that for each instance of the AccountingCodingBlockAssignment 55132 entity there may be one AccountingBusinessAreaCode 55180 attribute. The data types of the various packages, entities, and attributes are described with respect to FIG. 52.

Additionally, FIG. 56 shows an example configuration of an Element Structure that includes a FundsCommitmentDocumentERPUpdateConfirmationMessage_sync 56000 package. The FundsCommitmentDocumentERPUpdateConfirmationMessage_sync 56000 package includes a FundsCommitmentDocumentERPUpdateConfirmationMessage_sync 56002 entity. The FundsCommitmentDocumentERPUpdateConfirmationMessage_sync 56000 package includes various packages, namely a MessageHeader 56004, a FundsCommitmentDocument 56010, and a Log 56020.

The MessageHeader 56004 package includes a MessageHeader 56006 entity. The MessageHeader 56006 entity has a cardinality of 0 . . . 1 56008 meaning that for each instance of the MessageHeader 56004 package there may be one MessageHeader 56006 entity.

The FundsCommitmentDocument 56010 package includes a FundsCommitmentDocument 56012 entity. The FundsCommitmentDocument 56012 entity has a cardinality of 0 . . . 1 56014 meaning that for each instance of the FundsCommitmentDocument 56010 package there may be one FundsCommitmentDocument 56012 entity. The FundsCommitmentDocument 56012 entity includes an ID 56016 attribute. The ID 56016 attribute has a cardinality of 1 56018 meaning that for each instance of the FundsCommitmentDocument 56012 entity there is one ID 56016 attribute.

The Log 56020 package includes a Log 56022 entity. The Log 56022 entity has a cardinality of 1 56024 meaning that for each instance of the Log 56020 package there is one Log 56022 entity. The data types of the various packages, entities, and attributes are described with respect to FIG. 52.

Additionally, FIG. 57 shows an example configuration of an Element Structure that includes a FundsCommitmentDocumentERPByIDQueryMessage_sync 57000 package. The FundsCommitmentDocumentERPByIDQueryMessage_sync 57000 package includes a FundsCommitmentDocumentERPByIDQueryMessage_sync 57002 entity. The FundsCommitmentDocumentERPByIDQueryMessage_sync 57000 package includes various packages, namely a Selection 57004.

The Selection 57004 package includes a FundsCommitmentDocumentSelectionByID 57006 entity. The FundsCommitmentDocumentSelectionByID 57006 entity has a cardinality of 1 57008 meaning that for each instance of the Selection 57004 package there is one FundsCommitmentDocumentSelectionByID 57006 entity. The FundsCommitmentDocumentSelectionByID 57006 entity includes an ID 57010 attribute. The ID 57010 attribute has a cardinality of 1 57012 meaning that for each instance of the FundsCommitmentDocumentSelectionByID 57006 entity there is one ID 57010 attribute. The data types of the various packages, entities, and attributes are described with respect to FIG. 52.

Additionally, FIGS. 58-1 through 58-9 show an example configuration of an Element Structure that includes a FundsCommitmentDocumentERPByIDResponseMessage_sync 58000 package. The FundsCommitmentDocumentERPByIDResponseMessage_sync 58000 package includes a FundsCommitmentDocumentERPByIDResponseMessage_sync 58002 entity. The FundsCommitmentDocumentERPByIDResponseMessage_sync 58000 package includes various packages, namely a FundsCommitmentDocument 58004, and a Log 58230.

The FundsCommitmentDocument 58004 package includes a FundsCommitmentDocument 58006 entity. The FundsCommitmentDocument 58004 package includes an Item 58086 package. The FundsCommitmentDocument 58006 entity has a cardinality of 0 . . . 1 58008 meaning that for each instance of the FundsCommitmentDocument 58004 package there may be one FundsCommitmentDocument 58006 entity. The FundsCommitmentDocument 58006 entity includes various attributes, namely an ID 58010, a CompanyID 58014, a FundsManagementAreaID 58018, a ChangeStateID 58022, a CategoryCode 58026, a PostingStatusCode 58030, a TypeCode 58034, an ApprovedIndicator 58038, a CompletedIndicator 58042, a ConsumptionAllowedIndicator 58046, a ManualChangeAllowedIndicator 58050, an ExchangeRate 58054, a CategoryName 58058, a PostingStatusName 58062, a TypeName 58066, a Date 58070, a PostingDate 58074, a BusinessTransactionDocumentReference 58078 and a Note 58082.

The ID 58010 attribute has a cardinality of 1 58012 meaning that for each instance of the FundsCommitmentDocument 58006 entity there is one ID 58010 attribute. The CompanyID 58014 attribute has a cardinality of 1 58016 meaning that for each instance of the FundsCommitmentDocument 58006 entity there is one CompanyID 58014 attribute. The FundsManagementAreaID 58018 attribute has a cardinality of 0 . . . 1 58020 meaning that for each instance of the FundsCommitmentDocument 58006 entity there may be one FundsManagementAreaID 58018 attribute.

The ChangeStateID 58022 attribute has a cardinality of 1 58024 meaning that for each instance of the FundsCommitmentDocument 58006 entity there is one ChangeStateID 58022 attribute. The CategoryCode 58026 attribute has a cardinality of 1 58028 meaning that for each instance of the FundsCommitmentDocument 58006 entity there is one CategoryCode 58026 attribute. The PostingStatusCode 58030 attribute has a cardinality of 1 58032 meaning that for each instance of the FundsCommitmentDocument 58006 entity there is one PostingStatusCode 58030 attribute. The TypeCode 58034 attribute has a cardinality of 1 58036 meaning that for each instance of the FundsCommitmentDocument 58006 entity there is one TypeCode 58034 attribute.

The ApprovedIndicator 58038 attribute has a cardinality of 1 58040 meaning that for each instance of the FundsCommitmentDocument 58006 entity there is one ApprovedIndicator 58038 attribute. The CompletedIndicator 58042 attribute has a cardinality of 1 58044 meaning that for each instance of the FundsCommitmentDocument 58006 entity there is one CompletedIndicator 58042 attribute. The ConsumptionAllowedIndicator 58046 attribute has a cardinality of 1 58048 meaning that for each instance of the FundsCommitmentDocument 58006 entity there is one ConsumptionAllowedIndicator 58046 attribute.

The ManualChangeAllowedIndicator 58050 attribute has a cardinality of 1 58052 meaning that for each instance of the FundsCommitmentDocument 58006 entity there is one ManualChangeAllowedIndicator 58050 attribute. The ExchangeRate 58054 attribute has a cardinality of 1 58056 meaning that for each instance of the FundsCommitmentDocument 58006 entity there is one ExchangeRate 58054 attribute. The CategoryName 58058 attribute has a cardinality of 1 58060 meaning that for each instance of the FundsCommitmentDocument 58006 entity there is one CategoryName 58058 attribute.

The PostingStatusName 58062 attribute has a cardinality of 1 58064 meaning that for each instance of the FundsCommitmentDocument 58006 entity there is one PostingStatusName 58062 attribute. The TypeName 58066 attribute has a cardinality of 1 58068 meaning that for each instance of the FundsCommitmentDocument 58006 entity there is one TypeName 58066 attribute. The Date 58070 attribute has a cardinality of 1 58072 meaning that for each instance of the FundsCommitmentDocument 58006 entity there is one Date 58070 attribute.

The PostingDate 58074 attribute has a cardinality of 1 58076 meaning that for each instance of the FundsCommitmentDocument 58006 entity there is one PostingDate 58074 attribute. The BusinessTransactionDocumentReference 58078 attribute has a cardinality of 0 . . . 1 58080 meaning that for each instance of the FundsCommitmentDocument 58006 entity there may be one BusinessTransactionDocumentReference 58078 attribute. The Note 58082 attribute has a cardinality of 0 . . . 1 58084 meaning that for each instance of the FundsCommitmentDocument 58006 entity there may be one Note 58082 attribute.

The Item 58086 package includes an Item 58088 entity. The Item 58086 package includes an AccountingCodingBlockAssignment 58176 package. The Item 58088 entity has a cardinality of 1 58090 meaning that for each instance of the Item 58086 package there is one Item 58088 entity.

The Item 58088 entity includes various attributes, namely an ID 58092, a ChangeStateID 58096, a PredecessorFundsCommitmentDocumentReference 58100, an AccountingCodingBlockAssignmentChangeAllowedIndicator 58104, an ApprovedIndicator 58108, a CompletedIndicator 58112, a ConsumptionAllowedIndicator 58116, a DeletedIndicator 58120, an ExceedLimitAllowedIndicator 58124, a GlobalToleranceOverrideAllowedIndicator 58128, a ManualChangeAllowedIndicator 58132, an OverPercentUnlimitedIndicator 58136, a PredecessorFundsCommitmentDocumentItemCompletedIndicator 58140, an UpdateRelevanceIndicator 58144, a DueDate 58148, a ReservedTransactionCurrencyAmount 58152, a ReservedLocalCurrencyAmount 58156, an OpenTransactionCurrencyAmount 58160, an OpenLocalCurrencyAmount 58164, an AmountOverdrawingTolerancePercent 58168 and a Note 58172.

The ID 58092 attribute has a cardinality of 1 58094 meaning that for each instance of the Item 58088 entity there is one ID 58092 attribute. The ChangeStateID 58096 attribute has a cardinality of 1 58098 meaning that for each instance of the Item 58088 entity there is one ChangeStateID 58096 attribute. The PredecessorFundsCommitmentDocumentReference 58100 attribute has a cardinality of 0 . . . 1 58102 meaning that for each instance of the Item 58088 entity there may be one PredecessorFundsCommitmentDocumentReference 58100 attribute. The AccountingCodingBlockAssignmentChangeAllowedIndicator 58104 attribute has a cardinality of 1 58106 meaning that for each instance of the Item 58088 entity there is one AccountingCodingBlockAssignmentChangeAllowedIndicator 58104 attribute.

The ApprovedIndicator 58108 attribute has a cardinality of 1 58110 meaning that for each instance of the Item 58088 entity there is one ApprovedIndicator 58108 attribute. The CompletedIndicator 58112 attribute has a cardinality of 1 58114 meaning that for each instance of the Item 58088 entity there is one CompletedIndicator 58112 attribute. The ConsumptionAllowedIndicator 58116 attribute has a cardinality of 1 58118 meaning that for each instance of the Item 58088 entity there is one ConsumptionAllowedIndicator 58116 attribute. The DeletedIndicator 58120 attribute has a cardinality of 1 58122 meaning that for each instance of the Item 58088 entity there is one DeletedIndicator 58120 attribute.

The ExceedLimitAllowedIndicator 58124 attribute has a cardinality of 1 58126 meaning that for each instance of the Item 58088 entity there is one ExceedLimitAllowedIndicator 58124 attribute. The GlobalToleranceOverrideAllowedIndicator 58128 attribute has a cardinality of 1 58130 meaning that for each instance of the Item 58088 entity there is one GlobalToleranceOverrideAllowedIndicator 58128 attribute. The ManualChangeAllowedIndicator 58132 attribute has a cardinality of 1 58134 meaning that for each instance of the Item 58088 entity there is one ManualChangeAllowedIndicator 58132 attribute. The OverPercentUnlimitedIndicator 58136 attribute has a cardinality of 1 58138 meaning that for each instance of the Item 58088 entity there is one OverPercentUnlimitedIndicator 58136 attribute.

The PredecessorFundsCommitmentDocumentItemCompletedIndicator 58140 attribute has a cardinality of 1 58142 meaning that for each instance of the Item 58088 entity there is one PredecessorFundsCommitmentDocumentItemCompletedIndicator 58140 attribute. The UpdateRelevanceIndicator 58144 attribute has a cardinality of 1 58146 meaning that for each instance of the Item 58088 entity there is one UpdateRelevanceIndicator 58144 attribute. The DueDate 58148 attribute has a cardinality of 0 . . . 1 58150 meaning that for each instance of the Item 58088 entity there may be one DueDate 58148 attribute. The ReservedTransactionCurrencyAmount 58152 attribute has a cardinality of 1 58154 meaning that for each instance of the Item 58088 entity there is one ReservedTransactionCurrencyAmount 58152 attribute.

The ReservedLocalCurrencyAmount 58156 attribute has a cardinality of 1 58158 meaning that for each instance of the Item 58088 entity there is one ReservedLocalCurrencyAmount 58156 attribute. The OpenTransactionCurrencyAmount 58160 attribute has a cardinality of 1 58162 meaning that for each instance of the Item 58088 entity there is one OpenTransactionCurrencyAmount 58160 attribute. The OpenLocalCurrencyAmount 58164 attribute has a cardinality of 1 58166 meaning that for each instance of the Item 58088 entity there is one OpenLocalCurrencyAmount 58164 attribute. The AmountOverdrawingTolerancePercent 58168 attribute has a cardinality of 0 . . . 1 58170 meaning that for each instance of the Item 58088 entity there may be one AmountOverdrawingTolerancePercent 58168 attribute. The Note 58172 attribute has a cardinality of 0 . . . 1 58174 meaning that for each instance of the Item 58088 entity there may be one Note 58172 attribute.

The AccountingCodingBlockAssignment 58176 package includes an AccountingCodingBlockAssignment 58178 entity. The AccountingCodingBlockAssignment 58178 entity has a cardinality of 0 . . . 1 58180 meaning that for each instance of the AccountingCodingBlockAssignment 58176 package there may be one AccountingCodingBlockAssignment 58178 entity.

The AccountingCodingBlockAssignment 58178 entity includes various attributes, namely a CostCentreID 58182, a FundsManagementCentreID 58186, a ProjectReference 58190, an InternalOrderID 58194, an IndividualMaterialID 58198, a FundsManagementFundID 58202, a FundsManagementFunctionalAreaID 58206, a FundsManagementAccountID 58210, a FundsManagementProgramID 58214, a GrantID 58218, an AccountDeterminationExpenseGroupCode 58222 and an AccountingBusinessAreaCode 58226. The CostCentreID 58182 attribute has a cardinality of 0 . . . 1 58184 meaning that for each instance of the AccountingCodingBlockAssignment 58178 entity there may be one CostCentreID 58182 attribute.

The FundsManagementCentreID 58186 attribute has a cardinality of 0 . . . 1 58188 meaning that for each instance of the AccountingCodingBlockAssignment 58178 entity there may be one FundsManagementCentreID 58186 attribute. The ProjectReference 58190 attribute has a cardinality of 0 . . . 1 58192 meaning that for each instance of the AccountingCodingBlockAssignment 58178 entity there may be one ProjectReference 58190 attribute. The InternalOrderID 58194 attribute has a cardinality of 0 . . . 1 58196 meaning that for each instance of the AccountingCodingBlockAssignment 58178 entity there may be one InternalOrderID 58194 attribute.

The IndividualMaterialID 58198 attribute has a cardinality of 0 . . . 1 58200 meaning that for each instance of the AccountingCodingBlockAssignment 58178 entity there may be one IndividualMaterialID 58198 attribute. The FundsManagementFundID 58202 attribute has a cardinality of 0 . . . 1 58204 meaning that for each instance of the AccountingCodingBlockAssignment 58178 entity there may be one FundsManagementFundID 58202 attribute. The FundsManagementFunctionalAreaID 58206 attribute has a cardinality of 0 . . . 1 58208 meaning that for each instance of the AccountingCodingBlockAssignment 58178 entity there may be one Funds ManagementFunctionalAreaID 58206 attribute.

The FundsManagementAccountID 58210 attribute has a cardinality of 0 . . . 1 58212 meaning that for each instance of the AccountingCodingBlockAssignment 58178 entity there may be one FundsManagementAccountID 58210 attribute. The FundsManagementProgramID 58214 attribute has a cardinality of 0 . . . 1 58216 meaning that for each instance of the AccountingCodingBlockAssignment 58178 entity there may be one FundsManagementProgramID 58214 attribute. The GrantID 58218 attribute has a cardinality of 0 . . . 1 58220 meaning that for each instance of the AccountingCodingBlockAssignment 58178 entity there may be one GrantID 58218 attribute.

The AccountDeterminationExpenseGroupCode 58222 attribute has a cardinality of 0 . . . 1 58224 meaning that for each instance of the AccountingCodingBlockAssignment 58178 entity there may be one AccountDeterminationExpenseGroupCode 58222 attribute. The AccountingBusinessAreaCode 58226 attribute has a cardinality of 0 . . . 1 58228 meaning that for each instance of the AccountingCodingBlockAssignment 58178 entity there may be one AccountingBusinessAreaCode 58226 attribute.

The Log 58230 package includes a Log 58232 entity. The Log 58232 entity has a cardinality of 1 58234 meaning that for each instance of the Log 58230 package there is one Log 58232 entity. The data types of the various packages, entities, and attributes are described with respect to FIG. 52.

Additionally, FIGS. 59-1 through 59-8 show an example configuration of an Element Structure that includes a FundsCommitmentDocumentERPBasicDataByBasicDataQueryMessage_sync 59000 package. The FundsCommitmentDocumentERPBasicDataByBasicDataQueryMessage_sync 59000 package includes a FundsCommitmentDocumentERPBasicDataByBasicDataQueryMessage_sync 59002 entity. The FundsCommitmentDocumentERPBasicDataByBasicDataQueryMessage_sync 59000 package includes various packages, namely a Selection 59004, and a ProcessingConditions 59206.

The Selection 59004 package includes a FundsCommitmentDocumentSelectionByBasicData 59006 entity. The FundsCommitmentDocumentSelectionByBasicData 59006 entity has a cardinality of 1 59008 meaning that for each instance of the Selection 59004 package there is one FundsCommitmentDocumentSelectionByBasicData 59006 entity. The FundsCommitmentDocumentSelectionByBasicData 59006 entity includes various attributes, namely an ID 59010, a CompanyID 59014, a BusinessTransactionDocumentReference 59018 and a Note 59022.

The FundsCommitmentDocumentSelectionByBasicData 59006 entity includes various subordinate entities, namely a SelectionByFundsCommitmentDocumentID 59026, a SelectionByFundsCommitmentDocumentCategory 59046, a SelectionByFundsCommitmentDocumentType 59066, a SelectionByPostingDate 59086, a SelectionByFundsCommitmentDocumentDate 59106, a SelectionByCreationUserAccountID 59126, a SelectionByLastChangeUserAccountID 59146, a SelectionByCreationDate 59166 and a SelectionByLastChangeDate 59186. The ID 59010 attribute has a cardinality of 0 . . . 1 59012 meaning that for each instance of the FundsCommitmentDocumentSelectionByBasicData 59006 entity there may be one ID 59010 attribute.

The CompanyID 59014 attribute has a cardinality of 0 . . . 1 59016 meaning that for each instance of the FundsCommitmentDocumentSelectionByBasicData 59006 entity there may be one CompanyID 59014 attribute. The BusinessTransactionDocumentReference 59018 attribute has a cardinality of 0 . . . 1 59020 meaning that for each instance of the FundsCommitmentDocumentSelectionByBasicData 59006 entity there may be one BusinessTransactionDocumentReference 59018 attribute. The Note 59022 attribute has a cardinality of 0 . . . 1 59024 meaning that for each instance of the FundsCommitmentDocumentSelectionByBasicData 59006 entity there may be one Note 59022 attribute.

The SelectionByFundsCommitmentDocumentID 59026 entity has a cardinality of 0 . . . n 59028 meaning that for each instance of the FundsCommitmentDocumentSelectionByBasicData 59006 entity there may be one or more SelectionByFundsCommitmentDocumentID 59026 entities. The SelectionByFundsCommitmentDocumentID 59026 entity includes various attributes, namely an InclusionExclusionCode 59030, an IntervalBoundaryTypeCode 59034, a LowerBoundaryFundsCommitmentDocumentID 59038 and an UpperBoundaryFundsCommitmentDocumentID 59042.

The InclusionExclusionCode 59030 attribute has a cardinality of 1 59032 meaning that for each instance of the SelectionByFundsCommitmentDocumentID 59026 entity there is one InclusionExclusionCode 59030 attribute. The IntervalBoundaryTypeCode 59034 attribute has a cardinality of 1 59036 meaning that for each instance of the SelectionByFundsCommitmentDocumentID 59026 entity there is one IntervalBoundaryTypeCode 59034 attribute. The LowerBoundaryFundsCommitmentDocumentID 59038 attribute has a cardinality of 1 59040 meaning that for each instance of the SelectionByFundsCommitmentDocumentID 59026 entity there is one LowerBoundaryFundsCommitmentDocumentID 59038 attribute. The UpperBoundaryFundsCommitmentDocumentID 59042 attribute has a cardinality of 0 . . . 1 59044 meaning that for each instance of the SelectionByFundsCommitmentDocumentID 59026 entity there may be one UpperBoundaryFundsCommitmentDocumentID 59042 attribute.

The SelectionByFundsCommitmentDocumentCategory 59046 entity has a cardinality of 0 . . . n 59048 meaning that for each instance of the FundsCommitmentDocumentSelectionByBasicData 59006 entity there may be one or more SelectionByFundsCommitmentDocumentCategory 59046 entities. The SelectionByFundsCommitmentDocumentCategory 59046 entity includes various attributes, namely an InclusionExclusionCode 59050, an IntervalBoundaryTypeCode 59054, a LowerBoundaryFundsCommitmentDocumentCategory 59058 and an UpperBoundaryFundsCommitmentDocumentCategory 59062.

The InclusionExclusionCode 59050 attribute has a cardinality of 1 59052 meaning that for each instance of the SelectionByFundsCommitmentDocumentCategory 59046 entity there is one InclusionExclusionCode 59050 attribute. The IntervalBoundaryTypeCode 59054 attribute has a cardinality of 1 59056 meaning that for each instance of the SelectionByFundsCommitmentDocumentCategory 59046 entity there is one IntervalBoundaryTypeCode 59054 attribute.

The LowerBoundaryFundsCommitmentDocumentCategory 59058 attribute has a cardinality of 1 59060 meaning that for each instance of the SelectionByFundsCommitmentDocumentCategory 59046 entity there is one LowerBoundaryFundsCommitmentDocumentCategory 59058 attribute. The UpperBoundaryFundsCommitmentDocumentCategory 59062 attribute has a cardinality of 0 . . . 1 59064 meaning that for each instance of the SelectionByFundsCommitmentDocumentCategory 59046 entity there may be one UpperBoundaryFundsCommitmentDocumentCategory 59062 attribute.

The SelectionByFundsCommitmentDocumentType 59066 entity has a cardinality of 0 . . . n 59068 meaning that for each instance of the FundsCommitmentDocumentSelectionByBasicData 59006 entity there may be one or more SelectionByFundsCommitmentDocumentType 59066 entities. The SelectionByFundsCommitmentDocumentType 59066 entity includes various attributes, namely an InclusionExclusionCode 59070, an IntervalBoundaryTypeCode 59074, a LowerBoundaryFundsCommitmentDocumentType 59078 and an UpperBoundaryFundsCommitmentDocumentType 59082. The InclusionExclusionCode 59070 attribute has a cardinality of 1 59072 meaning that for each instance of the SelectionByFundsCommitmentDocumentType 59066 entity there is one InclusionExclusionCode 59070 attribute.

The IntervalBoundaryTypeCode 59074 attribute has a cardinality of 1 59076 meaning that for each instance of the SelectionByFundsCommitmentDocumentType 59066 entity there is one IntervalBoundaryTypeCode 59074 attribute. The LowerBoundaryFundsCommitmentDocumentType 59078 attribute has a cardinality of 1 59080 meaning that for each instance of the SelectionByFundsCommitmentDocumentType 59066 entity there is one LowerBoundaryFundsCommitmentDocumentType 59078 attribute. The UpperBoundaryFundsCommitmentDocumentType 59082 attribute has a cardinality of 0 . . . 1 59084 meaning that for each instance of the SelectionByFundsCommitmentDocumentType 59066 entity there may be one UpperBoundaryFundsCommitmentDocumentType 59082 attribute. The SelectionByPostingDate 59086 entity has a cardinality of 0 . . . n 59088 meaning that for each instance of the FundsCommitmentDocumentSelectionByBasicData 59006 entity there may be one or more SelectionByPostingDate 59086 entities.

The SelectionByPostingDate 59086 entity includes various attributes, namely an InclusionExclusionCode 59090, an IntervalBoundaryTypeCode 59094, a LowerBoundaryPostingDate 59098 and an UpperBoundaryPostingDate 59102. The InclusionExclusionCode 59090 attribute has a cardinality of 1 59092 meaning that for each instance of the SelectionByPostingDate 59086 entity there is one InclusionExclusionCode 59090 attribute. The IntervalBoundaryTypeCode 59094 attribute has a cardinality of 1 59096 meaning that for each instance of the SelectionByPostingDate 59086 entity there is one IntervalBoundaryTypeCode 59094 attribute. The LowerBoundaryPostingDate 59098 attribute has a cardinality of 1 59100 meaning that for each instance of the SelectionByPostingDate 59086 entity there is one LowerBoundaryPostingDate 59098 attribute. The UpperBoundaryPostingDate 59102 attribute has a cardinality of 0 . . . 1 59104 meaning that for each instance of the SelectionByPostingDate 59086 entity there may be one UpperBoundaryPostingDate 59102 attribute.

The SelectionByFundsCommitmentDocumentDate 59106 entity has a cardinality of 0 . . . n 59108 meaning that for each instance of the FundsCommitmentDocumentSelectionByBasicData 59006 entity there may be one or more SelectionByFundsCommitmentDocumentDate 59106 entities. The SelectionByFundsCommitmentDocumentDate 59106 entity includes various attributes, namely an InclusionExclusionCode 59110, an IntervalBoundaryTypeCode 59114, a LowerBoundaryDocumentDate 59118 and an UpperBoundaryDocumentDate 59122.

The InclusionExclusionCode 59110 attribute has a cardinality of 1 59112 meaning that for each instance of the SelectionByFundsCommitmentDocumentDate 59106 entity there is one InclusionExclusionCode 59110 attribute. The IntervalBoundaryTypeCode 59114 attribute has a cardinality of 1 59116 meaning that for each instance of the SelectionByFundsCommitmentDocumentDate 59106 entity there is one IntervalBoundaryTypeCode 59114 attribute. The LowerBoundaryDocumentDate 59118 attribute has a cardinality of 1 59120 meaning that for each instance of the SelectionByFundsCommitmentDocumentDate 59106 entity there is one LowerBoundaryDocumentDate 59118 attribute.

The UpperBoundaryDocumentDate 59122 attribute has a cardinality of 0 . . . 1 59124 meaning that for each instance of the SelectionByFundsCommitmentDocumentDate 59106 entity there may be one UpperBoundaryDocumentDate 59122 attribute. The SelectionByCreationUserAccountID 59126 entity has a cardinality of 0 . . . n 59128 meaning that for each instance of the FundsCommitmentDocumentSelectionByBasicData 59006 entity there may be one or more SelectionByCreationUserAccountID 59126 entities. The SelectionByCreationUserAccountID 59126 entity includes various attributes, namely an InclusionExclusionCode 59130, an IntervalBoundaryTypeCode 59134, a LowerBoundaryCreatorID 59138 and an UpperBoundaryCreatorID 59142. The InclusionExclusionCode 59130 attribute has a cardinality of 1 59132 meaning that for each instance of the SelectionByCreationUserAccountID 59126 entity there is one InclusionExclusionCode 59130 attribute.

The IntervalBoundaryTypeCode 59134 attribute has a cardinality of 1 59136 meaning that for each instance of the SelectionByCreationUserAccountID 59126 entity there is one IntervalBoundaryTypeCode 59134 attribute. The LowerBoundaryCreatorID 59138 attribute has a cardinality of 1 59140 meaning that for each instance of the SelectionByCreationUserAccountID 59126 entity there is one LowerBoundaryCreatorID 59138 attribute. The UpperBoundaryCreatorID 59142 attribute has a cardinality of 0 . . . 1 59144 meaning that for each instance of the SelectionByCreationUserAccountID 59126 entity there may be one UpperBoundaryCreatorID 59142 attribute. The SelectionByLastChangeUserAccountID 59146 entity has a cardinality of 0 . . . n 59148 meaning that for each instance of the FundsCommitmentDocumentSelectionByBasicData 59006 entity there may be one or more SelectionByLastChangeUserAccountID 59146 entities.

The SelectionByLastChangeUserAccountID 59146 entity includes various attributes, namely an InclusionExclusionCode 59150, an IntervalBoundaryTypeCode 59154, a LowerBoundaryLastChangeUserAccountID 59158 and an UpperBoundaryLastChangeUserAccountID 59162. The InclusionExclusionCode 59150 attribute has a cardinality of 1 59152 meaning that for each instance of the SelectionByLastChangeUserAccountID 59146 entity there is one InclusionExclusionCode 59150 attribute. The IntervalBoundaryTypeCode 59154 attribute has a cardinality of 1 59156 meaning that for each instance of the SelectionByLastChangeUserAccountID 59146 entity there is one IntervalBoundaryTypeCode 59154 attribute.

The LowerBoundaryLastChangeUserAccountID 59158 attribute has a cardinality of 1 59160 meaning that for each instance of the SelectionByLastChangeUserAccountID 59146 entity there is one LowerBoundaryLastChangeUserAccountID 59158 attribute. The UpperBoundaryLastChangeUserAccountID 59162 attribute has a cardinality of 0 . . . 1 59164 meaning that for each instance of the SelectionByLastChangeUserAccountID 59146 entity there may be one UpperBoundaryLastChangeUserAccountID 59162 attribute.

The SelectionByCreationDate 59166 entity has a cardinality of 0 . . . n 59168 meaning that for each instance of the FundsCommitmentDocumentSelectionByBasicData 59006 entity there may be one or more SelectionByCreationDate 59166 entities. The SelectionByCreationDate 59166 entity includes various attributes, namely an InclusionExclusionCode 59170, an IntervalBoundaryTypeCode 59174, a LowerBoundaryCreationDate 59178 and an UpperBoundaryCreationDate 59182. The InclusionExclusionCode 59170 attribute has a cardinality of 1 59172 meaning that for each instance of the SelectionByCreationDate 59166 entity there is one InclusionExclusionCode 59170 attribute.

The IntervalBoundaryTypeCode 59174 attribute has a cardinality of 1 59176 meaning that for each instance of the SelectionByCreationDate 59166 entity there is one IntervalBoundaryTypeCode 59174 attribute. The LowerBoundaryCreationDate 59178 attribute has a cardinality of 1 59180 meaning that for each instance of the SelectionByCreationDate 59166 entity there is one LowerBoundaryCreationDate 59178 attribute. The UpperBoundaryCreationDate 59182 attribute has a cardinality of 0 . . . 1 59184 meaning that for each instance of the SelectionByCreationDate 59166 entity there may be one UpperBoundaryCreationDate 59182 attribute.

The SelectionByLastChangeDate 59186 entity has a cardinality of 0 . . . n 59188 meaning that for each instance of the FundsCommitmentDocumentSelectionByBasicData 59006 entity there may be one or more SelectionByLastChangeDate 59186 entities. The SelectionByLastChangeDate 59186 entity includes various attributes, namely an InclusionExclusionCode 59190, an IntervalBoundaryTypeCode 59194, a LowerBoundaryLastChangeDate 59198 and an UpperBoundaryLastChangeDate 59202. The InclusionExclusionCode 59190 attribute has a cardinality of 1 59192 meaning that for each instance of the SelectionByLastChangeDate 59186 entity there is one InclusionExclusionCode 59190 attribute.

The IntervalBoundaryTypeCode 59194 attribute has a cardinality of 1 59196 meaning that for each instance of the SelectionByLastChangeDate 59186 entity there is one IntervalBoundaryTypeCode 59194 attribute. The LowerBoundaryLastChangeDate 59198 attribute has a cardinality of 1 59200 meaning that for each instance of the SelectionByLastChangeDate 59186 entity there is one LowerBoundaryLastChangeDate 59198 attribute. The UpperBoundaryLastChangeDate 59202 attribute has a cardinality of 0 . . . 1 59204 meaning that for each instance of the SelectionByLastChangeDate 59186 entity there may be one UpperBoundaryLastChangeDate 59202 attribute.

The ProcessingConditions 59206 package includes a QueryProcessingConditions 59208 entity. The QueryProcessingConditions 59208 entity has a cardinality of 0 . . . 1 59210 meaning that for each instance of the ProcessingConditions 59206 package there may be one QueryProcessingConditions 59208 entity. The QueryProcessingConditions 59208 entity includes various attributes, namely a QueryHitsMaximumNumberValue 59212 and an UnlimitedQueryHitsIndicator 59216.

The QueryHitsMaximumNumberValue 59212 attribute has a cardinality of 0 . . . 1 59214 meaning that for each instance of the QueryProcessingConditions 59208 entity there may be one QueryHitsMaximumNumberValue 59212 attribute. The UnlimitedQueryHitsIndicator 59216 attribute has a cardinality of 1 59218 meaning that for each instance of the QueryProcessingConditions 59208 entity there is one UnlimitedQueryHitsIndicator 59216 attribute. The data types of the various packages, entities, and attributes are described with respect to FIG. 52.

Additionally, FIGS. 60-1 through 60-3 show an example configuration of an Element Structure that includes a FundsCommitmentDocumentERPBasicDataByBasicDataResponseMessage_sync 60000 package. The FundsCommitmentDocumentERPBasicDataByBasicDataResponseMessage_sync 60000 package includes a FundsCommitmentDocumentERPBasicDataByBasicDataResponseMessage_sync 60002 entity. The FundsCommitmentDocumentERPBasicDataByBasicDataResponseMessage_sync 60000 package includes various packages, namely a FundsCommitmentDocument 60004, a ProcessingConditions 60050, and a Log 60064.

The FundsCommitmentDocument 60004 package includes a FundsCommitmentDocument 60006 entity. The FundsCommitmentDocument 60006 entity has a cardinality of 0 . . . n 60008 meaning that for each instance of the FundsCommitmentDocument 60004 package there may be one or more FundsCommitmentDocument 60006 entities. The FundsCommitmentDocument 60006 entity includes various attributes, namely an ID 60010, a CompanyID 60014, a CategoryCode 60018, a TypeCode 60022, a CategoryName 60026, a TypeName 60030, a Date 60034, a PostingDate 60038, a BusinessTransactionDocumentReference 60042 and a Note 60046. The ID 60010 attribute has a cardinality of 1 60012 meaning that for each instance of the FundsCommitmentDocument 60006 entity there is one ID 60010 attribute.

The CompanyID 60014 attribute has a cardinality of 0 . . . 1 60016 meaning that for each instance of the FundsCommitmentDocument 60006 entity there may be one CompanyID 60014 attribute. The CategoryCode 60018 attribute has a cardinality of 0 . . . 1 60020 meaning that for each instance of the FundsCommitmentDocument 60006 entity there may be one CategoryCode 60018 attribute. The TypeCode 60022 attribute has a cardinality of 0 . . . 1 60024 meaning that for each instance of the FundsCommitmentDocument 60006 entity there may be one TypeCode 60022 attribute. The CategoryName 60026 attribute has a cardinality of 0 . . . 1 60028 meaning that for each instance of the FundsCommitmentDocument 60006 entity there may be one CategoryName 60026 attribute.

The TypeName 60030 attribute has a cardinality of 0 . . . 1 60032 meaning that for each instance of the FundsCommitmentDocument 60006 entity there may be one TypeName 60030 attribute. The Date 60034 attribute has a cardinality of 0 . . . 1 60036 meaning that for each instance of the FundsCommitmentDocument 60006 entity there may be one Date 60034 attribute. The PostingDate 60038 attribute has a cardinality of 0 . . . 1 60040 meaning that for each instance of the FundsCommitmentDocument 60006 entity there may be one PostingDate 60038 attribute. The BusinessTransactionDocumentReference 60042 attribute has a cardinality of 0 . . . 1 60044 meaning that for each instance of the FundsCommitmentDocument 60006 entity there may be one BusinessTransactionDocumentReference 60042 attribute. The Note 60046 attribute has a cardinality of 0 . . . 1 60048 meaning that for each instance of the FundsCommitmentDocument 60006 entity there may be one Note 60046 attribute.

The ProcessingConditions 60050 package includes a ResponseProcessingConditions 60052 entity. The ResponseProcessingConditions 60052 entity has a cardinality of 1 60054 meaning that for each instance of the ProcessingConditions 60050 package there is one ResponseProcessingConditions 60052 entity. The ResponseProcessingConditions 60052 entity includes various attributes, namely a ReturnedQueryHitsNumberValue 60056 and a MoreElementsAvailableIndicator 60060. The ReturnedQueryHitsNumberValue 60056 attribute has a cardinality of 1 60058 meaning that for each instance of the ResponseProcessingConditions 60052 entity there is one ReturnedQueryHitsNumberValue 60056 attribute. The MoreElementsAvailableIndicator 60060 attribute has a cardinality of 1 60062 meaning that for each instance of the ResponseProcessingConditions 60052 entity there is one MoreElementsAvailableIndicator 60060 attribute.

The Log 60064 package includes a Log 60066 entity. The Log 60066 entity has a cardinality of 1 60068 meaning that for each instance of the Log 60064 package there is one Log 60066 entity. The data types of the various packages, entities, and attributes are described with respect to FIG. 52.

Additionally, FIG. 61 shows an example configuration of an Element Structure that includes a FundsCommitmentDocumentERPCompleteRequestMessage_sync 61000 package. The FundsCommitmentDocumentERPCompleteRequestMessage_sync 61000 package includes a FundsCommitmentDocumentERPCompleteRequestMessage_sync 61002 entity. The FundsCommitmentDocumentERPCompleteRequestMessage_sync 61000 package includes various packages, namely a MessageHeader 61004, and a FundsCommitmentDocument 61010.

The MessageHeader 61004 package includes a MessageHeader 61006 entity. The MessageHeader 61006 entity has a cardinality of 0 . . . 1 61008 meaning that for each instance of the MessageHeader 61004 package there may be one MessageHeader 61006 entity.

The FundsCommitmentDocument 61010 package includes a FundsCommitmentDocument 61012 entity. The FundsCommitmentDocument 61012 entity has a cardinality of 1 61014 meaning that for each instance of the FundsCommitmentDocument 61010 package there is one FundsCommitmentDocument 61012 entity. The FundsCommitmentDocument 61012 entity includes an ID 61016 attribute. The ID 61016 attribute has a cardinality of 1 61018 meaning that for each instance of the FundsCommitmentDocument 61012 entity there is one ID 61016 attribute. The data types of the various packages, entities, and attributes are described with respect to FIG. 52.

Additionally, FIG. 62 shows an example configuration of an Element Structure that includes a FundsCommitmentDocumentERPCompleteConfirmationMessage 62000 package. The FundsCommitmentDocumentERPCompleteConfirmationMessage 62000 package includes a FundsCommitmentDocumentERPCompleteConfirmationMessage_sync 62002 entity. The FundsCommitmentDocumentERPCompleteConfirmationMessage 62000 package includes various packages, namely a MessageHeader 62004, and a Log 62010.

The MessageHeader 62004 package includes a MessageHeader 62006 entity. The MessageHeader 62006 entity has a cardinality of 0 . . . 1 62008 meaning that for each instance of the MessageHeader 62004 package there may be one MessageHeader 62006 entity.

The Log 62010 package includes a Log 62012 entity. The Log 62012 entity has a cardinality of 1 62014 meaning that for each instance of the Log 62010 package there is one Log 62012 entity. The data types of the various packages, entities, and attributes are described with respect to FIG. 52.

InsuranceContract Interfaces

The interfaces in the InsuranceContractReturnInformation scenario can be used in application to application (A2A) processes in the insurance industry to exchange information from insurance-specific collection processes between a collection and disbursement component and upstream or downstream components, such as in-force business management or a claims system. Information from insurance-specific collection processes can refer to a process step being reached, or an occurrence of a business transaction. The InsuranceContract scenarios focus on information with exception character, meaning information from processes for which exception facts have occurred during payment and settlement transactions. In some implementations, information is used from collection processes, such as dunning, payment or invoicing, to trigger processes in subsequent systems, such as changes. The InsuranceContractReturnInformation scenario is a scenario that exchanges insurance-specific information from collection/disbursement processes between a settling system (e.g., Collections/Disbursements system) and other insurance systems, such as an in-force business management system (e.g., insurance policy management system), or a claims management system.

A collection/disbursement component (e.g., settlement component) can be an integral component of every insurance system landscape. In some implementations, varied information is used from collection processes (such as dunning, payment and invoicing) to trigger follow-up processes in upstream and downstream components. For example, if it is not possible to collect a premium because a customer's bank account has been deleted, collection process information is used in an in-force business management system that delivers posting data and requests the creation of management objects for a settlement component, in order to change the payment (e.g., automatic debit or direct payer). In some implementations, information from collection processes always refers to an existing insurance policy.

Processing cross-component business processes in the insurance industry uses efficient confirmations from the collection and disbursement component. Standardization of these information messages should increase the suitability of the collection and disbursement component for integration in existing system landscapes, from a technical and business perspective.

A DunningLevelAchievedNotification can be a message from a Collections/Disbursements system to an in-force business management system to say that a specific dunning level has been reached for a contract account. The structure of the DunningLevelAchievedNotification can be defined by the DunningLevelAchievedNotification message data category.

A PaymentReturnsOccurredNotification can be a message from a Collections/Disbursements system to an in-force business management system or claims management system about a payment return, such as a failed payment or check presentment, for a contract account. The structure of the PaymentReturnsOccurredNotification can be defined by the PaymentReturnsOccurredNotification message data category.

A DepositShortageOccurredNotification can be a message from a Collections/Disbursements system to an in-force business management system, to inform about insufficient coverage on a credit account if insufficient coverage is available to clear a due receivable. The structure of the DepositShortageOccurredNotification can be defined by the DepositShortageOccurredNotification message data category.

A CustomerInitiatedPaymentReceivedNotification can be a message from a Collections/Disbursements system to an in-force business management system about a customer-initiated payment for a contract account. A customer-initiated payment can be a payment initiated by a business partner. In some implementations, no receivable exists yet for this payment in a collections/disbursements system. The structure of the CustomerInitiatedPaymentReceivedNotification can be defined by the CustomerInitiatedPaymentReceivedNotification message data category.

An InsuranceContractBenefitFreePeriodByInsuranceContractIDAndClaimPeriodQuery can be a query from a claims management system to a Collections/Disbursements system or in-force business management system, to determine whether benefit exemption exists for an insurance policy for a claim period, due to payments that have not been made. The structure of the InsuranceContractBenefitFreePeriodByInsuranceContractIDAndClaimPeriodQuery can be defined by the InsuranceContractBenefitFreePeriodByInsuranceContractIDAndClaimPeriodQuery message data category.

An InsuranceContractBenefitFreePeriodByInsuranceContractIDAndClaimPeriodResponse can be a response from a Collections/Disbursements or in-force business management system to a claims management system to say whether a benefit exemption exists for an insurance policy and in which periods. The structure of the InsuranceContractBenefitFreePeriodByInsuranceContractIDAndClaimPeriodResponse can be defined by the InsuranceContractBenefitFreePeriodByInsuranceContractIDAnd ClaimPeriodResponse message data category.

A PaymentReturnsOccurredBulkNotification can be a message from a Collections/Disbursements system to an in-force business management system or claims management system about a payment return, such as failed payment or check presentment, for several contract accounts. The structure of the PaymentReturnsOccurredBulkNotification can be defined by the PaymentReturnsOccurredBulkNotification message data category.

A DepositShortageOccurredBulkNotification can be a message from a Collections/Disbursements system to an in-force business management system, to inform about insufficient coverage for several deposit accounts if sufficient coverage is not available to clear a due receivable. The structure of the DepositShortageOccurredBulkNotification can be defined by the DepositShortageOccurredBulkNotification message data category.

A CustomerInitiatedPaymentReceivedBulkNotification can be a message from a Collections/Disbursements system to an in-force business management system, about customer-initiated payments on contract accounts. A customer-initiated payment can be a payment initiated by a business partner. In some implementations, no receivable exists yet for this payment in a collections/disbursements system. The structure of the CustomerInitiatedPaymentReceivedBulkNotification can be defined by the CustomerInitiatedPaymentReceivedBulkNotification message data category.

A ContractAccountsReceivablesPayablesPostingDocumentQuotationNotification can be a message from a Collections/Disbursements system to an in-force business management system about a status of acceptance of a quotation offered to a customer. Insurance companies can offer their customers the possibility to yearly adapt their premiums by a given percentage to cope with natural inflation. The yearly adaptation can be called a quotation. The customer can decide via his payments whether he accepts the quotation or not. The payment information is known by the Collections/Disbursements system and can be sent out to a Policy Management System. The structure of the ContractAccountsReceivablesPayablesPostingDocumentQuotationNotification can be defined by the ContractAccountsReceivablesPayablesPostingDocumentQuotationNotification message data category.

A ContractAccountsReceivablesPayablesPostingDocumentQuotationBulkNotification can be a message from a Collections/Disbursements system to an in-force business management system about a status of acceptance of quotations offered to customers. Insurance companies can offer their customers the possibility to yearly adapt their premiums by a given percentage to cope with natural inflation. The yearly adaptation can be called a quotation. The customer can decide via his payments whether he accepts the quotation or not. The payment information can be known by the Collections/Disbursements system and can be sent out to the Policy Management System. The structure of the ContractAccountsReceivablesPayablesPostingDocumentQuotationBulkNotification can be defined by the ContractAccountsReceivablesPayablesPostingDocumentQuotationBulkNotification message data category.

A RunningDunningProcedureNotification in a view used for the RunningDunningProcedure Notification includes information about the status of a running dunning procedure of an insurance contract. A running dunning procedure can represent a sequence of dunnings, ordered by their date of issue. The structure of the RunningDunningProcedureNotification is defined by the RunningDunningProcedureNotification message data category.

A RunningDunningProcedureBulkNotification in a view used for the RunningDunningProcedureBulk Notification includes information about the status of running dunning procedures of insurance contracts. A running dunning procedure can represent a sequence of dunnings, ordered by their date of issue. The structure of the RunningDunningProcedureBulk Notification can be defined by the RunningDunningProcedureBulkNotification message data category.

Data can be transferred from insurance-specific operational systems, such as insurance policy management, or claims management, to a collection and disbursement component, for processing collection and disbursement processes. In the collection and disbursement component, the system processes master data, such as data for business partners, insurance policies, or broker hierarchies, and transaction data, such as premiums, commission, or claims. Data transfer to the collection and disbursement component can take place using standardized interfaces.

The collection and disbursement component can execute insurance-specific collection and disbursement processes, such as dunning, payment, or invoicing. If certain business transactions occur, for example, a dunning level is reached in the current dunning procedure, the system can generate, update and send messages to a defined recipient system. Information about the business transaction can be used to trigger a follow-up process in the recipient system. The messages can be a notification of a status, from the Notification message category as seen by an interface paradigm. No definite answer to the notification is expected from the recipient system (in an asynchronous scenario).

A follow-up activity can be triggered in the recipient system, dependent on the sending process. The follow-up activity can trigger another activity in the collection and disbursement component. There can be a message pair that represents a question-answer process. These messages are questions or answers for a status. For example, a question may ask if the insurance policy is benefit-exempt or in benefit, and can be in the Query/Response message category as seen by the interface paradigm. A definite answer, or response, to the notification can be expected from the recipient system (in a synchronous scenario).

The PaymentReturnsOccurredBulkNotification can be implemented using the following message interfaces: PaymentReturnsOccurredBulkNotification_Out, PaymentReturnsOccurredBulkNotification_In and PaymentReturnsOccurredBulkNotification_In.

The DepositShortageOccurredBulkNotification can be implemented using the following message interfaces: DepositShortageOccurredBulkNotification_Out and DepositShortageOccurredBulkNotification_In.

The CustomerInitiatedPaymentReceivedBulkNotification can be implemented using the following message interfaces: CustomerInitiatedPaymentReceivedBulkNotification_Out and CustomerInitiatedPaymentReceivedBulkNotification_In.

The ContractAccountsReceivablesPaybablesPostingDocumentQuotationBulkNotification can be implemented using the following message interfaces: ContractAccountsReceivablesPaybablesPostingDocumentQuotationBulkNotification_Out and ContractAccountsReceivablesPaybablesPostingDocumentQuotationBulkNotification_In.

The RunningDunningProcedureBulkNotification can be implemented using the following message interfaces: RunningDunningProcedureBulkNotification_Out and RunningDunningProcedureBulkNotification_In.

Figure 63:
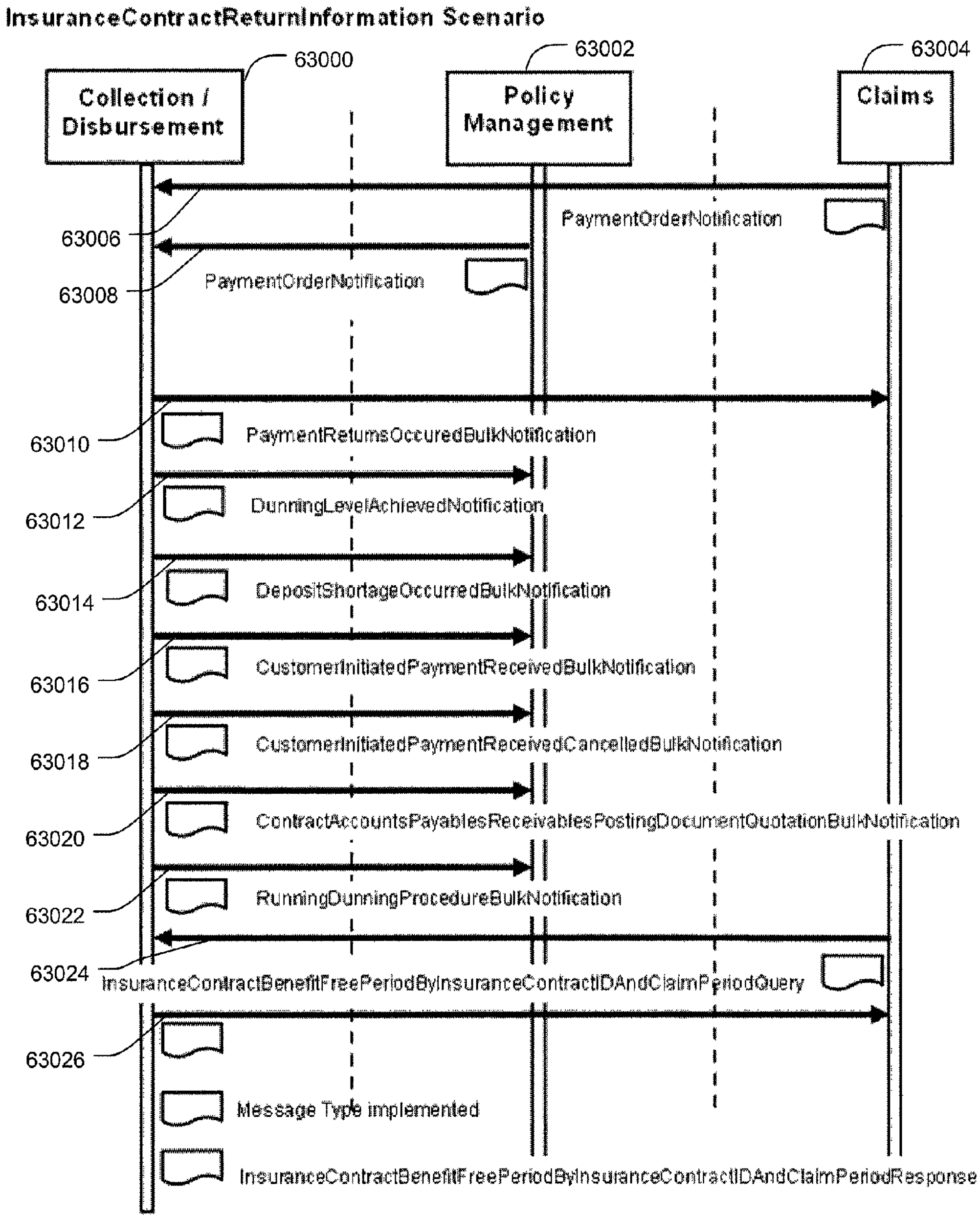
FIG. 63 shows an exemplary InsuranceContractReturnInformation Message Choreography.

The message choreography of FIG. 63 describes a possible logical sequence of messages that can be used to realize an Insurance Contract Return Information business scenario.

A "Claims" system 63004 can notify a "Collection/Disbursement" system 63000 of a payment order, using a PaymentOrderNotification message 63006 as shown, for example in FIG. 63. A "Policy Management" system 63002 can notify the "Collection/Disbursement" system 63000 of a payment order, using a PaymentOrderNotification message 63008 as shown, for example, in FIG. 63.

The "Collection/Disbursement" system 63000 can notify the "Claims" system 63004 about payment returns that have occurred in several accounts, using a PaymentReturnsOccurredBulkNotification message 63010 as shown, for example, in FIG. 63.

The "Collection/Disbursement" system 63000 can notify the "Policy Management" system 63002 about a dunning level achieved, using a DunningLevelAchieved message 63012 as shown, for example, in FIG. 63.

The "Collection/Disbursement" system 63000 can notify the "Policy Management" system 63002 about a deposit shortage that has occurred for several accounts, using a DepositShortageOccurredBulkNotification message 63014 as shown, for example, in FIG. 63.

The "Collection/Disbursement" system 63000 can notify the "Policy Management" system 63002 about the receipt of a customer initiated payment for several accounts, using a CustomerInitiatedPaymentReceivedBulkNotification message 63016 as shown, for example, in FIG. 63.

The "Collection/Disbursement" system 63000 can notify the "Policy Management" system 63002 about the cancellation of a customer initiated payment for several accounts, using a CustomerInitiatedPaymentReceivedCancelledBulkNotification message 63018 as shown, for example, in FIG. 63.

The "Collection/Disbursement" system 63000 can notify the "Policy Management" system 63002 about the status of a quotation, using a ContractsAccountsPayablesReceivablesPostingDocumentQuotationBulkNotification message 63020 as shown, for example, in FIG. 63.

The "Collection/Disbursement" system 63000 can notify the "Policy Management" system 63002 about the status of a running dunning procedure of an insurance contract, using a DunningLevelAchieved message 63022 as shown, for example, in FIG. 63.

The "Claims" system 63004 can query the "Collection/Disbursement" system 63000 about whether benefit exemption exists for an insurance policy, for a claim period due to payments that have not made been made, using an InsuranceContractBenefitFreePeriodBy-InsuranceContractIDAndClaimPeriodQuery message 63024 as shown, for example, in FIG. 63.

The "Collection/Disbursement" system 63000 can respond to the "Claims" system 63004 about whether benefit exemption exists for an insurance policy, and for which claim periods, using an InsuranceContractBenefitFreePeriodByInsuranceContractIDAndClaimPeriodResponse message 63026 as shown, for example, in FIG. 63.

Figure 64:
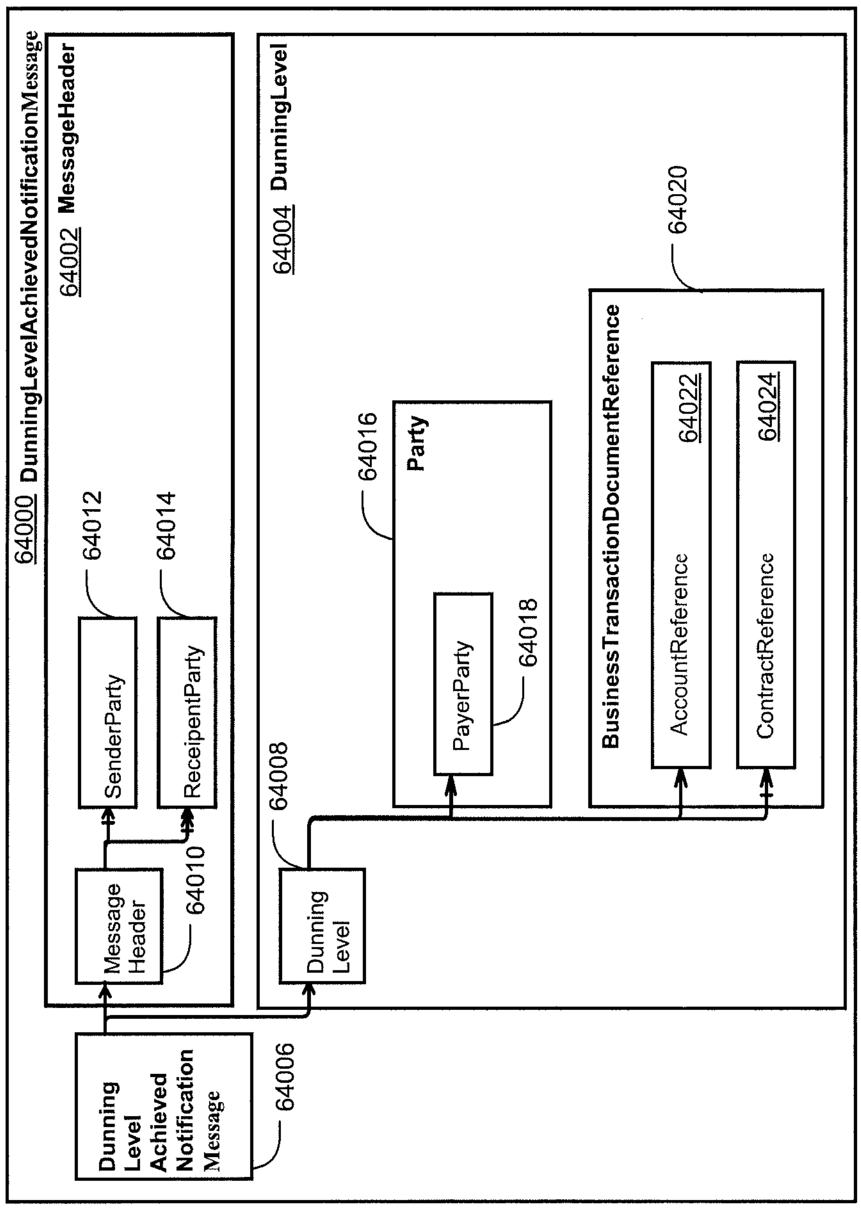
FIG. 64 shows an exemplary DunningLevelAchievedNotificationMessage Message Data Type.

FIG. 64 illustrates one example logical configuration of DunningLevelAchievedNotificationMessage message 64000. Specifically, this figure depicts the arrangement and hierarchy of various components such as one or more levels of packages, entities, and datatypes, shown here as 64002 through 64024. As described above, packages may be used to represent hierarchy levels. Entities are discrete business elements that are used during a business transaction. Data types are used to type object entities and interfaces with a structure. For example, DunningLevelAchievedNotificationMessage message 64000 includes, among other things, DunningLevel 64008. Accordingly, heterogeneous applications may communicate using this consistent message configured as such.

Figure 65:
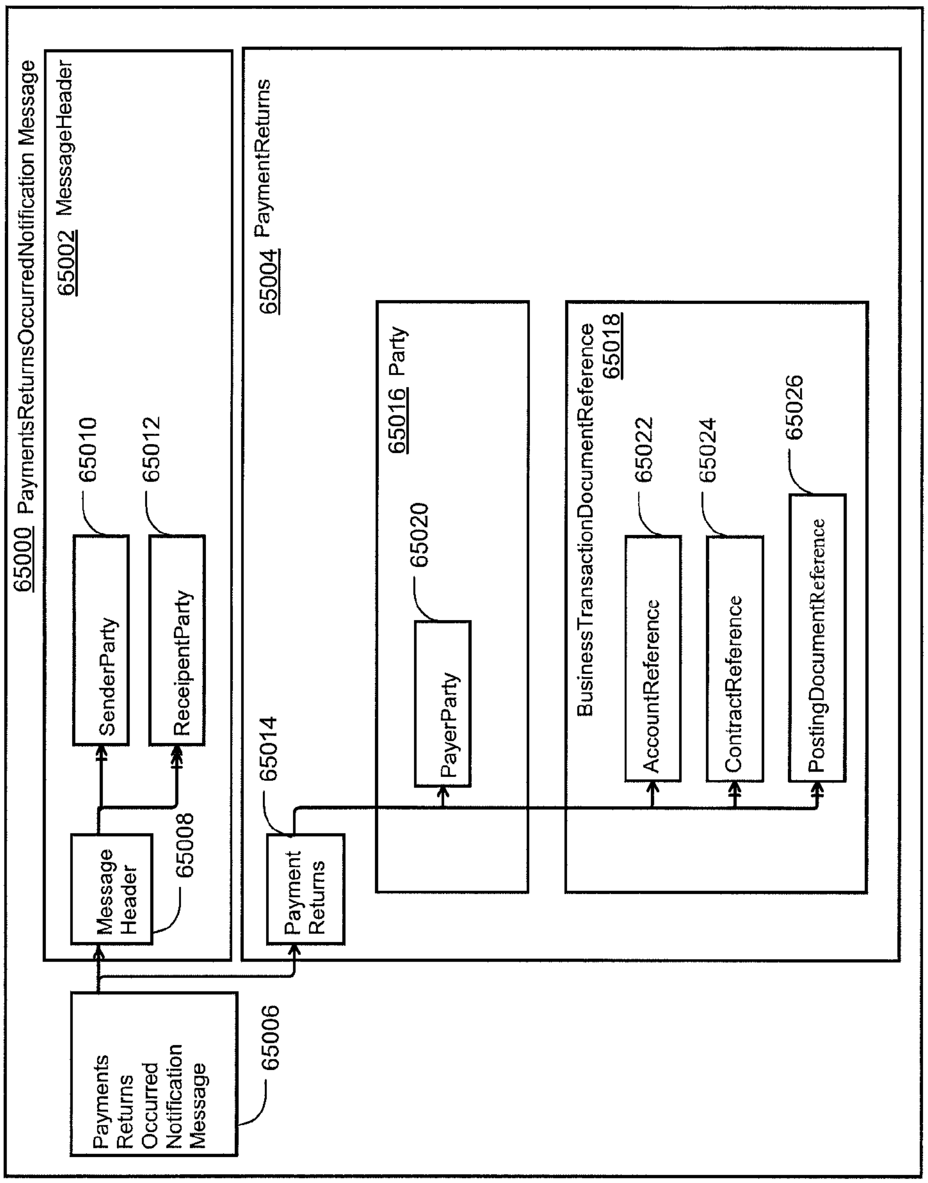
FIG. 65 shows an exemplary PaymentsReturnsOccurred-NotificationMessage Message Data Type.

Additionally, FIG. 65 illustrates one example logical configuration of PaymentsReturnsOccurredNotificationMessage message 65000. Specifically, this figure depicts the arrangement and hierarchy of various components such as one or more levels of packages, entities, and datatypes, shown here as 65002 through 65026. As described above, packages may be used to represent hierarchy levels. Entities are discrete business elements that are used during a business transaction. Data types are used to type object entities and interfaces with a structure. For example, PaymentsReturnsOccurredNotificationMessage message 65000 includes, among other things, PaymentReturns 65014. Accordingly, heterogeneous applications may communicate using this consistent message configured as such.

Figure 66:
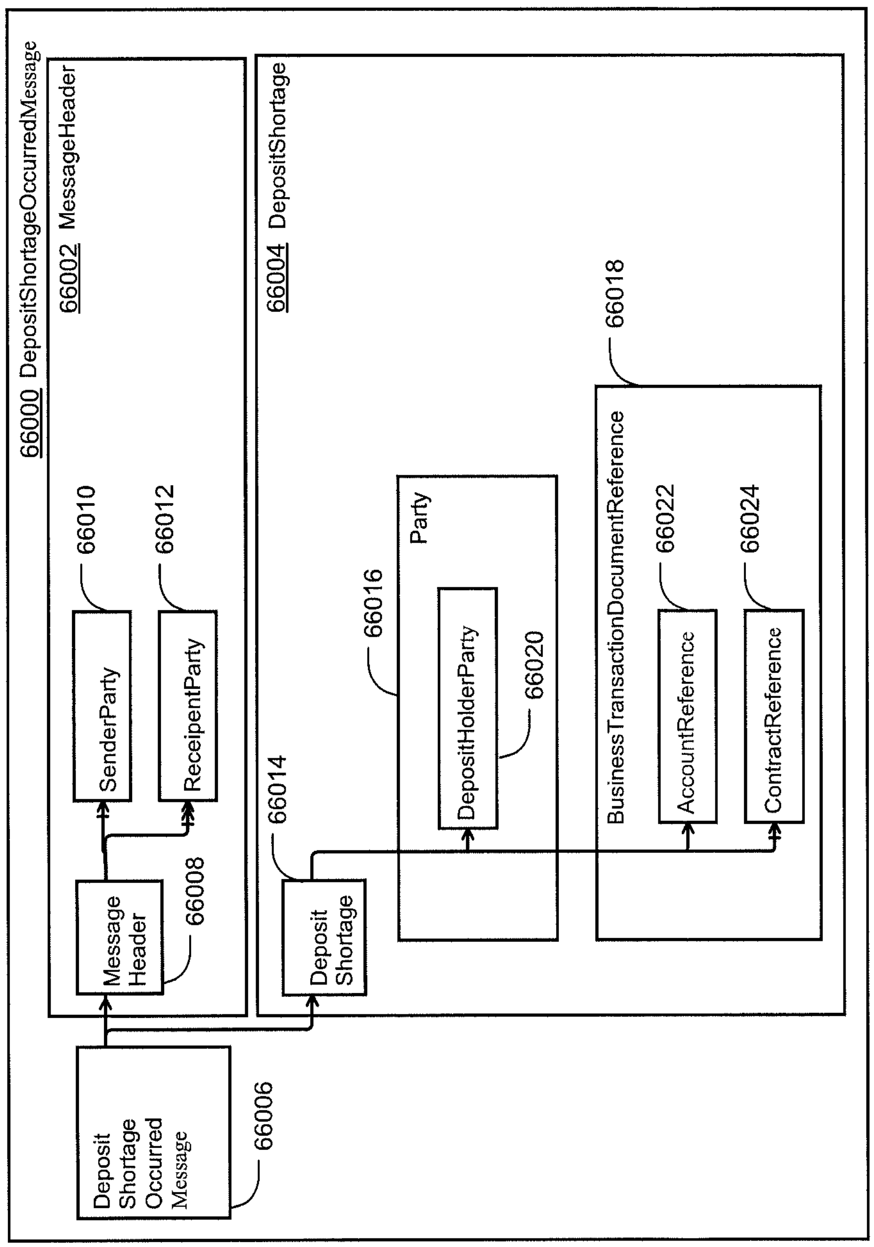
FIG. 66 shows an exemplary DepositShortageOccurred-Message Message Data Type.

Additionally, FIG. 66 illustrates one example logical configuration of DepositShortageOccurredMessage message 66000. Specifically, this figure depicts the arrangement and hierarchy of various components such as one or more levels of packages, entities, and datatypes, shown here as 66002 through 66024. As described above, packages may be used to represent hierarchy levels. Entities are discrete business elements that are used during a business transaction. Data types are used to type object entities and interfaces with a structure. For example, DepositShortageOccurredMessage message 66000 includes, among other things, DepositShortage 66014. Accordingly, heterogeneous applications may communicate using this consistent message configured as such.

Figure 67:
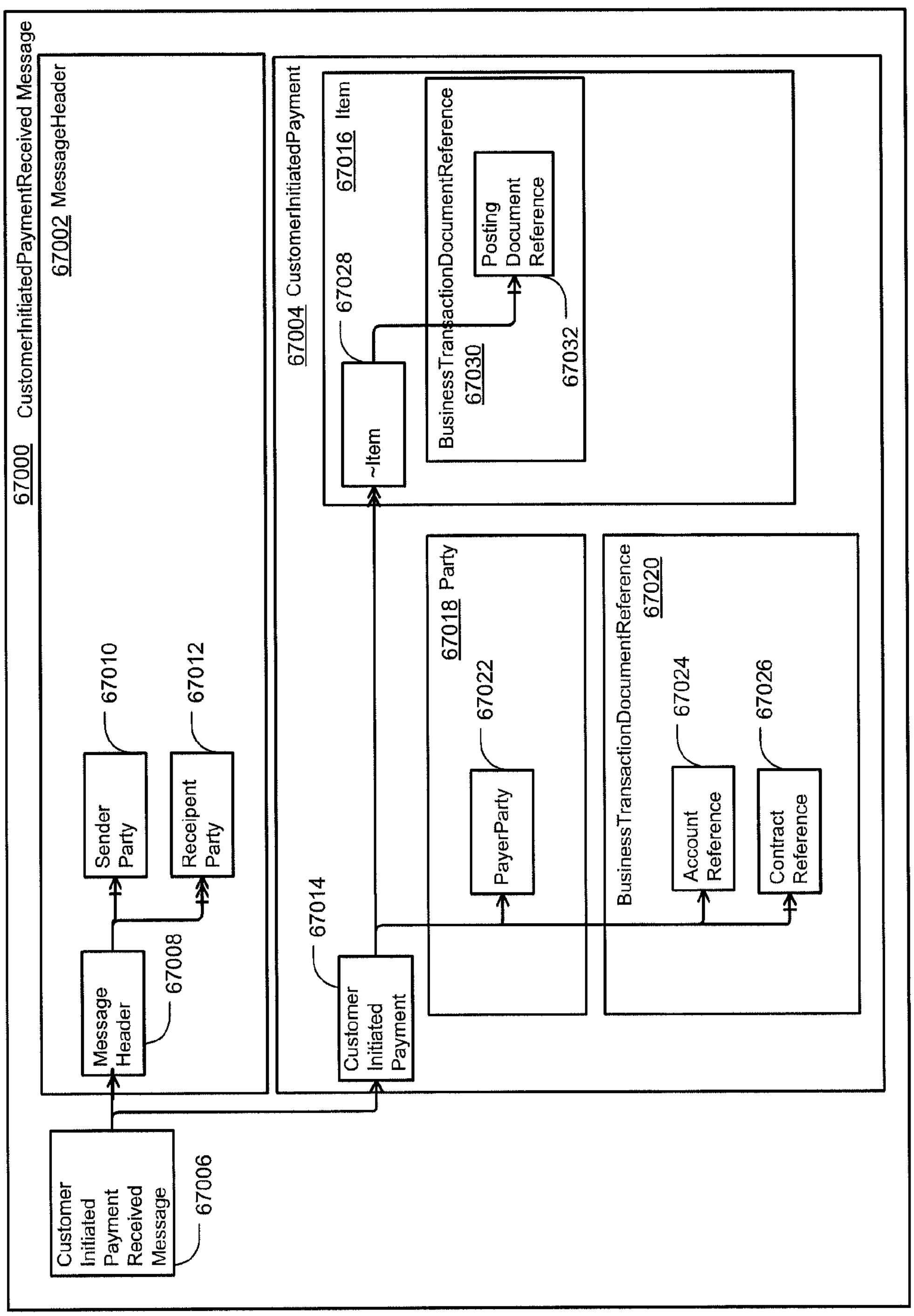
FIG. 67 shows an exemplary CustomerInitiatedPaymentReceivedMessage Message Data Type.

Additionally, FIG. 67 illustrates one example logical configuration of CustomerInitiatedPaymentReceivedMessage message 67000. Specifically, this figure depicts the arrangement and hierarchy of various components such as one or more levels of packages, entities, and datatypes, shown here as 67002 through 67032. As described above, packages may be used to represent hierarchy levels. Entities are discrete business elements that are used during a business transaction. Data types are used to type object entities and interfaces with a structure. For example, CustomerInitiatedPaymentReceivedMessage message 67000 includes, among other things, CustomerInitiatedPayment 67014. Accordingly, heterogeneous applications may communicate using this consistent message configured as such.

Figure 68:
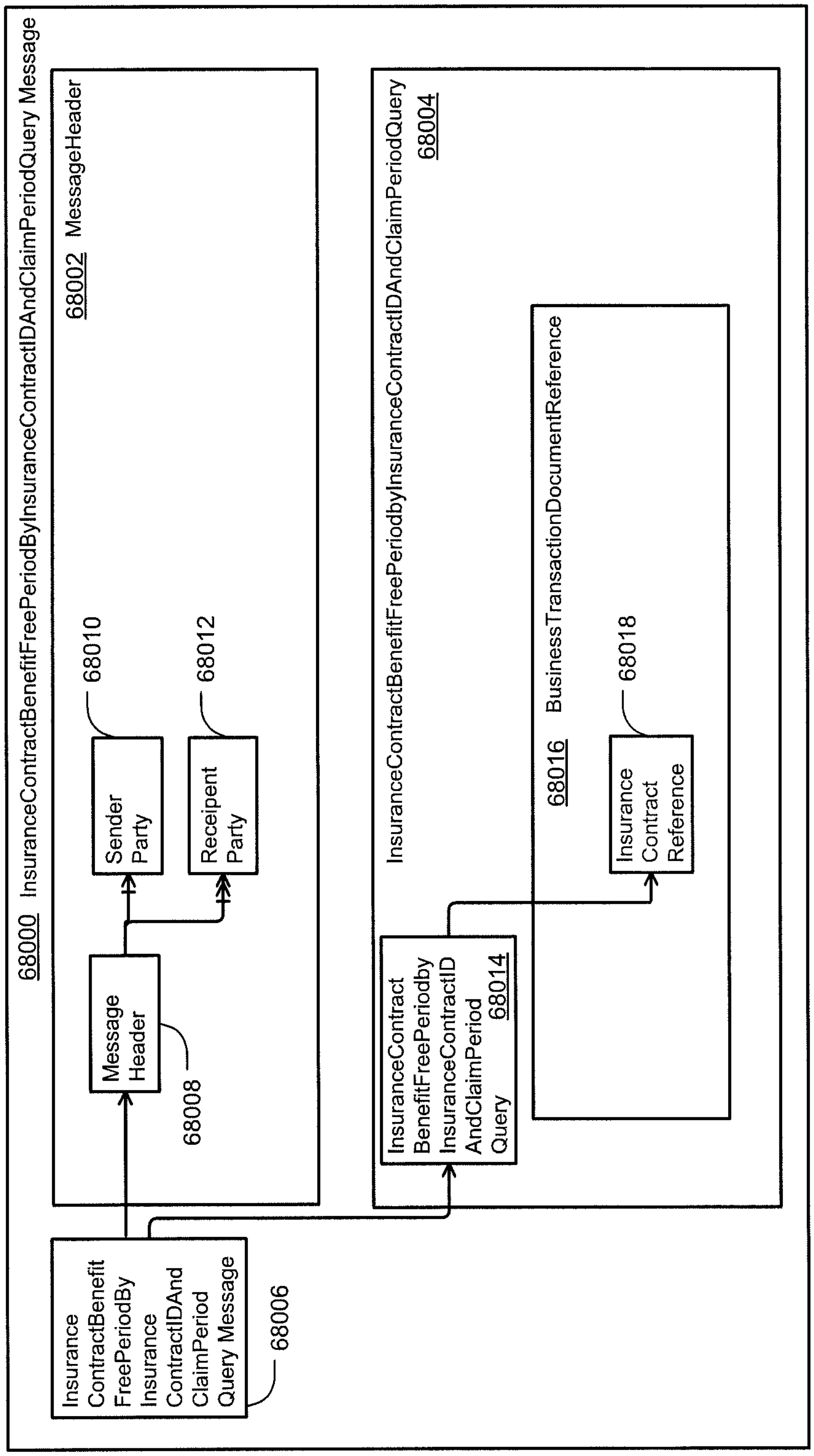
FIG. 68 shows an exemplary InsuranceContractBenefit-FreePeriodByInsuranceContractIDAndClaimPeriodQueryMessage Message Data Type.

Additionally, FIG. 68 illustrates one example logical configuration of InsuranceContractBenefitFreePeriodByInsuranceContractIDAndClaimPeriodQueryMessage message 68000. Specifically, this figure depicts the arrangement and hierarchy of various components such as one or more levels of packages, entities, and datatypes, shown here as 68002 through 68018. As described above, packages may be used to represent hierarchy levels. Entities are discrete business elements that are used during a business transaction. Data types are used to type object entities and interfaces with a structure. For example, InsuranceContractBenefitFreePeriodByInsuranceContractIDAndClaimPeriodQueryMessage message 68000 includes, among other things, InsuranceContractBenefitFreePeriodByInsuranceContractIDAndClaimPeriodQuery 68014. Accordingly, heterogeneous applications may communicate using this consistent message configured as such.

Figure 69:
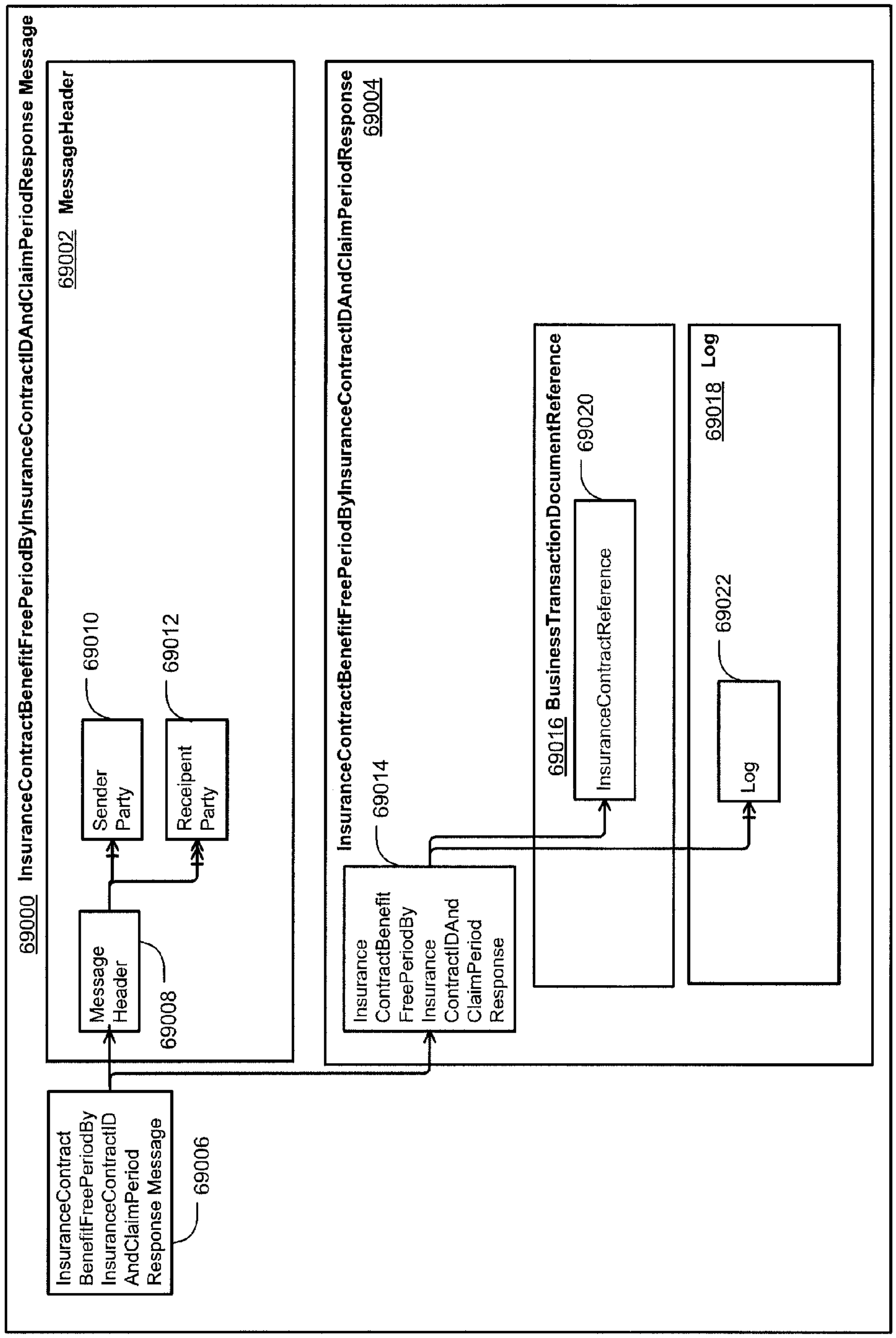
FIG. 69 shows an exemplary InsuranceContractBenefit-FreePeriodByInsuranceContractIDAndClaimPeriodResponseMessage Message Data Type.

Additionally, FIG. 69 illustrates one example logical configuration of InsuranceContractBenefitFreePeriodByInsuranceContractIDAndClaimPeriodResponseMessage message 69000. Specifically, this figure depicts the arrangement and hierarchy of various components such as one or more levels of packages, entities, and datatypes, shown here as 69002 through 69022. As described above, packages may be used to represent hierarchy levels. Entities are discrete business elements that are used during a business transaction. Data types are used to type object entities and interfaces with a structure. For example, InsuranceContractBenefitFreePeriodByInsuranceContractIDAndClaimPeriodResponseMessage message 69000 includes, among other things, InsuranceContractBenefitFreePeriodByInsuranceContractIDAndClaimPeriodResponse 69014. Accordingly, heterogeneous applications may communicate using this consistent message configured as such.

Figure 70:
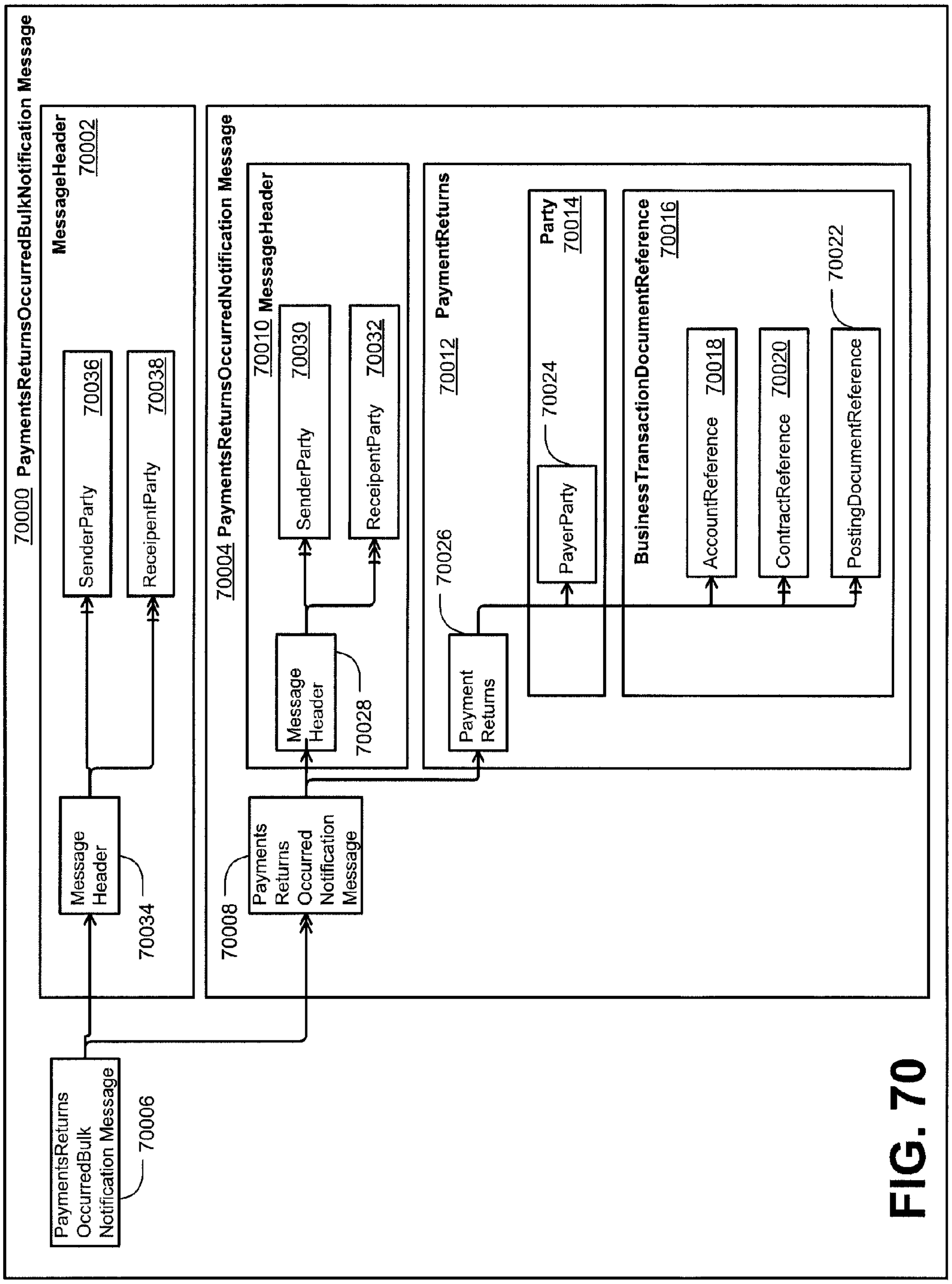
FIG. 70 shows an exemplary PaymentsReturnsOccurred-BulkNotificationMessage Message Data Type.

Additionally, FIG. 70 illustrates one example logical configuration of PaymentsReturnsOccurredBulkNotificationMessage message 70000. Specifically, this figure depicts the arrangement and hierarchy of various components such as one or more levels of packages, entities, and datatypes, shown here as 70002 through 70038. As described above, packages may be used to represent hierarchy levels. Entities are discrete business elements that are used during a business transaction. Data types are used to type object entities and interfaces with a structure. For example, PaymentsReturnsOccurredBulkNotificationMessage message 70000 includes, among other things, PaymentsReturnedOccurredNotificationMessage 70008. Accordingly, heterogeneous applications may communicate using this consistent message configured as such.

Figure 71:
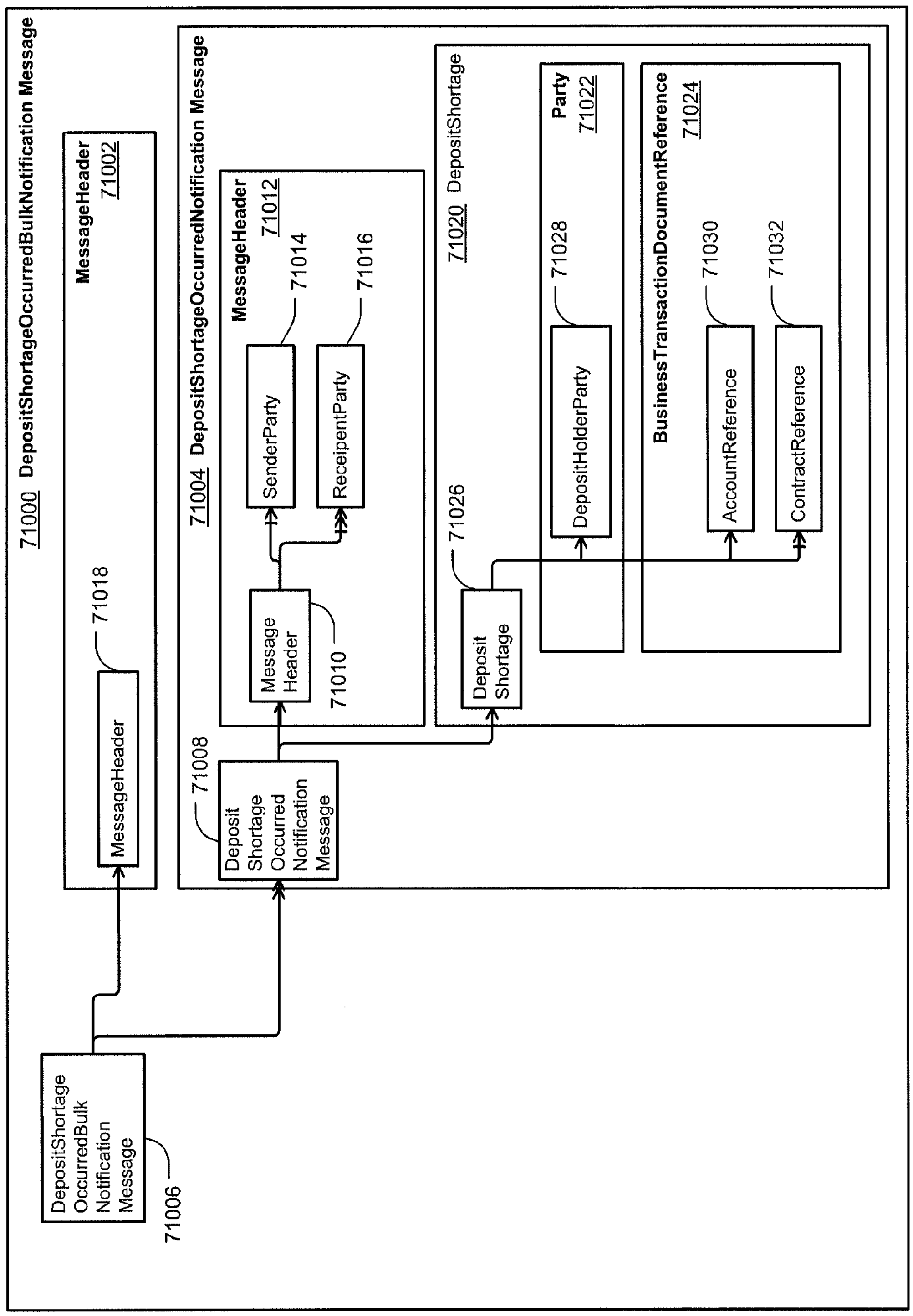
FIG. 71 shows an exemplary DepositShortageOccurred-BulkNotificationMessage Message Data Type.

Additionally, FIG. 71 illustrates one example logical configuration of DepositShortageOccurredBulkNotificationMessage message 71000. Specifically, this figure depicts the arrangement and hierarchy of various components such as one or more levels of packages, entities, and datatypes, shown here as 71002 through 71032. As described above, packages may be used to represent hierarchy levels. Entities are discrete business elements that are used during a business transaction. Data types are used to type object entities and interfaces with a structure. For example, DepositShortageOccurredBulkNotificationMessage message 71000 includes, among other things, DepositShortageOccurredNotificationMessage 71008. Accordingly, heterogeneous applications may communicate using this consistent message configured as such.

Figure 72:
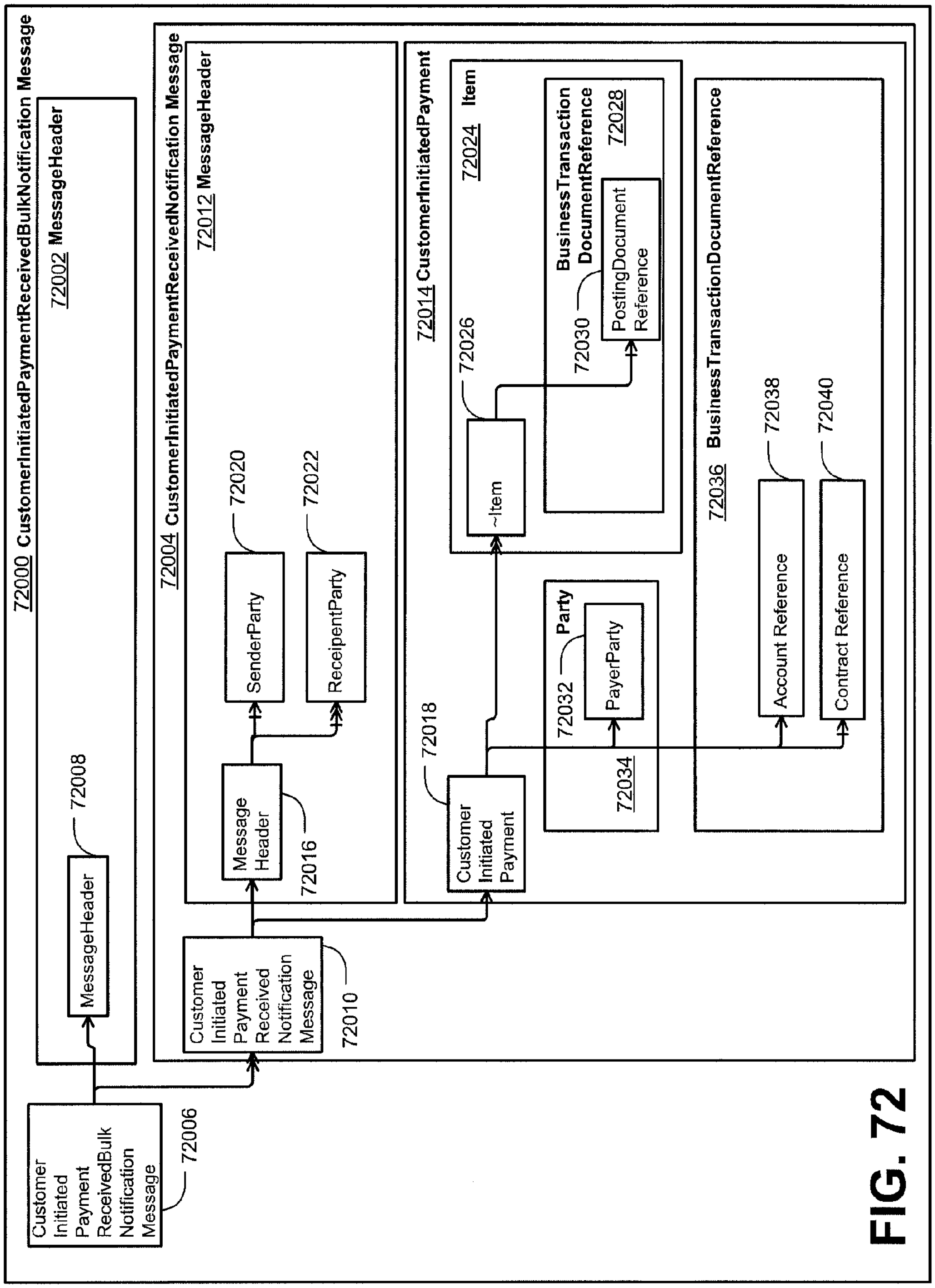
FIG. 72 shows an exemplary CustomerInitiatedPaymentReceivedBulkNotificationMessage Message Data Type.

Additionally, FIG. 72 illustrates one example logical configuration of CustomerInitiatedPaymentReceivedBulkNotificationMessage message 72000. Specifically, this figure depicts the arrangement and hierarchy of various components such as one or more levels of packages, entities, and datatypes, shown here as 72002 through 72040. As described above, packages may be used to represent hierarchy levels. Entities are discrete business elements that are used during a business transaction. Data types are used to type object entities and interfaces with a structure. For example, CustomerInitiatedPaymentReceivedBulkNotificationMessage message 72000 includes, among other things, CustomerInitiatedPaymentReceivedNotificationMessage 72010. Accordingly, heterogeneous applications may communicate using this consistent message configured as such.

Figure 73:
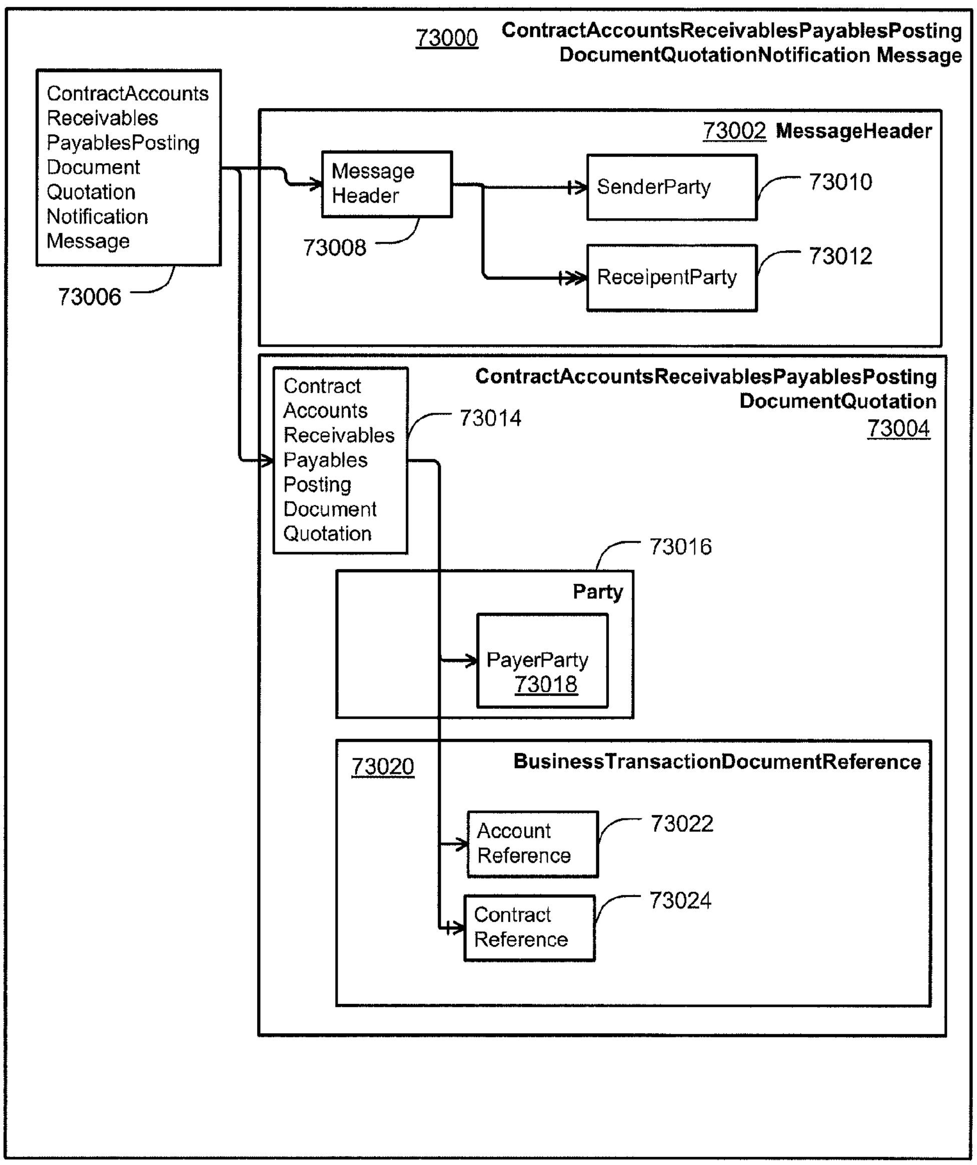
FIG. 73 shows an exemplary ContractAccountsReceivablesPayablesPostingDocument-QuotationNotificationMessage Message Data Type.

Additionally, FIG. 73 illustrates one example logical configuration of ContractAccountsReceivablesPayablesPostingDocumentQuotationBulkNotificationMessage message 73000. Specifically, this figure depicts the arrangement and hierarchy of various components such as one or more levels of packages, entities, and datatypes, shown here as 73002 through 73024. As described above, packages may be used to represent hierarchy levels. Entities are discrete business elements that are used during a business transaction. Data types are used to type object entities and interfaces with a structure. For example, ContractAccountsReceivablesPayablesPostingDocumentQuotationNotificationMessage message 73000 includes, among other things, ContractAccountsReceivablesPayablesPostingDocumentQuotation 73014. Accordingly, heterogeneous applications may communicate using this consistent message configured as such.

Figure 74:
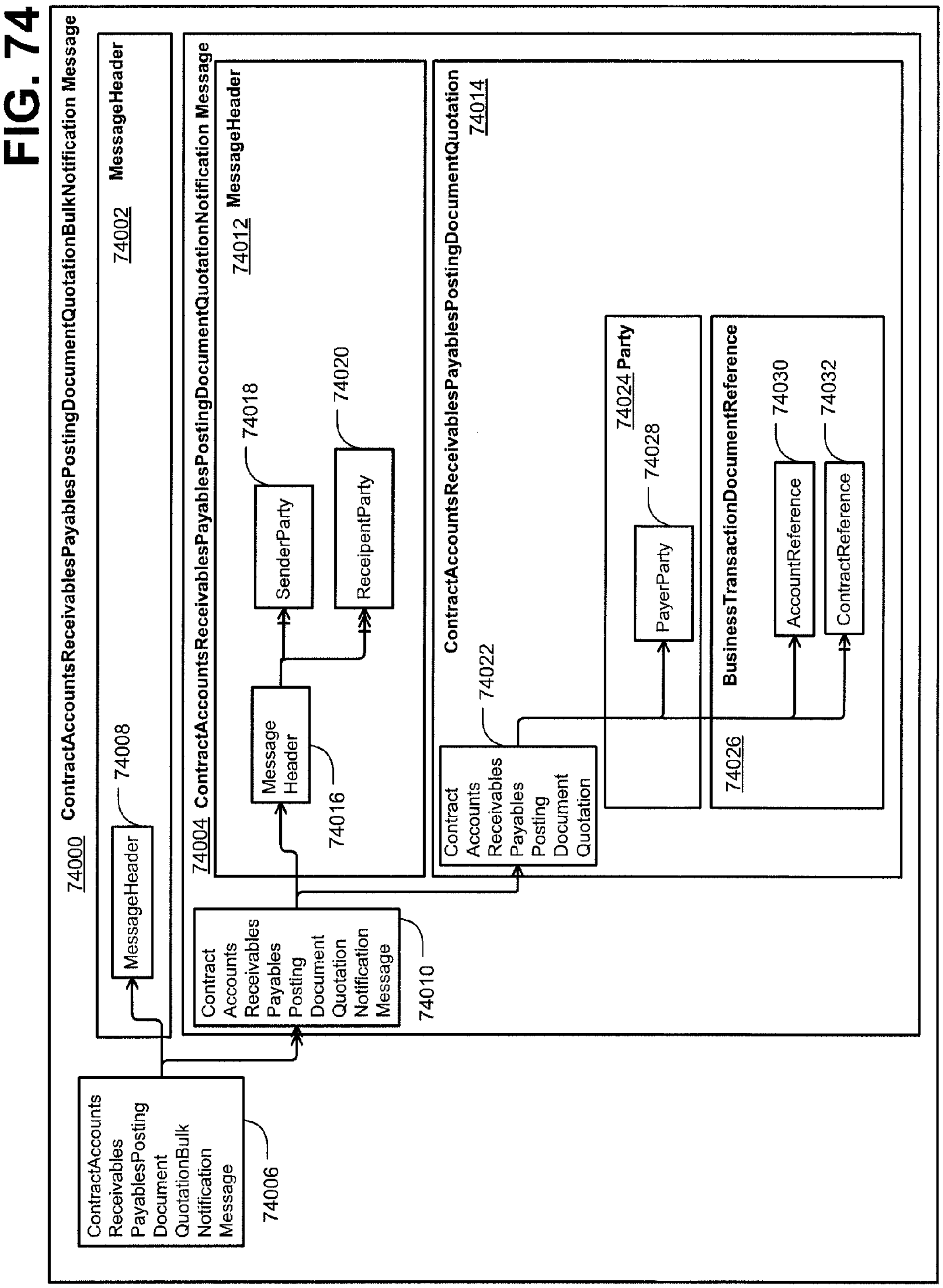
FIG. 74 shows an exemplary ContractAccountsReceivablesPayablesPostingDocument-QuotationBulkNotificationMessage Message Data Type.

Additionally, FIG. 74 illustrates one example logical configuration of ContractAccountsReceivablesPayablesPostingDocumentQuotationBulkNotificationMessage message 74000. Specifically, this figure depicts the arrangement and hierarchy of various components such as one or more levels of packages, entities, and datatypes, shown here as 74002 through 74032. As described above, packages may be used to represent hierarchy levels. Entities are discrete business elements that are used during a business transaction. Data types are used to type object entities and interfaces with a structure. For example, ContractAccountsReceivablesPayablesPostingDocumentQuotationBulkNotificationMessage message 74000 includes, among other things, PayerParty 74028. Accordingly, heterogeneous applications may communicate using this consistent message configured as such.

Figure 75:
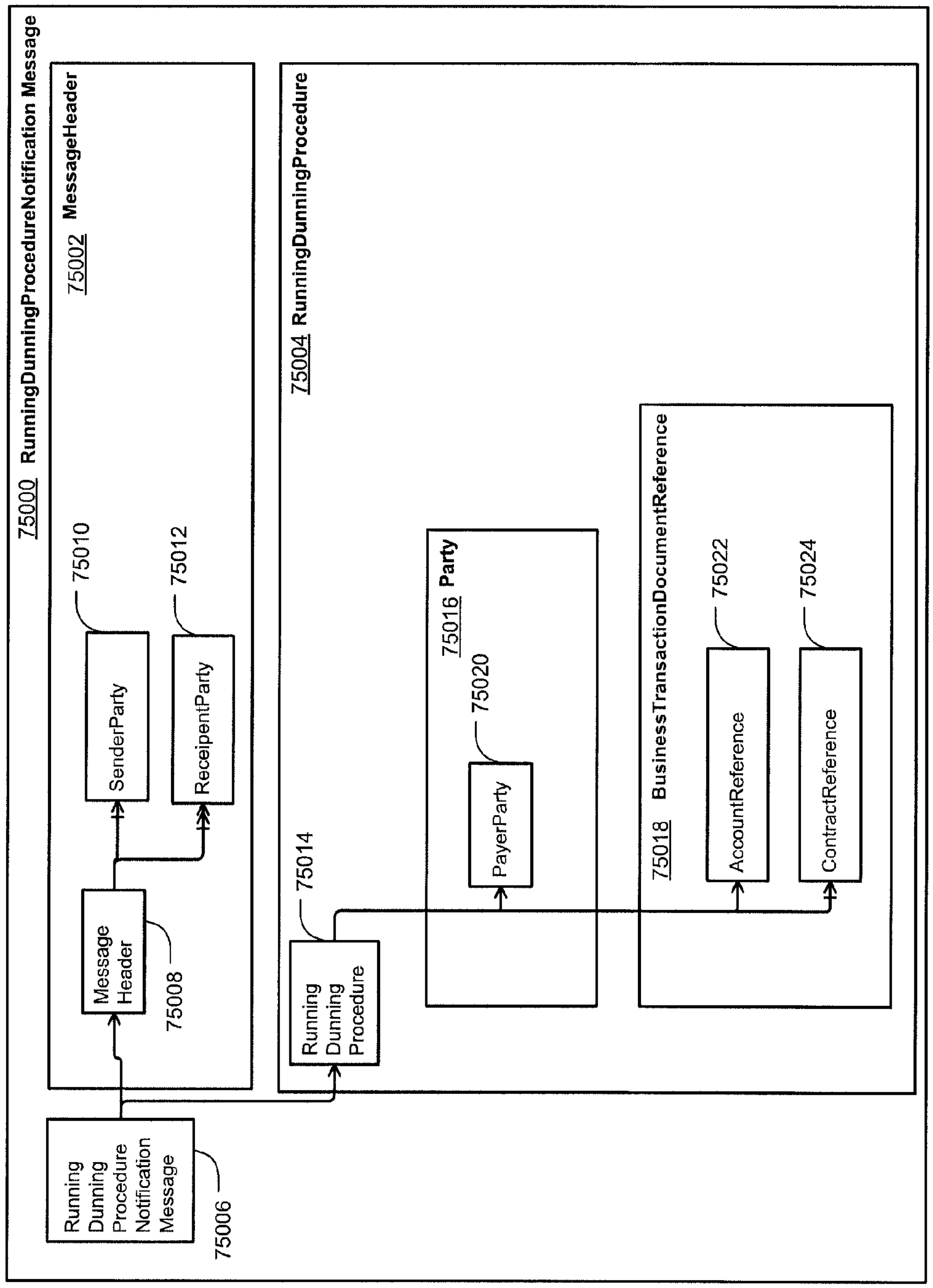
FIG. 75 shows an exemplary RunningDunningProcedureNotificationMessage Message Data Type.

Additionally, FIG. 75 illustrates one example logical configuration of RunningDunningProcedureNotificationMessage message 75000. Specifically, this figure depicts the arrangement and hierarchy of various components such as one or more levels of packages, entities, and datatypes, shown here as 75002 through 75024. As described above, packages may be used to represent hierarchy levels. Entities are discrete business elements that are used during a business transaction. Data types are used to type object entities and interfaces with a structure. For example, RunningDunningProcedureNotificationMessage message 75000 includes, among other things, RunningDunningProcedure 75014. Accordingly, heterogeneous applications may communicate using this consistent message configured as such.

Figure 76:
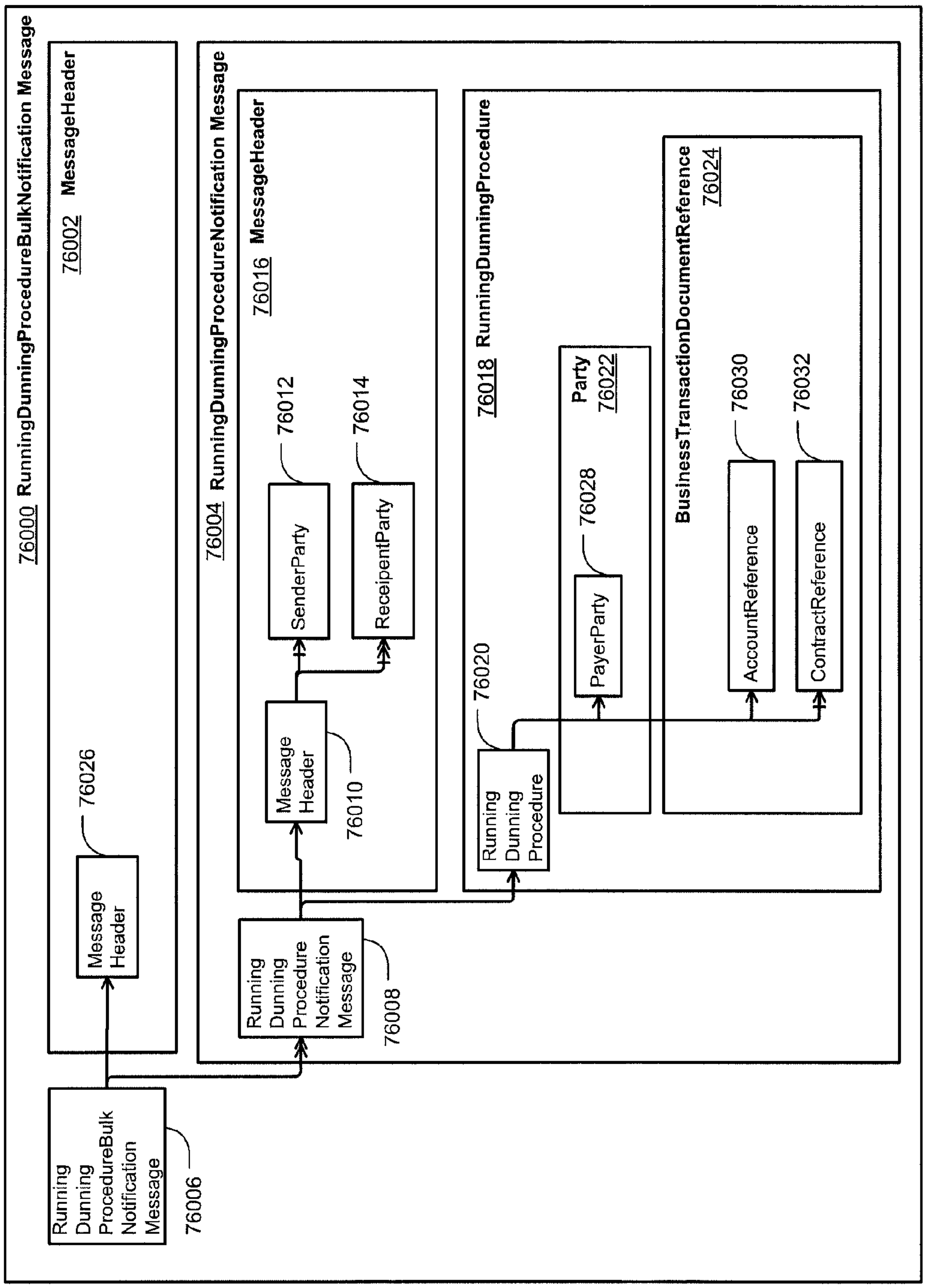
FIG. 76 shows an exemplary RunningDunningProcedure-BulkNotificationMessage Message Data Type.

Additionally, FIG. 76 illustrates one example logical configuration of RunningDunningProcedureBulkNotificationMessage message 76000. Specifically, this figure depicts the arrangement and hierarchy of various components such as one or more levels of packages, entities, and datatypes, shown here as 76002 through 76032. As described above, packages may be used to represent hierarchy levels. Entities are discrete business elements that are used during a business transaction. Data types are used to type object entities and interfaces with a structure. For example, RunningDunningProcedureBulkNotificationMessage message 76000 includes, among other things, AccountReference 76030. Accordingly, heterogeneous applications may communicate using this consistent message configured as such.

FIGS. 77-1 through 77-4 illustrate one example logical configuration of a ContractAccountsReceivablesPayablesPostingDocumentQuotationNotificationMessage 77000 element structure. Specifically, these figures depict the arrangement and hierarchy of various components such as one or more levels of packages, entities, and datatypes, shown here as 77000 through 77124. As described above, packages may be used to represent hierarchy levels. Entities are discrete business elements that are used during a business transaction. Data types are used to type object entities and interfaces with a structure. For example, the ContractAccountsReceivablesPayablesPostingDocumentQuotationNotificationMessage 77000 includes, among other things, a ContractAccountsReceivablesPayablesPostingDocumentQuotationNotificationMessage entity 77002. Accordingly, heterogeneous applications may communicate using this consistent message configured as such.

Message Data Category DunningLevelAchievedNotification Message

The message data type DunningLevelAchievedNotificationMessage includes a Dunning object included in a business document, in a view used for the DunningLevelAchievedNotification, and business information relevant for sending a business document in a message. The message data type DunningLevelAchievedNotificationMessage includes the MessageHeader and DunningLevel packages. The message data category DunningLevelAchievedNotification Message can provide a structure for messages of the type DunningLevelAchievedNotification and for interfaces based on it. If a business partner does not pay payables on time, the non-payment can be recognized by a dunning program in a collections and disbursements component. This recognition can trigger a dunning procedure, based on an insurance line of business or an insured risk. The running dunning procedure can send information to an insurance policy management system. Follow-up processes, such as the reversal of an insurance policy, can be triggered in the insurance policy management system, based on a dunning level reached.

A MessageHeader package can group business information relevant for sending a business document in a message. The MessageHeader package includes the MessageHeader entity. A MessageHeader can group business information from the point of view of the sender application, including information to identify the business document in a message, information about the sender party, and information about the recipient party. The MessageHeader includes SenderParty and RecipientParty. MessageHeader can be of the type GDT: BusinessDocumentMessageHeader, and can use the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The DunningLevel package can group a DunningLevel together with its packages. The DunningLevel package includes the Party and BusinessTransactionDocumentReference packages. A DunningLevel in a view used for the DunningLevelAchievedNotification includes information about a dunning level for a contract. DunningLevel includes the following elements: ID, DunningProcedureCode, Value, BalanceAmount, FeeAmount, and AchievedDateTime. ID can be a unique ID in a sender system. The ID can be from the GDT: BusinessTransactionDocumentID category. DunningProcedureCode can be a procedure in case of dunning. DunningProcedureCode can be from the GDT: DunningProcedureCode category. Value can signify a dunning level. Value can be from GDT: DunningLevelValue. BalanceAmount can be a balance for open receivable that was dunned BalanceAmount can be from GDT: Amount. FeeAmount can be dunning charges. FeeAmount can be from GDT: Amount. AchievedDateTime can be time at which the dunning level was reached. AchievedDateTime can be from GDT: DateTime. In some implementations, the elements ID, DunningProcedureCode, BalanceAmount and AchievedDateTime may be specified. The element FeeAmount is optional.

A DunningLevelParty package can group parties to a dunning notice. The DunningLevelParty package includes the PayerParty entity. A PayerParty can be a party that pays due receivables for a contract. A PayerParty can be of the type GDT: BusinessTransactionDocumentParty whereby the element InternalID is used. In some implementations, at least one PayerParty is specified.

A BusinessTransactionDocumentReference package can group references to business documents that are important for the DunningLevelAchievedNotification and have a business relationship. A BusinessTransactionDocumentReference package includes the AccountReference and ContractReference entities. An AccountReference can be a reference to an underlying account which can be used for posting due receivables and payables. AccountReference can be from the GDT: BusinessTransactionDocumentReference category. In some implementations, an AccountReference is specified. A ContractReference can be a reference to an underlying contract. ContractReference can be from the GDT: BusinessTransactionDocumentReference category. Entering the ContractReference is optional.

Message Data Category PaymentReturnsOccurredNotification Message

The PaymentReturnsOccurredNotification message data category includes a returns object included in a business document from a perspective used by the PaymentReturnsOccurredNotification, and business information that is relevant for sending the business document in a message. The PaymentReturnsOccurredNotification message data category includes the MessageHeader and PaymentReturns packages. The message data category PaymentReturnsOccurredNotification Message can provide a structure for messages from the PaymentReturnsOccurredNotification category, and for interface(s) based on it. Insurance customers can use various payment forms to pay payables due to an insurance company. With automatic debit, a customer can specify a bank account from which open amounts can be collected periodically. If amounts cannot be collected completely, for various reasons, the system sends a message to the relevant operational components (normally the insurance policy management system or the claims management system).

A MessageHeader package can group business information relevant for sending a business document in a message. A MessageHeader package includes the MessageHeader entity. A MessageHeader can group business information from a point of view of the sender application. The business information includes information to identify the business document in a message, information about the sender party, and information about the recipient party. The MessageHeader includes SenderParty and RecipientParty. MessageHeader can be of the type GDT: BusinessDocumentMessageHeader, and can use the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The PaymentReturns package can group PaymentReturns together with its packages. The PaymentReturns package includes the Party and BusinessTransactionDocumentReference packages. A PaymentReturns in a view used for PaymentReturnsOccurredNotification includes information about payment returns due to a failed payment for a contract. PaymentReturns includes the following elements: ReasonCode, PostedAmount, FeeAmount, and PostingDate. ReasonCode can be a company-specific return reason. ReasonCode can be from the GDT: PaymentReturnsReasonCode category. PostedAmount can be a posted amount for payment return. Amount can be from GDT: Amount. FeeAmount can be, for example, a charge for payment return, a total from a bank charge, or a company-specific processing charge. FeeAmount can be from GDT: Amount. PostingDate can be a posting date for payment return. PostingDate can be from GDT: Date. In some implementations, the elements ReasonCode, PostedAmount, and PostingDate are specified. The element FeeAmount can be optional.

A PaymentReturnsParty package groups parties to a return. A PaymentReturnsParty package includes the PayerParty entity. A PayerParty can be a party that pays due receivables for a contract. A PayerParty can be of the type GDT: BusinessTransactionDocumentParty whereby the element InternalID is used. In some implementations, at least one PayerParty is specified.

A BusinessTransactionDocumentReference package can group references to business documents that are important for the PaymentReturnsOccurredNotification and have a business relationship. The BusinessTransactionDocumentReference package includes the entities AccountReference, ContractReference, and PostingDocumentReference. An AccountReference can be a reference to an underlying account which is used to post due receivables and payables. AccountReference can be from the GDT: BusinessTransactionDocumentReference category. In some implementations, an AccountReference is specified. A ContractReference can be a reference to an underlying contract. ContractReference can be from the GDT: BusinessTransactionDocumentReference category. Entering the ContractReference is optional. From the perspective required by PaymentReturnsOccurredNotification, a PostingDocumentReference includes a reference to an original accounting document for a return. PostingDocumentReference can be from type GDT: BusinessTransactionDocumentReference. Entry of the PostingDocumentReference is optional.

Message Data Category DepositShortageOccurredNotification Message

The message data category DepositShortageOccurredNotification Message includes the object DepositShortage included in a business document from a perspective used by the DepositShortageOccurredNotification, and business information that can be relevant for sending the business document in a message. The message data category DepositShortageOccurredNotification Message includes the MessageHeader and DepositShortage packages. The message data category DepositShortageOccurredNotification Message can provide a structure for messages from the DepositShortageOccurredNotification category and for interfaces that are based on it.

A MessageHeader package can group business information relevant for sending the business document in a message. The MessageHeader package includes the MessageHeader entity. A MessageHeader can group business information from the point of view of the sender application. The business information includes information to identify the business document in a message, information about the sender party, and information about the recipient party. The MessageHeader includes SenderParty and RecipientParty. MessageHeader can be of the type GDT: BusinessDocumentMessageHeader, and can use the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The DepositShortage package can group a DepositShortage together with its packages. The DepositShortage package includes the Party and BusinessTransactionDocumentReference packages. A DepositShortage in a view used by the DepositShortageOccurredNotification includes information about insufficient coverage on a credit account if insufficient coverage is available to clear a due receivable. DepositShortage includes the elements BalanceAmount, DebitedAmount, and OccurredDateTime. BalanceAmount can be a balance for a credit account. BalanceAmount can be from GDT: Amount. DebitedAmount can be a receivable amount. DebitedAmount can be from GDT: Amount. OccurredDateTime can be a time at which insufficient coverage occurred on a credit account. OccurredDateTime can be from GDT: DateTime. In some implementations, the elements BalanceAmount, DebitedAmount and OccurredDateTime are specified. A DepositShortage can be insufficient deposit coverage for an insurance policy. An insufficient deposit coverage can be a status for a deposit clearing account that occurs in a payment process, if the credit on the deposit is insufficient to pay receivables due on insurance policies that are paid with this deposit. A DepositShortage can describe coverage that does not exist on a current checking account.

A DepositShortageParty package can group parties for a credit account. A DepositShortageParty package includes the DepositHolderParty entity. A DepositHolderParty can be a party that owns a credit account used to pay receivables. DepositHolderParty can be from the GDT: BusinessTransactionDocumentParty category, whereby the element InternalID is used. In some implementations, a DepositHolderParty is specified.

A BusinessTransactionDocumentReference package can group references to business documents that are important for the DepositShortageOccurredNotification and have a business relationship. A BusinessTransactionDocumentReference package includes the AccountReference and ContractReference entities. An AccountReference can be a reference to an underlying account which is used to post due receivables and payables. AccountReference can be from the GDT: BusinessTransactionDocumentReference category. In some implementations, an AccountReference is specified. A ContractReference can be a reference to an underlying contract. ContractReference can be from the GDT: BusinessTransactionDocumentReference category. Entering the ContractReference is optional.

Message Data Category CustomerInitiatedPaymentReceivedNotification Message

The message data category CustomerInitiatedPaymentReceivedNotification Message includes the object CustomerInitiatedPayment included in a business document from the perspective used by the CustomerInitiatedPaymentReceivedNotification, and business information that can be relevant for sending a business document in a message. The message data category CustomerInitiatedPaymentReceivedNotification Message includes the MessageHeader and CustomerInitiatedPayment packages. The message data category CustomerInitiatedPaymentReceivedNotification Message can provide a structure for messages of the type CustomerInitiatedPaymentReceivedNotification and for interfaces that are based on it.

A MessageHeader package can group business information relevant for sending a business document in a message. The MessageHeader package includes the MessageHeader entity. A MessageHeader can group business information from the point of view of a sender application. The business information includes information to identify a business document in a message, information about the sender party, and information about the recipient party. The MessageHeader includes SenderParty and RecipientParty. It can be of the type GDT: BusinessDocumentMessageHeader, and uses the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The CustomerInitiatedPayment package can group the CustomerInitiatedPayment together with its packages. It includes the Party, BusinessTransactionDocumentReference, and CustomerInitiatedPaymentItem packages. A CustomerInitiatedPayment in a view used for the CustomerInitiatedPaymentNotification includes information about customer-initiated payments. A customer-initiated payment can be a payment initiated by a business partner. In some implementations, no receivable exists yet for this payment in a Collections/Disbursements system.

A CustomerInitiatedPaymentParty package can group parties involved in a payment. A CustomerInitiatedPaymentParty package includes the PayerParty entity. A PayerParty can be a party that initiated a payment. A PayerParty can be of the type GDT: BusinessTransactionDocumentParty whereby the element InternalID is used. In some implementations, at least one PayerParty is specified.

A BusinessTransactionDocumentReference package can group references to business documents that are important for the CustomerInitiatedPaymentNotification and that have a business relationship. The BusinessTransactionDocumentReference package includes the AccountReference and ContractReference entities. An AccountReference can be a reference to an underlying account which is used to post due receivables and payables. AccountReference can be from the GDT: BusinessTransactionDocumentReference category. In some implementations, an AccountReference is specified. A ContractReference can be a reference to an underlying contract. ContractReference can be from the GDT: BusinessTransactionDocumentReference category. Entering the ContractReference is optional.

A CustomerInitiatedPaymentItem package can group information for a customer-initiated payment. The CustomerInitiatedPaymentItem package includes the BusinessTransactionDocumentReference package. A CustomerInitiatedPaymentItem in a view used for the CustomerInitiatedPaymentReceivedNotification includes information about customer-initiated payments. CustomerInitiatedPaymentItem includes the ValueDate and Amount elements. ValueDate can be from GDT: Date. Amount can be a payment amount. Amount can be from GDT: Amount. In some implementations, at least one CustomerInitiatedPaymentItem is specified.

A BusinessTransactionDocumentReference package can group references to business documents that are important for the CustomerInitiatedPaymentReceivedNotification and that have a business relationship. The BusinessTransactionDocumentReference package includes the PostingDocumentReference entity. A PostingDocumentReference can be a link to a posting document that includes a customer-initiated payment. PostingDocumentReference can be from the GDT: BusinessTransactionDocumentReference category. In some implementations, a PostingDocumentReference is specified.

Message Data Category InsuranceContractBenefitFreePeriodByInsuranceContractIDAndClaimPeriodQuery Message The message data category InsuranceContractBenefitFreePeriodByInsuranceContractIDAndClaimPeriodQuery Message includes the InsuranceContractBenefitFreePeriodByInsuranceContractIDAndClaimPeriodQuery object included in a business document from a perspective used by the InsuranceContractBenefitFreePeriodByInsuranceContractIDAndClaimPeriodQuery. The message data category InsuranceContractBenefitFreePeriodByInsuranceContractIDAndClaimPeriodQuery Message includes the MessageHeader package.

The message data category InsuranceContractBenefitFreePeriodByInsuranceContractIDAndClaimPeriodQuery Message can provide a structure for messages from the InsuranceContractBenefitFreePeriodByInsuranceContractIDAndClaimPeriodQuery category and for interfaces that are based on it. If a business partner does not pay payables on time, the non-payment can be recognized by a dunning program in a collections and disbursements component. The recognition can trigger a dunning procedure, dependent on an insurance line of business or an insured risk. If no payment is made for the premiums due before a defined deadline, after dunning notices have been issued to the business partner, benefit-exemption can begin for this insurance policy when the next dunning level is reached. This benefit exemption can end when the premium payer has paid the amounts due on the insurance policy. For each relevant insurance contract in the Collections/Disbursements system, a claims management system can query whether in-benefit or benefit-exempt was applicable on the relevant date, before triggering a disbursement for a claim, for example.

A MessageHeader package can group business information relevant for sending a business document in a message. The MessageHeader package includes the MessageHeader entity. A MessageHeader can group business information from the point of view of the sender application. This information includes information to identify a business document in a message, information about the sender party, and information about the recipient party. The MessageHeader includes SenderParty and RecipientParty. It can be of the type GDT: BusinessDocumentMessageHeader, and uses the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The InsuranceContractBenefitFreePeriodByInsuranceContractIDAndClaimPeriodQuery package can group InsuranceContractBenefitFreePeriodByInsuranceContractIDAndClaimPeriodQuery together with its packages. The InsuranceContractBenefitFreePeriodByInsuranceContractIDAndClaimPeriodQuery package includes the BusinessTransactionDocumentReference package. An InsuranceContractBenefitFreePeriodByInsuranceContractIDAndClaimPeriodQuery can be a query to determine whether a benefit exemption exists for a claim period for an insurance policy, due to payments not being made. InsuranceContractBenefitFreePeriodByInsuranceContractIDAndClaimPeriodQuery includes the ClaimPeriod element. ClaimPeriod can be a time at which a claim occurred. ClaimPeriod can be from GDT: DateTimePeriod. In some implementations, the ClaimPeriod element is specified.

A BusinessTransactionDocumentReference package can group references to business documents that are important for the InsuranceContractBenefitFreePeriodByInsuranceContractIDAndClaimPeriodQuery and that have a business relationship. The BusinessTransactionDocumentReference package includes the InsuranceContractReference entity. An InsuranceContractReference can be a reference to an insurance contract. InsuranceContractReference can be from the category GDT: BusinessTransactionDocumentReference. In some implementations, a ContractReference is specified.

Message Data Category InsuranceContractBenefitFreePeriodByInsuranceContractIDAndClaimPeriodResponse Message The message data category InsuranceContractBenefitFreePeriodByInsuranceContractIDAndClaimPeriodResponse Message includes the InsuranceContractBenefitFreePeriodByInsuranceContractIDAnd ClaimPeriodResponse object included in a business document from a perspective used by the InsuranceContractBenefitFreePeriodByInsuranceContractIDAndClaimPeriodResponse. The message data category InsuranceContractBenefitFreePeriodByInsuranceContractIDAndClaimPeriodResponse Message includes the MessageHeader and InsuranceContractBenefitFreePeriod packages. The message data category InsuranceContractBenefitFreePeriodByInsuranceContractIDAndClaimPeriodResponse message can provide a structure for messages of the type InsuranceContractBenefitFreePeriodByInsuranceContractIDAndClaimPeriodResponse and for interfaces that are based on it. If a business partner does not pay payables on time, the non-payment can be recognized by a dunning program in a collections and disbursements component. The recognition can trigger a dunning procedure, dependent on an insurance line of business or an insured risk. If no payment is made for the premiums due before a defined deadline, after dunning notices have been issued to the business partner, benefit-exemption can begin for this insurance policy when the next dunning level is reached. This benefit exemption can end when the premium payer has paid the amounts due on the insurance policy. For each relevant insurance contract in the Collections/Disbursements system, a claims management system can query whether in-benefit or benefit-exempt was applicable on a relevant date, before triggering a disbursement for a claim, for example.

A MessageHeader package can group business information relevant for sending a business document in a message. The MessageHeader package includes the MessageHeader entity. A MessageHeader can group business information from the point of view of the sender application. This business information includes information to identify a business document in a message, information about the sender party, and information about the recipient party. The MessageHeader includes SenderParty and RecipientParty. MessageHeader can be of the type GDT: BusinessDocumentMessageHeader, and can use the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The InsuranceContractBenefitFreePeriodByInsuranceContractIDAndClaimPeriodResponse package can group InsuranceContractBenefitFreePeriodByInsuranceContractIDAndClaimPeriodResponse together with its packages. The InsuranceContractBenefitFreePeriodByInsuranceContractIDAndClaimPeriodResponse package includes the BusinessTransactionDocumentReference and Log packages. An InsuranceContractBenefitFreePeriodByInsuranceContractIDAndClaimPeriodResponse can be a response to describe periods in which a benefit exemption exists for an insurance policy, due to payments not being made. InsuranceContractBenefitFreePeriodByInsuranceContractIDAndClaimPeriodResponse includes the ClaimPeriod and BenefitFreePeriod elements. ClaimPeriod can be a time at which a claim occurred. ClaimPeriod can be from GDT: DateTimePeriod. BenefitFreePeriod can be a period in which benefit exemptions exist. BenefitFreePeriod can be from GDT: DateTimePeriod. Specification of the Benefit- FreePeriod is optional. It can be possible to specify more characteristics for the BenefitFreePeriod element. In some implementations, the ClaimPeriod element is specified. If no benefit-free periods (BenefitFreePeriod element) exist for an insurance policy within a claim period (ClaimPeriod element), the BenefitFreePeriod and Log elements may or may not be specified.

A BusinessTransactionDocumentReference package groups references to business documents that are important for the InsuranceContractBenefitFreePeriodByInsuranceContractIDAndClaimPeriodResponse and that have a business relationship. A BusinessTransactionDocumentReference package includes the InsuranceContractReference entity. An InsuranceContractReference can be a reference to an insurance contract. InsuranceContractReference can be from the category GDT: BusinessTransactionDocumentReference. In some implementations, a ContractReference is specified.

A Log package can group the business log messages that arise with a query about benefit-free periods for an insurance policy. The Log package includes the Log entity. A Log can be a result of messages that arise when an application executes a task. The Log can be of the type GDT: Log. The role category field is optional.

Message Data Type PaymentReturnsOccurredBulkNotificationMessage

The message data type PaymentReturnsOccurredBulkNotification Message includes the PaymentReturnsOccurredNotification message and business information that can be relevant for sending a business document in a message. The message data type PaymentReturnsOccurredBulkNotification Message includes the MessageHeader and PaymentReturnsOccurredNotificationMessage packages.

A MessageHeader package can group business information relevant for sending a business document in a message. The MessageHeader package includes the MessageHeader entity. The PaymentReturnsOccurredNotificationMessage data category includes a returns object included in the business document from the perspective required by the PaymentReturnsOccurredNotification, and business information that is relevant for sending a business document in a message. The PaymentReturnsOccurredNotificationMessage data category includes the MessageHeader and PaymentReturns packages. The message data category PaymentReturnsOccurredNotification Message can provide a structure for messages from the PaymentReturnsOccurredNotification category, and for interface(s) based on it. Insurance customers can use various payment forms to pay payables due to a insurance company. With automatic debit, a customer can specify a bank account from which open amounts are to be collected periodically. If amounts cannot be collected completely, for various reasons, the system sends a message to relevant operational components, normally a insurance policy management system or a claims management system.

Message Data Type DepositShortageOccurredBulkNotificationMessage

The message data type DepositShortageOccurredBulkNotification Message includes the DepositShortageOccurredNotification message and business information that can be relevant for sending a business document in a message. The message data type DepositShortageOccurredBulkNotification Message includes the MessageHeader and DepositShortageOccurredNotificationMessage packages.

A MessageHeader package can group business information relevant for sending a business document in a message. The MessageHeader package includes the MessageHeader entity. The message data category DepositShortageOccurredNotification Message includes the object DepositShortage included in a business document from the perspective required by the DepositShortageOccurredNotification, and business information relevant for sending a business document in a message. The message data category DepositShortageOccurredNotification Message includes the MessageHeader and DepositShortage packages. The message data category DepositShortageOccurredNotification Message can provide a structure for messages from the DepositShortageOccurredNotification category and for interfaces that are based on it.

Message Data Type CustomerInitiatedPaymentReceivedBulkNotificationMessage

The message data type CustomerInitiatedPaymentReceivedBulkNotification Message includes the CustomerInitiatedPaymentReceivedNotification message and business information that can be relevant for sending a business document in a message. The message data type CustomerInitiatedPaymentReceivedBulkNotification Message includes the MessageHeader and CustomerInitiatedPaymentReceivedNotificationMessage packages.

A MessageHeader package can group business information that is relevant for sending a business document in a message. The MessageHeader package includes the MessageHeader entity. The message data category CustomerInitiatedPaymentReceivedNotification Message includes the Object CustomerInitiatedPayment included in a business document from the perspective used by the CustomerInitiatedPaymentReceivedNotification, and business information that can be relevant for sending a business document in a message. The message data category CustomerInitiatedPaymentReceivedNotification Message includes the MessageHeader and CustomerInitiatedPayment packages. The message data category CustomerInitiatedPaymentReceivedNotification Message can provide a structure for messages of the type CustomerInitiatedPaymentReceivedNotification and for interfaces that are based on it.

Message Data Type ContractAccountsReceiyablesPayablesPostingDocumentQuotationNotification The message data type ContractAccountsReceivablesPayablesPostingDocumentQuotationNotification Message includes the object ContractAccountsReceivablesPayablesPostingDocumentQuotation including information about a status of acceptance of a quotation offered to an insurance customer and business information relevant for sending a business document in a message. The message data type ContractAccountsReceivablesPayablesPostingDocumentQuotationNotification Message includes the MessageHeader and ContractAccountsReceivablesPayablesPostingDocumentQuotation packages. The message data type ContractAccountsReceivablesPayablesPostingDocumentQuotationNotification Message can provide a structure for messages of the type ContractAccountsReceivablesPayablesPostingDocumentQuotationNotification and for interfaces that are based on it.

A MessageHeader package can group business information relevant for sending a business document in a message. The MessageHeader package includes the MessageHeader entity. A MessageHeader can group business information from a point of view of the sender application. This business information includes information to identify a business document in a message, information about the sender party, and information about the recipient party. The MessageHeader includes SenderParty and RecipientParty. MessageHeader can be of the type GDT: BusinessDocumentMessageHeader, and can use the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The ContractAccountsReceivablesPayablesPostingDocumentQuotation package can group the ContractAccountsReceivablesPayablesPostingDocumentQuotation together with its packages. The ContractAccountsReceivablesPayablesPostingDocumentQuotation package includes the Party and BusinessTransactionDocumentReference. A ContractAccountsReceivablesPayablesPostingDocumentQuotation in a view used for the ContractAccountsReceivablesPayablesPostingDocumentQuotationNotification includes information about a status of acceptance of a quotation offered to an insurance customer. Insurance companies can offer their customers the flexibility to yearly adapt their premiums by a certain percentage in order to cope with natural inflation. A customer is free to accept or refuse the quotation.

The quotation can be accepted by a customer payment or implicitly refused in case of missing customer payment, i.e., if the customer only pays the unadapted amount. ContractAccountsReceivablesPayablesPostingDocumentQuotationNotification includes the following elements: ID, DueDate, Amount, PaymentAmount, and StatusDateTime. ID can be an identifier of the ContractAccountsReceivablesPayablesPostingDocumentQuotationNotification. ID can be from GTD: BusinessTransactionDocumentID. DueDate can be the due date of the ContractAccountsReceivablesPayablesPostingDocumentQuotation. DueDate can be from GDT_Date. Amount can be an amount of a quotation offered to a customer. Amount can be from GTD: Amount. PaymentAmount can be a paid amount for the ContractAccountsReceivablesPayablesPostingDocumentQuotation. PaymentAmount can be from GTD: Amount. StatusDateTime can be a timestamp of quotation information. StatusDateTime can be from GDT: GLOBAL DateTime.

The Party package can group parties involved in a payment. The Party package includes the PayerParty entity. A PayerParty can be a party to which a quotation is offered. A PayerParty can be of the type GDT: BusinessTransactionDocumentParty whereby the element InternalID is used. In some implementations, at least one PayerParty is specified.

A QuotationBusinessTransactionDocumentReference package can group references to business documents that are important for the QuotationNotification and that have a business relationship. The QuotationBusinessTransactionDocumentReference package includes the AccountReference and ContractReference entities. An AccountReference can be a reference to an underlying account, which is used to post due receivables and payables. AccountReference can be from the GDT: BusinessTransactionDocumentReference category. In some implementations, an AccountReference is specified. A ContractReference can be a reference to an underlying contract. ContractReference can be from the GDT: BusinessTransactionDocumentReference category. Entering the ContractReference is optional.

Message Data Type ContractAccountsReceivablesPayablesPostingDocumentQuotationBulkNotification The message data type ContractAccountsReceivablesPayablesPostingDocumentQuotationBulkNotification Message includes the ContractAccountsReceivablesPayablesPostingDocumentQuotationNotification message and business information that can be relevant for sending a business document in a message. The message data type ContractAccountsReceivablesPayablesPostingDocumentQuotationBulkNotification Message includes the MessageHeader and ContractAccountsReceivablesPayablesPostingDocumentQuotationNotification Message packages.

A MessageHeader Package can group business information relevant for sending a business document in a message. The MessageHeader package includes the MessageHeader entity. The ContractAccountsReceivablesPayablesPostingDocumentQuotation package can group the ContractAccountsReceivablesPayablesPostingDocumentQuotation together with its packages. The ContractAccountsReceivablesPayablesPostingDocumentQuotation package includes the Party and BusinessTransactionDocumentReference.

Message Data Type RunningDunningProcedureNotification

The message data type RunningDunningProcedureNotificationMessage includes the object RunningDunningProcedure included in a business document from a perspective used by the RunningDunningProcedureNotification and business information relevant for sending a business document in a message. The message data type RunningDunningProcedureNotificationMessage includes the MessageHeader and RunningDunningProcedure packages. The message data type RunningDunningNotification message can provide a structure for messages of the type RunningDunningNotification and for interfaces that are based on it.

In the event that a business partner has overdue payables, these payables can be triggered in a Collections/Disbursements system. Depending on a line of insurance or insured risk, a dunning procedure can be created. Information about dunning procedures can be periodically sent to legacy Contract Management Systems. The Contract Management Systems start follow-up processes can be based on a reached dunning level (e.g., reversal of a contract). For each business partner, several running dunning procedures can be created (e.g., one dunning procedure per insurance line).

A MessageHeader package can group business information relevant for sending a business document in a message. The MessageHeader package includes the MessageHeader entity. A MessageHeader can group business information from a point of view of a sender application. This business information includes information to identify a business document in a message, information about the sender party, and information about the recipient party. The MessageHeader includes SenderParty and RecipientParty. MessageHeader can be of the type GDT: BusinessDocumentMessageHeader, and can use the ID element of the GDT. A SenderParty can be a party responsible for sending a business document at a business application level. The SenderParty can be of the type GDT: BusinessDocumentMessageHeaderParty. A RecipientParty can be a party responsible for receiving a business document at a business application level. The RecipientParty can be of the type GDT: BusinessDocumentMessageHeaderParty.

The RunningDunningProcedure package can group the RunningDunningProcedure together with its packages. The RunningDunningProcedure package includes the Party and BusinessTransactionDocumentReference packages. A RunningDunningProcedure in a view used for the RunningDunningProcedureNotification includes information about a status of a running dunning procedure of a contract. A running dunning procedure can represent a sequence of dunnings, ordered by their date of issue. RunningDunningProcedure includes the following elements: ID, DunningProcedureCode, DunningLevelCode, DunningLevelValue, BalanceAmount, FeeAmount, EndedReason, and DateTime. ID can be a unique identifier in a sending system. ID can be of GDT: BusinessTransactionDocumentID. DunningProcedureCode can be a procedure in case of a dunning DunningProcedureCode can be of GDT: DunningProcedureCode. DunningLevelValue can define a reached dunning level of a running dunning procedure. DunningLevelValue can be of GDT: DunningLevelValue. BalanceAmount can be a balance of open items subject to dunning BalanceAmount can be of GDT: Amount. FeeAmount can be a dunning Fee Amount. FeeAmount can be of GDT: Amount. EndedReason can define a reason for ending a dunning procedure. EndedReason can be of GDT:DunningSequenceEndedReasonCode. DateTime can define a point of time when information has been created. DateTime can be of GDT:DataTime. In some implementations, the elements ID, DunningProcedureCode, BalanceAmount and DateTime are provided. The elements EndedReason and FeeAmount are optional.

A RunningDunningProcedure package can group all parties involved in a running dunning procedure. A RunningDunningProcedure package includes the PayerParty entity. A PayerParty can be a party that initiated a payment. A PayerParty can be of the type GDT: BusinessTransactionDocumentParty whereby the element InternalID is used. In some implementations, at least one PayerParty is specified.

A BusinessTransactionDocumentReference package can group references to business documents that are important for the CustomerInitiatedPaymentNotification and that have a business relationship. The BusinessTransactionDocumentReference package includes the AccountReference and ContractReference entities. An AccountReference can be a reference to an underlying account which is used to post due receivables and payables. AccountReference can be from the GDT: BusinessTransactionDocumentReference category. In some implementations, an AccountReference is specified. A ContractReference can be a reference to an underlying contract. ContractReference can be from the GDT: BusinessTransactionDocumentReference category. Entering the ContractReference is optional.

Message Data Type RunningDunningProcedureBulkNotificationMessage

The message data type RunningDunningProcedureBulkNotificationMessage includes the RunningDunningProcedureNotification message and business information relevant for sending a business document in a message. The message data type RunningDunningProcedureBulkNotificationMessage includes the MessageHeader and RunningDunningProcedureNotificationMessage packages.

A MessageHeader package can group business information relevant for sending a business document in a message. The MessageHeader package includes the MessageHeader entity. The message data type RunningDunningProcedureNotificationMessage includes the object RunningDunningProcedure included in a business document from a perspective used by the RunningDunningProcedureNotification and business information relevant for sending a business document in a message. The message data type RunningDunningProcedureNotificationMessage includes the MessageHeader and RunningDunningProcedure packages. The message data type RunningDunningNotification message can provide a structure for messages of the type RunningDunningNotification and for interfaces that are based on it. In the event that a business partner has overdue payables, these payables can be triggered in a Collections/Disbursements system. Depending on a line of insurance or insured risk, a dunning procedure can be created. Information about dunning procedures can be periodically sent to legacy Contract Management Systems. The Contract Management Systems start follow-up processes can be based on a reached dunning level (e.g., reversal of a contract). For each business partner, several running dunning procedures can be created (e.g., one dunning procedure per insurance line).

ProjectCostEstimate Interfaces

Project Cost Controller can use this business object to manage the estimated costs for a project, e.g., a project cost controller can estimate costs for a project and use this business object to create, update, read such data. The ProjectCostEstimate interface can perform various operations, namely a ProjectCostEstimateERPByProjectIDAndAccountingPlanningVersionCodeQueryResponse n, a ProjectCostEstimateERPCreateRequestConfirmation_In, a ProjectCostEstimateERPUpdateRequestConfirmation_In, and a ProjectCostEstimateERPCancelRequestConfirmation_In.

The ProjectCostEstimateERPByProjectIDAndAccountingPlanningVersionCodeQueryResponse_In operation can handle an enquiry to and response from Costing to read a ProjectCostEstimate. Project Cost Controller can use the inbound operation 'read project cost estimate' to read a project cost estimate. The ProjectCostEstimateERPByProjectIDAndAccountingPlanningVersionCodeQueryResponse_In operation includes various message types, namely a ProjectCostEstimateERPByProjectIDAndAccountingPlanningVersionCodeQuery_sync and a ProjectCostEstimate ERPByProjectIDAndAccountingPlanningVersionCodeResponse_sync. The structure of the ProjectCostEstimateERPByProjectIDAndAccountingPlanningVersionCodeQuery_sync message type can be specified by a ProjCostEstERPByProjIDAndActgPlngVersCodeQryMsg_s message data type. The structure of the ProjectCostEstimateERPByProjectIDAndAccountingPlanningVersionCodeResponse_sync message type can be specified by a ProjCostEstERPByProjIDAndActgPlngVersCodeRspMsg_s message data type.

The ProjectCostEstimateERPCreateRequestConfirmation_In operation can handle a request to and confirmation from Costing to create a ProjectCostEstimate. Project Cost Controller can use the inbound operation 'create project cost estimate' to create a project cost estimate. The ProjectCostEstimateERPCreateRequestConfirmation_In operation includes various message types, namely a ProjectCostEstimateERPCreateRequest_sync and a ProjectCostEstimateERPCreateConfirmation_sync. The structure of the ProjectCostEstimateERPCreateRequest_sync message type can be specified by a ProjCostEstERPCrteReqMsg_s message data type. The structure of the ProjectCostEstimateERPCreateConfirmation_sync message type can be specified by a ProjCostEstERPCrteConfMsg_s message data type.

The ProjectCostEstimateERPUpdateRequestConfirmation_In operation can handle a request to and confirmation from Costing to update a ProjectCostEstimate. Project Cost Controller can use the inbound operation 'update project cost estimate' to update a project cost estimate. The ProjectCostEstimateERPUpdateRequestConfirmation_In operation includes various message types, namely a ProjectCostEstimateERPUpdateRequest_sync and a ProjectCostEstimateERPUpdateConfirmation_sync. The structure of the ProjectCostEstimateERPUpdateRequest_sync message type can be specified by a ProjCostEstERPUpdtReqMsg_s message data type. The structure of the ProjectCostEstimateERPUpdateConfirmation_sync message type can be specified by a ProjCostEstERPUpdtConfMsg_s message data type.

The ProjectCostEstimateERPCancelRequestConfirmation_In operation handles a request to and confirmation from Costing to cancel a ProjectCostEstimate. Project Cost Controller can use the inbound operation 'cancel project cost estimate' to cancel a project cost estimate. The ProjectCostEstimateERPCancelRequestConfirmation_In operation includes various message types, namely a ProjectCostEstimateERPCancelRequest_sync and a ProjectCostEstimateERPCancelConfirmation_sync. The structure of the ProjectCostEstimateERPCancelRequest_sync message type can be specified by a ProjCostEstERPCanReqMsg_s message data type. The structure of the ProjectCostEstimateERPCancelConfirmation_sync message type can be specified by a ProjCostEstERPCanConfMsg_s message data type.

Figure 78:
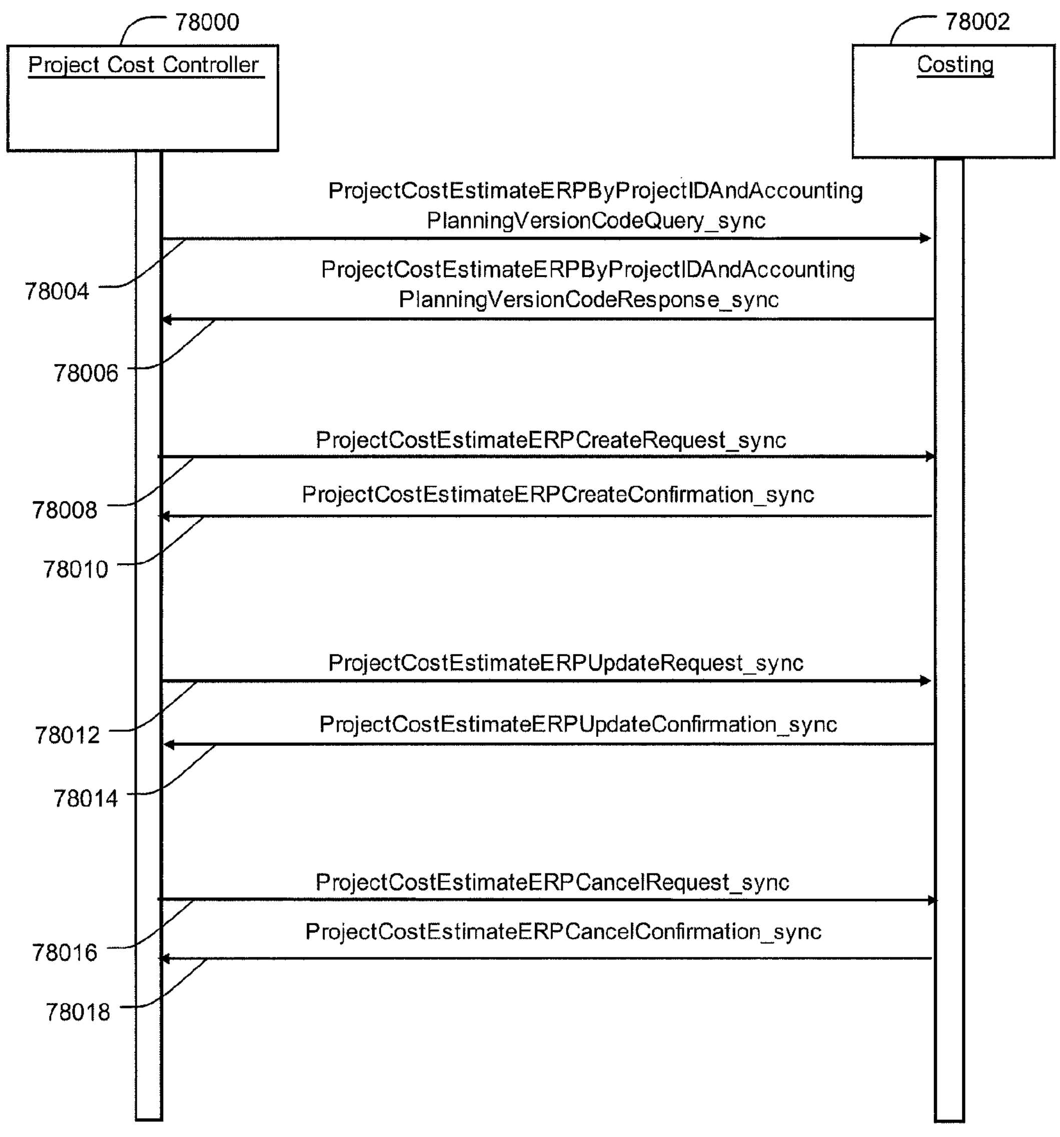
FIG. 78 shows an exemplary ProjectCostEstimate MessageChoreography.

The message choreography of FIG. 78 describes a possible logical sequence of messages that can be used to realize a Project Cost Estimate business scenario. A "Project Cost Controller" system 78000 can query a "Costing" system 78002 to read a project cost estimate, using a ProjectCostEstimateERPByProjectIDAndAccountingPlanningVersionCodeQuery_sync message 78004 as shown, for example in FIG. 78. The "Costing" system 78002 can respond to the query, using a ProjectCostEstimateERPByProjectIDAndAccountingPlanningVersionCodeResponse_sync message 78006 as shown, for example, in FIG. 78.

The "Project Cost Controller" system 78000 can request the "Costing" system 78002 to create a project cost estimate, using a ProjectCostEstimateERPCreateRequest_sync message 78008 as shown, for example in FIG. 78. The "Costing" system 78002 can confirm the creation, using a ProjectCostEstimateERPCreateConfirmation_sync message 78010 as shown, for example, in FIG. 78.

The "Project Cost Controller" system 78000 can request the "Costing" system 78002 to update a project cost estimate, using a ProjectCostEstimateERPUpdateRequest_sync message 78012 as shown, for example in FIG. 78. The "Costing" system 78002 can confirm the update, using a ProjectCostEstimateERPUpdateConfirmation_sync message 78014 as shown, for example, in FIG. 78.

The "Project Cost Controller" system 78000 can request the "Costing" system 78002 to cancel a project cost estimate, using a ProjectCostEstimateERPCancelRequest_sync message 78016 as shown, for example in FIG. 78. The "Costing" system 78002 can confirm the cancellation, using a ProjectCostEstimateERPCancelConfirmation_sync message 78018 as shown, for example, in FIG. 78.

Figure 79:
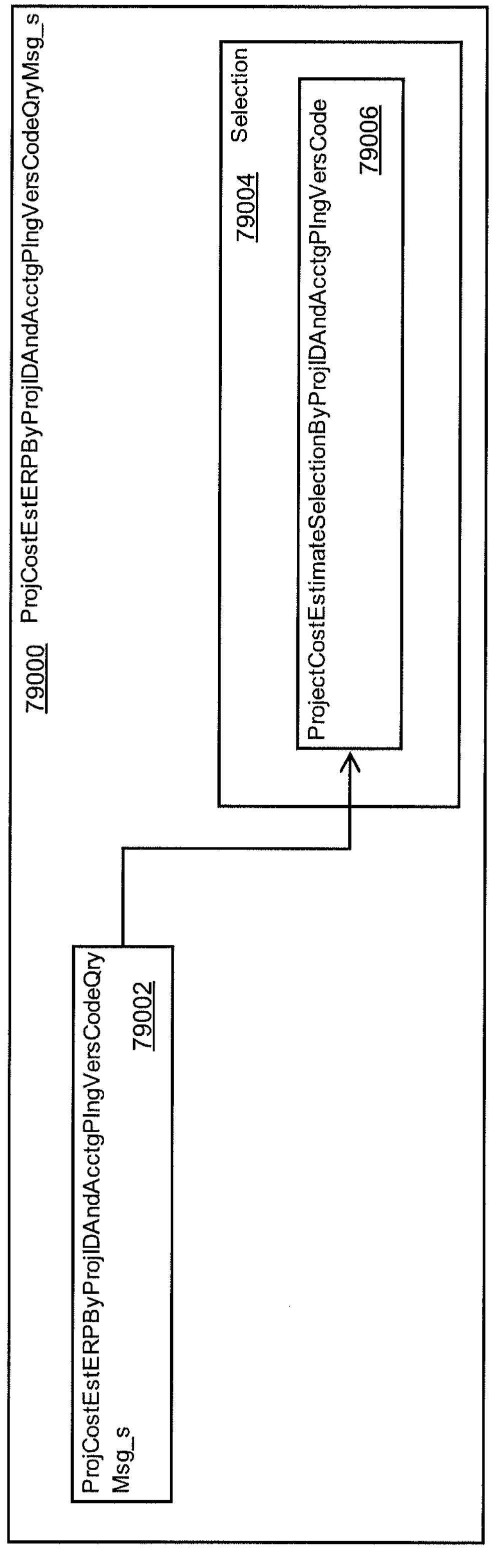
FIG. 79 shows an exemplary ProjCostEstERP-ByProjIDAndAcctgPlngVersCodeQryMsg_s Message Data Type.

FIG. 79 illustrates one example logical configuration of ProjCostEstERPByProjIDAndActPlngVersCodeQryMsg_s message 79000. Specifically, this figure depicts the arrangement and hierarchy of various components such as one or more levels of packages, entities, and datatypes, shown here as 79002 through 79006. As described above, packages may be used to represent hierarchy levels. Entities are discrete business elements that are used during a business transaction. Data types are used to type object entities and interfaces with a structure. For example, ProjCostEstERPByProjIDAndAcctPlngVersCodeQryMsg_s message 79000 includes, among other things, ProjCostEstERPByProjIDAndActgPlngVersCodeQryMsg_s 79002. Accordingly, heterogeneous applications may communicate using this consistent message configured as such.

Figure 80:
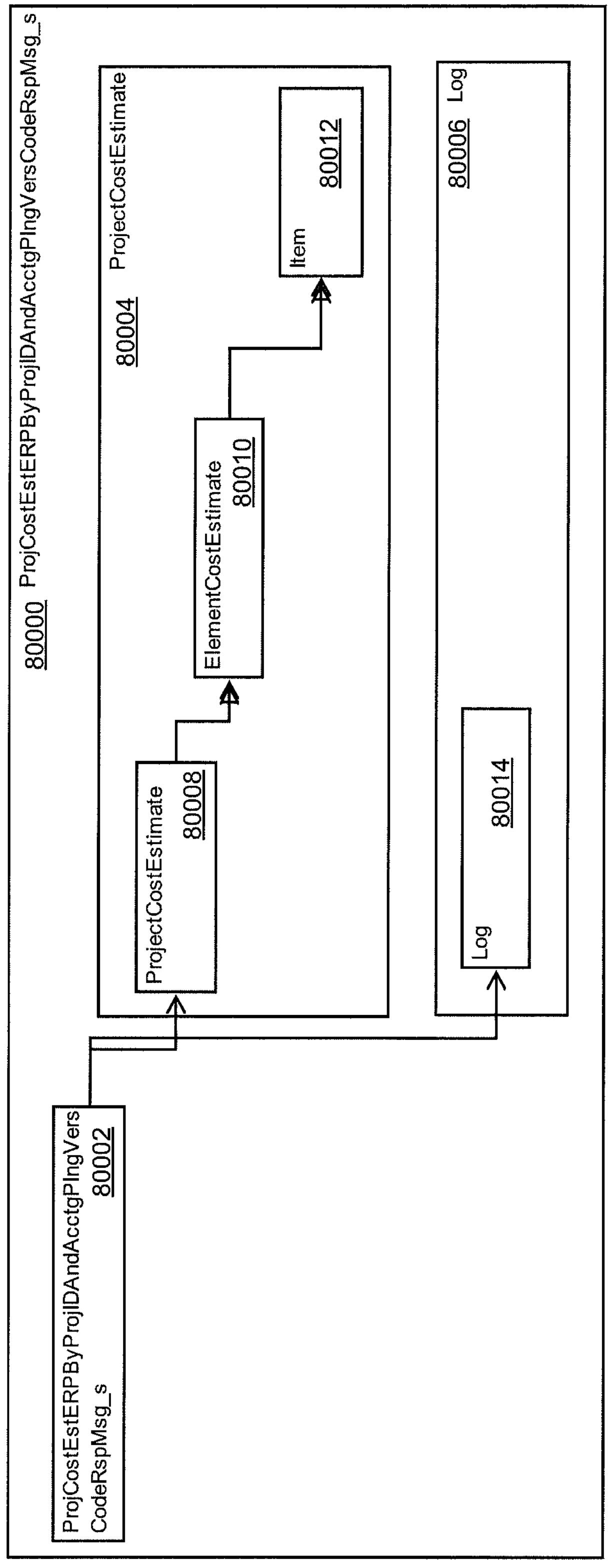
FIG. 80 shows an exemplary ProjCostEstERP-ByProjIDAndAcctgPlngVersCodeRspMsg_s Message Data Type.

Additionally, FIG. 80 illustrates one example logical configuration of ProjCostEstERPByProjIDAndActgPlngVersCodeRspMsg_s message 80000. Specifically, this figure depicts the arrangement and hierarchy of various components such as one or more levels of packages, entities, and datatypes, shown here as 80002 through 80014. As described above, packages may be used to represent hierarchy levels. Entities are discrete business elements that are used during a business transaction. Data types are used to type object entities and interfaces with a structure. For example, ProjCostEstERPByProjIDAndActgPlngVersCodeRspMsg_s message 80000 includes, among other things, ProjectCostEstimate 80008. Accordingly, heterogeneous applications may communicate using this consistent message configured as such.

Figure 81:
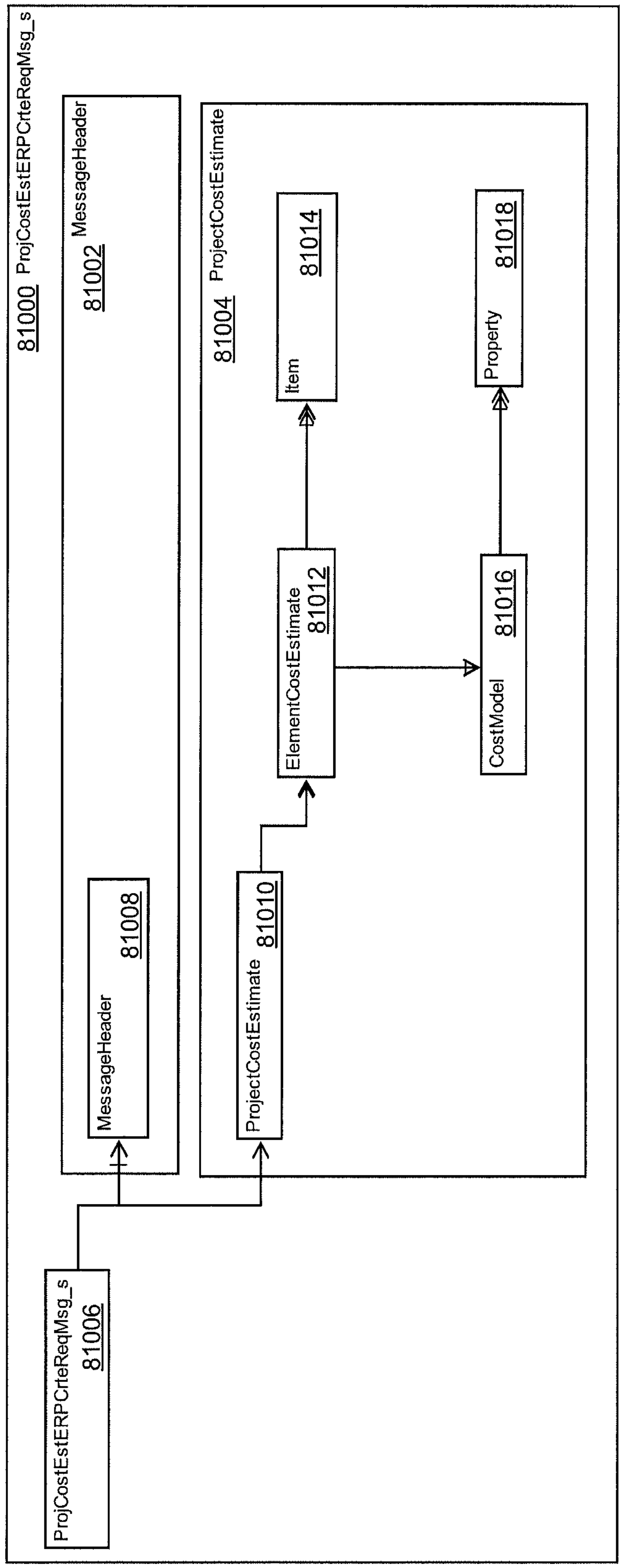
FIG. 81 shows an exemplary ProjCostEstERPCrteReqMsg_s Message Data Type.

Additionally, FIG. 81 illustrates one example logical configuration of ProjCostEstERPCrteReqMsg_s message 81000. Specifically, this figure depicts the arrangement and hierarchy of various components such as one or more levels of packages, entities, and datatypes, shown here as 81002 through 81018. As described above, packages may be used to represent hierarchy levels. Entities are discrete business elements that are used during a business transaction. Data types are used to type object entities and interfaces with a structure. For example, ProjCostEstERPCrteReqMsg_s message 81000 includes, among other things, ProjectCostEstimate 81010. Accordingly, heterogeneous applications may communicate using this consistent message configured as such.

Figure 82:
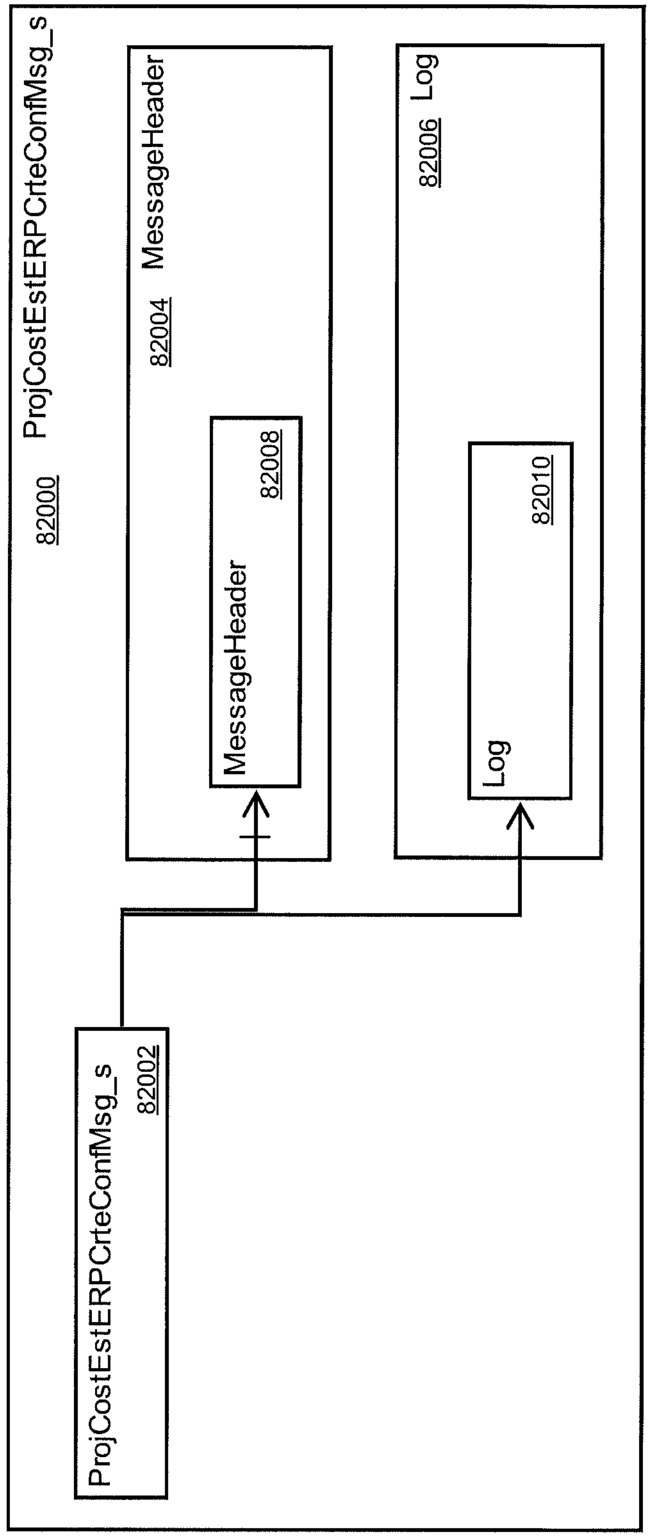
FIG. 82 shows an exemplary ProjCostEstERPCrteConfMsg_s Message Data Type.

Additionally, FIG. 82 illustrates one example logical configuration of ProjCostEstERPCrteConfMsg_s message 82000. Specifically, this figure depicts the arrangement and hierarchy of various components such as one or more levels of packages, entities, and datatypes, shown here as 82002 through 82010. As described above, packages may be used to represent hierarchy levels. Entities are discrete business elements that are used during a business transaction. Data types are used to type object entities and interfaces with a structure. For example, ProjCostEstERPCrteConfMsg_s message 82000 includes, among other things, Log 82010. Accordingly, heterogeneous applications may communicate using this consistent message configured as such.

Figure 83:
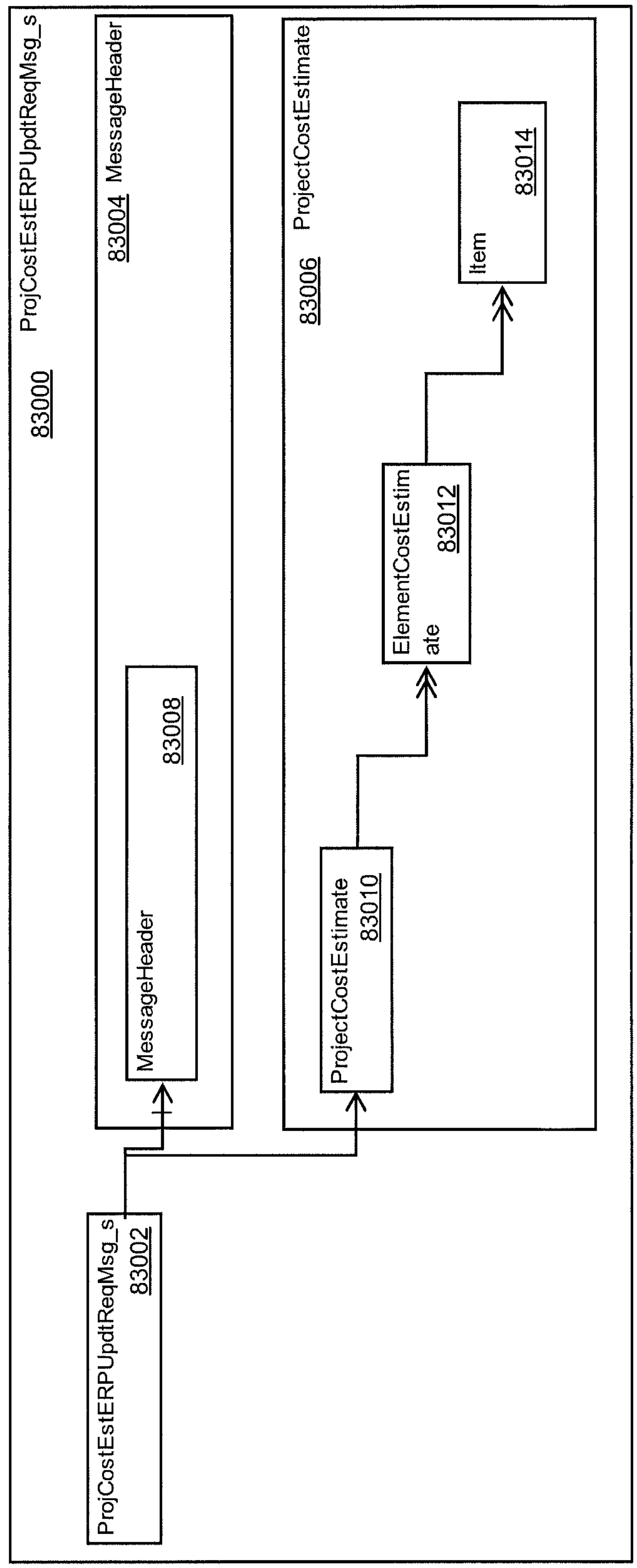
FIG. 83 shows an exemplary ProjCostEstERPUpdtReqMsg_s Message Data Type.

Additionally, FIG. 83 illustrates one example logical configuration of ProjCostEstERPUpdtReqMsg_s message 83000. Specifically, this figure depicts the arrangement and hierarchy of various components such as one or more levels of packages, entities, and datatypes, shown here as 83002 through 83014. As described above, packages may be used to represent hierarchy levels. Entities are discrete business elements that are used during a business transaction. Data types are used to type object entities and interfaces with a structure. For example, ProjCostEstERPUpdtReqMsg_s message 83000 includes, among other things, ProjectCostEstimate 83010. Accordingly, heterogeneous applications may communicate using this consistent message configured as such.

Figure 84:
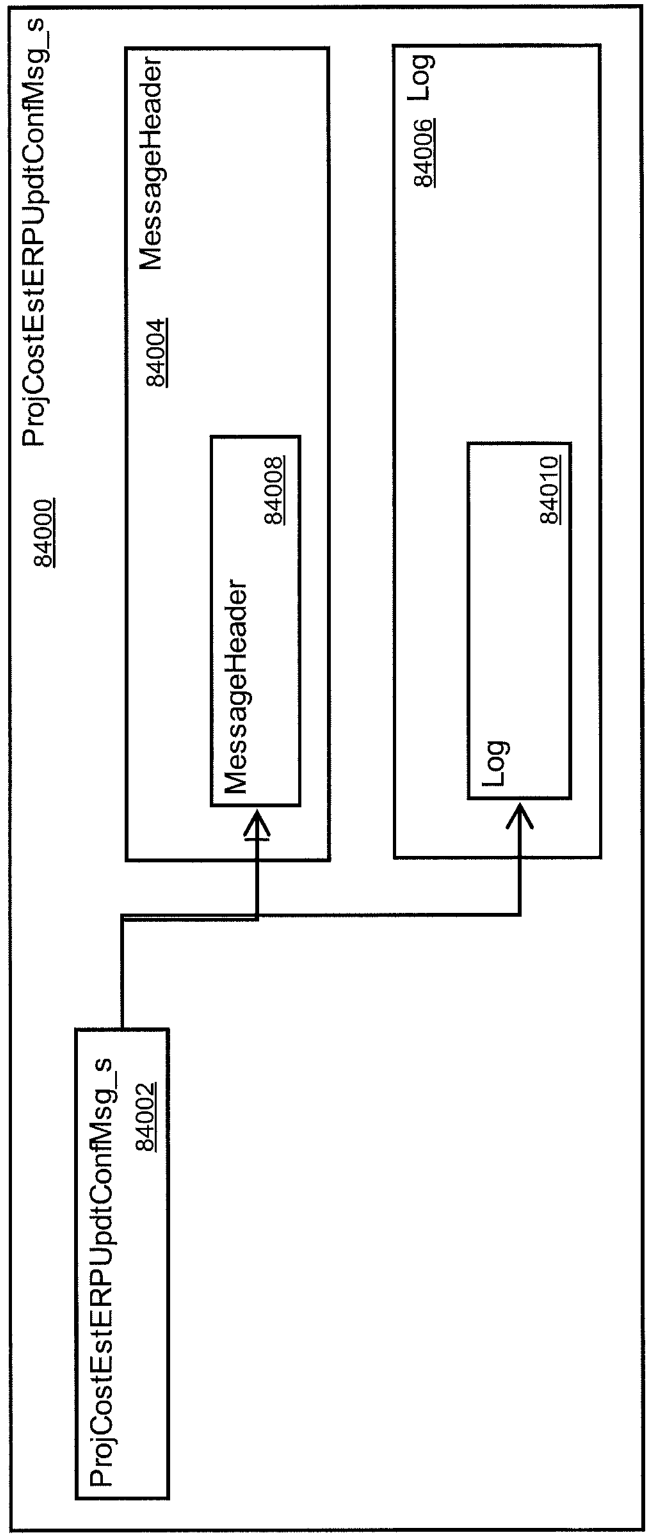
FIG. 84 shows an exemplary ProjCostEstERPUpdtConfMsg_s Message Data Type.

Additionally, FIG. 84 illustrates one example logical configuration of ProjCostEstERPUpdtConfMsg_s message 84000. Specifically, this figure depicts the arrangement and hierarchy of various components such as one or more levels of packages, entities, and datatypes, shown here as 84002 through 84010. As described above, packages may be used to represent hierarchy levels. Entities are discrete business elements that are used during a business transaction. Data types are used to type object entities and interfaces with a structure. For example, ProjCostEstERPUpdtConfMsg_s message 84000 includes, among other things, Log 84010. Accordingly, heterogeneous applications may communicate using this consistent message configured as such.

Figure 85:
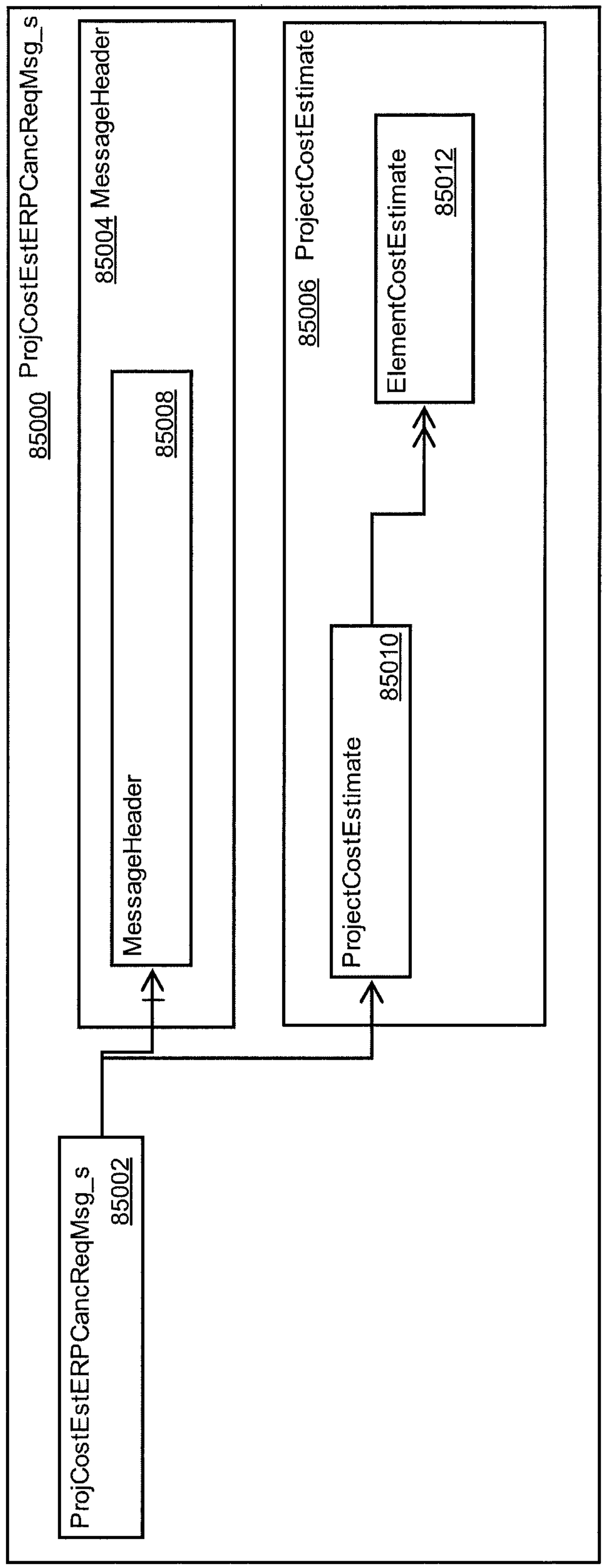
FIG. 85 shows an exemplary ProjCostEstERPCancReqMsg_s Message Data Type.

Additionally, FIG. 85 illustrates one example logical configuration of ProjCostEstERPCancReqMsg_s message 85000. Specifically, this figure depicts the arrangement and hierarchy of various components such as one or more levels of packages, entities, and datatypes, shown here as 85002 through 85012. As described above, packages may be used to represent hierarchy levels. Entities are discrete business elements that are used during a business transaction. Data types are used to type object entities and interfaces with a structure. For example, ProjCostEstERPCancReqMsg_s message 85000 includes, among other things, ProjectCostEstimate 85010. Accordingly, heterogeneous applications may communicate using this consistent message configured as such.

Figure 86:
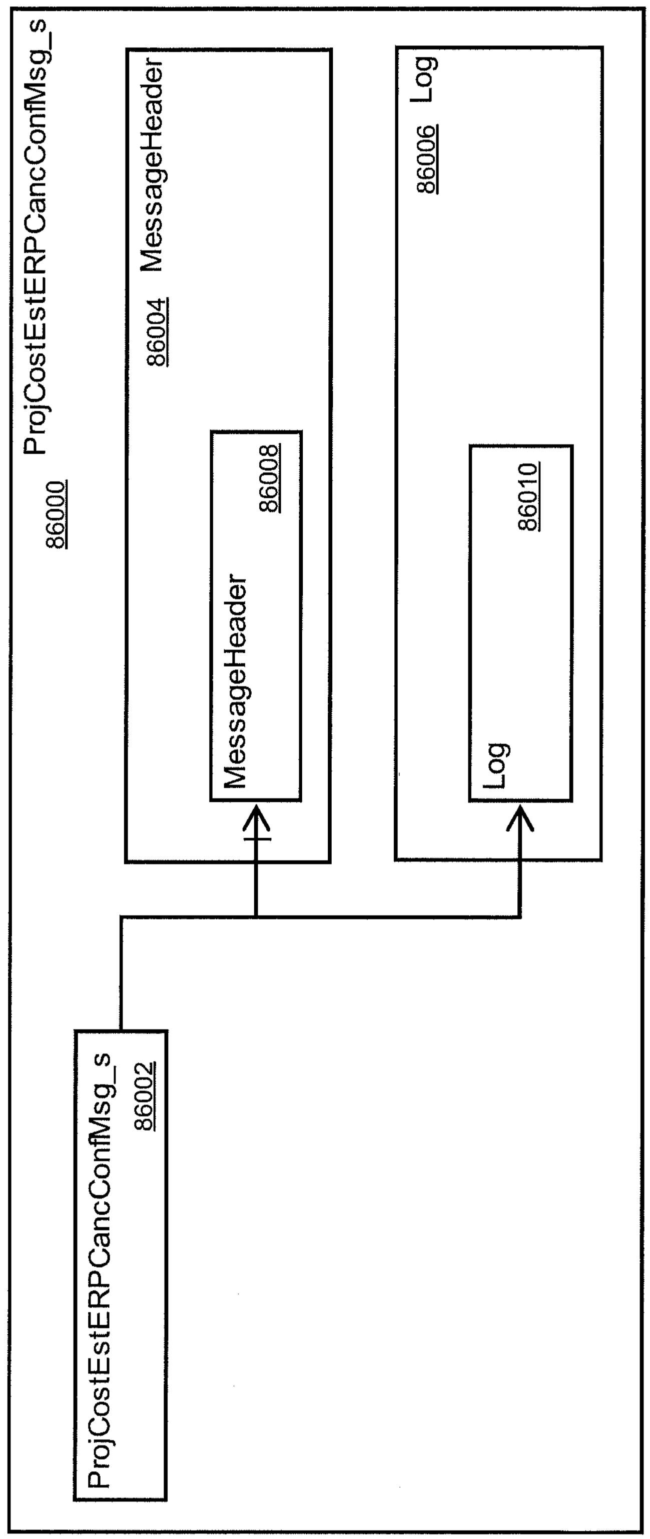
FIG. 86 shows an exemplary ProjCostEstERPCancConfMsg_s Message Data Type.

Additionally, FIG. 86 illustrates one example logical configuration of ProjCostEstERPCancConfMsg_s message 86000. Specifically, this figure depicts the arrangement and hierarchy of various components such as one or more levels of packages, entities, and datatypes, shown here as 86002 through 86010. As described above, packages may be used to represent hierarchy levels. Entities are discrete business elements that are used during a business transaction. Data types are used to type object entities and interfaces with a structure. For example, ProjCostEstERPCancConfMsg_s message 86000 includes, among other things, Log 86010. Accordingly, heterogeneous applications may communicate using this consistent message configured as such.

FIGS. 87-1 through 87-5 show an example configuration of an Element Structure that includes a ProjectCostEstimateMessage 87000 package. The ProjectCostEstimateMessage 87000 package includes a ProjectCostEstimateMessage 87002 entity. The ProjectCostEstimateMessage 87000 package includes various packages, namely a MessageHeader 87004, a ProjectCostEstimate 87010 and a Log 87126.

The MessageHeader 87004 package can be a NOSC_BasicBusinessDocumentMessageHeader 87008 data type. The MessageHeader 87004 package includes a MessageHeader 87006 entity.

The BasicBusinessDocumentMessageHeader can be a collection of identification data of an instance of a business document message, or reference data to another instance of a business document message, or both. The subject of the identification data can be a message instance that conveys information, whereas the reference data can be related to a different message instance previously exchanged between the same interaction parties.

The ProjectCostEstimate 87010 package includes a ProjectCostEstimate 87012 entity. The ProjectCostEstimate 87012 entity includes various attributes, namely a ProjectID 87014, an AccountingPlanningVersionCode 87018 and a ChangeStateID 87022. The ProjectCostEstimate 87012 entity includes an ElementCostEstimate 87026 subordinate entity. The ProjectID 87014 attribute can be a NOSC_ProjectID 87016 data type. The ProjectID can be a unique identifier for a project. The AccountingPlanningVersionCode 87018 attribute can be a NOSC_AccountingPlanningVersionCode 87020 data type.

The AccountingPlanningVersionCode can be a coded representation of a planning version used in Accounting. Planning versions can be used to configure alternative scenarios based on different assumptions. For example, different versions can represent different employment markets, price and wage increases, or sales programs. The ChangeStateID 87022 attribute can be a ChangeStateID 87024 data type. The ElementCostEstimate 87026 entity includes various attributes, namely a ProjectWorkBreakdownStructureElementID 87028, a ProjectActivityID 87032 and a ProjectNetworkID 87036. The ElementCostEstimate 87026 entity includes various subordinate entities, namely a CostModel 87040 and an Item 87056. The ProjectWorkBreakdownStructureElementID 87028 attribute can be a NOSC_ProjectWorkBreakdownStructureElementID 87030 data type. The ProjectWorkBreakdownStructureElement ID can be an identifier for a Project Work Breakdown Structure Element.

A Work Breakdown Structure can organize various tasks involved in a project in a hierarchical structure. The Work Breakdown Structure includes a number of Work Breakdown Structure elements. A Work Breakdown Structure element can represent a certain task or a partial task that can be subdivided further. The ProjectActivityID 87032 attribute can be a ProjectActivityID 87034 data type. The ProjectActivity ID can be an identifier for a Project Activity. A project activity can be a processing section of a process in project management. The ProjectNetworkID 87036 attribute can be a ProjectNetworkID 87038 data type. The ProjectNetwork ID can be an identifier for a Project Network. A project network can represent a sequence of different tasks and inter-relationships between tasks in a project. A project network can be a basis for planning, monitoring and controlling schedules and resources. The CostModel 87040 entity includes an ID 87042 attribute.

The CostModel 87040 entity includes a PropertyValuation 87046 subordinate entity. The ID 87042 attribute can be a NOSC_CostModelID 87044 data type. The CostModelID can be an identifier for a CostModel. The Cost Model can represent a cost simulation project consisting of cost estimates with various cost sources, such as resources, activities, and overhead cost surcharges. The PropertyValuation 87046 entity includes various attributes, namely a PropertyID 87048 and a PropertyValueName 87052. The PropertyID 87048 attribute can be a NOSC_PropertyID 87050 data type. The PropertyID can be a unique identifier for a property. The PropertyValueName 87052 attribute can be a SHORT Name 87054 data type. The description can be a representation of properties of an object in natural language. The Item 87056 entity includes various attributes, namely a @actionCode 87058, a Number 87062, a TypeCode 87066, a ControllingAreaID 87070, a CostCentreID 87074, a CostingActivityResourceClassID 87078, a ProductInternalID 87082, a PlantID 87086, a WorkCentreID 87090, a WorkCentrePlantID 87094, a CostingActivityID 87098, an InventoryValuationTypeCode 87102, a ValuationDate 87106, a LatestScheduledEndDate 87110, a CostElementID 87114, a NetPrice 87118 and a Description 87122. The @actionCode 87058 attribute can be an ActionCode 87060 data type.

The ActionCode can be a coded representation of an instruction to a recipient of a message describing how to process a transmitted element. The Number 87062 attribute can be a NumberValue 87064 data type. The TypeCode 87066 attribute can be a CostEstimateItemTypeCode 87068 data type. The CostEstimateItemTypeCode can be a coded representation of the type of a costing item. The ControllingAreaID 87070 attribute can be a NOSC_ControllingAreaID 87072 data type. The ControllingAreaID can be an identifier for a controlling area. A controlling area can be the highest organizational unit in controlling. Controlling can represent a company's flow of cost and revenue.

The CostCentreID 87074 attribute can be a NOSC_CostCentreID 87076 data type. The CostCentreID can be an identifier for a cost center. A CostCentre can be an organizational unit that represents a clearly defined location at which costs arise and for which costs are recorded separately. The definition can be based on functional requirements, allocation criteria, physical location, and cost responsibility. The CostingActivityResourceClassID 87078 attribute can be a NOSC_ResourceClassID 87080 data type. The CostingActivityResourceClassID can be an identifier of a resource class assigned to a costing activity. A resource class can classify resources of a particular nature, for example, development resources, consulting resources, or production resources. Costing activities can be a basis for activity based costing. A costing activity can describe a structured set of work steps that consume resources and convert them into outputs, such as products and services. A costing activity can correspond to one or more operation activities.

The ProductInternalID 87082 attribute can be a NOSC_ProductInternalID 87084 data type. The ProductID can be a unique identifier for a product. A product can be either a tangible or intangible good, and can be a part of the business activities of a company. It can be traded and can contribute directly or indirectly to value added. The PlantID 87086 attribute can be a NOSC_PlantID 87088 data type. The PlantID can be an identifier of a plant. A Plant can be a structured organisational unit of a company with unique fiscal assignment. The WorkCentreID 87090 attribute can be a NOSC_WorkCentreID 87092 data type. The WorkCentreID can be an identifier of a WorkCentre. A WorkCentre can be an object used to carry out work in logistics. A WorkCentre includes data relevant for costing, scheduling and capacity planning. There can be a possibility of a connection to a Human Resources object to assign employees to the WorkCentre.

The WorkCentrePlantID 87094 attribute can be a NOSC_PlantID 87096 data type. The PlantID can be an identifier of a plant. A Plant can be a structured organisational unit of a company with unique fiscal assignment. The CostingActivityID 87098 attribute can be a NOSC_CostingActivityID 87100 data type. The CostingActivityID can be an identifier for a costing activity. Costing activities can be a basis for activity based costing. A costing activity can describe a structured set of work steps that consume resources and convert them into outputs, such as products and services. A costing activity can correspond to one or more operation activities.

The InventoryValuationTypeCode 87102 attribute can be a NOSC_InventoryValuationTypeCode 87104 data type. The InventoryValuationTypeCode can be a coded representation of a valuation type of a material stock. A valuation type can enable the management of stocks of a material on a value basis in different balance sheet accounts and the handling of these stocks differently for valuation. The ValuationDate 87106 attribute can be a Date 87108 data type. The Date can be a specification of a day in the Gregorian calendar. The LatestScheduledEndDate 87110 attribute can be a Date 87112 data type. The Date can be a specification of a day in the Gregorian calendar.

The CostElementID 87114 attribute can be a CostElementID 87116 data type. The CostElementID can be an identifier for a cost element. A cost element can be a classification of an organization's valuated consumption of production factors within a controlling area. Each cost element can correspond to a cost-relevant item in a chart of accounts. The NetPrice 87118 attribute can be a Price 87120 data type. The Price can be an exchange value, expressed in a monetary unit, of a product or a service in relation to a basic amount. The Description 87122 attribute can be a SHORT_Description 87124 data type. The Description can be a representation of properties of an object in natural language. The Log 87126 package includes a Log 87128 entity.

Additionally, FIG. 88 shows an example configuration of an Element Structure that includes a ProjCostEstERPByProjIDAndAcctgPlngVersCodeQryMsg_s 88000 package. The ProjCostEstERPByProjIDAndAcctgPlngVersCodeQryMsg_s 88000 package includes a ProjCostEstERPByProjIDAndAcctgPlngVersCodeQryMsg_s 88002 entity. The ProjCostEstERPByProjIDAndAcctgPlngVersCodeQryMsg_s 88000 package includes various packages, namely a Selection 88004.

The Selection 88004 package includes a ProjectCostEstimateSelectionByProjIDAndAcctgPlngVersCode 88006 entity. The ProjectCostEstimateSelectionByProjIDAndAcctgPlngVersCode 88006 entity has a cardinality of 1 88008 meaning that for each instance of the Selection 88004 package there is one ProjectCostEstimateSelectionByProjIDAndAcctgPlngVersCode 88006 entity. The ProjectCostEstimateSelectionByProjIDAndAcctgPlngVersCode 88006 entity includes various attributes, namely a ProjectID 88010 and an AccountingPlanningVersionCode 88014. The ProjectID 88010 attribute has a cardinality of 1 88012 meaning that for each instance of the ProjectCostEstimateSelectionByProjIDAndAcctgPlngVersCode 88006 entity there is one ProjectID 88010 attribute. The AccountingPlanningVersionCode 88014 attribute has a cardinality of 1 88016 meaning that for each instance of the ProjectCostEstimateSelectionByProjIDAndAcctgPlngVersCode 88006 entity there is one AccountingPlanningVersionCode 88014 attribute. The data types of the various packages, entities, and attributes are described with respect to FIG. 87.

Additionally, FIGS. 89-1 through 89-4 show an example configuration of an Element Structure that includes a ProjCostEstERPByProjIDAndAcctgPlngVersCodeRspMsg_s 89000 package. The ProjCostEstERPByProjIDAndAcctgPlngVersCodeRspMsg_s 89000 package includes a ProjCostEstERPByProjIDAndAcctgPlngVersCodeRspMsg_s 89002 entity. The ProjCostEstERPByProjIDAndAcctgPlngVersCodeRspMsg_s 89000 package includes various packages, namely a ProjectCostEstimate 89004, and a Log 89106.

The ProjectCostEstimate 89004 package includes a ProjectCostEstimate 89006 entity. The ProjectCostEstimate 89006 entity has a cardinality of 0 . . . 1 89008 meaning that for each instance of the ProjectCostEstimate 89004 package there may be one ProjectCostEstimate 89006 entity. The ProjectCostEstimate 89006 entity includes various attributes, namely a ProjectID 89010, an AccountingPlanningVersionCode 89014 and a ChangeStateID 89018. The ProjectCostEstimate 89006 entity includes an ElementCostEstimate 89022 subordinate entity. The ProjectID 89010 attribute has a cardinality of 1 89012 meaning that for each instance of the ProjectCostEstimate 89006 entity there is one ProjectID 89010 attribute.

The AccountingPlanningVersionCode 89014 attribute has a cardinality of 1 89016 meaning that for each instance of the ProjectCostEstimate 89006 entity there is one AccountingPlanningVersionCode 89014 attribute. The ChangeStateID 89018 attribute has a cardinality of 1 89020 meaning that for each instance of the ProjectCostEstimate 89006 entity there is one ChangeStateID 89018 attribute. The ElementCostEstimate 89022 entity has a cardinality of 0 . . . n 89024 meaning that for each instance of the ProjectCostEstimate 89006 entity there may be one or more ElementCostEstimate 89022 entities.

The ElementCostEstimate 89022 entity includes various attributes, namely a ProjectWorkBreakdownStructureElementID 89026, a ProjectActivityID 89030 and a ProjectNetworkID 89034. The ElementCostEstimate 89022 entity includes an Item 89038 subordinate entity. The ProjectWorkBreakdownStructureElementID 89026 attribute has a cardinality of 0 . . . 1 89028 meaning that for each instance of the ElementCostEstimate 89022 entity there may be one ProjectWorkBreakdownStructureElementID 89026 attribute.

The ProjectActivityID 89030 attribute has a cardinality of 0 . . . 1 89032 meaning that for each instance of the ElementCostEstimate 89022 entity there may be one ProjectActivityID 89030 attribute. The ProjectNetworkID 89034 attribute has a cardinality of 0 . . . 1 89036 meaning that for each instance of the ElementCostEstimate 89022 entity there may be one ProjectNetworkID 89034 attribute. The Item 89038 entity has a cardinality of 0 . . . n 89040 meaning that for each instance of the ElementCostEstimate 89022 entity there may be one or more Item 89038 entities.

The Item 89038 entity includes various attributes, namely a Number 89042, a TypeCode 89046, a ControllingAreaID 89050, a CostCentreID 89054, a CostingActivityResourceClassID 89058, a ProductInternalID 89062, a PlantID 89066, a WorkCentreID 89070, a WorkCentrePlantID 89074, a CostingActivityID 89078, an InventoryValuationTypeCode 89082, a ValuationDate 89086, a LatestScheduledEndDate 89090, a CostElementID 89094, a NetPrice 89098 and a Description 89102. The Number 89042 attribute has a cardinality of 1 89044 meaning that for each instance of the Item 89038 entity there is one Number 89042 attribute. The TypeCode 89046 attribute has a cardinality of 1 89048 meaning that for each instance of the Item 89038 entity there is one TypeCode 89046 attribute.

The ControllingAreaID 89050 attribute has a cardinality of 1 89052 meaning that for each instance of the Item 89038 entity there is one ControllingAreaID 89050 attribute. The CostCentreID 89054 attribute has a cardinality of 0 . . . 1 89056 meaning that for each instance of the Item 89038 entity there may be one CostCentreID 89054 attribute. The CostingActivityResourceClassID 89058 attribute has a cardinality of 0 . . . 1 89060 meaning that for each instance of the Item 89038 entity there may be one CostingActivityResourceClassID 89058 attribute. The ProductInternalID 89062 attribute has a cardinality of 0 . . . 1 89064 meaning that for each instance of the Item 89038 entity there may be one ProductInternalID 89062 attribute. The PlantID 89066 attribute has a cardinality of 0 . . . 1 89068 meaning that for each instance of the Item 89038 entity there may be one PlantID 89066 attribute.

The WorkCentreID 89070 attribute has a cardinality of 0 . . . 1 89072 meaning that for each instance of the Item 89038 entity there may be one WorkCentreID 89070 attribute. The WorkCentrePlantID 89074 attribute has a cardinality of 0 . . . 1 89076 meaning that for each instance of the Item 89038 entity there may be one WorkCentrePlantID 89074 attribute. The CostingActivityID 89078 attribute has a cardinality of 0 . . . 1 89080 meaning that for each instance of the Item 89038 entity there may be one CostingActivityID 89078 attribute. The InventoryValuationTypeCode 89082 attribute has a cardinality of 0 . . . 1 89084 meaning that for each instance of the Item 89038 entity there may be one InventoryValuationTypeCode 89082 attribute.

The ValuationDate 89086 attribute has a cardinality of 0 . . . 1 89088 meaning that for each instance of the Item 89038 entity there may be one ValuationDate 89086 attribute. The LatestScheduledEndDate 89090 attribute has a cardinality of 0 . . . 1 89092 meaning that for each instance of the Item 89038 entity there may be one LatestScheduledEndDate 89090 attribute. The CostElementID 89094 attribute has a cardinality of 0 . . . 1 89096 meaning that for each instance of the Item 89038 entity there may be one CostElementID 89094 attribute. The NetPrice 89098 attribute has a cardinality of 0 . . . 1 89100 meaning that for each instance of the Item 89038 entity there may be one NetPrice 89098 attribute. The Description 89102 attribute has a cardinality of 0 . . . 1 89104 meaning that for each instance of the Item 89038 entity there may be one Description 89102 attribute.

The Log 89106 package includes a Log 89108 entity. The Log 89108 entity has a cardinality of 1 89110 meaning that for each instance of the Log 89106 package there is one Log 89108 entity. The data types of the various packages, entities, and attributes are described with respect to FIG. 87.

Additionally, FIGS. 90-1 through 90-4 show an example configuration of an Element Structure that includes a ProjCostEstERPCrteReqMsg_s 90000 package. The ProjCostEstERPCrteReqMsg_s 90000 package includes a ProjCostEstERPCrteReqMsg_s 90002 entity. The ProjCostEstERPCrteReqMsg_s 90000 package includes various packages, namely a MessageHeader 90004, and a ProjectCostEstimate 90010.

The MessageHeader 90004 package includes a MessageHeader 90006 entity. The MessageHeader 90006 entity has a cardinality of 0 . . . 1 90008 meaning that for each instance of the MessageHeader 90004 package there may be one MessageHeader 90006 entity. The ProjectCostEstimate 90010 package includes a ProjectCostEstimate 90012 entity. The ProjectCostEstimate 90012 entity has a cardinality of 1 90014 meaning that for each instance of the ProjectCostEstimate 90010 package there is one ProjectCostEstimate 90012 entity. The ProjectCostEstimate 90012 entity includes various attributes, namely a ProjectID 90016 and an AccountingPlanningVersionCode 90020.

The ProjectCostEstimate 90012 entity includes an ElementCostEstimate 90024 subordinate entity. The ProjectID 90016 attribute has a cardinality of 1 90018 meaning that for each instance of the ProjectCostEstimate 90012 entity there is one ProjectID 90016 attribute. The AccountingPlanningVersionCode 90020 attribute has a cardinality of 1 90022 meaning that for each instance of the ProjectCostEstimate 90012 entity there is one AccountingPlanningVersionCode 90020 attribute. The ElementCostEstimate 90024 entity has a cardinality of 1 . . . n 90026 meaning that for each instance of the ProjectCostEstimate 90012 entity there are one or more ElementCostEstimate 90024 entities. The ElementCostEstimate 90024 entity includes various attributes, namely a ProjectWorkBreakdownStructureElementID 90028, a ProjectActivityID 90032 and a ProjectNetworkID 90036.

The ElementCostEstimate 90024 entity includes various subordinate entities, namely a CostModel 90040 and an Item 90060. The ProjectWorkBreakdownStructureElementID 90028 attribute has a cardinality of 0 . . . 1 90030 meaning that for each instance of the ElementCostEstimate 90024 entity there may be one ProjectWorkBreakdownStructureElementID 90028 attribute. The ProjectActivityID 90032 attribute has a cardinality of 0 . . . 1 90034 meaning that for each instance of the ElementCostEstimate 90024 entity there may be one ProjectActivityID 90032 attribute. The ProjectNetworkID 90036 attribute has a cardinality of 0 . . . 1 90038 meaning that for each instance of the ElementCostEstimate 90024 entity there may be one ProjectNetworkID 90036 attribute.

The CostModel 90040 entity has a cardinality of 0 . . . 1 90042 meaning that for each instance of the ElementCostEstimate 90024 entity there may be one CostModel 90040 entity. The CostModel 90040 entity includes an ID 90044 attribute. The CostModel 90040 entity includes a PropertyValuation 90048 subordinate entity. The ID 90044 attribute has a cardinality of 1 90046 meaning that for each instance of the CostModel 90040 entity there is one ID 90044 attribute.

The PropertyValuation 90048 entity has a cardinality of 0 . . . n 90050 meaning that for each instance of the CostModel 90040 entity there may be one or more PropertyValuation 90048 entities. The PropertyValuation 90048 entity includes various attributes, namely a PropertyID 90052 and a PropertyValueName 90056. The PropertyID 90052 attribute has a cardinality of 1 90054 meaning that for each instance of the PropertyValuation 90048 entity there is one PropertyID 90052 attribute. The PropertyValueName 90056 attribute has a cardinality of 1 90058 meaning that for each instance of the PropertyValuation 90048 entity there is one PropertyValueName 90056 attribute.

The Item 90060 entity has a cardinality of 0 . . . n 90062 meaning that for each instance of the ElementCostEstimate 90024 entity there may be one or more Item 90060 entities. The Item 90060 entity includes various attributes, namely a TypeCode 90064, a ControllingAreaID 90068, a CostCentreID 90072, a CostingActivityResourceClassID 90076, a ProductInternalID 90080, a PlantID 90084, a WorkCentreID 90088, a WorkCentrePlantID 90092, a CostingActivityID 90096, an InventoryValuationTypeCode 90100, a CostElementID 90104, a NetPrice 90108 and a Description 90112. The TypeCode 90064 attribute has a cardinality of 1 90066 meaning that for each instance of the Item 90060 entity there is one TypeCode 90064 attribute.

The ControllingAreaID 90068 attribute has a cardinality of 1 90070 meaning that for each instance of the Item 90060 entity there is one ControllingAreaID 90068 attribute. The CostCentreID 90072 attribute has a cardinality of 0 . . . 1 90074 meaning that for each instance of the Item 90060 entity there may be one CostCentreID 90072 attribute. The CostingActivityResourceClassID 90076 attribute has a cardinality of 0 . . . 1 90078 meaning that for each instance of the Item 90060 entity there may be one CostingActivityResourceClassID 90076 attribute.

The ProductInternalID 90080 attribute has a cardinality of 0 . . . 1 90082 meaning that for each instance of the Item 90060 entity there may be one ProductInternalID 90080 attribute. The PlantID 90084 attribute has a cardinality of 0 . . . 1 90086 meaning that for each instance of the Item 90060 entity there may be one PlantID 90084 attribute. The WorkCentreID 90088 attribute has a cardinality of 0 . . . 1 90090 meaning that for each instance of the Item 90060 entity there may be one WorkCentreID 90088 attribute. The WorkCentrePlantID 90092 attribute has a cardinality of 0 . . . 1 90094 meaning that for each instance of the Item 90060 entity there may be one WorkCentrePlantID 90092 attribute. The CostingActivityID 90096 attribute has a cardinality of 0 . . . 1 90098 meaning that for each instance of the Item 90060 entity there may be one CostingActivityID 90096 attribute.

The InventoryValuationTypeCode 90100 attribute has a cardinality of 0 . . . 1 90102 meaning that for each instance of the Item 90060 entity there may be one InventoryValuationTypeCode 90100 attribute. The CostElementID 90104 attribute has a cardinality of 0 . . . 1 90106 meaning that for each instance of the Item 90060 entity there may be one CostElementID 90104 attribute. The NetPrice 90108 attribute has a cardinality of 0 . . . 1 90110 meaning that for each instance of the Item 90060 entity there may be one NetPrice 90108 attribute. The Description 90112 attribute has a cardinality of 0 . . . 1 90114 meaning that for each instance of the Item 90060 entity there may be one Description 90112 attribute. The data types of the various packages, entities, and attributes are described with respect to FIG. 87.

Additionally, FIG. 91 shows an example configuration of an Element Structure that includes a ProjCostEstERPCrteConfMsg_s 91000 package. The ProjCostEstERPCrteConfMsg_s 91000 package includes a ProjCostEstERPCrteConfMsg_s 91002 entity. The ProjCostEstERPCrteConfMsg_s 91000 package includes various packages, namely a MessageHeader 91004, and a Log 91010.

The MessageHeader 91004 package includes a MessageHeader 91006 entity. The MessageHeader 91006 entity has a cardinality of 0 . . . 1 91008 meaning that for each instance of the MessageHeader 91004 package there may be one MessageHeader 91006 entity. The Log 91010 package includes a Log 91012 entity. The Log 91012 entity has a cardinality of 1 91014 meaning that for each instance of the Log 91010 package there is one Log 91012 entity. The data types of the various packages, entities, and attributes are described with respect to FIG. 87.

Additionally, FIGS. 92-1 through 92-4 show an example configuration of an Element Structure that includes a ProjCostEstERPUpdtReqMsg_s 92000 package. The ProjCostEstERPUpdtReqMsg_s 92000 package includes a ProjCostEstERPUpdtReqMsg_s 92002 entity. The ProjCostEstERPUpdtReqMsg_s 92000 package includes various packages, namely a MessageHeader 92004, and a ProjectCostEstimate 92008.

The MessageHeader 92004 package includes a MessageHeader 92006 entity. The ProjectCostEstimate 92008 package includes a ProjectCostEstimate 92010 entity. The ProjectCostEstimate 92010 entity has a cardinality of 1 92012 meaning that for each instance of the ProjectCostEstimate 92008 package there is one ProjectCostEstimate 92010 entity. The ProjectCostEstimate 92010 entity includes various attributes, namely a ProjectID 92014, an AccountingPlanningVersionCode 92018 and a ChangeStateID 92022. The ProjectCostEstimate 92010 entity includes an ElementCostEstimate 92026 subordinate entity.

The ProjectID 92014 attribute has a cardinality of 1 92016 meaning that for each instance of the ProjectCostEstimate 92010 entity there is one ProjectID 92014 attribute. The AccountingPlanningVersionCode 92018 attribute has a cardinality of 1 92020 meaning that for each instance of the ProjectCostEstimate 92010 entity there is one AccountingPlanningVersionCode 92018 attribute. The ChangeStateID 92022 attribute has a cardinality of 1 92024 meaning that for each instance of the ProjectCostEstimate 92010 entity there is one ChangeStateID 92022 attribute.

The ElementCostEstimate 92026 entity has a cardinality of 1 . . . n 92028 meaning that for each instance of the ProjectCostEstimate 92010 entity there are one or more ElementCostEstimate 92026 entities. The ElementCostEstimate 92026 entity includes various attributes, namely a ProjectWorkBreakdownStructureElementID 92030, a ProjectActivityID 92034 and a ProjectNetworkID 92038.

The ElementCostEstimate 92026 entity includes an Item 92042 subordinate entity. The ProjectWorkBreakdownStructureElementID 92030 attribute has a cardinality of 0 . . . 1 92032 meaning that for each instance of the ElementCostEstimate 92026 entity there may be one ProjectWorkBreakdownStructureElementID 92030 attribute. The ProjectActivityID 92034 attribute has a cardinality of 0 . . . 1 92036 meaning that for each instance of the ElementCostEstimate 92026 entity there may be one ProjectActivityID 92034 attribute. The ProjectNetworkID 92038 attribute has a cardinality of 0 . . . 1 92040 meaning that for each instance of the ElementCostEstimate 92026 entity there may be one ProjectNetworkID 92038 attribute.

The Item 92042 entity has a cardinality of 1 . . . n 92044 meaning that for each instance of the ElementCostEstimate 92026 entity there are one or more Item 92042 entities. The Item 92042 entity includes various attributes, namely a @actionCode 92046, a Number 92050, a ControllingAreaID 92054, a TypeCode 92058, a CostCentreID 92062, a CostingActivityResourceClassID 92066, a ProductInternalID 92070, a PlantID 92074, a WorkCentreID 92078, a WorkCentrePlantID 92082, a CostingActivityID 92086, an InventoryValuationTypeCode 92090, a CostElementID 92094, a NetPrice 92098 and a Description 92102. The @actionCode 92046 attribute has a cardinality of 1 92048 meaning that for each instance of the Item 92042 entity there is one @actionCode 92046 attribute. The Number 92050 attribute has a cardinality of 1 92052 meaning that for each instance of the Item 92042 entity there is one Number 92050 attribute.

The ControllingAreaID 92054 attribute has a cardinality of 1 92056 meaning that for each instance of the Item 92042 entity there is one ControllingAreaID 92054 attribute. The TypeCode 92058 attribute has a cardinality of 0 . . . 1 92060 meaning that for each instance of the Item 92042 entity there may be one TypeCode 92058 attribute. The CostCentreID 92062 attribute has a cardinality of 0 . . . 1 92064 meaning that for each instance of the Item 92042 entity there may be one CostCentreID 92062 attribute. The CostingActivityResourceClassID 92066 attribute has a cardinality of 0 . . . 1 92068 meaning that for each instance of the Item 92042 entity there may be one CostingActivityResourceClassID 92066 attribute.

The ProductInternalID 92070 attribute has a cardinality of 0 . . . 1 92072 meaning that for each instance of the Item 92042 entity there may be one ProductInternalID 92070 attribute. The PlantID 92074 attribute has a cardinality of 0 . . . 1 92076 meaning that for each instance of the Item 92042 entity there may be one PlantID 92074 attribute. The WorkCentreID 92078 attribute has a cardinality of 0 . . . 1 92080 meaning that for each instance of the Item 92042 entity there may be one WorkCentreID 92078 attribute. The WorkCentrePlantID 92082 attribute has a cardinality of 0 . . . 1 92084 meaning that for each instance of the Item 92042 entity there may be one WorkCentrePlantID 92082 attribute.

The CostingActivityID 92086 attribute has a cardinality of 0 . . . 1 92088 meaning that for each instance of the Item 92042 entity there may be one CostingActivityID 92086 attribute. The InventoryValuationTypeCode 92090 attribute has a cardinality of 0 . . . 1 92092 meaning that for each instance of the Item 92042 entity there may be one InventoryValuationTypeCode 92090 attribute. The CostElementID 92094 attribute has a cardinality of 0 . . . 1 92096 meaning that for each instance of the Item 92042 entity there may be one CostElementID 92094 attribute. The NetPrice 92098 attribute has a cardinality of 0 . . . 1 92100 meaning that for each instance of the Item 92042 entity there may be one NetPrice 92098 attribute. The Description 92102 attribute has a cardinality of 0 . . . 1 92104 meaning that for each instance of the Item 92042 entity there may be one Description 92102 attribute. The data types of the various packages, entities, and attributes are described with respect to FIG. 87.

Additionally, FIG. 93 shows an example configuration of an Element Structure that includes a ProjCostEstERPUpdtConfMsg_s 93000 package. The ProjCostEstERPUpdtConfMsg_s 93000 package includes a ProjCostEstERPUpdtConfMsg_s 93002 entity. The ProjCostEstERPUpdtConfMsg_s 93000 package includes various packages, namely a MessageHeader 93004, and a Log 93010.

The MessageHeader 93004 package includes a MessageHeader 93006 entity. The MessageHeader 93006 entity has a cardinality of 0 . . . 1 93008 meaning that for each instance of the MessageHeader 93004 package there may be one MessageHeader 93006 entity. The Log 93010 package includes a Log 93012 entity. The Log 93012 entity has a cardinality of 1 93014 meaning that for each instance of the Log 93010 package there is one Log 93012 entity. The data types of the various packages, entities, and attributes are described with respect to FIG. 87.

Additionally, FIGS. 94-1 through 94-2 show an example configuration of an Element Structure that includes a ProjCostEstERPCancReqMsg_s 94000 package. The ProjCostEstERPCancReqMsg_s 94000 package includes a ProjCostEstERPCancReqMsg_s 94002 entity. The ProjCostEstERPCancReqMsg_s 94000 package includes various packages, namely a MessageHeader 94004, and a ProjectCostEstimate 94010.

The MessageHeader 94004 package includes a MessageHeader 94006 entity. The MessageHeader 94006 entity has a cardinality of 0 . . . 1 94008 meaning that for each instance of the MessageHeader 94004 package there may be one MessageHeader 94006 entity. The ProjectCostEstimate 94010 package includes a ProjectCostEstimate 94012 entity. The ProjectCostEstimate 94012 entity has a cardinality of 1 94014 meaning that for each instance of the ProjectCostEstimate 94010 package there is one ProjectCostEstimate 94012 entity. The ProjectCostEstimate 94012 entity includes various attributes, namely a ProjectID 94016 and an AccountingPlanningVersionCode 94020.

The ProjectCostEstimate 94012 entity includes an ElementCostEstimate 94024 subordinate entity. The ProjectID 94016 attribute has a cardinality of 1 94018 meaning that for each instance of the ProjectCostEstimate 94012 entity there is one ProjectID 94016 attribute. The AccountingPlanningVersionCode 94020 attribute has a cardinality of 1 94022 meaning that for each instance of the ProjectCostEstimate 94012 entity there is one AccountingPlanningVersionCode 94020 attribute. The ElementCostEstimate 94024 entity has a cardinality of 1 . . . n 94026 meaning that for each instance of the ProjectCostEstimate 94012 entity there are one or more ElementCostEstimate 94024 entities. The ElementCostEstimate 94024 entity includes various attributes, namely a ProjectWorkBreakdownStructureElementID 94028, a ProjectActivityID 94032 and a ProjectNetworkID 94036.

The ProjectWorkBreakdownStructureElementID 94028 attribute has a cardinality of 0 . . . 1 94030 meaning that for each instance of the ElementCostEstimate 94024 entity there may be one ProjectWorkBreakdownStructureElementID 94028 attribute. The ProjectActivityID 94032 attribute has a cardinality of 0 . . . 1 94034 meaning that for each instance of the ElementCostEstimate 94024 entity there may be one ProjectActivityID 94032 attribute. The ProjectNetworkID 94036 attribute has a cardinality of 0 . . . 1 94038 meaning that for each instance of the ElementCostEstimate 94024 entity there may be one ProjectNetworkID 94036 attribute. The data types of the various packages, entities, and attributes are described with respect to FIG. 87.

Additionally, FIG. 95 shows an example configuration of an Element Structure that includes a ProjCostEstERPCancConfMsg_s 95000 package. The ProjCostEstERPCancConfMsg_s 95000 package includes a ProjCostEstERPCancConfMsg_s 95002 entity. The ProjCostEstERPCancConfMsg_s 95000 package includes various packages, namely a MessageHeader 95004, and a Log 95010.

The MessageHeader 95004 package includes a MessageHeader 95006 entity. The MessageHeader 95006 entity has a cardinality of 0 . . . 1 95008 meaning that for each instance of the MessageHeader 95004 package there may be one MessageHeader 95006 entity. The Log 95010 package includes a Log 95012 entity. The Log 95012 entity has a cardinality of 1 95014 meaning that for each instance of the Log 95010 package there is one Log 95012 entity. The data types of the various packages, entities, and attributes are described with respect to FIG. 87.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for performing a budget availability control register service, the budget availability control register service allowing a user to determine available and consumed budgets on an assignment, the medium comprising:

program code for receiving, via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message from budget processing for querying a budget availability control register for available and already consumed budget values for an account assignment with possible restrictions on a time period and budget relevant attributes, the first message including a first message package derived from the common business object model, the first message package hierarchically organized in memory as including:

at a first hierarchical level within the first message package, a budget availability control register enterprise resource planning item by elements query message entity; and at the first hierarchical level in the first message package, a selection package comprising, at a second hierarchical level in the first message package, a budget availability control register item selection by elements entity, where the budget availability control register item selection by elements entity includes, at a third hierarchical level in the first message package, a fiscal year ID, at least one selection by budget availability control register code, and at least one of a funds management area ID, a cash effectiveness fiscal year ID, a consuming project reference, a consuming internal order ID, or a consuming maintenance order reference, where each selection by budget availability control register code includes, at a fourth hierarchical level in the first message package, an inclusion/exclusion code, an interval boundary type code, and a lower boundary budget availability control register code;

program code for processing the first message based on the hierarchical organization of the first message package, where processing the first message includes unpacking the first message package based on the first message package's structure and the first message package's derivation from the common business object model, wherein the particular structure of the first message package is used at least in part to identify the purpose of the first message package; and program code for sending a second message to the heterogeneous application responsive to the first message, where the second message includes a second message package derived from the common business object model to provide consistent semantics with the first message package.

2. The computer readable medium of claim 1, wherein the second message comprises a response to the query of the first message and the second message package is derived from the common business object model and is hierarchically organized in memory as including:

a budget availability control register enterprise resource planning item by elements response message entity; and a budget availability control register package and a log package, the budget availability control register package comprising at least one budget availability control register entity, where each budget availability control register entity includes a budget availability control register code and a budget availability control register name.

3. The computer readable medium of claim 1, wherein each selection by budget availability control register code includes, at the fourth hierarchical level in the first message package, an upper boundary budget availability control register code.

* * * * *